United States Patent
Kuribayashi et al.

(10) Patent No.: US 10,359,883 B2
(45) Date of Patent: Jul. 23, 2019

(54) DETECTION DEVICE, ELECTRONIC APPARATUS, DETECTION METHOD AND PROGRAM

(71) Applicant: NIKON CORPORATION, Tokyo (JP)

(72) Inventors: Hidenori Kuribayashi, Tokyo (JP); Tatsuyoshi Tanabe, Tokyo (JP); Marie Shimoyama, Tokyo (JP); Hidefumi Toki, Fuchu (JP); Daisaku Komiya, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 15/123,951

(22) PCT Filed: Dec. 26, 2014

(86) PCT No.: PCT/JP2014/084714
§ 371 (c)(1),
(2) Date: Sep. 6, 2016

(87) PCT Pub. No.: WO2016/103520
PCT Pub. Date: Jun. 30, 2016

(65) Prior Publication Data
US 2017/0017344 A1     Jan. 19, 2017

(51) Int. Cl.
  *G06F 3/041* (2006.01)
  *G06F 3/042* (2006.01)
  (Continued)

(52) U.S. Cl.
  CPC ....... *G06F 3/0418* (2013.01); *G02B 27/2285* (2013.01); *G06F 3/013* (2013.01); *G06F 3/044* (2013.01); *G06F 3/0421* (2013.01); *G06F 3/0423* (2013.01); *G06F 3/0425* (2013.01); *G06F 3/0488* (2013.01); *G06F 3/04842* (2013.01); *G07F 19/20* (2013.01); *G06F 2203/0381* (2013.01); *G06F 2203/04101* (2013.01)

(58) Field of Classification Search
None
See application file for complete search history.

(56) References Cited

U.S. PATENT DOCUMENTS 7,893,920 B2   2/2011   Endoh
8,456,416 B2   6/2013   Izumi
(Continued)

FOREIGN PATENT DOCUMENTS

EP   2 613 226 A1   7/2013
JP   2005-321869 A   11/2005
(Continued)

OTHER PUBLICATIONS

Feb. 10, 2015 International Search Report issued in PCT/JP2014/084714.
(Continued)

*Primary Examiner* — Kenneth B Lee, Jr.
(74) *Attorney, Agent, or Firm* — Oliff PLC

(57) ABSTRACT

A detection device that detects an operation by a user on a display in midair, includes: a control unit that changes a positional relationship between a detection reference detecting the operation and the display, wherein: the control unit is capable of changing the positional relationship by user.

36 Claims, 61 Drawing Sheets

(51) Int. Cl.
  *G06F 3/044* (2006.01)
  *G06F 3/0488* (2013.01)
  *G02B 27/22* (2018.01)
  *G06F 3/01* (2006.01)
  *G07F 19/00* (2006.01)
  *G06F 3/0484* (2013.01)

(56) References Cited

U.S. PATENT DOCUMENTS

| | | |
|---|---|---|
| 8,614,696 B2 | 12/2013 | Tokuda et al. |
| 8,890,809 B2 | 11/2014 | Izumi |
| 2007/0097096 A1 | 5/2007 | Rosenberg |
| 2011/0187706 A1 | 8/2011 | Vesely et al. |
| 2012/0056989 A1* | 3/2012 | Izumi ............... H04N 13/0014 348/46 |
| 2013/0181897 A1 | 7/2013 | Izumi |
| 2014/0009424 A1* | 1/2014 | Nagata ............... G06F 3/0416 345/173 |
| 2014/0015794 A1 | 1/2014 | Ueno et al. |
| 2014/0176477 A1 | 6/2014 | Nakao |
| 2014/0282274 A1 | 9/2014 | Everitt et al. |
| 2015/0035781 A1* | 2/2015 | Oshinome ............ G06F 3/0488 345/173 |

FOREIGN PATENT DOCUMENTS

| | | |
|---|---|---|
| JP | 2010-015553 A | 1/2010 |
| JP | 2011-108152 A | 6/2011 |
| JP | 2011-175617 A | 9/2011 |
| JP | 2012-098959 A | 5/2012 |
| JP | 2012-203736 A | 10/2012 |
| JP | 2012-203737 A | 10/2012 |
| JP | 2012-216095 A | 11/2012 |
| JP | 2014-067071 A | 4/2014 |
| WO | 2013/136333 A1 | 9/2013 |

OTHER PUBLICATIONS

Feb. 10, 2015 International Search Report issued in PCT/JP2014/084715.
Mar. 17, 2015 International Search Report issued in PCT/JP2014/084716.
Jan. 16, 2018 Office Action issued in Japanese Application No. 2016-509807.
Jun. 22, 2018 Search Report issued in European Patent Application No. 14909121.7.
Apr. 30, 2019 Office Action issued in European Patent Application No. 14 909 121.7.

* cited by examiner

FIG.1
(a)
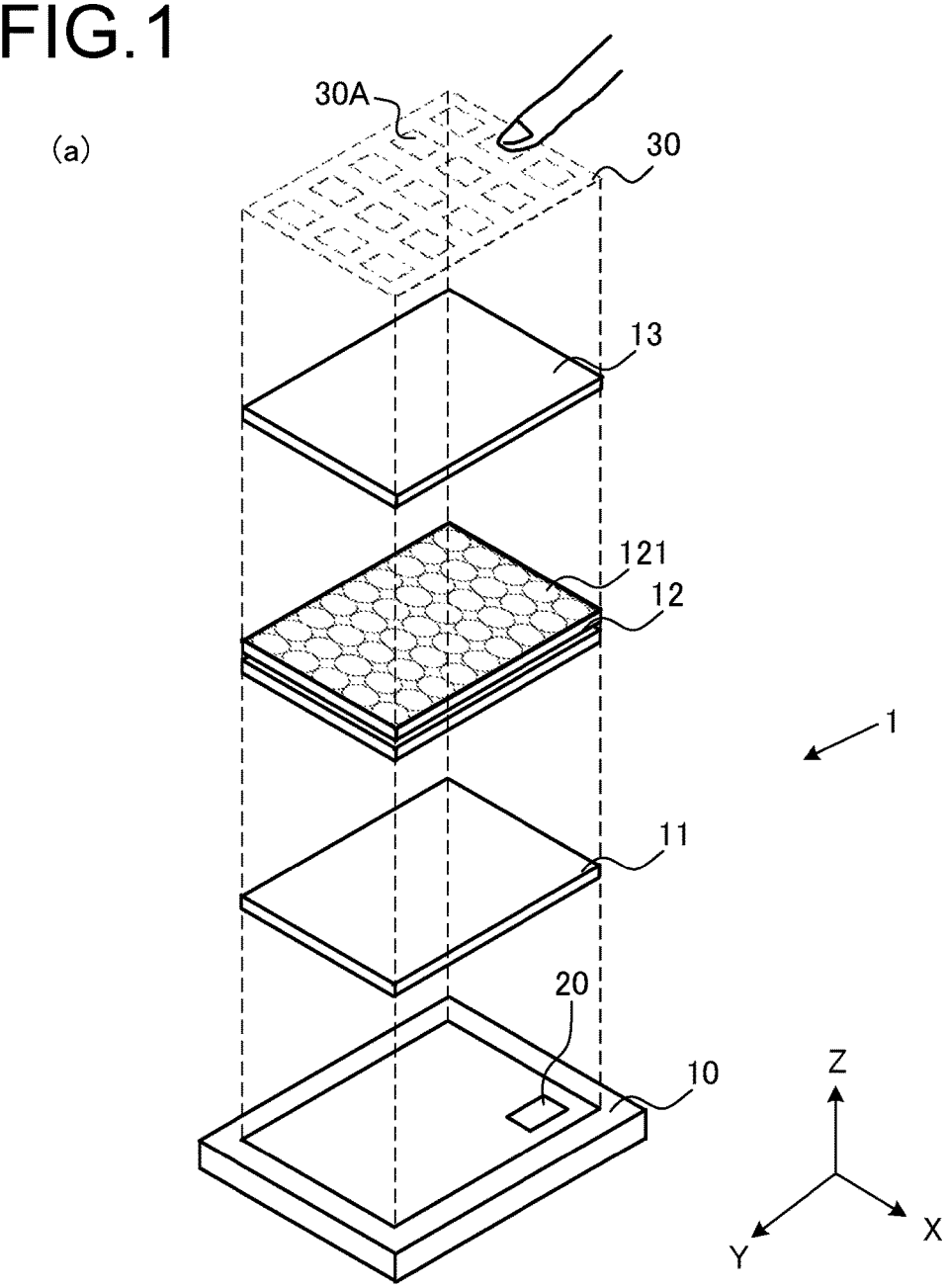
(b)
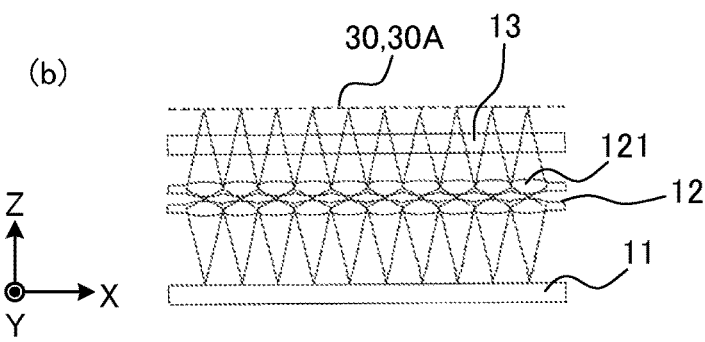

FIG.3
(a)
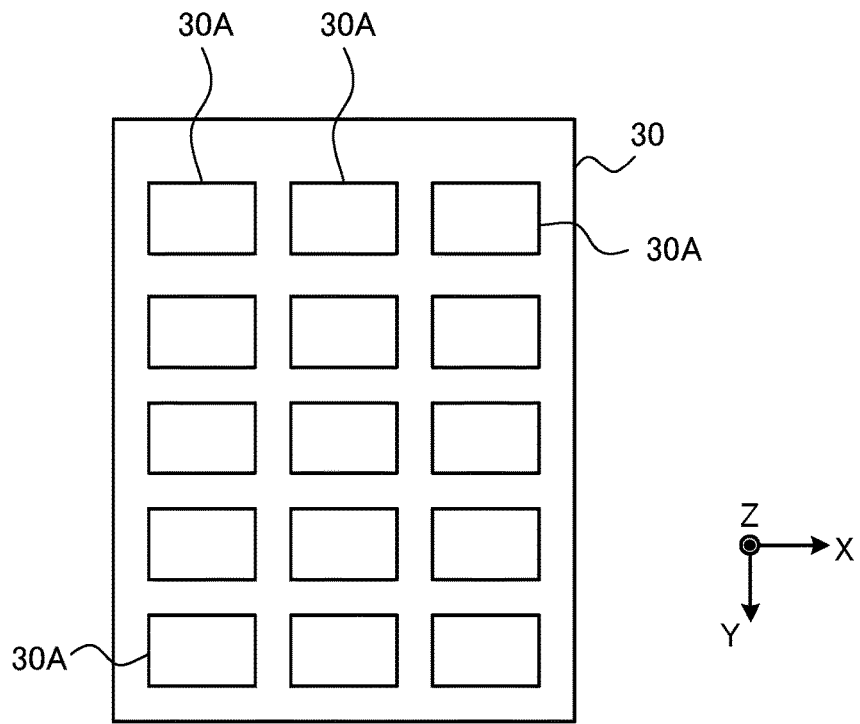
(b)
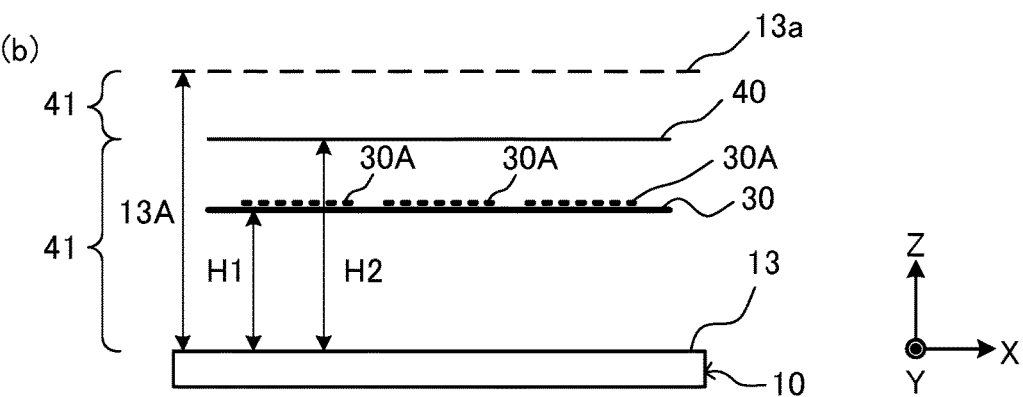
(c)
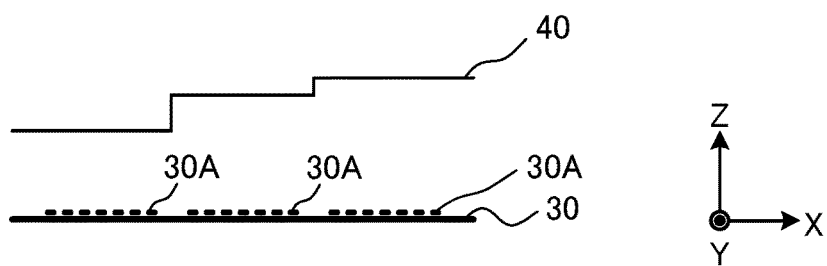

FIG.5
(a)
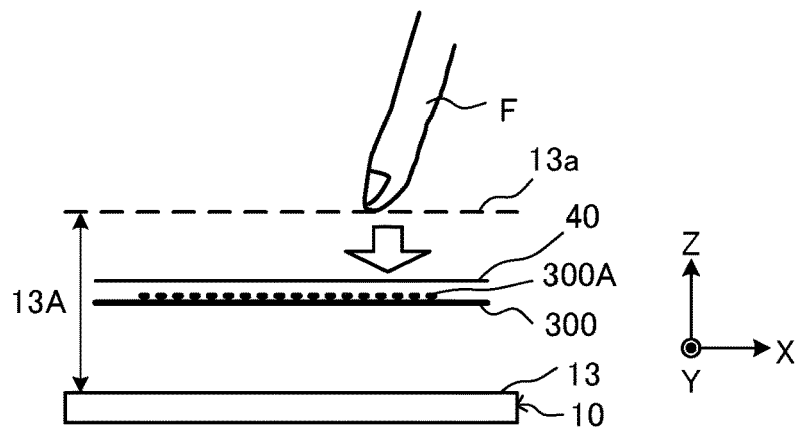
(b)
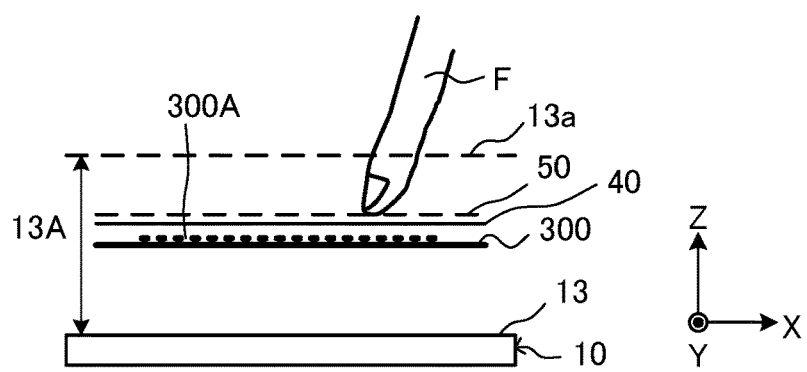
(c)
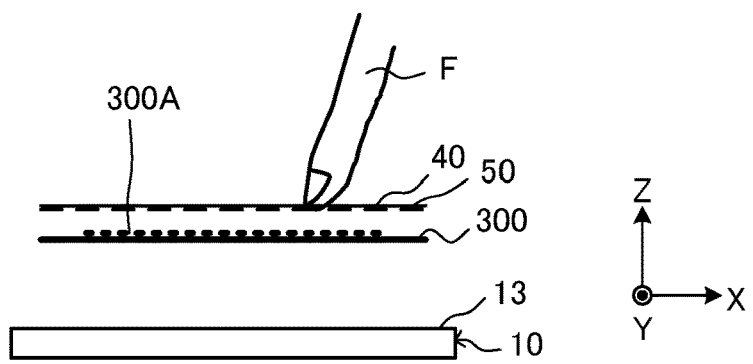
(d)
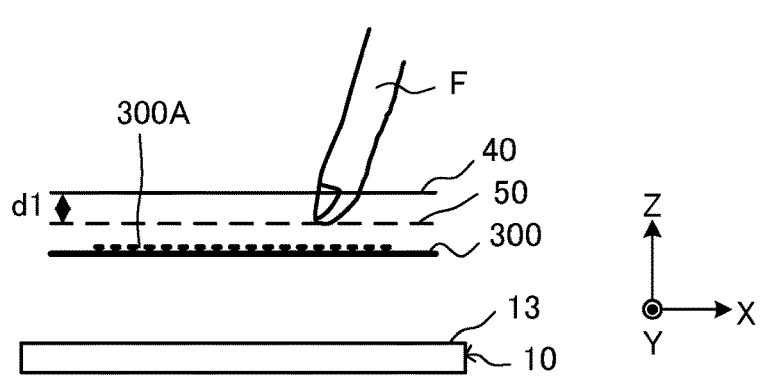

FIG.10
(a)
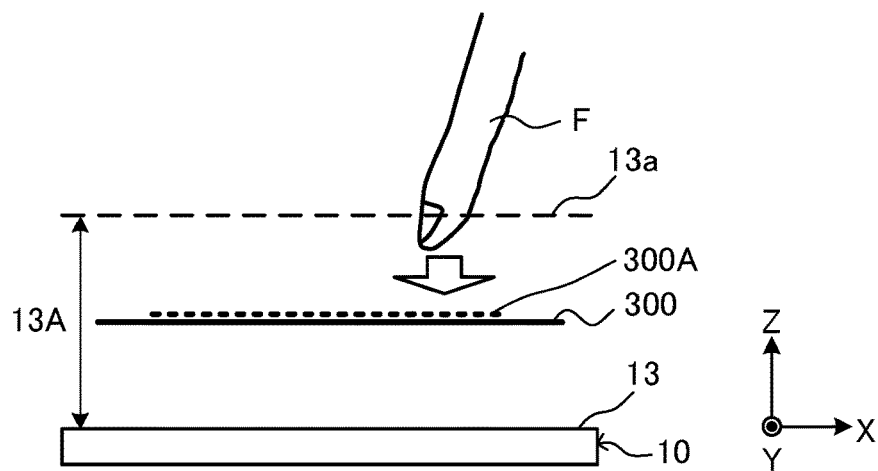
(b)
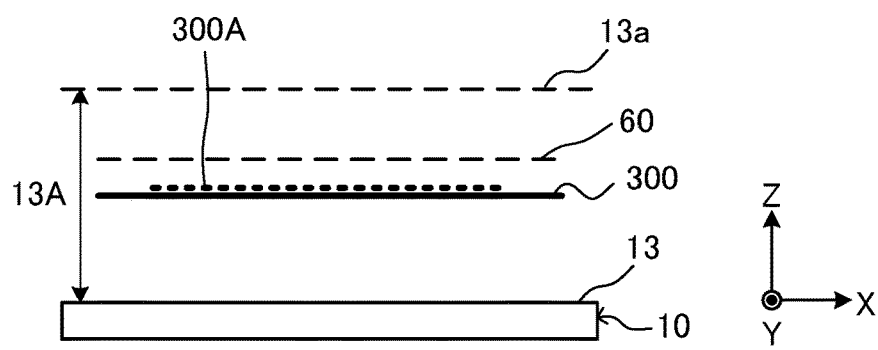
(c)
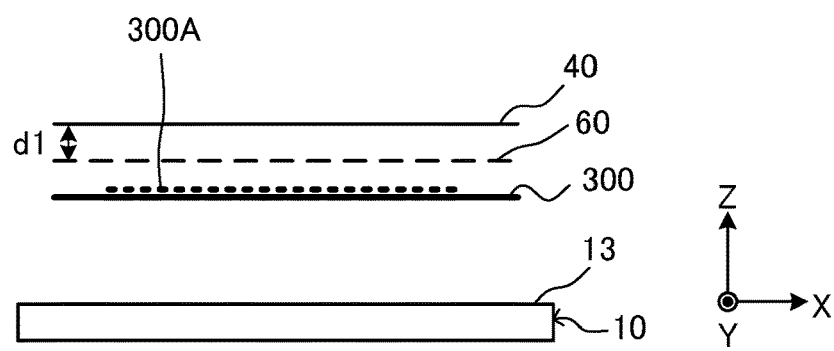

FIG.13
(a)
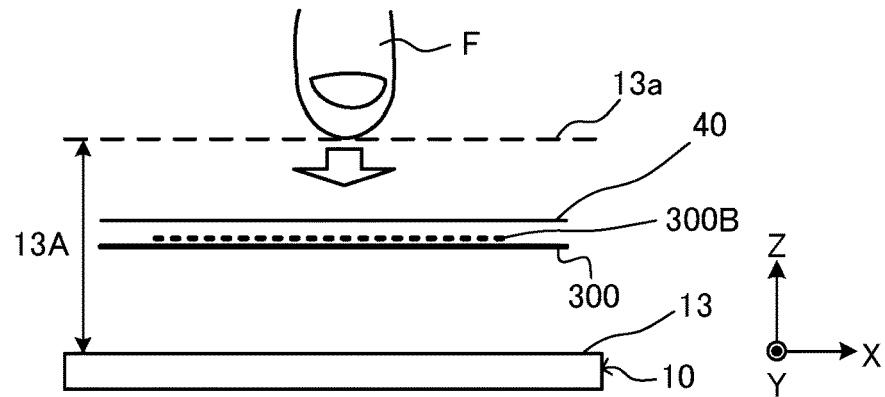
(b)
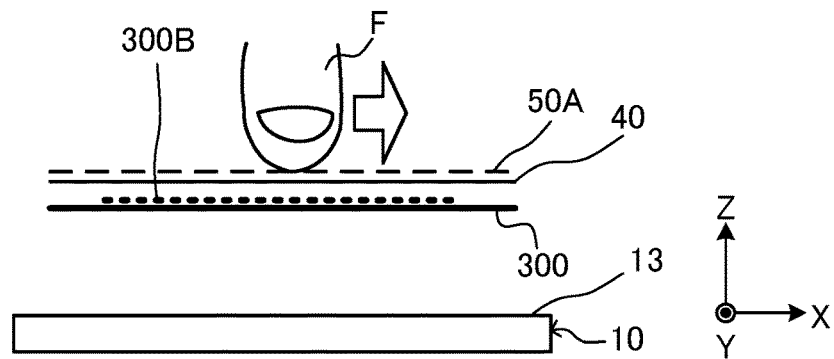
(c)
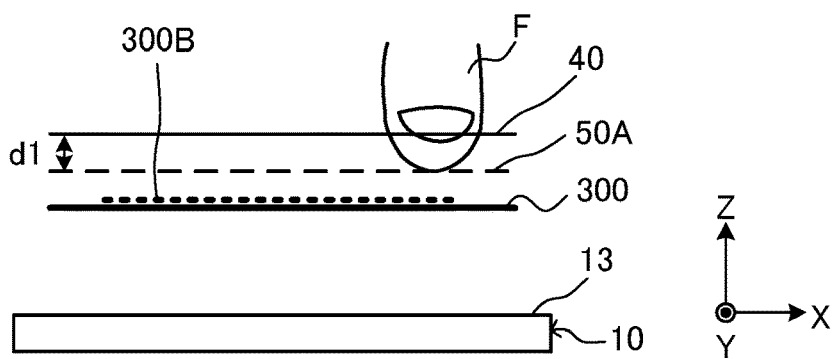

FIG.21
(a)
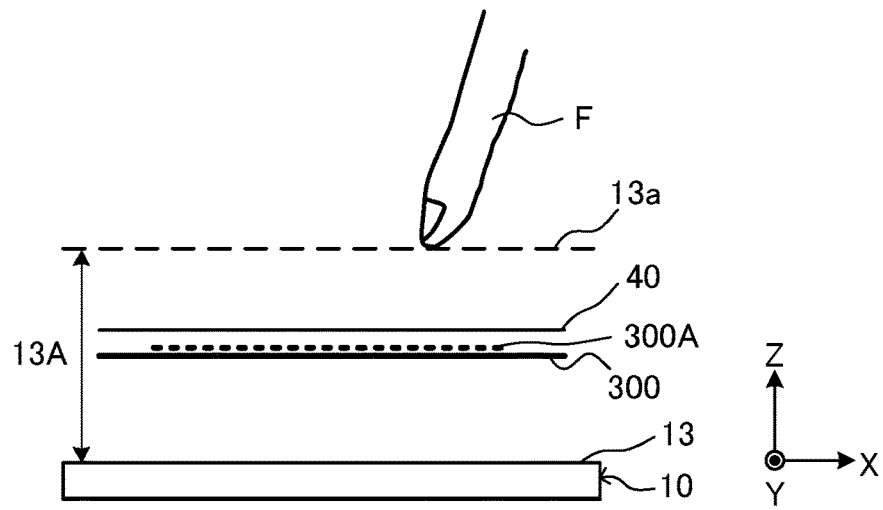
(b)
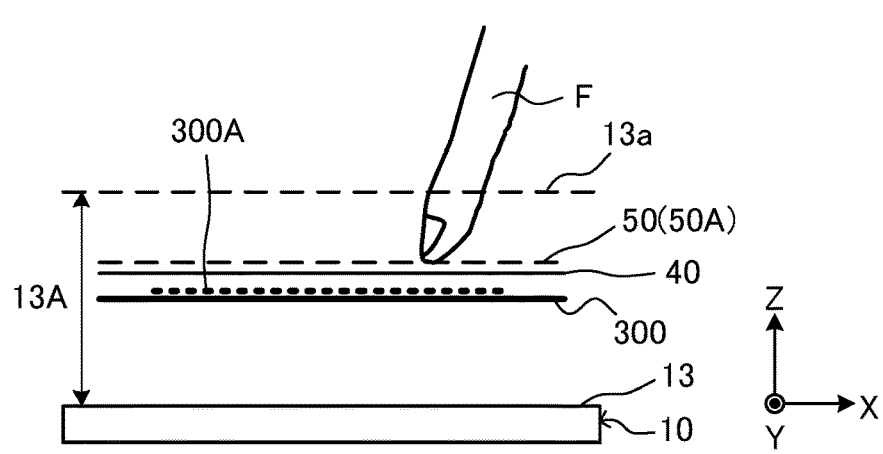
(c)
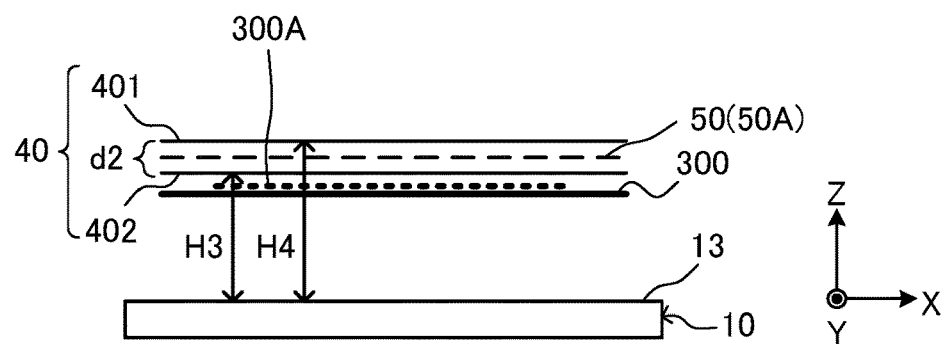

FIG.29
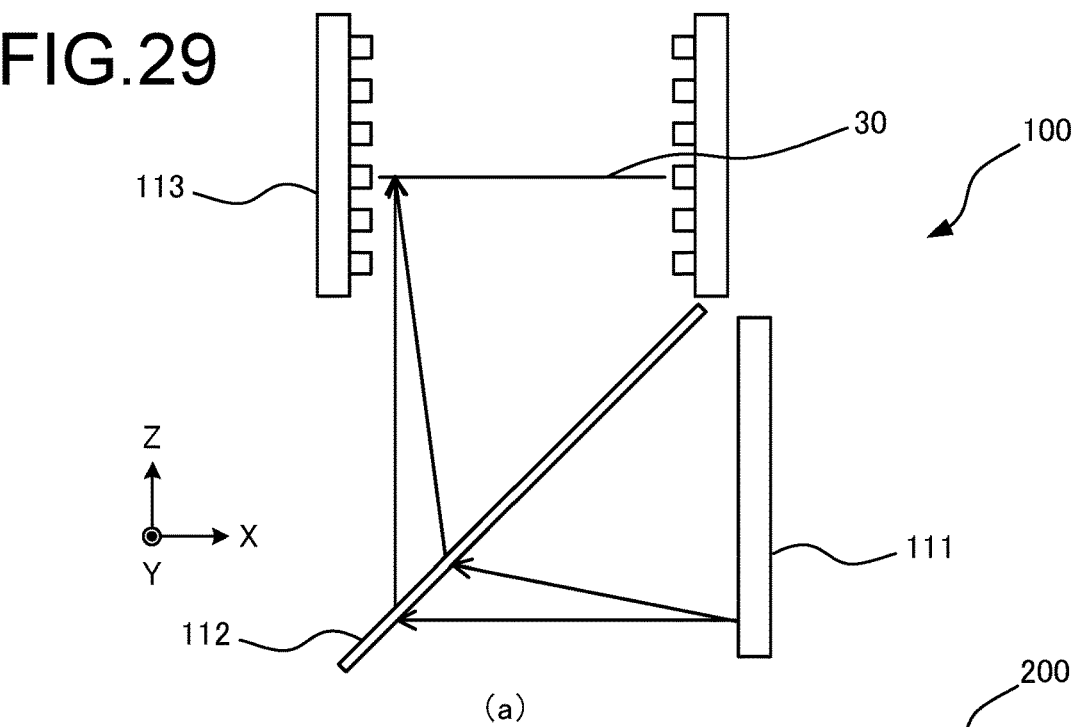
(a)
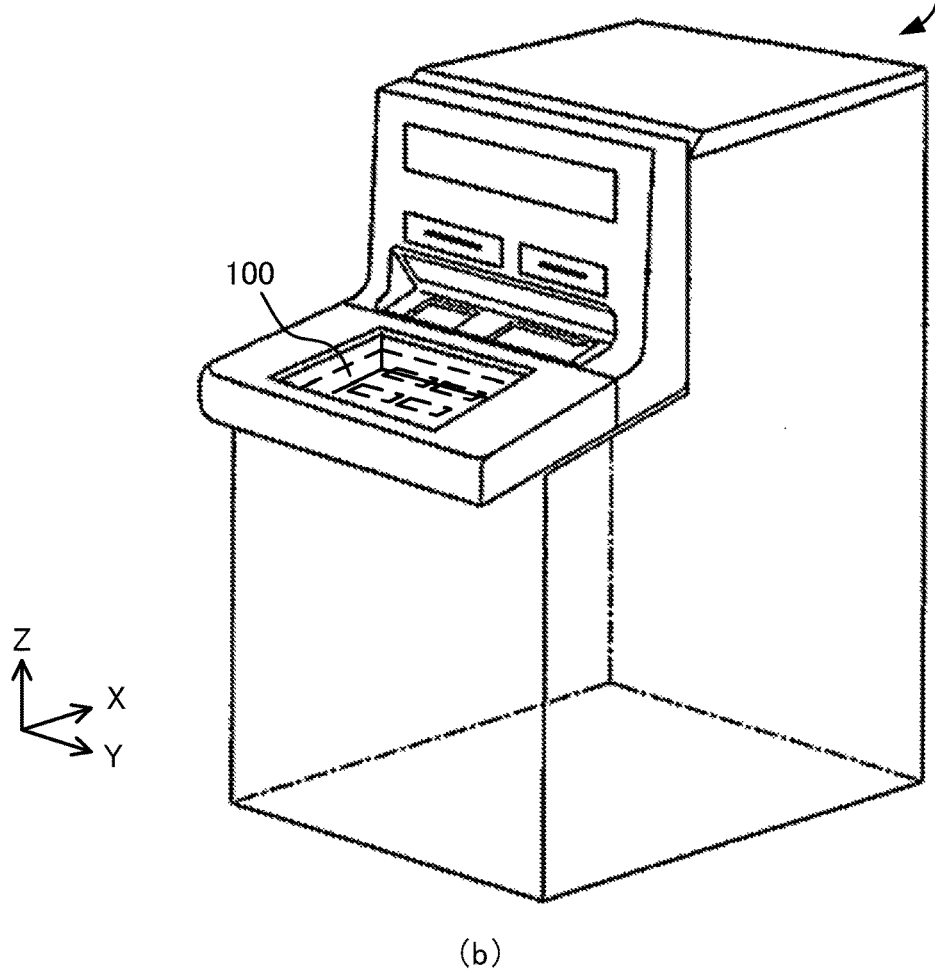
(b)

FIG.35
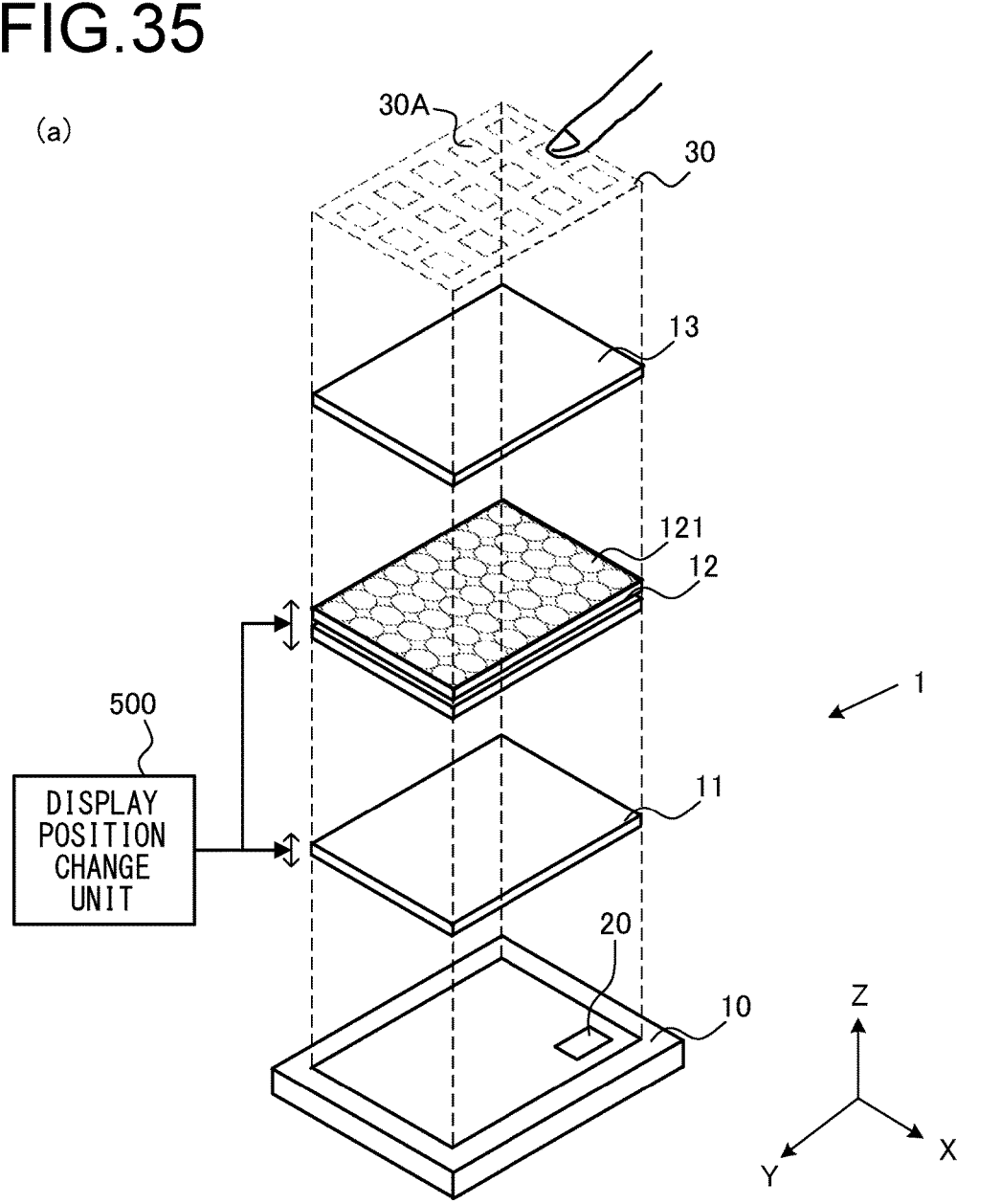
(a)
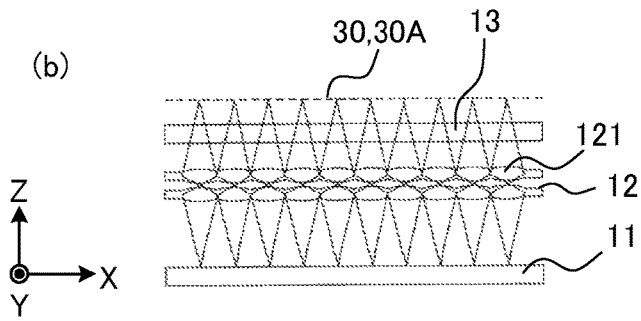
(b)

FIG.37
(a)
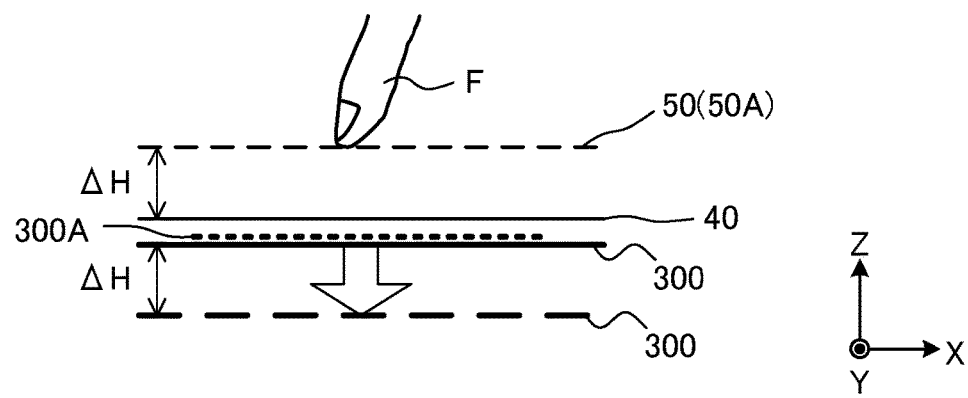
(b)
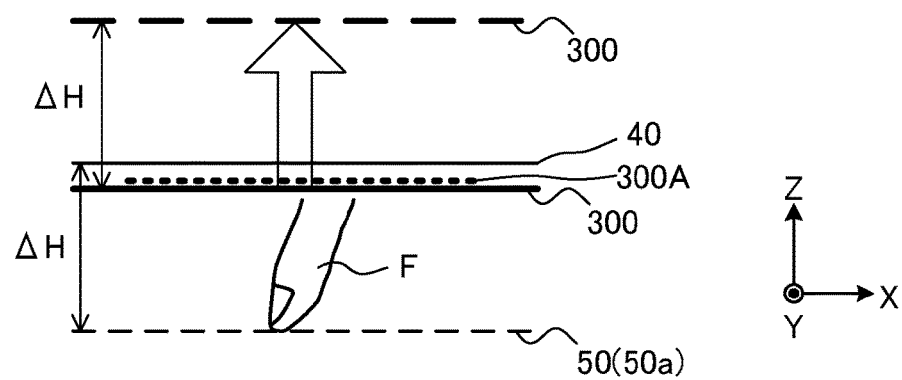

FIG.43
(a)
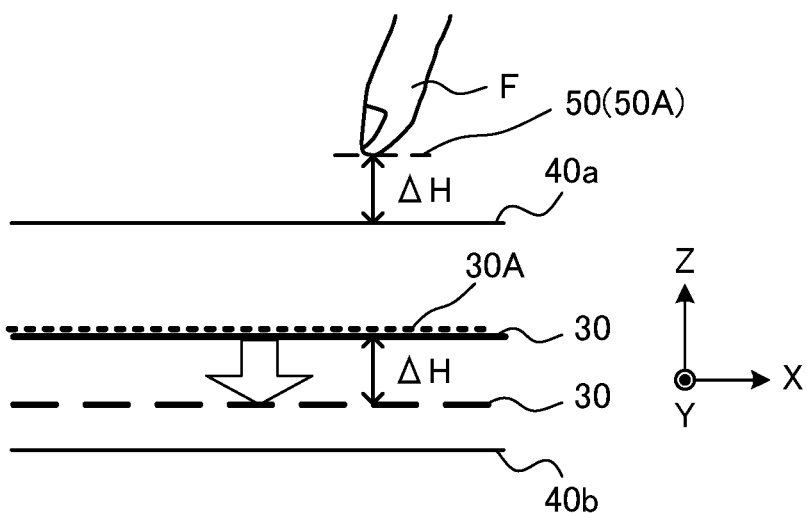
(b)
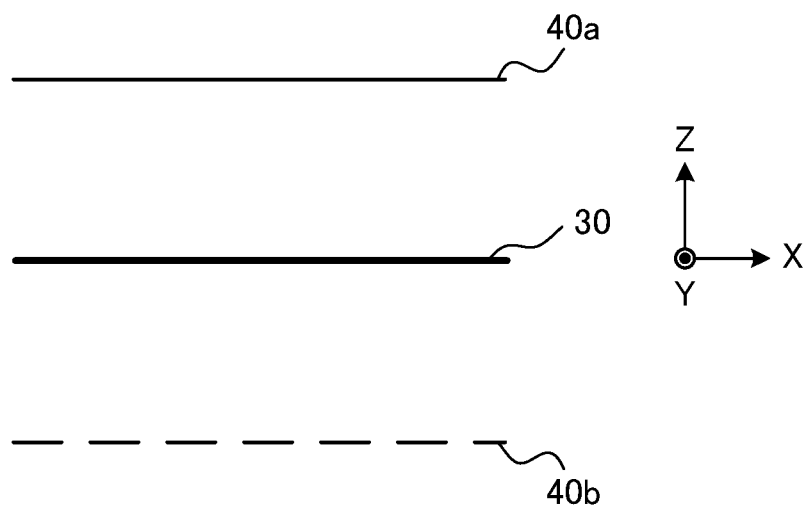

FIG.44
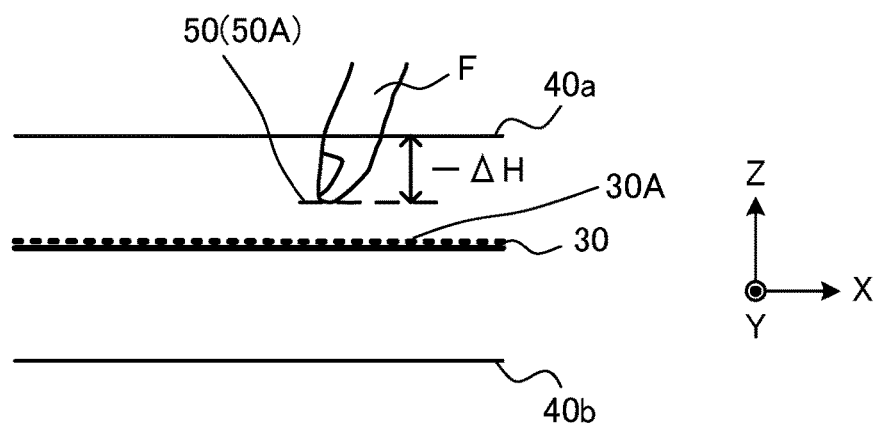
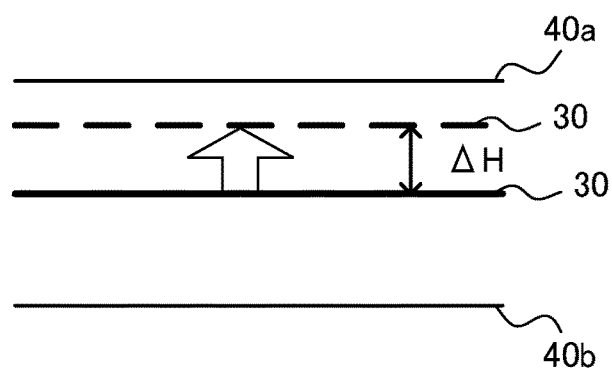
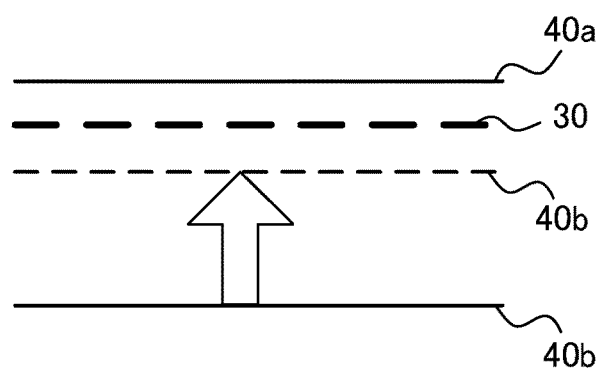

FIG.45
(a)
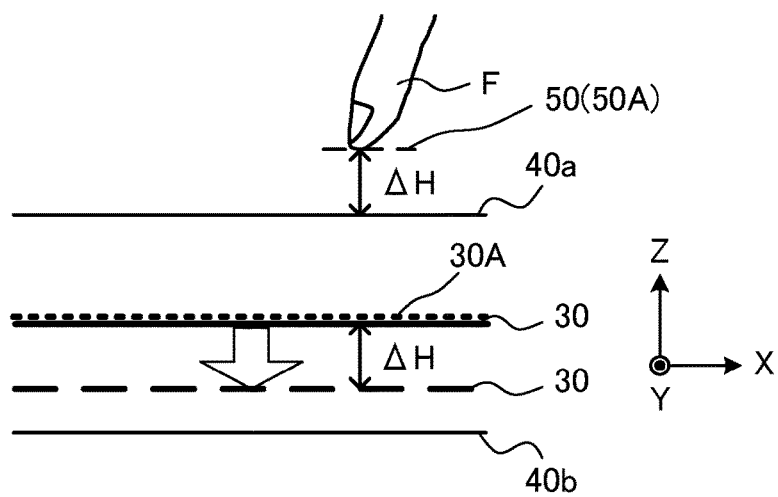
(b)
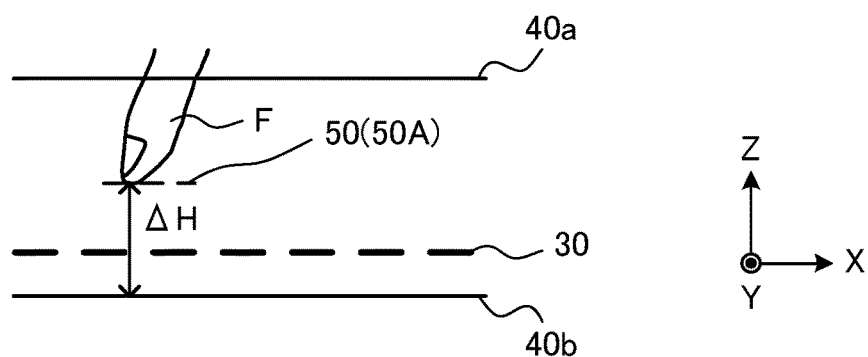
(c)
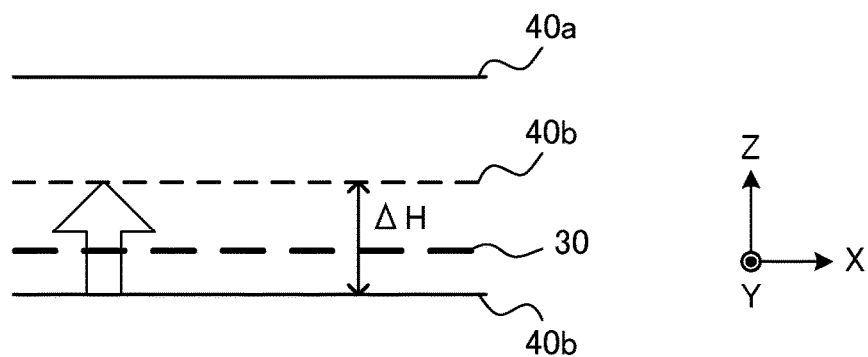

FIG.47
(a)
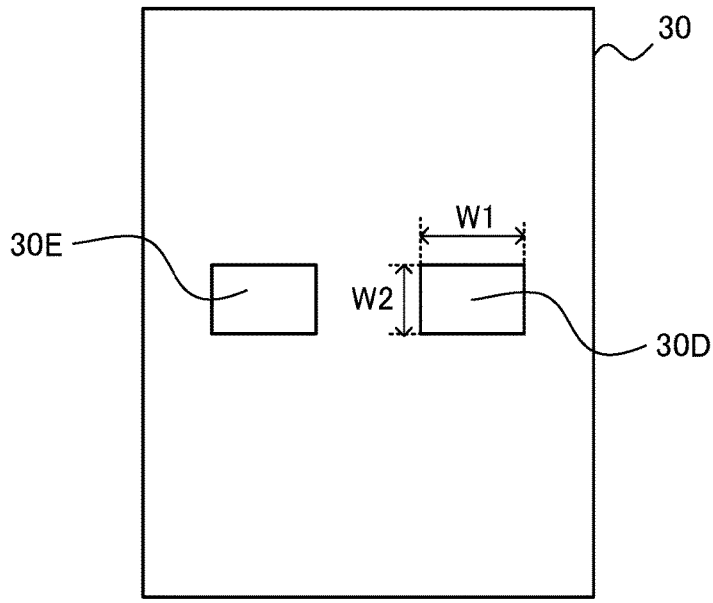
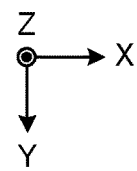
(b)
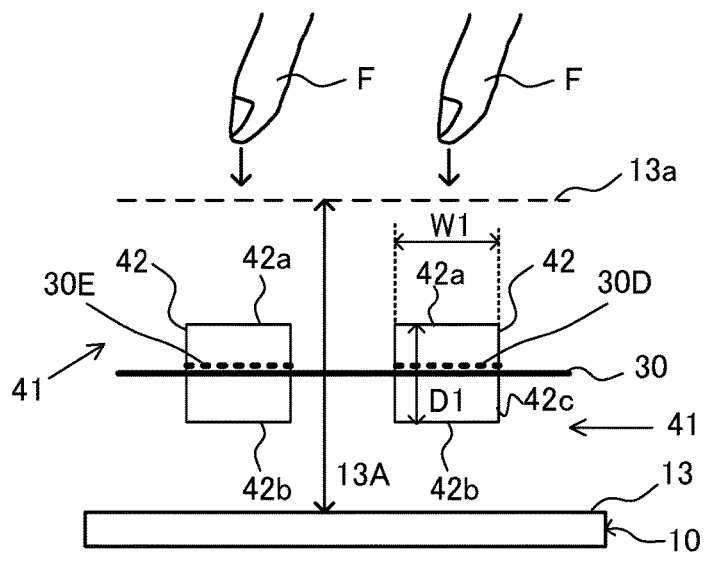
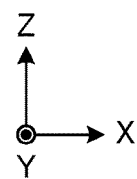
(c)
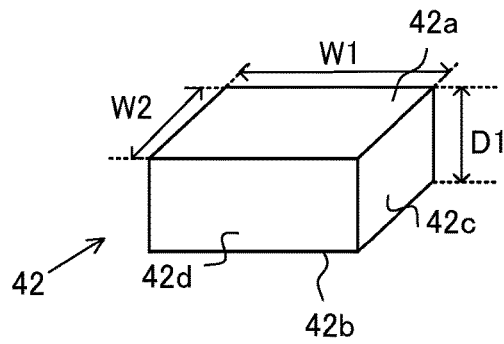
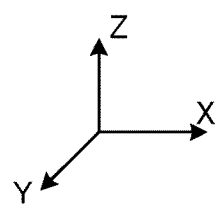

FIG.48
(a)
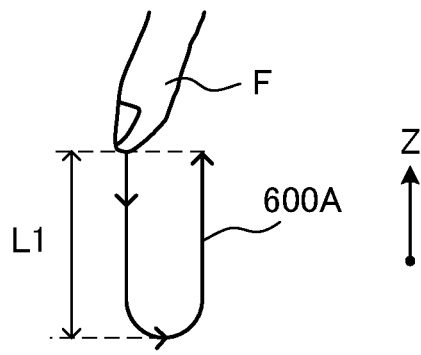
(b)
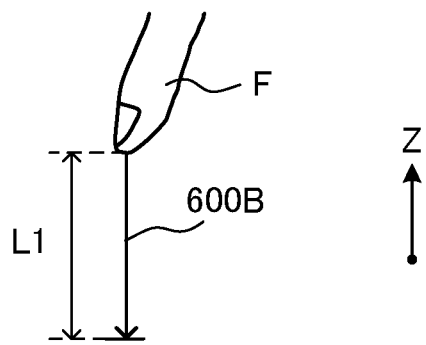
(c)
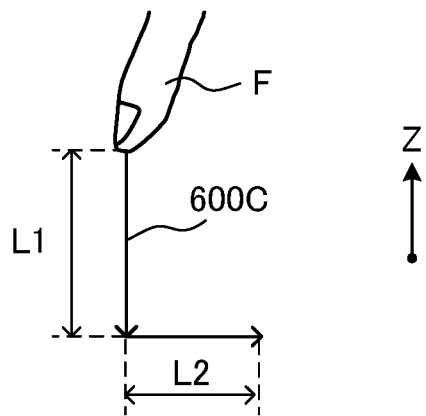

FIG.50
(a)
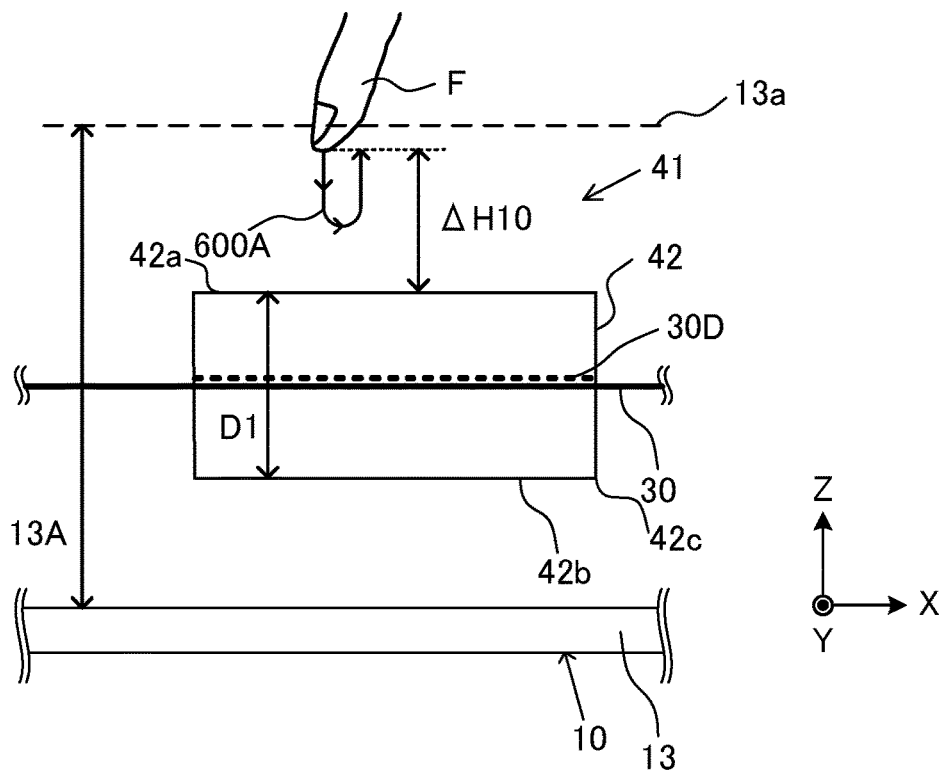
(b)
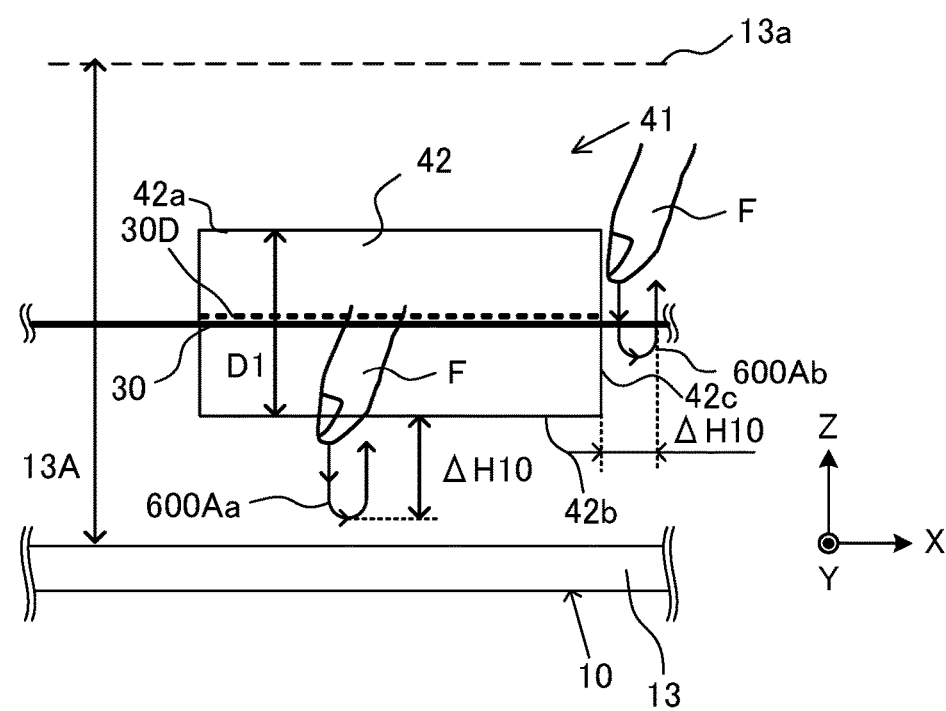

FIG.51
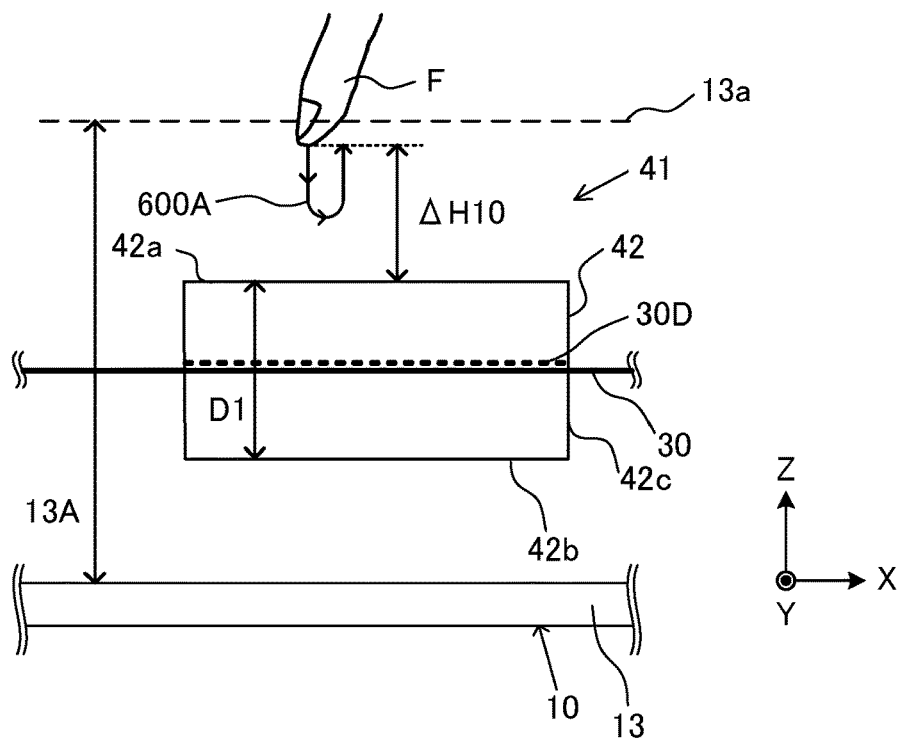
(a)
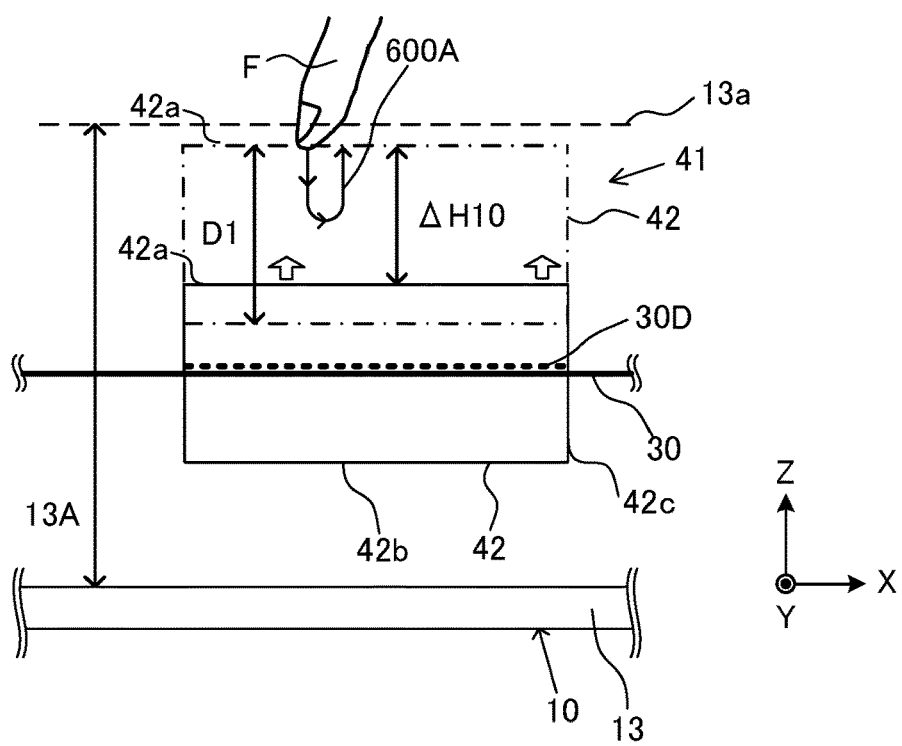
(b)

FIG.52
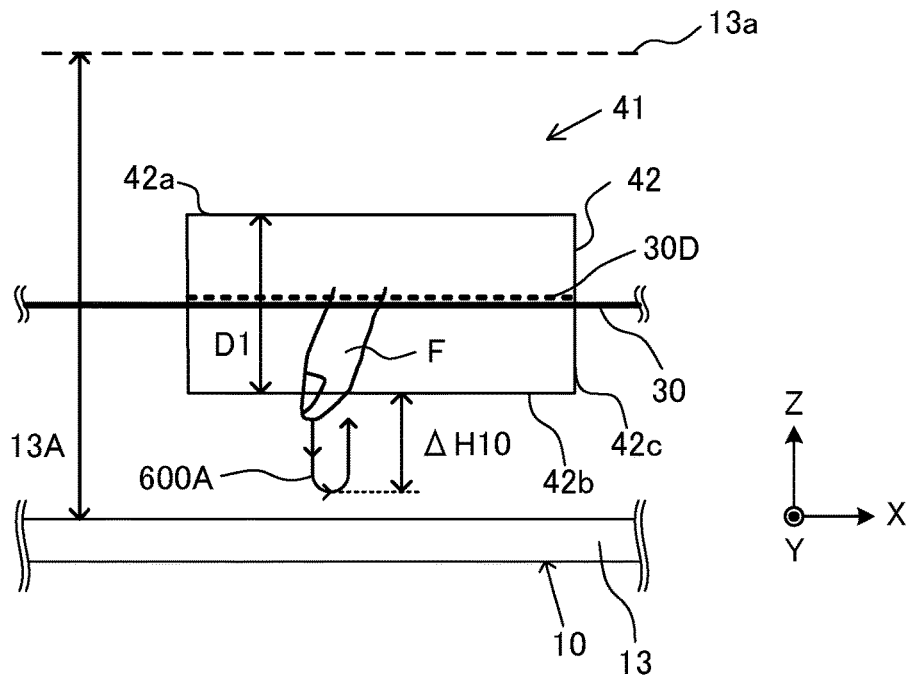
(a)
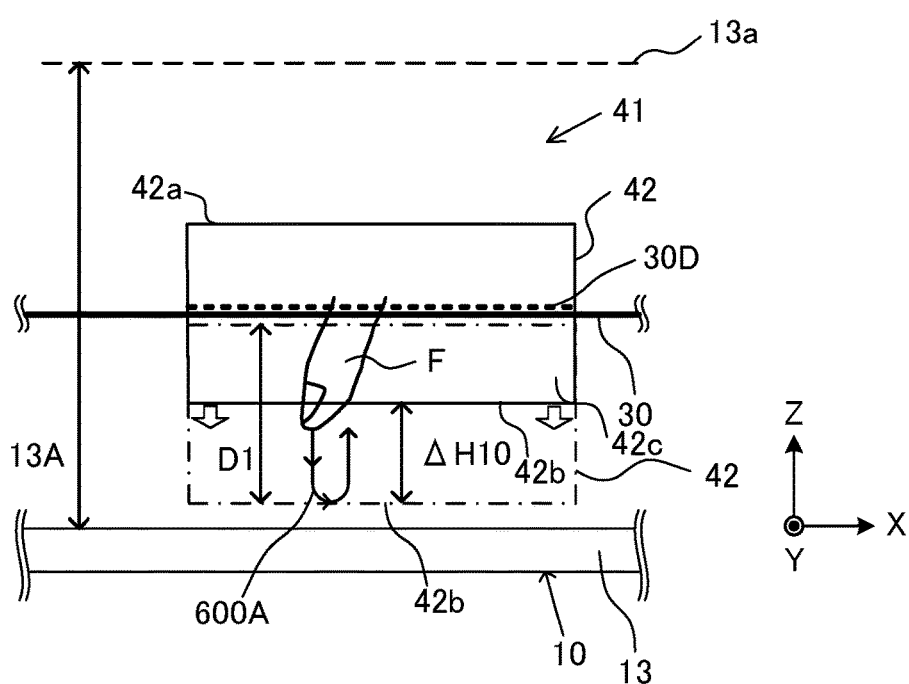
(b)

FIG.53
(a)
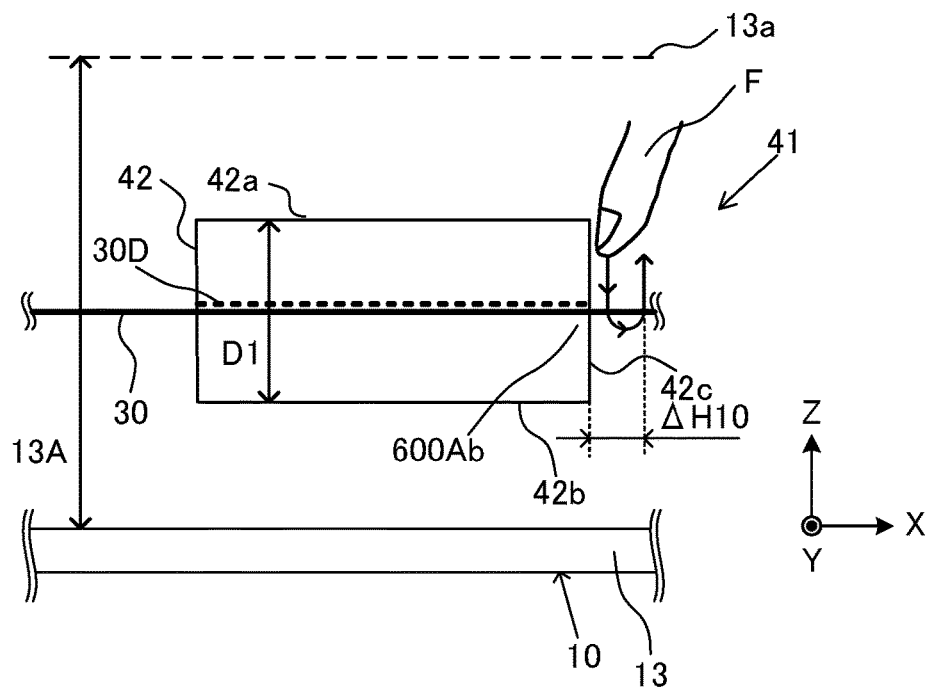
(b)
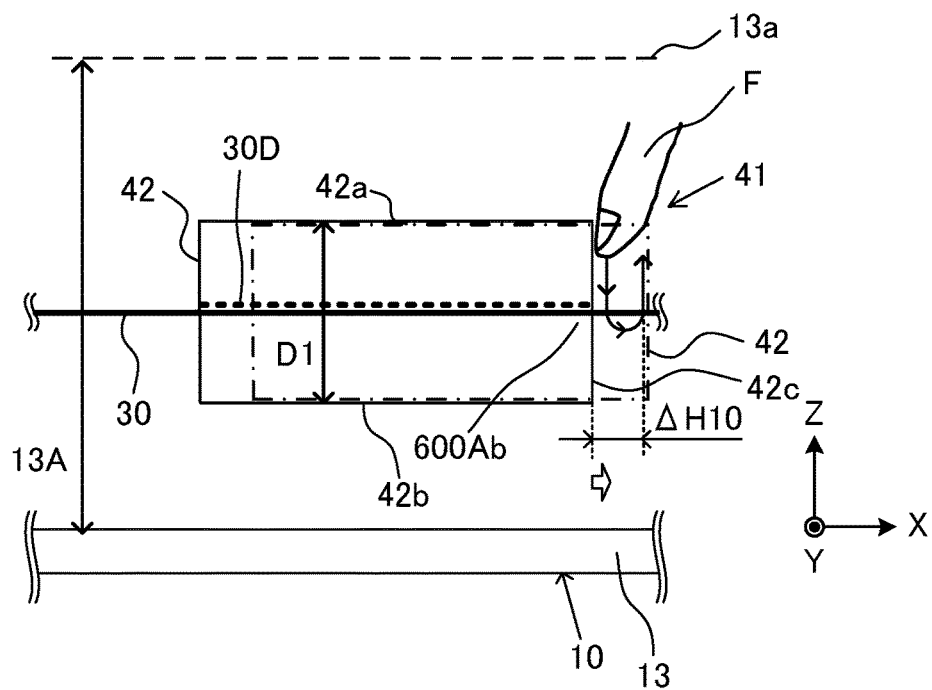

FIG.54
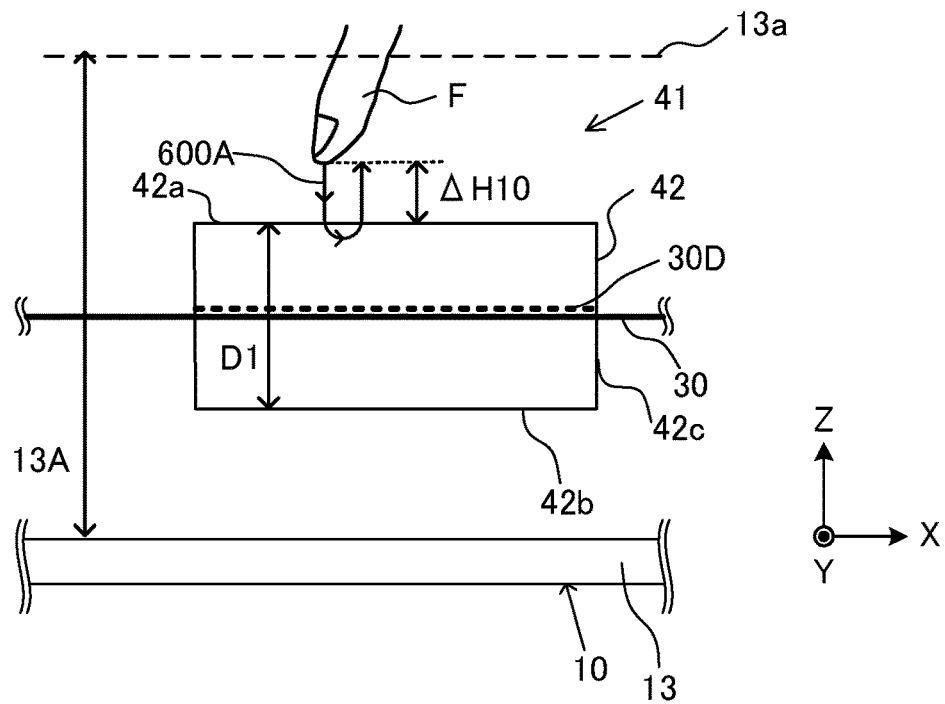
(a)
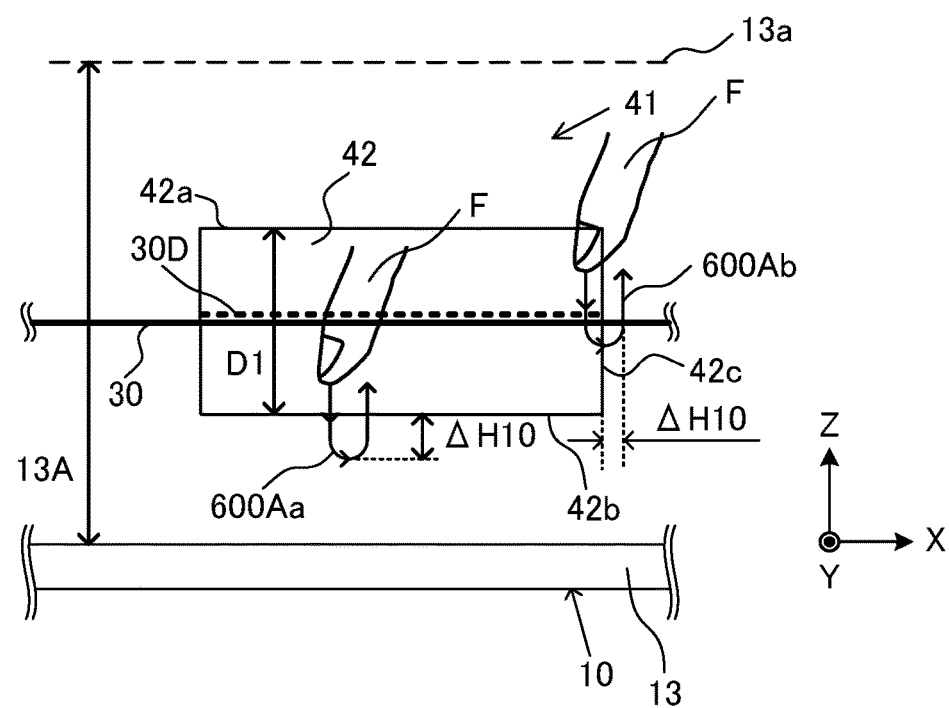
(b)

FIG.56
(a)
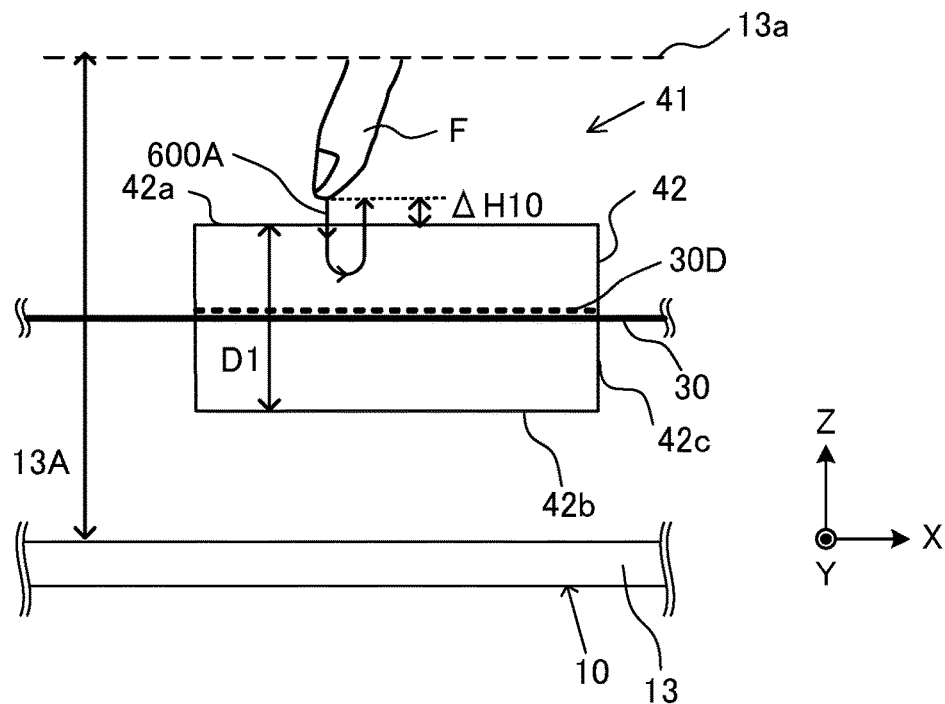
(b)
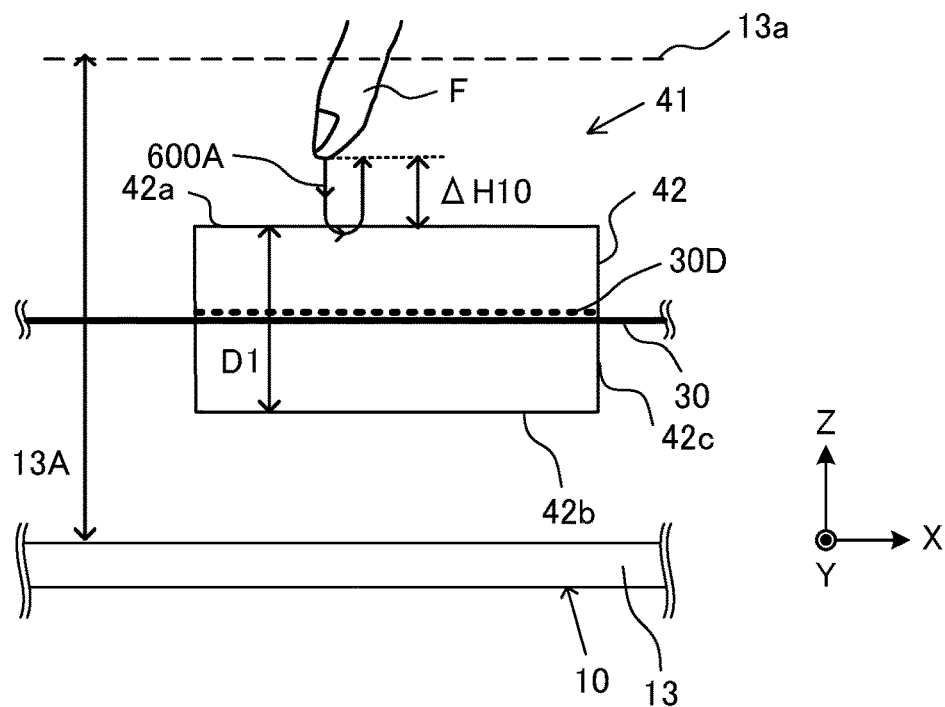

FIG.58
(a)
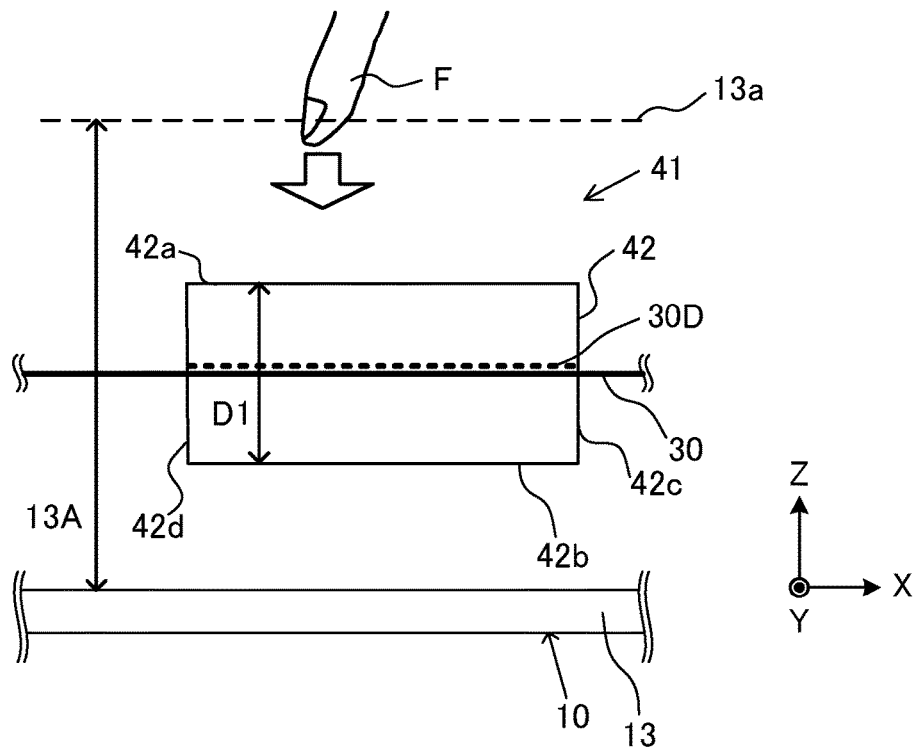
(b)
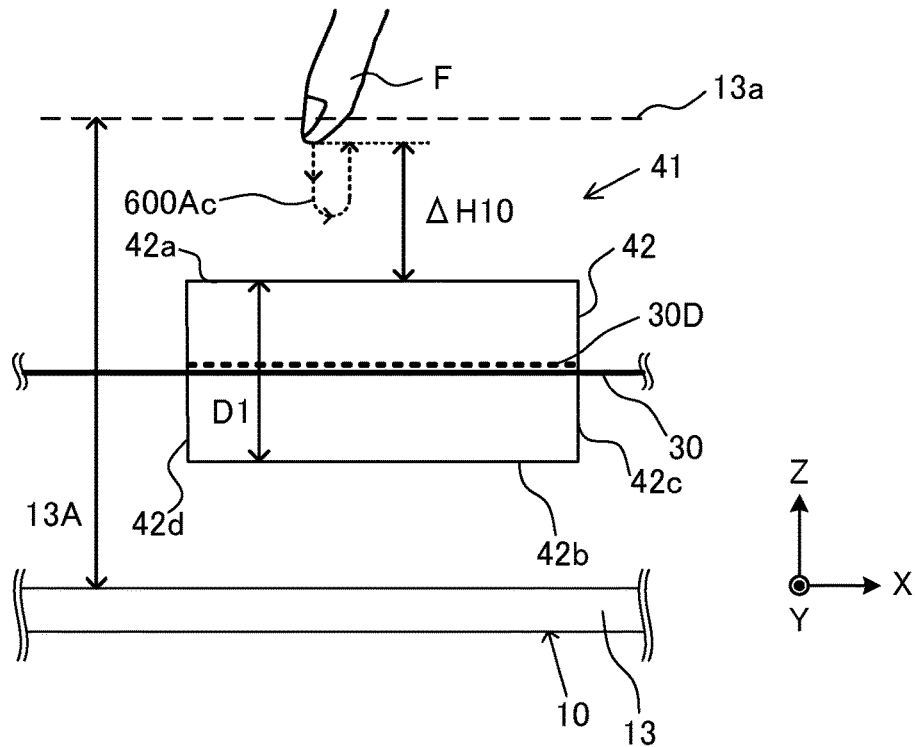

FIG.60
(a)
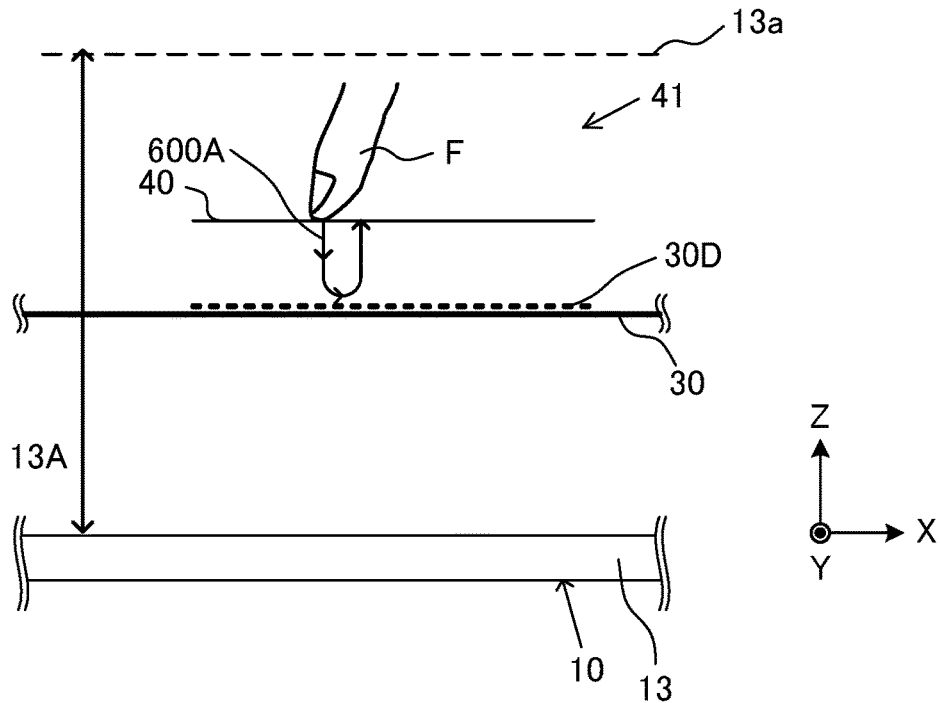
(b)
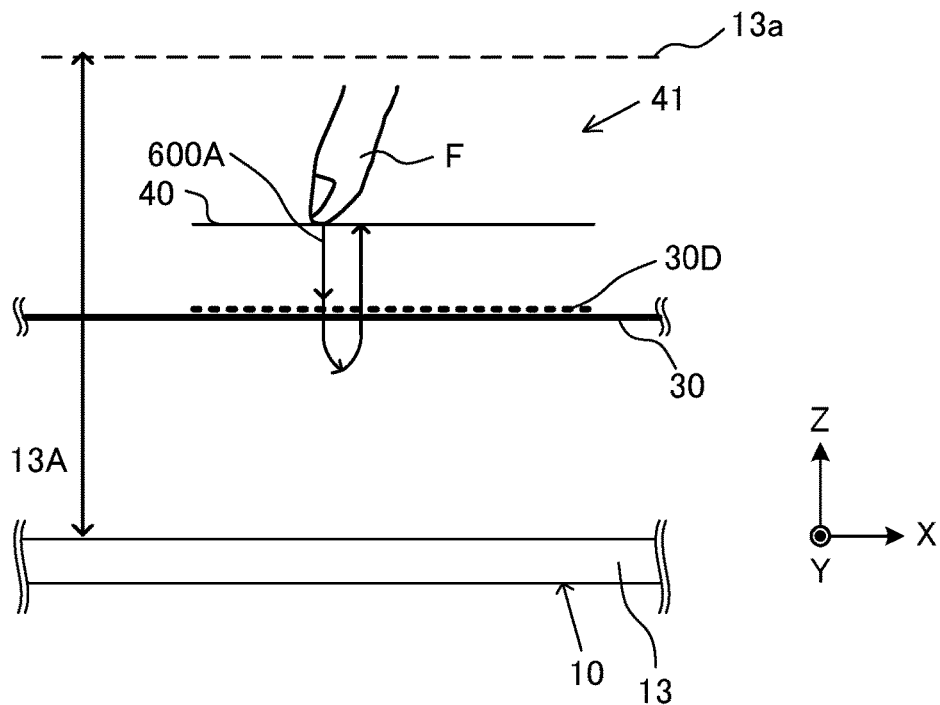

FIG.61
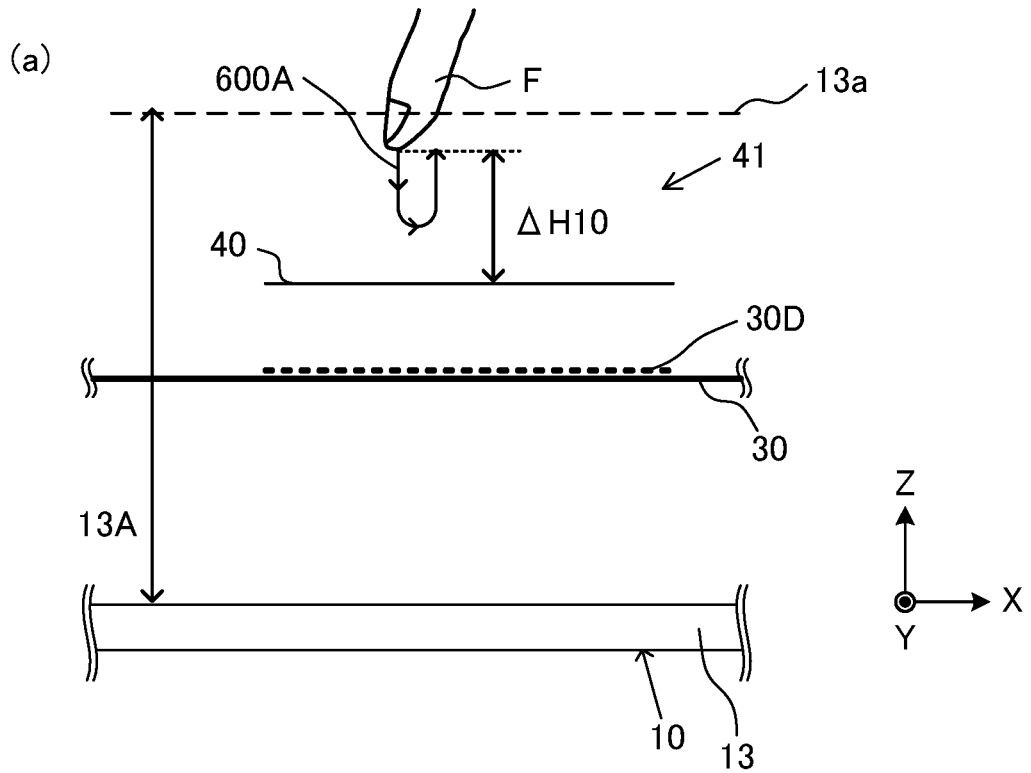
(a)
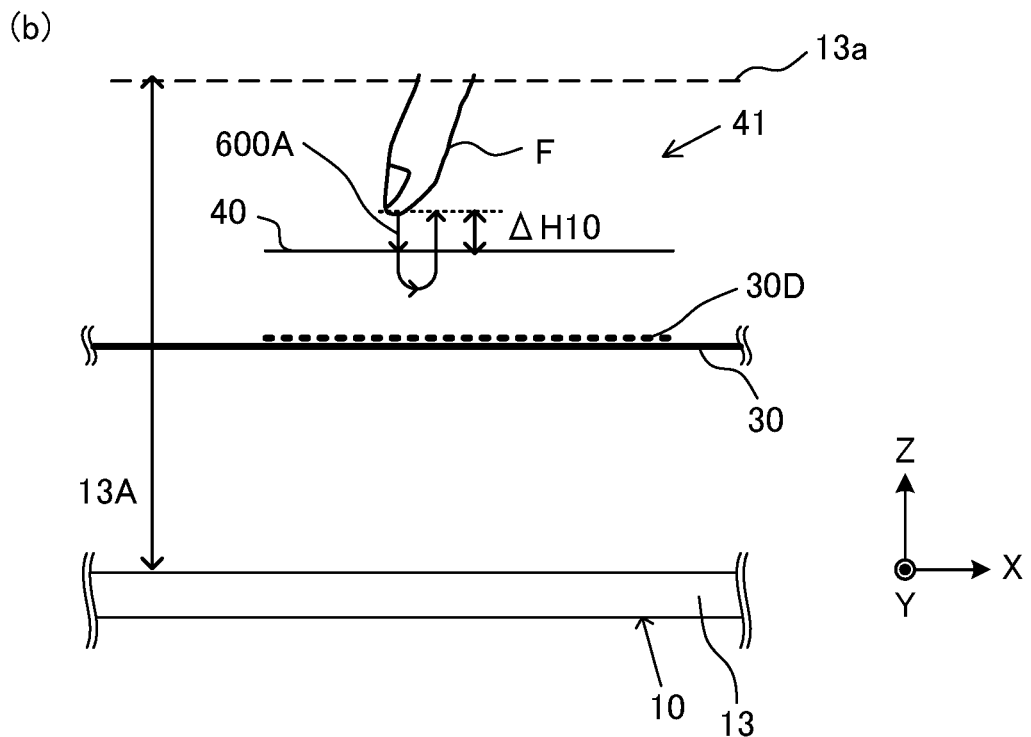
(b)

DETECTION DEVICE, ELECTRONIC APPARATUS, DETECTION METHOD AND PROGRAM

TECHNICAL FIELD

The present invention relates to a detection device, an electronic apparatus, a detection method and a program.

BACKGROUND ART

There is an electronic device disclosed in the related art, which is capable of detecting an operation performed on a three-dimensional object displayed in midair via a capacitive touch sensor that calculates the distance between a finger and a touch panel (see PTL 1).

CITATION LIST

Patent Literature

PTL 1: Japanese Laid Open Patent Publication No. 2012-203737

SUMMARY OF INVENTION

Technical Problem

While PTL 1 describes detecting an operation performed on a three-dimensional object (target), operability of operations performed on the object is not assured in the art disclosed in PTL 1.

According to the 1st aspect of the present invention, a detection device that detects an operation by a user on a display in midair comprises: a control unit that changes a positional relationship between a detection reference detecting the operation and the display, wherein: the control unit is capable of changing the positional relationship by user.

According to the 2nd aspect of the present invention, a detection device that detects an operation by a user on a display in midair, comprises: a control unit that changes a positional relationship between a detection reference detecting the operation and the display based on information relating to the user.

According to the 3rd aspect of the present invention, a detection device that detects an operation performed on a display in midair, comprises: a control unit that changes a positional relationship between a detection reference detecting the operation and the display based on the operation.

According to the 4th aspect of the present invention, a detection device comprises: a detection unit that detects an operation by a user on a display in midair and changes a positional relationship between a detection reference detecting the operation and the display, wherein: the detection unit is capable of changing the positional relationship by user.

According to the 5th aspect of the present invention, a detection device comprises: a detection unit that detects an operation by a user on a display in midair and changes a positional relationship between a detection reference detecting the operation and the display based on information on the user.

According to the 6th aspect of the present invention, a detection device comprises: a detection unit that detects an operation performed on a display in midair and changes a positional relationship between a detection reference detecting the operation and the display based on the operation.

According to the 7th aspect of the present invention, a detection method for detecting an operation by a user on a display in midair comprises: changing a positional relationship between a detection reference detecting the operation and the display by user.

According to the 8th aspect of the present invention, a detection method for detecting an operation by a user on a display in midair comprises: changing a positional relationship between a detection reference detecting the operation and the display based on information on the user.

According to the 9th aspect of the present invention, a detection method for detecting an operation performed on a display in midair comprises: changing a positional relationship between a detection reference detecting the operation and the display based on the operation.

According to the 10th aspect of the present invention, a detection method, comprises: detecting an operation performed by a user on a display in midair; and changing a positional relationship between a detection reference detecting the operation and the display by user.

According to the 11th aspect of the present invention, a detection method comprises: detecting an operation by a user on a display in midair; and changing a positional relationship between a detection reference detecting the operation and the display based on information on the user.

According to the 12th aspect of the present invention, a detection method comprises: detecting an operation performed on a display in midair; and changing a positional relationship between a detection reference detecting the operation and the display based on the operation.

According to the 13th aspect of the present invention, a program that enables a computer to execute detection of an operation by a user on a display in midair comprises: processing for changing a positional relationship between a detection reference detecting the operation and the display by user.

According to the 14th aspect of the present invention, a program that enables a computer to execute detection of an operation by a user on a display in midair comprises: processing for changing a positional relationship between a detection reference detecting the operation and the display based on information on the user.

According to the 15th aspect of the present invention, a program that enables a computer to execute detection of an operation performed on a display in midair comprises: processing for changing a positional relationship between a detection reference detecting the operation and the display based on the operation.

According to the 16th aspect of the present invention, a program that enables a computer to execute comprises: processing for detecting an operation performed by a user on a display in midair; and processing for changing a positional relationship between a detection reference detecting the operation and the display by user.

According to the 17th aspect of the present invention, a program that enables a computer to execute comprises: processing for detecting an operation by a user on a display in midair; and processing for changing a positional relationship between a detection reference detecting the operation and the display based on information on the user.

According to the 18th aspect of the present invention, a program that enables a computer to execute comprises: processing for detecting an operation performed on a display in midair; and processing for changing a positional relationship between a detection reference detecting the operation and the display based on the operation.

BRIEF DESCRIPTION OF DRAWINGS

FIG. 1 The structure of the display device achieved in a first embodiment, illustrated in a disassembled oblique view in (a) and in a sectional view in (b)

FIG. 21 The calibration processing executed in variation 7 of the first embodiment, illustrated in (a), (b) and (c) each providing a sectional view indicating the relationship among the operation detector, the midair image, the detection reference and the finger position FIG. 22 A perspective of the display device achieved in variation 8 of the first embodiment FIG. 23 A block diagram showing the main configuration of the display device achieved in variation 8 of the first embodiment FIG. 24 A sectional view of the internal structure assumed in the display device in variation 8 of the first embodiment FIG. 25 A block diagram showing the main configuration of the display device achieved in a second embodiment FIG. 26 A flowchart of the calibration processing executed in the second embodiment FIG. 27 A block diagram showing the main configuration of the display device achieved in a third embodiment FIG. 28 A flowchart of the calibration processing executed in the third embodiment FIG. 29 Illustrations of the display device achieved in a fourth embodiment, with the structure of the display device schematically illustrated in a sectional view in (a) and an electronic apparatus at which the display device is fitted shown in a perspective in (b)

each providing a sectional view indicating the relationship among the midair image, the detection reference and the finger position FIG. 44 The calibration processing executed in the display device in the sixth embodiment, illustrated in (a) and (b) each providing a sectional view indicating the relationship among the midair image, the detection reference and the finger position FIG. 45 The calibration processing executed in variation 1 of the sixth embodiment, illustrated in (a), (b) and (c) each providing a sectional view indicating the relationship among the midair image, the detection reference and the finger position.

Figure 46:
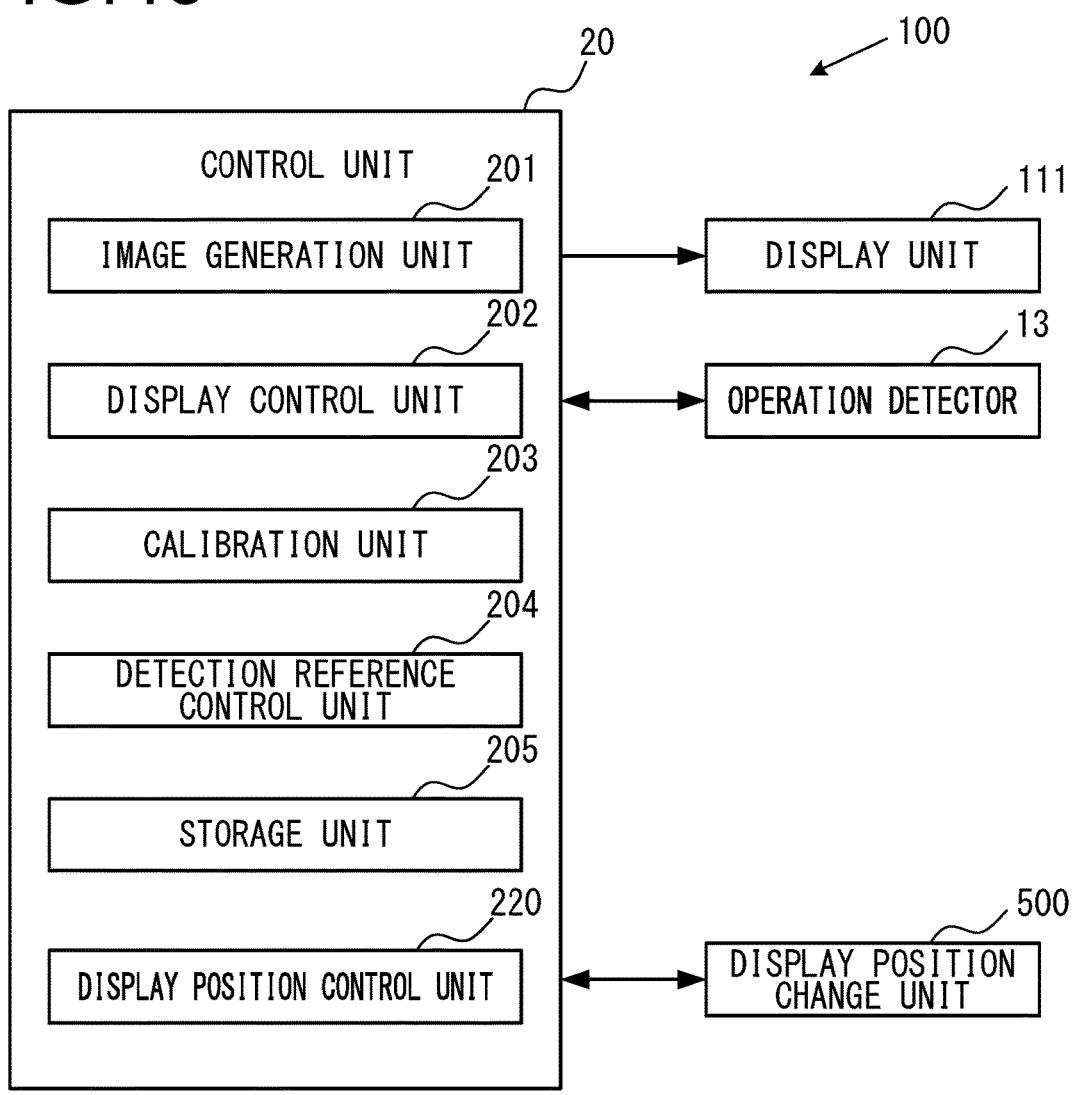

FIG. 46 A block diagram showing the main configuration of the display device achieved in a seventh embodiment FIG. 47 A schematic presentation of a midair image displayed in an eighth embodiment in a plan view in (a), in a sectional view indicating the relationship among the operation detector, the midair image and the detection reference in (b) and a perspective of the detection reference in (c)

Figure 49:
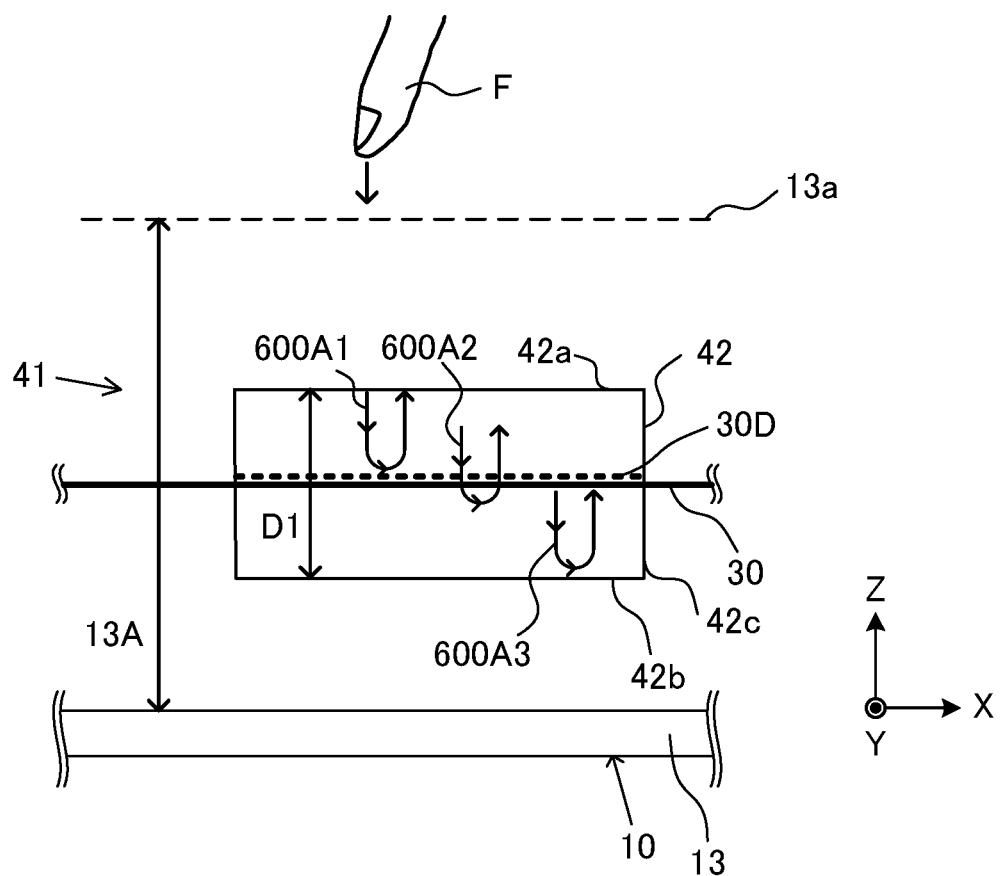
Figure 55:
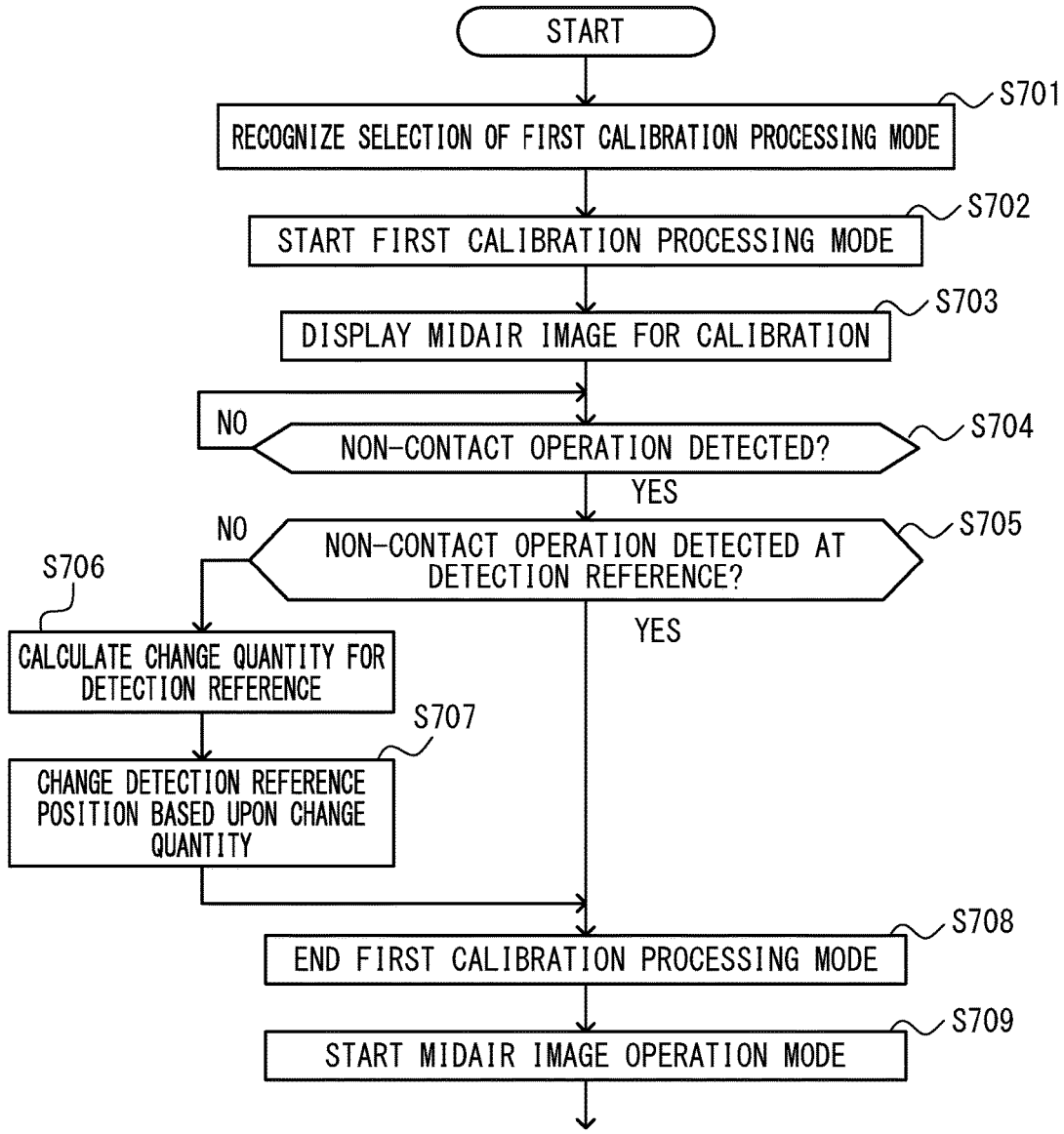

FIG. 48 A schematic presentation of examples of specific non-contact operations that may be performed in the eighth embodiment FIG. 49 A schematic illustration showing a specific non-contact operation detected in the detection reference in the eighth embodiment FIG. 50 Schematic illustrations, each showing the specific non-contact operation not detected in the detection reference in the eighth embodiment, with (a) showing the specific non-contact operation in its entirety detected outside the detection reference above the detection reference and (b) showing the specific non-contact operation detected outside the detection reference below the detection reference FIG. 51 Illustrations showing how the detection reference position may be changed in the eighth embodiment, with (a) showing the detection reference position before the change and (b) showing the detection reference position changed upward FIG. 52 Illustrations showing how the detection reference position may be changed in the eighth embodiment, with (a) showing the detection reference position before the change and (b) showing the detection reference position changed downward FIG. 53 Illustrations showing how the detection reference position may be changed in the eighth embodiment, with (a) showing the detection reference position before the change and (b) showing the detection reference position changed to the right FIG. 54 Schematic illustrations, each showing the specific non-contact operation not detected at the detection reference in the eighth embodiment, with (a) showing part of the specific non-contact operation detected outside the detection reference above the detection reference and the remaining non-contact operation detected at the detection reference and (b) showing part of the specific non-contact operation detected outside the detection reference below or to a side of the detection reference and the remaining non-contact operation detected at the detection reference FIG. 55 A flowchart of the calibration processing executed in the eighth embodiment FIG. 56 Illustrations of part of the specific non-contact operation detected at the detection reference in variation 2 of the eighth embodiment, with the detection reference changed in (a) and the detection reference not changed in (b)

Figure 57:
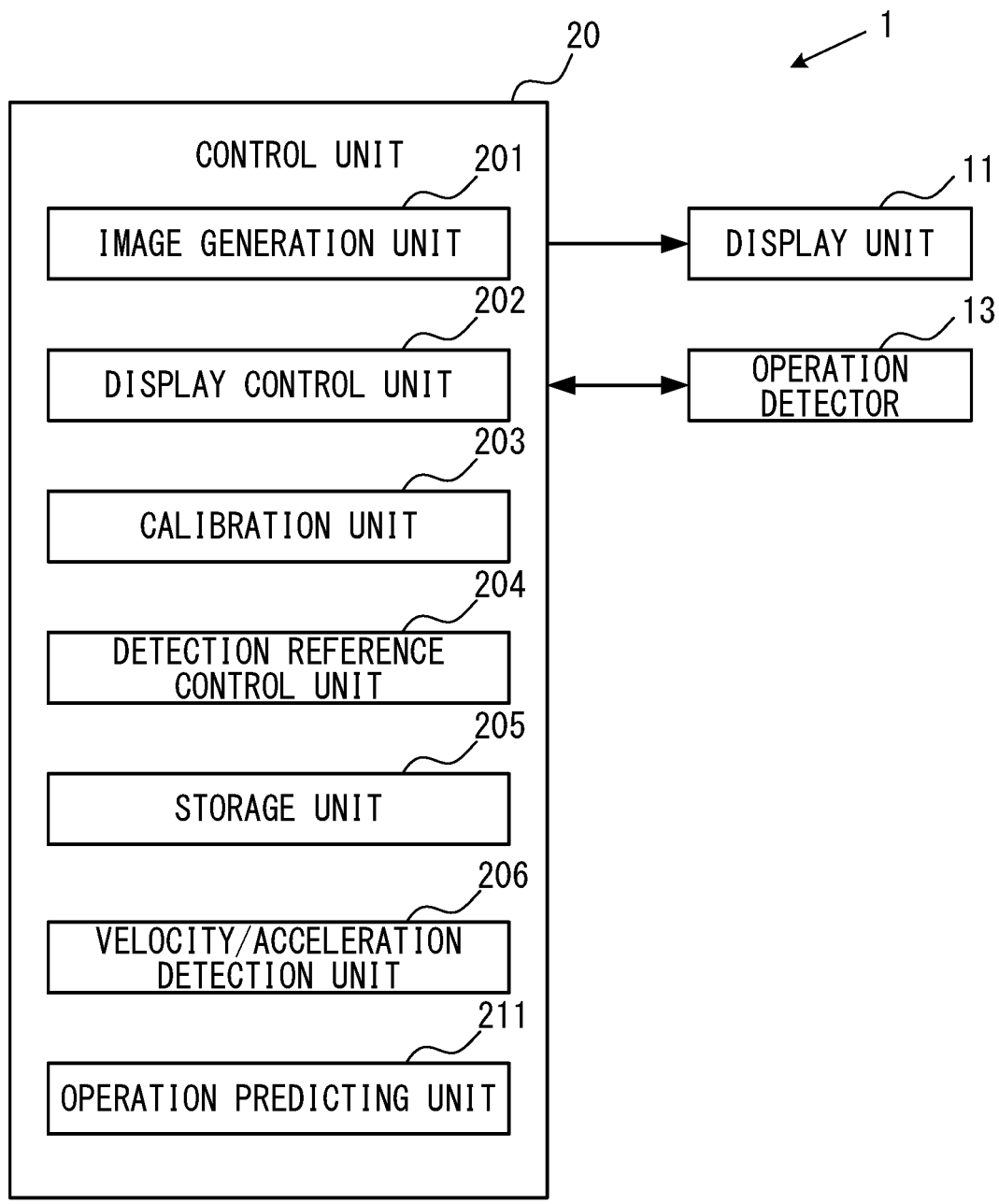
Figure 59:
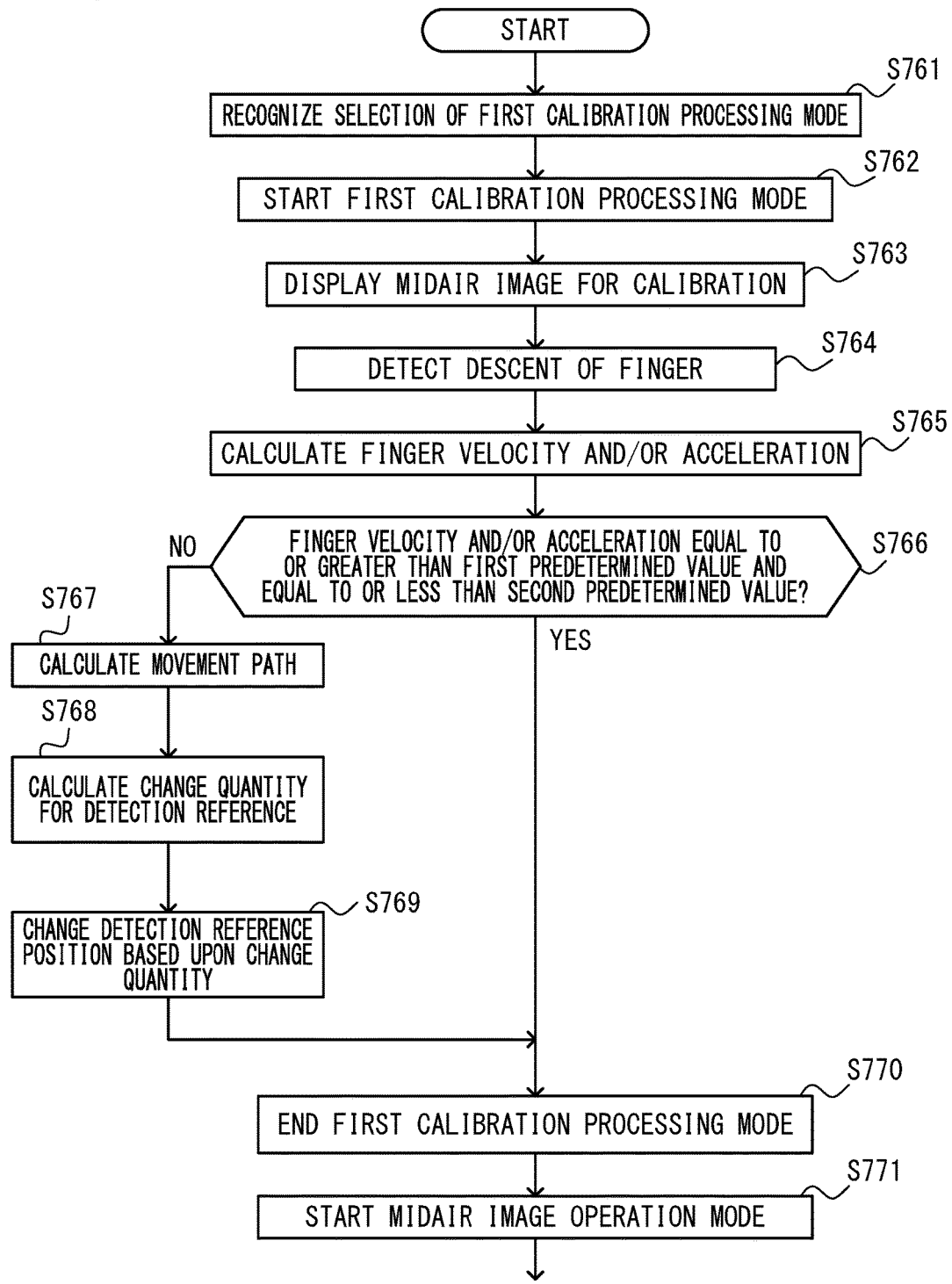

FIG. 57 A block diagram showing the main configuration of the display device 1 achieved in variation 3 of the eighth embodiment FIG. 58 The calibration processing executed in variation 3 of the eighth embodiment, illustrated in (a) and (b) each providing a sectional view indicating the relationship among the operation detector, the detection reference and the finger position FIG. 59 A flowchart of the calibration processing executed in variation 3 of the eighth embodiment FIG. 60 The calibration processing executed in variation 6 of the eighth embodiment, illustrated in (a) and (b) each providing a sectional view indicating the relationship among the operation detector, the detection reference and the finger position FIG. 61 The calibration processing executed in variation 6 of the eighth embodiment, illustrated in (a) and (b) each providing a sectional view indicating the relationship among the operation detector, the detection reference and the finger position

DESCRIPTION OF EMBODIMENTS

First Embodiment

In reference to drawings, the display device achieved in the first embodiment will be described. The first embodiment will be described in reference to an example in which the display device in the embodiment is mounted in a portable telephone. It is to be noted that the display device in the embodiment may be mounted in an electronic apparatus other than a portable telephone such as a portable information terminal device such as a tablet terminal, a wristwatch-type terminal and so on, a personal computer, a music player, a land-line telephone unit or a wearable device.

FIG. 1(a) is a disassembled oblique view of a display device 1 and FIG. 1(b) shows part of the display device 1 in an enlarged side elevation. It is to be noted that for purposes of facilitating the explanation, a coordinate system assuming an X axis, a Y axis and a Z axis is set relative to the display device 1 as indicated in the figure. It is to be also noted that the coordinate system set for these purposes does not need to be an orthogonal coordinate system assuming the X axis, the Y axis and the Z axis, and it may instead be a polar coordinate system or a cylindrical coordinate system. In other words, any of these coordinate systems may be set relative to the display device, as long as the X axis is set to extend along the shorter sides of the rectangular display area of the display device 1, the Y axis is set to extend along the longer sides of the rectangular display area of the display device 1 and the Z axis is set to extend along a direction perpendicular to the display area.

The display device 1 includes a body 10 having installed therein a control unit 20, a display unit 11, an image forming optical system 12 and an operation detector 13. The display unit 11, the image forming optical system 12 and the operation detector 13 are disposed inside the body 10. The display unit 11, configured with, for instance, a liquid crystal display or an organic EL display, includes a plurality of display pixel arrays arranged in a two-dimensional pattern. Under control executed by the control unit 20, the display unit 11 displays an image corresponding to display image data. The image forming optical system 12 is disposed further upward relative to the display unit 11 (on the + side along the Z direction) over a predetermined distance from the display unit 11. The image forming optical system 12 may be configured by, for instance, layering two micro-lens arrays, each having convex micro-lenses 121 arranged in a two-dimensional array, along the Z direction as clearly indicated in FIG. 1(b).

The image forming optical system 12 forms a midair image 30 of a display image displayed at the display unit 11 in the space above the display device 1. Namely, an image displayed by the display unit 11 at the display device 1 can be viewed by the user of the display device 1 as the midair image 30, floating above the display device 1. The midair image 30 includes a plurality of icons 30A (operation buttons) corresponding to operation buttons via which various settings may be selected for the display device 1 and instructions for executing various functions of the display device 1 may be issued. The icons 30A in the embodiment may be set over, for instance, three rows by five columns. It is to be noted that instead of the micro-lens arrays, pinhole arrays or slit arrays may be used to configure the image forming optical system.

The operation detector 13, disposed further upward (on the + side along the Z direction) relative to the image forming optical system 12, may be configured with, for instance, a transparent capacitive panel (hereafter will be referred to as a capacitive panel) of the known art. The operation detector 13 configured with a capacitive panel forms an electric field with electrodes constituted of a substantially transparent material. When the user moves his finger or a stylus toward the midair image 30 in order to operate manipulate adjust the display position of the midair image 30, the operation detector 13 detects the position of the finger or the stylus as an electrostatic capacitance value. For instance, it may compare the electrostatic capacitance values detected at the four corners of the capacitive panel so as to detect the position of the user's finger along the X axis and the Y axis based on the electrostatic capacitance values detected at the four corners. The operation detector 13 may take an electrostatic capacitance detection range, which is a predetermined range set upward relative to itself, as will be described in detail later, and detect the distance (i.e., the position on the Z axis) between the operation detector 13 and the finger or the stylus within the predetermined detection range based on the electrostatic capacitance values detected at the four corners of the transparent capacitive panel by, for instance, comparing the electrostatic capacitance values detected at the four corners. The midair image 30 must be formed via the image forming optical system 12 so that it occupies a position within the predetermined detection range of the operation detector 13, and preferably a position around the midway point of the predetermined detection range along the up/down direction. As described above, the operation detector 13 detects an operation by a user at the display position of the midair image 30 with his finger or with a stylus, enabling the user to perform operations on the midair image 30 without having to directly touch the operation detector 13. It is to be noted that while the following description will be provided by assuming that the user uses his finger to perform an operation at the display position of the midair image 30, the similar manner will apply to an operation performed via a stylus or the like.

Figure 2:
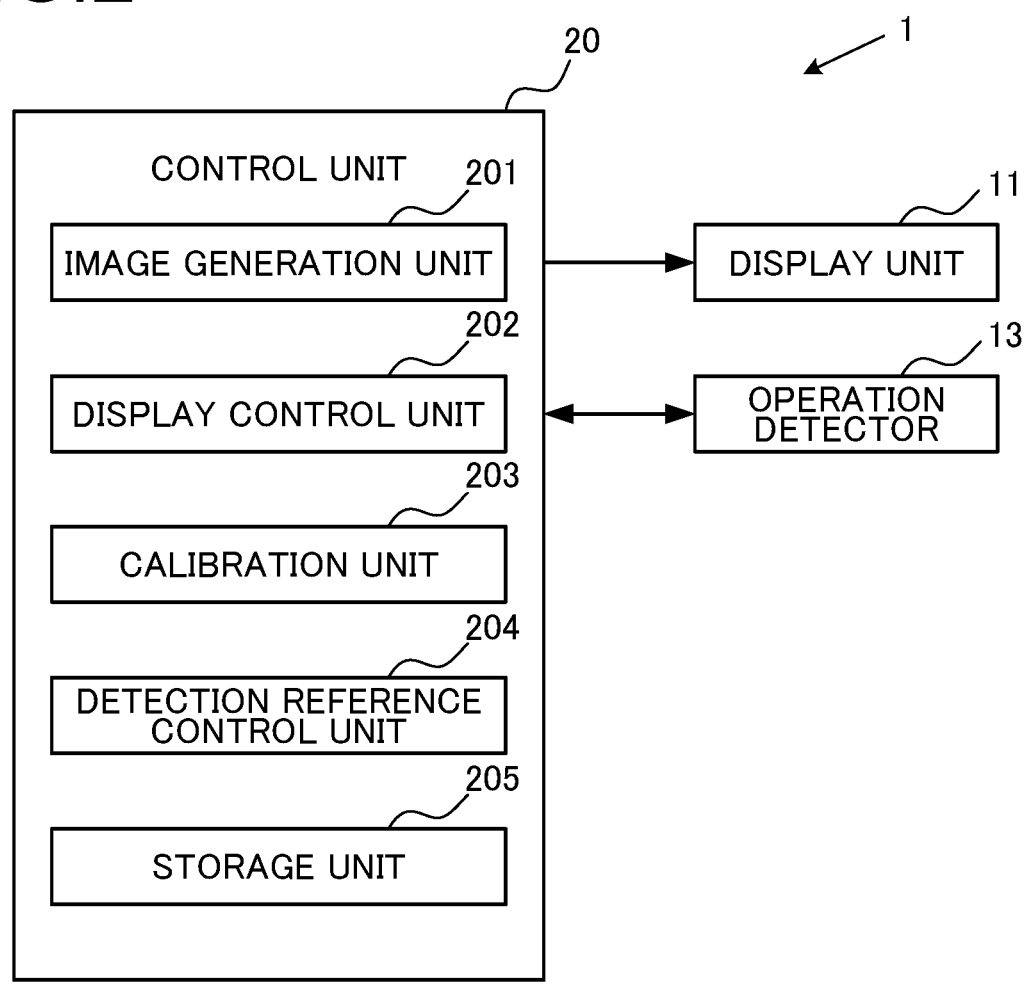
FIG. 2 A block diagram showing the main configuration of the display device achieved in the first embodiment FIG. 3 A schematic presentation of a midair image displayed in the first embodiment in a plan view in (a) and in sectional views, each indicating the relationship among the operation detector, the midair image and the detection reference, in (b) and (c)

FIG. 2 is a block diagram showing the control unit 20, and the display unit 11 and the operation detector 13 controlled by the control unit 20, among the components configuring the display device 1. The control unit 20, comprising a CPU, a ROM, a RAM and the like, includes an arithmetic operation circuit that controls various structural elements of the display device 1, including the display unit 11 and the operation detector 13, based on a control program and executes various types of data processing. The control unit 20 includes an image generation unit 201, a display control unit 202, a calibration unit 203, a detection reference control unit 204 and a storage unit 205. The storage unit 205 includes a nonvolatile memory where the control program is stored, a storage medium where image data to be displayed at the display unit 11 and the like are stored, and the like. It is to be noted that the correspondence between the distance from the surface of the operation detector 13 to the fingertip and the electrostatic capacitance manifesting when the operation detector 13 detects the fingertip is stored in advance in the storage unit 205. Accordingly, as the fingertip is positioned within the predetermined detection range of the operation detector 13, the operation detector 13 is able to detect the electrostatic capacitance at the fingertip, and thus detect the position of the fingertip along the Z direction based on the detected electrostatic capacitance and the correspondence stored in the storage unit 205, as explained earlier.

Based upon image data stored in the storage medium, the image generation unit 201 generates display image data corresponding to a display image to be displayed at the display unit 11. The display control unit 202 brings up the image corresponding to the display image data generated by the image generation unit 201 at the display unit 11. As the user performs an operation at the display position of an icon 30A in the midair image 30, the display control unit 202 executes display image switchover control for the display unit 11 in correspondence to the type of icon 30A that has been operated. It is to be noted that in response to a user operation performed at the display position of the icon 30A in the midair image 30, the display control unit 202 may execute control other than the display image switchover control for the display unit 11. For instance, assuming that the user performs an operation at the display position of the icon 30A in the midair image 30 while a movie image is on display as the display image at the display unit 11, the display control unit 202 may execute control for playing the movie image currently displayed at the display unit 11 or for stopping the movie image playback.

The calibration unit 203 executes calibration processing in first and second calibration processing modes, as will be described in detail later. The detection reference control unit 204 sets a detection plane, i.e., a detection reference, in the space above the display device 1, and specifically, at the position of the midair image 30 (or over a specific range around the midair image 30) within the predetermined detection range of the operation detector 13. The detection reference control unit 204 also decides that the user's finger has reached the detection reference based on an electrostatic capacitance value detected by the operation detector 13. Namely, the detection reference control unit 204 decides that the user has performed an operation at the display position of the icon 30A when the finger position (the position on the X axis, the Y axis and the Z axis) corresponding to the value of the electrostatic capacitance detected by the operation detection unit 13 matches the position of the detection reference having been set. The detection reference control unit 204 may set the detection reference at a predetermined specific initial position and changes or adjusts the detection reference position based on the results of the calibration processing to be described later. The initial position for the detection reference is stored in advance in the storage unit 205. It is to be noted that the initial position for the detection reference may be a universal position shared by all users, or a different initial position may be set for each user based on the history of use of the display device 1 by the particular user. The initial position for the detection reference and a newly changed position for the detection reference may be set over the entire plane (the X axis and the Y axis) of the operation detector 13 or may be set over part of the plane. The detection reference having been set when the display device 1 was last used, stored in the storage unit 205, may also be read out and set as the initial position for the detection reference. It is to be noted that the detection reference control unit 204 may decide that the user has performed an operation at the display position of the icon 30A when the finger position corresponding to the electrostatic capacitance value detected by the operation detector 13 roughly matches the position for the detection reference, as well as when the finger position exactly matches the position for the detection reference. A specific range over which the finger position is considered to roughly match the position for the detection reference may be set in advance.

FIG. 3(a) presents an example of a midair image 30 that may be displayed by the display device 1 and FIG. 3(b) schematically illustrates the positional relationship among the body 10 or the operation detector 13, the midair image 30 and a detection reference 40. The midair image 30 in FIG. 3(a) includes 15 icons 30A set over three rows by five columns, as explained earlier. In FIG. 3(b), the detection reference 40 is set near the position of the midair image 30, and specifically, slightly above the midair image 30, as shown in the figure, by the detection reference control unit 204. In FIG. 3(b), icons in the midair image 30 are indicated as 30A marked with bold dotted lines. It is to be noted that while the icons 30A all assume a height wise position matching that of the midair image 30 since they are part of the midair image 30, the bold dotted lines indicating the icons 30A are offset from the position of the solid line indicating the midair image 30 in FIG. 3(b) so as to distinguish them from the midair image 30.

In FIG. 3(b), the midair image 30 is formed above the operation detector 13 in the display device 1, at a position set apart from the operation detector 13 by a distance H1, whereas the detection reference 40 is set at a position further upward relative to the operation detector 13, set apart from the operation detector 13 by a distance H2 (H1<H2). As explained earlier, the operation detector 13 assumes an electrostatic capacitance detection range 13A set above its surface. In FIG. 3(b), the electrostatic capacitance detection limit above the operation detector 13 is indicated with a dotted line 13a, and the interval between the electrostatic capacitance detection limit 13a and the operation detector 13 is indicated as an electrostatic capacitance detection range 13A. The midair image 30 and the detection reference 40 are set so as to take positions within the electrostatic capacitance detection range 13A. It is to be noted that while the detection reference 40 in FIG. 3(b) is set above the midair image 30, it may instead be set further downward relative to the midair image 30 or may be set so as to match the position of the midair image 30, as long as it takes a position within the electrostatic capacitance detection range 13A of the operation detector 13. A range outside the area set for the detection reference 40 within the detection range 30A will hereafter be referred to as outside a detection reference 41.

It is to be noted that while the midair image 30 and the detection reference 40 are shown in FIG. 3(b) as flat planes ranging parallel to the XY plane, they do not need to be flat planes but instead may be curved planes. The detection reference 40 may include stages, each corresponding to one of the icons 30A, as indicated in FIG. 3(c), instead of being formed as a flat plane. In other words, the distance between a given icon 30A and the part of the detection reference 40 corresponding to the particular icon may be different from the distance between another icon 30A and the part of the detection reference 40 corresponding to the other icon. Assuming stages in the detection reference 40, as described above, is particularly effective when the midair image 30 is a 3-D image and the positions of the plurality of icons 30A are offset relative to one another along the Z direction, i.e., along the up/down direction. By offsetting the positions of the detection reference 40, each corresponding to one of the icons 30A in correspondence to the offset with which the plurality of icons 30A in the 3-D midair image 30 are shifted along the up/down direction, for instance, it is also possible that the distances between the icons 30A and the corresponding positions in the detection reference 40 remain equal.

When the user's fingertip has moved to a point set apart from the operation detector 13 by the distance H2, the operation detector 13 outputs a detection output corresponding to the distance H2. Based upon the detection output provided by the operation detector 13, the detection reference control unit 204 decides that the user's fingertip position has matched the detection reference 40 and accordingly decides that the user has performed an operation with his fingertip at the display position of the icon 30A. Through this process, the display device 1 detects an operation by the user at the display position of the particular icon 30A in the midair image 30 and executes a function corresponding to the icon 30A having been operated. For instance, it executes display image switchover at the display unit 11.

While the icons 30A take positions set apart from the operation detector 13 by the distance H1, they are displayed as part of the midair image 30 and for this reason, the visual perception of the display positions of the icons 30A in the midair image 30, i.e., their height H1, of one user may be different from that of another user. The visual perception of the display positions of the icons 30A of a given user may change depending upon the environment in which he operates the display device 1. For instance, when the detection reference 40 is set so as to align with the position of the midair image 30, a user, having moved his finger toward an icon 30A in the midair image 30 in order to perform an operation at the display position of the particular icon 30A, may feel that there is still some distance between his finger and the icon 30A although the finger has, in fact, reached the icon, i.e., the detection reference 40. Under such circumstances, an icon operation will be executed against the user's wishes. Another user, having moved his finger toward an icon 30A in the midair image in order to perform an icon operation, may feel that his finger has reached the icon 30A and is performing an operation at the display position of the icon 30A while his finger is actually still set apart from the icon 30A, i.e., the detection reference 40. In this case, no icon operation will be executed against the user's wishes. In either scenario, the user is bound to feel that the icon operation is uncomfortable.

Accordingly, in addition to a midair operation mode that may be set for the midair image 30, as described earlier, a calibration processing mode can be set in the display device 1 in the embodiment, so as to customize the response to icon operations to suit the user. In the calibration processing mode, the positional relationship between the midair image 30 and the detection reference 40 is set so as to establish a suitable relation best suited to the operational perception or operation characteristics of a specific user, the environment in which the display device is used and the like. As explained earlier, first and second calibration processing modes are available in the display device 1 in the embodiment. In the first calibration processing mode, calibration processing is executed while the midair image operation mode is not in effect, i.e., while midair image operation mode execution is not underway, whereas in the second calibration processing mode, calibration processing is executed while the midair image operation mode execution, following startup of the display device 1, is underway. The processing in the first and second calibration processing modes is executed by the calibration unit 203 shown in FIG. 2. It is to be noted that the first or second calibration processing mode may be selected by operating a calibration processing mode selector operation button (not shown) located at the display device 1, and the control unit 20 may select and execute the midair image operation mode when neither the first calibration processing mode nor the second calibration processing mode is selected via the calibration processing mode selector operation button. If the display device does not have a calibration processing mode selector operation button, the second calibration processing mode may be a default mode. The first calibration processing mode and the second calibration processing mode will now be described in that order. It is to be noted that the first or second calibration processing mode may be selected via an icon in the midair image instead of via an operation button.

Figure 4:
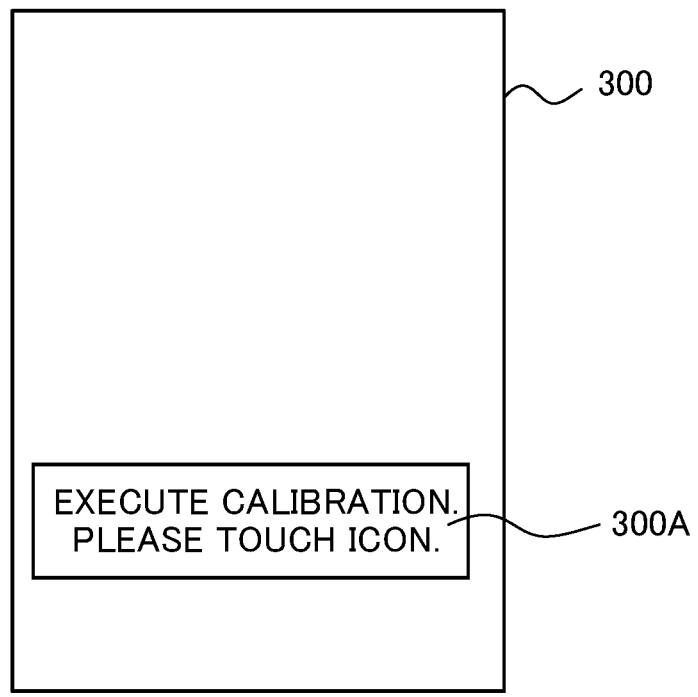
FIG. 4 A schematic illustration of a midair image displayed for purposes of calibration processing in the first embodiment FIG. 5 The calibration processing executed in the first embodiment, illustrated in (a), (b), (c) and (d) each providing a sectional view indicating the relationship among the operation detector, the midair image, the detection reference and the finger position FIG. 6 A flowchart of the calibration processing executed in a first calibration processing mode in the first embodiment FIG. 7 An illustration indicating the positional relationship among the midair image, the detection reference and the reach position in a second calibration processing mode in the first embodiment FIG. 8 A flowchart of the calibration processing executed in the second calibration processing mode in the first embodiment FIG. 9 A block diagram showing the main configuration of the display device achieved in variation 1 of the first embodiment FIG. 10 The calibration processing executed in variation 1 of the first embodiment, illustrated in (a), (b) and (c) each providing a sectional view indicating the relationship among the operation detector, the midair image, the detection reference and the finger position FIG. 11 A flowchart of the calibration processing executed in variation 1 of the first embodiment FIG. 12 A schematic illustration of a midair image displayed for purposes of calibration processing in variation 3 of the first embodiment FIG. 13 The calibration processing executed in variation 3 of the first embodiment, illustrated in (a), (b) and (c) each providing a sectional view indicating the relationship among the operation detector, the midair image, the detection reference and the finger position FIG. 14 A flowchart of the calibration processing executed in variation 3 of the first embodiment FIG. 15 A schematic illustration of a midair image displayed for purposes of calibration processing in variation 4 of the first embodiment FIG. 16 A flowchart of the calibration processing executed in variation 4 of the first embodiment FIG. 17 A block diagram showing the main configuration of the display device achieved in variation 6 of the first embodiment FIG. 18 A schematic illustration of a midair image displayed for purposes of calibration processing in variation 6 of the first embodiment FIG. 19 A flowchart of the calibration processing executed in variation 6 of the first embodiment FIG. 20 A schematic presentation of a midair image displayed in variation 7 of the first embodiment in a plan view in (a) and in a sectional view indicating the relationship among the operation detector, the midair image and the detection reference in (b)

The first calibration processing mode will be described first. As the display device 1 is started up and the user operates the calibration processing mode selector operation button to select the first calibration processing mode, the calibration unit 203 in FIG. 2 starts the first calibration processing mode. The image generation unit 201 generates display image data, and the display unit 11 brings up a display image to be used in calibration processing based on the display image data. FIG. 4 and FIG. 5 show a midair image 300 of the display image generated for the calibration processing. The midair image 300 includes an icon 300A for calibration, and a message "execute calibration. Please touch this icon" is superimposed on the calibration icon 300A. The detection reference control unit 204 may select an initial setting for the detection reference 40 so as to set it at a position near the midair image 30, e.g., slightly above the midair image 300, as indicated in FIG. 5(*a*). The initial position for the detection reference 40 may instead be set so as to align with the midair image 300 or may be set slightly below the midair image 300. It is to be noted that it is not always necessary to display the message "execute calibration. Please touch this icon" when calibration processing is to be executed. For instance, the user, having selected the calibration processing mode may already know a specific operation he needs to perform in the calibration processing mode and in such a case, the message does not need to be displayed.

As the user, following the instructions in the message superimposed on the icon 300A in the midair image 300, moves his fingertip F down toward the icon 300A, as shown in FIG. 5(*a*), until the fingertip F reaches the electrostatic capacitance detection range 13A of the operation detector 13 shown in FIG. 2, the operation detector 13 detects movement of the user's fingertip F toward the icon 300A, i.e., the downward movement, as a change in the electrostatic capacitance.

As the fingertip F moves further down and reaches a position indicated by a dotted line 50 slightly above the detection reference 40 in FIG. 5(*b*), the user feels that his fingertip F, having reached the display position of the icon 300A, has performed a press down operation on the icon 300A, and moves the fingertip F upward by a predetermined distance. The operation detector 13 detects the downward movement of the fingertip F described above, i.e., the fingertip F pressing down the icon 300A, and the subsequent upward movement by the predetermined distance as changes in the electrostatic capacitance. Once the operation detector 13 detects the fingertip F pressing down the icon 300A and the subsequent upward movement of the fingertip F by the predetermined distance described above, the detection reference control unit 204 decides that an operation has been performed at the display position of the icon 300A. It is to be noted that the reach position to which the user's fingertip F moves downward in order to press down the icon 300A for an operation at the display position of the icon 300A before the fingertip F moves upward by the predetermined distance will be referred to as a reach position. Namely, position indicated by the dotted line 50 will be referred to as the reach position.

Upon deciding that the fingertip F, having reached the reach position 50, has performed an operation at the display position of the icon 300A, the detection reference control unit 204 moves, i.e., changes, the detection reference 40 to the reach position 50 as indicated in FIG. 5(*c*) and also stores the position data indicating the position of the changed detection reference 40 into the storage unit 205 in FIG. 2. It is to be noted that the detection reference control unit 204 may instead move, i.e., change, the detection reference 40 to a position further upward relative to the reach position 50, set apart from the reach position 50 by a predetermined distance d1, as indicated in FIG. 5(*d*) and store position data indicating the position of the changed detection reference 40 into the storage unit 205. This predetermined distance d1 may be set to, for instance, approximately 1 mm through 10 mm. The predetermined distance d1 may be changed in correspondence to each user who operates the device, and in such a case, the predetermined distance d1 may be set based on the distance measured from the tip of the user's finger to the first joint. For instance, the predetermined distance d1 may be set to a specific value falling into a range between ¼ and ½ of the distance from the user's fingertip to the first joint.

While the reach position 50 to which the finger reaches is further upward relative to the detection reference 40 in the example described above, the reach position 50 may instead be further downward relative to the detection reference 40, and in such a case, too, decision-making with regard to the reach position 50 should be made as described above and the detection reference 40 should be changed based on the reach position 50 thus determined. While decision-making with regard to the reach position 50 aligned with the detection reference 40 is also executed as described above, the detection reference 40 may not be changed in this case, since the reach position 50 is aligned with the detection reference 40.

It is to be noted that when the reach position 50 is further downward relative to the detection reference 40, the finger passes through the detection reference 40 and the detection reference control unit 204 thus decides that the finger has reached the detection reference 40 based on the detection output provided by the operation detector 13 before the finger reaches the reach position 50. In this situation, no display switchover takes place at the display unit 13 in the first calibration processing mode. Likewise, when the reach position 50 is aligned with the detection reference 40, no display switchover takes place at the display unit 13. However, when the finger has moved to reach the detection reference 40, the user may be informed that the finger has reached the detection reference with, for instance, a highlight display of the icon 300A or by flashing the icon 300A.

It is to be noted that while the user presses down the icon 300A as an operation performed at the display position of the icon 300A in the example described above, the present invention is not limited to this example. Namely, the operation detector 13 may detect a predetermined non-contact operation performed by the user in relation to the icon 300A and, in such a case, the detection reference 40 may be changed based on the location where the specific non-contact operation is performed. The predetermined non-contact operation may be performed by the user by making a gesture operation to touch the icon 300A. In this case, the detection reference 40 may be changed based on the position at which the user has made the gesture of touching the icon 300A. The operation performed by the user making a gesture of touching the icon 300A may be, for instance, a gesture of swiping the icon 300A with the user's hand. The position at which the user has performed the operation by making a gesture of touching the icon 300A may be determined based on the position at which the user's hand, having made the swiping gesture, is determined to have stopped or based on the position at which the user has started making the swiping gesture.

As described above, it is decided in the first calibration processing mode that the user perceives that his finger has performed an operation at the display position of the icon 300A in the midair image 300 by detecting a shift from a downward movement to an upward movement by the predetermined distance, and the positional relationship between the detection reference 40 and the midair image 30 is changed by changing the detection reference 40 for the particular user to a position set apart from the finger reach position 50 by the predetermined distance d1 along the upward direction. Namely, based on the operation by the user, which is one type of information on the user operating the device, the positional relationship between the detection reference 40 and the display position of the midair image 300 is changed. It is to be noted that when changing the detection reference 40 for a given user, it is not always necessary to detect the identity of the user operating the device and that the positional relationship between the detection reference 40 but the display position of the midair image 300 may be changed based on the detection output provided by the operation detector 13 having detected the operation described above.

It is to be noted that the detection reference control unit 204, changing the position of the detection reference 40, may move the entire detection reference 40 or may move only the part of the detection reference 40 corresponding to the icon 300A operated by the user's finger.

It is to be also noted that in the description provided above, the detection reference 40 is changed to the position further upward set apart from the reach position 50 by the predetermined distance d1 in the example presented in FIG. 5(c) for the following reason. Namely, a user operating a touch panel normally touches the touch panel with his finger and gently presses the finger down on the touch panel. When the user performs an operation at the display position of the icon 300A in the midair image 300, he tends to simulate this process, i.e., when performing the operation at the display position of the icon 300A in the midair image 300 with his fingertip, the user is likely to move his finger slightly downward before moving it upward by a predetermined distance, instead of immediately moving his finger upward by the predetermined distance after the operation at the display position. Accordingly, the finger reach position 50 tends to be slightly lower than the position at which the user perceives that the operation has been performed at the display position of the icon 300A with the finger and the detection reference 40 is then changed to the position set apart from the reach position 50 by the predetermined distance d1 along the upward direction. However, the extent to which the finger is moved down to press the icon 300A may be relatively small or the finger may hardly move downward to touch the icon 300A, for some users, and accordingly, the position of the detection reference 40 may be changed so as to substantially match the reach position 50.

In the calibration processing mode, which is selected in order to set the positional relationship between the calibration midair image 300 and the detection reference 40 to a suitable relationship suited to the operation characteristics of the user, as explained earlier, the detection reference 40 may be changed so as to be substantially aligned with the reach position 50, as described above, or to a position further downward relative to the reach position 50, in correspondence to the operation characteristics by the user or the display device. For instance, when the reach position 50 of a given user is above the midair image 300 and the distance between the reach position 50 and the upper limit 13a of the electrostatic capacitance detection range 13A is less than the distance between the reach position 50 and the midair image 300, the detection reference 40 may be changed so as to be in alignment with the reach position 50 or to a position further downward relative to the reach position 50, since the detection reference 40 changed to take a position further upward relative to the reach position 50 would be too close to the upper limit 13a of the electrostatic capacitance detection range 13A.

It is to be noted that the method through which the reach position 50 is determined is not limited to that described above, through which the reach position 50 is determined based on the shift from the downward movement to the upward movement by the predetermined distance, and it may be determined through any of the various other methods to be described below. For instance, the user, perceiving that his finger, having reached the display position of the icon 300A, has performed the press down operation on the icon 300A, stops moving his finger downward, i.e., stops pressing down the icon. The detection reference control unit 204 may decide that the finger has stopped pressing down when there is not almost any change in the value of the electrostatic capacitance detected by the operation detector 13, and may determine the position at which the finger has stopped pressing down as the reach position 50. It is to be noted that it may decide that the downward movement has stopped when the value of the electrostatic capacitance detected by the operation detector 13 has remained unchanged for a short span of time of, for instance, 0.1 sec through 1 sec. In another method, the reach position may be determined by detecting the velocity vector of the movement of the user's finger, i.e., the finger movement velocity and the finger movement direction, based on a change in the electrostatic capacitance, by detecting that the direction of the finger velocity vector has changed from the downward direction to the opposite direction and that the velocity vector along the opposite direction has reached a predetermined level, and by designating the position taken by the finger when the velocity vector achieving the predetermined level along the opposite direction is detected as the reach position. When the predetermined level for the velocity vector is set substantially equal to 0 in this method, the position taken by the finger when the direction of the velocity vector shifts from downward to the opposite direction, i.e., the lowermost position, will be determined to be the reach position, whereas when the predetermined level is set to a value other than 0 in this method, a position taken by the finger, set apart from the lowermost position by a predetermined distance along the upward direction is determined as the reach position. As explained above, the reach position is set at the lowermost position taken by the finger as the finger is judged by the detection reference control unit 405 to have performed an operation at the display position of the icon or at a position near the lowermost position.

While the reach position is determined in the example presented above in reference to the part of the finger or the stylus coming in contact with the icon 300A in the midair image 300, i.e., the position of the fingertip or the position of the lowermost part of the stylus, the reach position may instead be determined in reference to the position of the fingernail tip of the user's finger or in reference to the position of the first joint of the finger. The icon may be also operated with the user's foot or elbow instead of the user's finger, and in such a case, the reach position may be determined in reference to the foot or the elbow. When the icon operation is performed via a stylus, a specific position on the stylus may be marked and the reach position may be determined in reference to the marked position. It is desirable that when the reach position is determined in reference to the position of the first joint of the finger, the position of the stylus mark or the like, the operation detector 13 be configured with an image-capturing device or the like, such as that to be described in reference to variation 8, instead of the capacitive panel.

Figure 6:
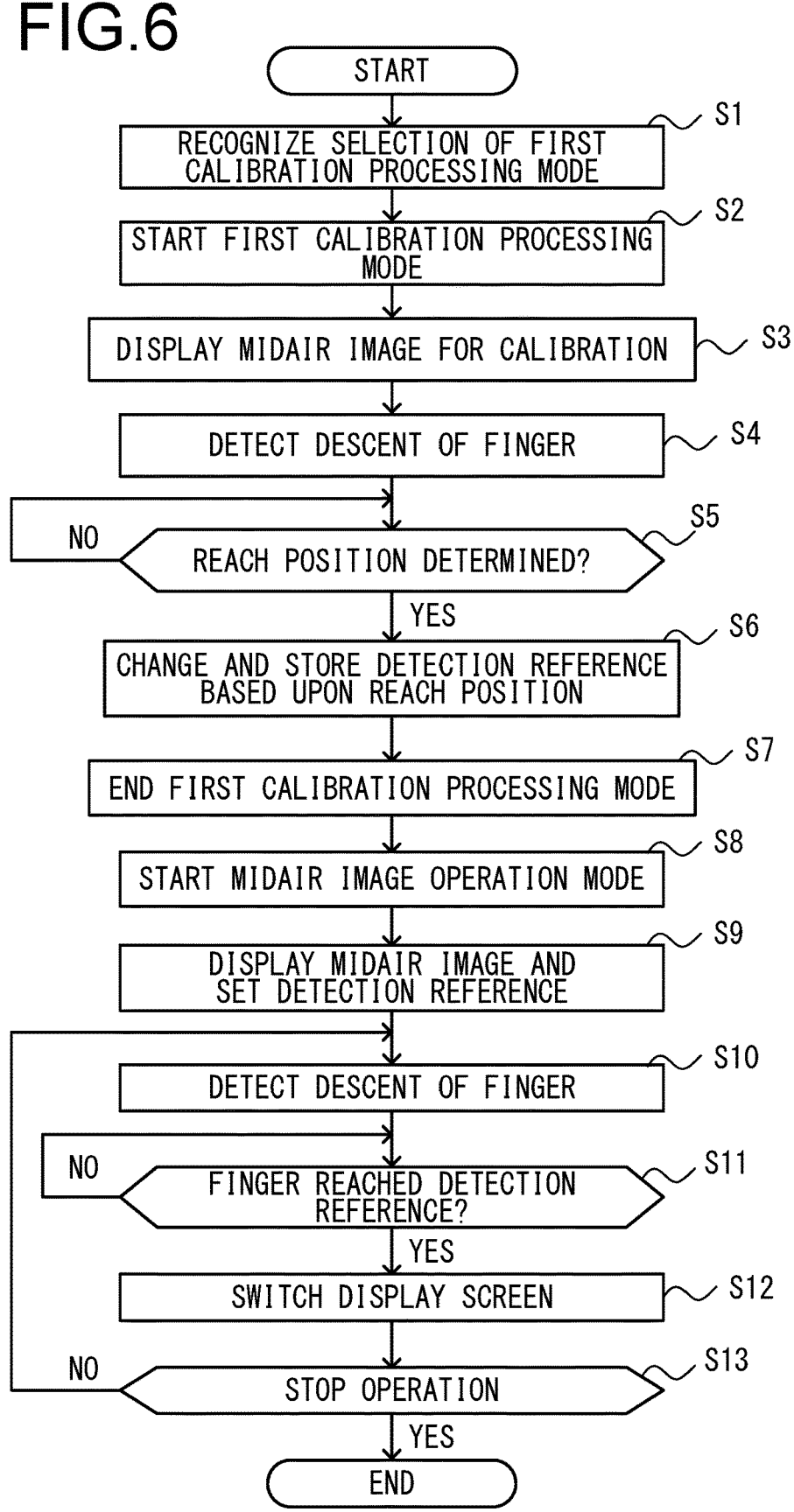

The relationship between the first calibration processing mode described above and the midair image operation mode will be described in reference to the flowchart presented in FIG. 6. After the display device 1 is started up, the processing shown in the flowchart presented in FIG. 6 is executed based on a program by the control unit 20. The program is stored in the storage unit 205. In step S1, the first calibration processing mode, selected by the user via the calibration mode selector operation button, is recognized, and then the operation proceeds to step S2. In step S2, the calibration unit 203 shown in FIG. 2 starts the first calibration processing mode before the operation proceeds to step S3. In step S3, the image generation unit 201 generates display image data for the calibration display image, the display control unit 202 brings up on display at the display unit 11 the calibration image based on the display image data and the detection reference control unit 204 sets the detection reference at the initial position. The display image at the display unit 11 is the calibration midair image 300 in FIG. 4 generated by the image forming optical system 12. The midair image 300 includes the icon 300A with the message "execute calibration. Please touch this icon". In step S4, the operation detector 13 detects a downward movement of the user's fingertip F, and the operation proceeds to step S5.

In step S5, the detection reference control unit 204 shown in FIG. 2 determines based on the detection output provided by the operation detector 13, whether or not the finger has reached the reach position. When an affirmative decision is made in step S5, i.e., when it is decided that the finger has reached the reach position, the operation proceeds to step S6. When a negative decision is made in step S5, i.e., when it is decided that the finger has not become still, the operation waits in standby until an affirmative decision is made. In step S6, the detection reference control unit 204 changes the position of the detection reference 40 based on the reach position 50 and stores the position data indicating the position of the changed detection reference 40 into the storage unit 205 shown in FIG. 2 before the operation proceeds to step S7. In step S7, the operation exits the first calibration processing mode and proceeds to step S8. In step S8, the midair image operation mode is started, and the operation then proceeds to step S9. In step S9, the midair image 30 for the midair image operation mode shown in FIG. 3, which includes icons 30A, is displayed, the position data indicating the position of the detection reference 40 having been changed in the first calibration processing mode through step S6 are read out from the storage unit 205 and the detection reference 40 is set at a position near the midair image 30 based on the position data, as indicated in FIG. 3(b). The detection reference 40, having been set in the first calibration processing mode to suit the operation characteristics of the user is thus used in the midair image operation mode.

As the user moves his finger down toward the midair image 30 in order to perform an operation at the display position of an icon 30A, the operation detector 13 shown in FIG. 2 detects the downward movement of the user's finger in step S10, and then the operation proceeds to step S11. In step S11, the detection reference control unit 204 determines based on the detection output divided by the operation detector 13 whether or not the finger has reached the detection reference 40. When an affirmative decision is made in step S11, i.e., when it is decided that the finger has reached the detection reference 40, the operation proceeds to step S12. When a negative decision is made in step S11, i.e., when it is decided that the finger has not reached the detection reference 40, the operation waits in standby until an affirmative decision is made. In step S12, the display control unit 202 switches the display image at the display unit 13 to a display image corresponding to the icon 30A having been operated, and then the operation proceeds to step S13. In step S13, a decision is made as to whether or not an operation has been performed to stop the display device 1. When an affirmative decision is made in step S13, i.e., when an operation has been performed to stop the display device 1, the display device 1 stops. When a negative decision is made in step S13, however, the operation returns to step S10.

As explained above, the detection reference is changed based on an operation by the user so as to change the positional relationship between the midair image and the detection reference in the first calibration mode. Since the detection reference for the midair image operation mode is set at the position of the detection reference having been changed through the first calibration mode, the midair image operation mode can be executed based on the detection reference suitable for the operation characteristics of the user or the operating environment in which the display device 1 is operated.

While the first calibration processing mode is executed immediately after the display device 1 is started up so as to precede the midair image operation mode in the example described above, the first calibration processing mode may instead be executed following the midair image operation mode. For instance, the user, having experienced frustration while performing an operation at the display position of an icon 300A in the midair image operation mode, may operate the calibration processing mode selector operation button at the display device 1 in order to select the first calibration processing mode. In this case, the first calibration processing mode is executed by interrupting the midair image operation mode that is underway and the midair image operation mode is then resumed after the first calibration processing ends. It is to be noted that while the display device 1 selects the first calibration mode in response to an operation of the operation button by the user in the example described above, the first calibration processing mode may instead be executed upon detecting signs of annoyance experienced by the user, which is likely attributable to difficulty in performing an operation at the display position of the icon 300A. The display device 1 may, for instance, read the pulse rate of the user (biometrics) and a pulse rate exceeding a predetermined value may be detected as a sign of user discomfort.

Figure 7:
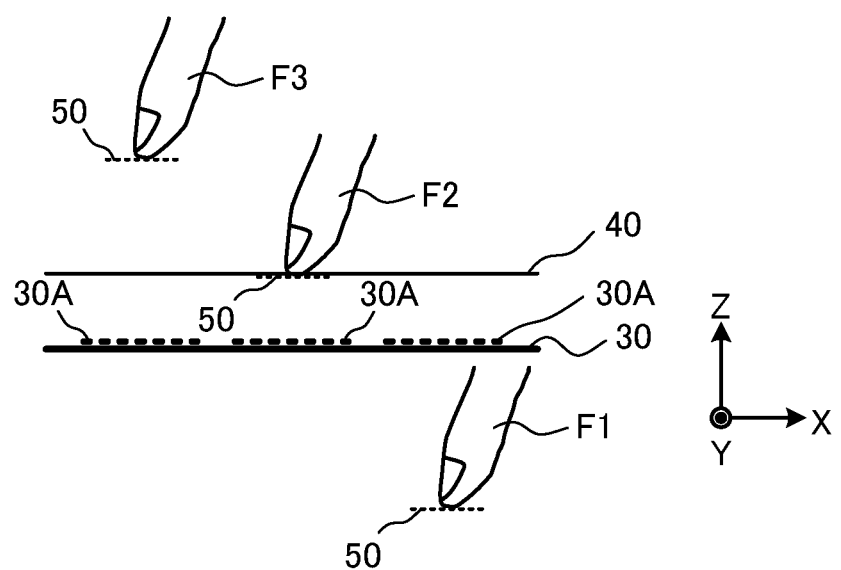
Figure 8:
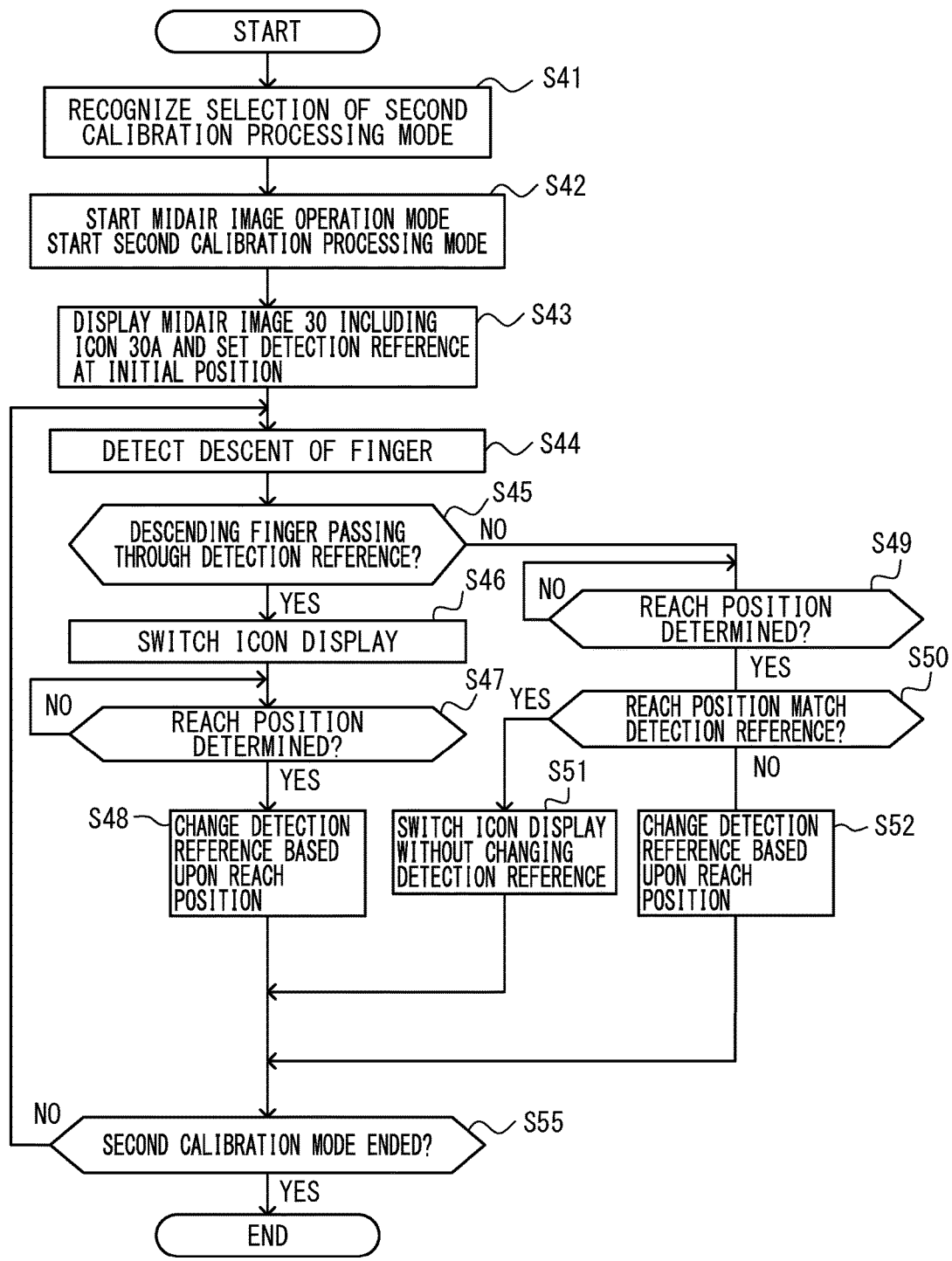

Next, the second calibration processing mode will be described in reference to FIG. 7 and FIG. 8. It is to be noted that the processing described earlier in reference to the first calibration mode may also be executed, as appropriate, in the second calibration processing mode described below. FIG. 7 illustrates the midair image 30 on display for the midair image operation mode, the detection reference 40 at the initial position and the finger reach position 50, whereas FIG. 8 presents a flowchart of the operation executed in the second calibration processing mode. The processing in the flowchart presented in FIG. 8 is executed following startup of the display device, by the control unit 20 based on a program.

In step S41, the second calibration processing mode is recognized as the selected mode, and then the operation proceeds to step S42. In step S42, the midair image operation mode and the second calibration processing mode start concurrently, before the operation proceeds to step S43. In step S43, the midair image 30 shown in FIG. 3, which includes the icons 30A, is displayed and the detection reference control unit 204 in FIG. 2 sets the detection reference 40 at a predetermined initial position, e.g., at the position taken by the midair image 30 or at a position slightly above the position taken by the midair image 30, before the operation proceeds to step S44. At this time, a message "calibration executed during icon operation" is briefly displayed in the midair image 30. However, it is not necessary that this message be displayed.

As the user moves his finger downward in order to perform an operation at the display position of an icon 30A, the operation detector 13 starts detection of finger movement in step S44, and then the operation proceeds to step S45. In step S45, the detection reference control unit 204 determines based on the detection output provided by the operation detector 13 whether or not the finger moving downward has passed through the detection reference 40. When an affirmative decision is made in step S45, i.e., when the finger moving downward has passed through the detection reference 40 and has moved further down, the operation proceeds to step S46. F1 in FIG. 7 indicates the finger having passed through the detection reference 40 during its downward movement. In step S46, the detection reference control unit 204, having decided that the finger F1 has reached the detection reference 40, i.e., it has passed through the detection reference 40, executes icon display switchover so as to switch the midair image 30 in correspondence to the icon 30A having been operated. The operation then proceeds to step S47. In step S47, the detection reference control unit 204 determines whether or not the finger F1 has reached the reach position 50, and when an affirmative decision is made, the operation proceeds to step S48, whereas when a negative decision is made, the operation is held until an affirmative decision is made. In step S48, the detection reference control unit 204 changes the position of the detection reference 40 based on the reach position 50. It is to be noted that the position of the detection reference 40 having been changed may be exactly at the user's fingertip or may be above the position of the user's fingertip. In such a case, icon display switchover does not occur since icon display switchover has already been executed once in step S46.

When a negative decision is made in step S45, i.e., when the finger moving downward has not yet passed through the detection reference 40, the operation proceeds to step S49. In step S49, the detection reference control unit 204 determines based on the detection output provided by the operation detector 13 whether or not the finger has reached the reach position 50, and when an affirmative decision is made, the operation proceeds to step S50. When, on the other hand, a negative decision is made, the operation is held until an affirmative decision is made. A finger F2 in FIG. 7 indicates that the reach position 50 is in alignment with the detection reference 40. In step S50, the detection reference control unit 204 determines based on the detection output from the operation detector 13 whether or not the reach position 50 is in alignment with the detection reference 40, and when an affirmative decision is made, the operation proceeds to step S51, whereas when a negative decision is made, the operation proceeds to step S52. In step S51, icon display switchover is executed since the reach position 50 is in alignment with the detection reference 40 but the detection reference 40 is not changed.

In step S52, with the reach position 50 located above the detection reference 40 as indicated by a finger F3 in FIG. 7, the detection reference control unit 204 changes the position of the detection reference 40 based on the reach position 50, i.e., changes the position of the detection reference 40 to a point near the reach position 50, and then the operation proceeds to step S55. In this situation, when the position of the detection reference 40 having been changed is exactly at the user's fingertip or is further upward relative to the position of the user's fingertip, icon display switchover is executed. When, on the other hand, the detection reference 40 having been changed still does not reach the position of the user's fingertip, icon display switchover is not executed.

In step S55, a decision is made as to whether or not an end operation has been performed in order to exit the second calibration processing mode, and when an affirmative decision is made, the operation proceeds to step S55, whereas when a negative decision is made, the operation returns to step S44.

In the second calibration processing mode described above, which is executed concurrently while the midair image operation mode is underway, the user is able to perform an operation at the display position of the midair image by using the detection reference suitable for the user without having to be aware that calibration processing is also in progress. It is to be noted that the first/second calibration processing mode selection does not necessarily need to be made by the user and instead, the display device 1 may automatically select either the first calibration processing mode or the second calibration processing mode. It is not necessary that both the first calibration processing mode and the second calibration processing mode be available at the display device 1 and the display device 1 may use one of these calibration modes.

The display device 1 achieved in the first embodiment as described above allows for the following variations.

Variation 1 of the First Embodiment

Figure 9:
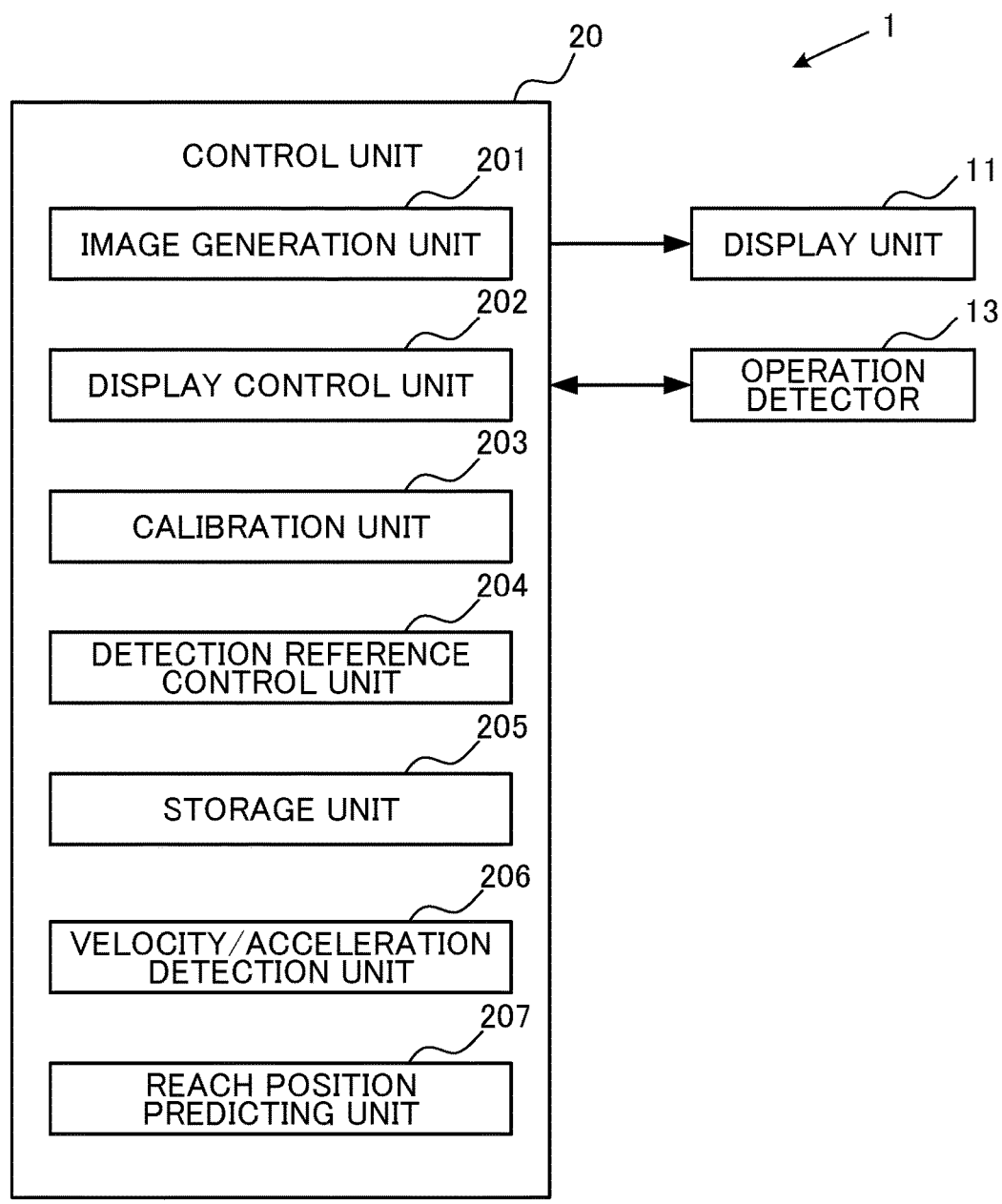

The display device in variation 1 calculates the velocity or the acceleration of the user's fingertip based on the detection output provided by the operation detector 13, predicts a finger reach position based on the velocity or the acceleration having been calculated and changes the detection reference based on the predicted reach position. FIG. 9 is a block diagram showing a control unit 20 and a display unit 11 and an operation detector 13 controlled by the control unit 20, among the structural components in the display device 1 achieved in variation 1.

The structural features of the display device 1 in variation 1 will be described by focusing on features different from those in the display device achieved in the first embodiment. A velocity/acceleration detection unit 206 in FIG. 9 reads out an electrostatic capacitance value detected by the operation detector 13 over predetermined time intervals, calculates the velocity of the finger movement based on a change occurring in the electrostatic capacitance value over each predetermined time interval and also calculates the acceleration of the finger movement based on the velocity having been calculated. A reach position predicting unit 207 predicts the reach position for the finger based on the finger movement velocity or acceleration output by the velocity/acceleration detection unit 206. The reach position predicting unit 207 is able to estimate the reach position for the finger by, for instance, detecting that the moving finger, having been accelerating or moving at a substantially constant speed, has shifted into a decelerating state and ascertaining the rate of deceleration. Based upon the reach position predicted by the reach position predicting unit 207, the detection reference control unit 204 changes the detection reference.

Figure 11:
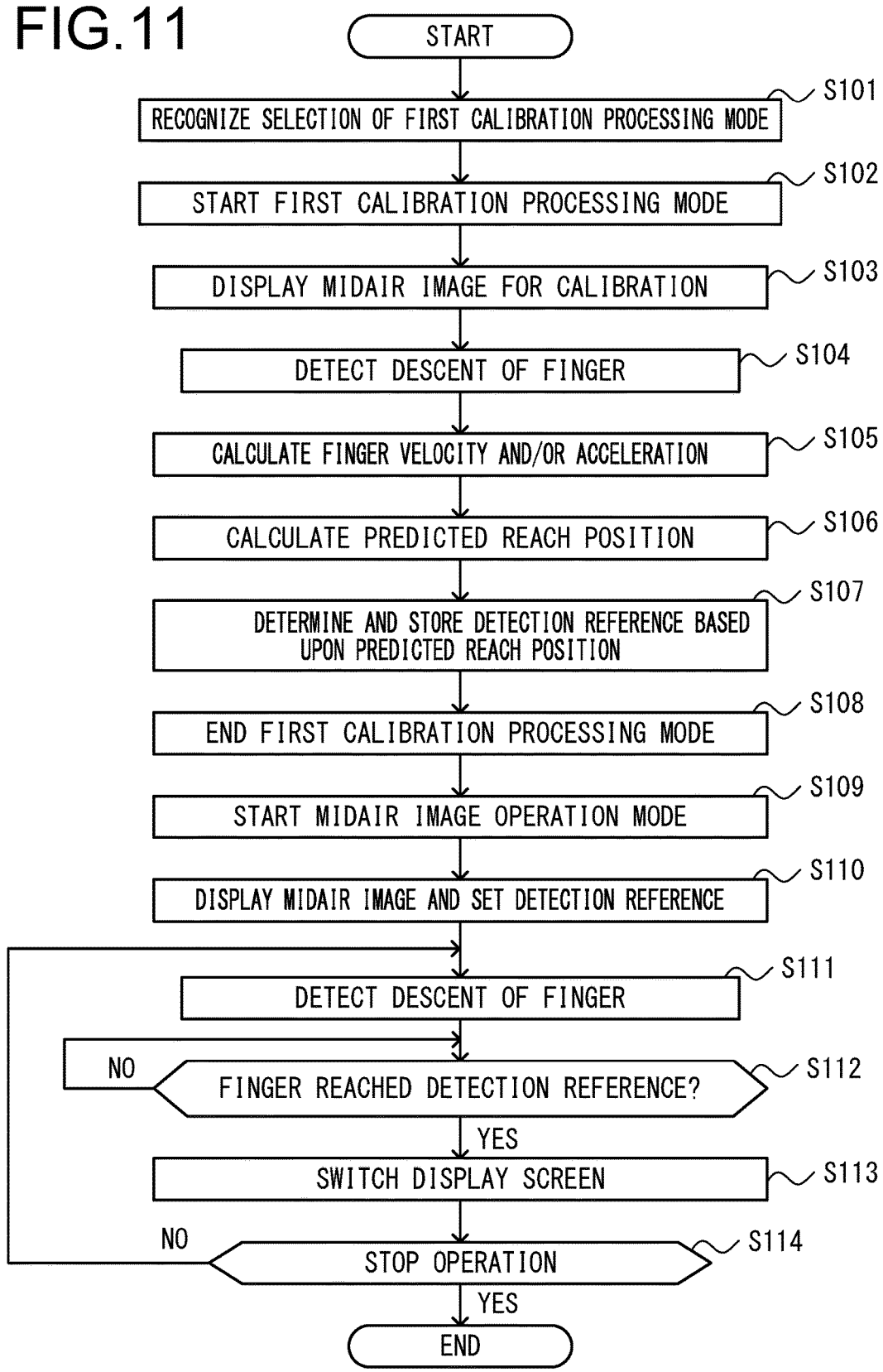

Next, the first calibration processing mode executed in the display device 1 in variation 1 will be explained in reference to FIG. 10 and FIG. 11. The processing executed in steps other than step S103 through step S107 in the flowchart presented in FIG. 11 is identical to that in the flowchart presented in FIG. 6, and accordingly, a repeated explanation is not provided. As the fingertip F moves into the predetermined detection range 13A of the operation detector 13, as shown in FIG. 10(a), the operation detector 13 detects the movement of the fingertip F as a change in the electrostatic capacitance value in step S104. In step S105, the velocity/acceleration detection unit 206 calculates the velocity and the acceleration of the movement of the fingertip F based on the detection output provided by the operation detector 13. In step S106, the reach position predicting unit 207 calculates the reach position for the fingertip F based on the velocity and the acceleration of the movement having been calculated by the velocity/acceleration detection unit 206. The finger reach position calculated by the reach position predicting unit 207, i.e., predicted by the reach position predicting unit 207, is indicated by a dotted line 60 in FIG. 10(b). In step S107, the detection reference control unit 204 changes the detection reference 40 based on the predicted reach position 60, as indicated in FIG. 10(c) and also stores the position data indicating the changed position of the detection reference 40 into the storage unit 205. In the subsequent step S110, the detection reference for the midair image operation mode is set at the position of the detection reference 40 indicated in the position data having been stored. It is to be noted that the reach position for the finger may be estimated based on both the velocity and the acceleration of the finger movement or based on either one of them.

It is to be noted that while the velocity/acceleration detection unit 206 reads out the electrostatic capacitance value detected by the operation detector 13 over predetermined time intervals, calculates the velocity of the finger movement based on a change occurring in the electrostatic capacitance value over each predetermined time interval and calculates the acceleration of the finger movement based on the velocity thus calculated in the description provided above, the present invention is not limited to this method and it may be adopted in conjunction with a velocity/acceleration detection unit 206 configured with an image-capturing device. While the velocity or the acceleration of the user's finger movement is calculated in the example described above, the velocity or the acceleration of the movement of the user's foot or elbow or the movement of a stylus pen held by the user may be calculated instead.

It is to be also noted that while the predicted reach position 60, to which the user's finger is predicted to reach, is calculated based on the velocity and the acceleration of the user's finger having been calculated and the detection reference 40 is changed based on the predicted reach position 60 thus calculated for the user's finger in the description provided above, it is not necessary to predict the reach position 60 for the user's finger for each operation. When a predicted reach position 60 is calculated based on an unintended movement of the user's finger occurring prior to an operation by the user, the detection reference may not be set at the suitable position, and instead, the detection reference 40 may be set to, for instance, an extremely high position. Such an undesirable result may be prevented by changing the position of the detection reference 40 based on a predicted reach position 60 that is calculated only when a velocity and an acceleration of the user's finger movement, indicated by a value equal to or greater than a predetermined threshold value, are detected.

In variation 1, in which the finger reach position is predicted based on the velocity or the acceleration of finger movement, calibration processing can be executed promptly.

While the calibration processing in this variation is adopted in the first calibration processing mode in the first embodiment in the example described above, the calibration processing may also be adopted in the second calibration processing mode. By adopting variation 1 in the second calibration processing mode, it becomes possible to estimate in advance the reach position for the fingertip F of the user performing a midair image operation before the fingertip F reaches the detection reference 40 and to change the detection reference based on the predicted reach position. This means that even when the fingertip F of the user does not reach the detection reference 40, the user is comfortably able to perform an operation since an error such as a failure to execute icon display switchover can be prevented.

Variation 2 of the First Embodiment

In the first embodiment and variation 1 of the first embodiment, the display device 1 detects or predicts the reach position, changes the detection reference based on the reach position and stores the position data for the detection reference into the storage unit 205 through a single calibration processing session. Subsequently, the detection reference for the midair image operation mode is set to or changed to the position of the detection reference stored in the storage unit 205. The display device achieved in variation 2 is distinct in that it individually stores a plurality of detection reference positions each set through one of a plurality of calibration processing sessions into the storage unit 205 and changes the detection reference for the midair image operation mode based on the plurality of positions of the detection reference stored in the storage unit.

In the first calibration processing session, the detection reference control unit 204 determines the finger reach position 50 based on the detection output provided by the operation detector 13, changes the detection reference 40 based on the reach position 50 and stores the position data for the detection reference 40 into the storage device 205.

Immediately after the first session, it executes a second calibration processing session and stores position data for the detection reference changed in a similar manner into the storage unit 205. It may further execute a third calibration processing session immediately afterwards. A single detection reference position is then calculated by using the plurality of sets of position data for the detection reference having been stored into the storage unit 205 through the plurality of calibration processing sessions having been executed successively as described above, and position data for the detection reference thus calculated are stored into the storage unit 205. In the subsequent midair image operation mode, the detection reference is set to the position of the calculated detection reference indicated in the position data stored in the storage unit 205.

A single detection reference may be determined by using the plurality of detection references 40 through any of various procedures. For instance, the single detection reference may be calculated as the arithmetic mean of the plurality of detection references 40 or as the geometric mean of the plurality of detection references 40. As an alternative, a new detection reference may be determined by applying suitable weight to each of the plurality of detection references 40. For instance, a detection reference may be calculated by weighting the position $H_N$ of a detection reference determined through an Nth session and the position $H_{N+1}$ of a detection reference determined through an N+1th session at a ratio of 3:7. In more specific terms, by using $H_N$ and $H_{N+1}$, a detection reference can be calculated as expressed as; $(H_N \times 3 + H_{N+1} \times 7)/10$. The weighting ratio used in this calculation is not limited to 3:7 and the number of sessions is not limited to 2, either. It will be also obvious that instead of individually storing detection positions, each set based on the finger reach position determined through one of a plurality of calibration processing sessions, into the storage unit 205, the finger reach positions, each detected through one of a plurality of calibration processing sessions may be each stored into the storage unit 205 and a single detection reference may be calculated based on the plurality of reach positions thus stored.

The position of the detection reference may not be changed through the calibration processing when the distance between the reach position and the detection reference is equal to or less than a predetermined value, i.e., when the reach position is close to the detection reference.

Instead of changing the detection reference through each calibration processing session, the number of times an operation at the icon display position has failed may be calculated based on the number of times that the reach position has been determined and the number of times the reach position has been judged to actually reach the detection reference through a plurality of calibration processing sessions and the detection reference may be changed when the number of times a failure has occurred is judged to be equal to or greater than a predetermined value.

While the calibration processing in this variation is adopted in the first calibration processing mode in the first embodiment in the example described above, the calibration processing may also be adopted in the second calibration processing mode and in variation 1.

The calibration processing described above, in which the reach position is determined by detecting a natural operating motion that the user would normally make when performing an operation at an icon display position in a midair image, e.g., a downward movement of the finger to press down the icon, which then shifts to an upward movement or a movement of the finger coming into contact with the icon, and then holding down the icon briefly, can be executed without the user being aware of the reach position being detected • determined through the calibration processing, i.e., without the user being aware that calibration processing is in progress.

Variation 3 of the First Embodiment

In the first embodiment, the reach position is determined by detecting an operation performed at the display position of the midair image by the user with his finger and the detection reference is changed based on the reach position thus determined. As an alternative, the user may be allowed to designate the finger position at which he has a perception of performing an operation at the display position of an icon in the midair image, and in such a case, the detection reference control unit may determine the designated position and change the positional relationship between the detection reference and the midair image by changing the detection reference based on the designated position. The following is a description of a variation in which the user indicates the position at which he has had a perception of performing an operation at the display position of the midair image as a designated position. It is to be noted that while an example in which variation 3 is adopted in the first calibration processing mode in the first embodiment is described below, it may also be adopted in the second calibration processing mode and in variations 1 and 2 described earlier.

Figure 12:
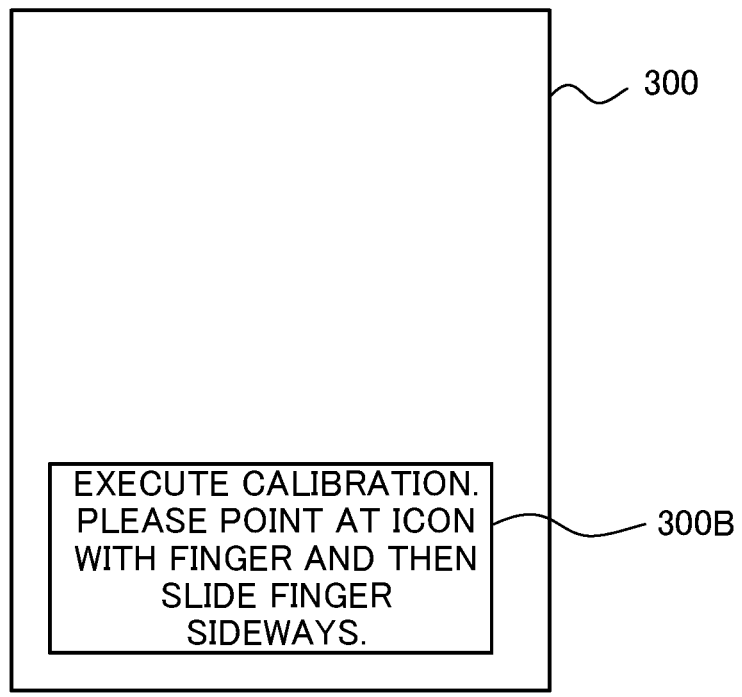

The following is a description of the display device achieved in variation 3. As the display device 1 is started up and the user operates the calibration processing mode selector operation button to select the first calibration processing mode, the calibration unit 203 in FIG. 2 starts the first calibration processing mode. The image generation unit 201 generates display image data, and the display unit 11 brings up a display image to be used in the calibration processing based on the display image data. FIG. 12 shows a midair image 300 as the display image generated for the calibration processing. The midair image 300 includes an icon 300B for calibration, and a message "execute calibration. Please point at icon with finger and move the finger sideways" is superimposed on the calibration icon 300B. The detection reference control unit 204 may set the detection reference 40 to an initial position near the midair image 300, as indicated in FIG. 13(*a*).

As the user, following the instructions in the message superimposed on the icon 300B in the midair image 300, moves his fingertip F down toward the icon 300B, as shown in FIG. 13(*a*), until the fingertip F reaches the electrostatic capacitance detection range 13A of the operation detector 13 shown in FIG. 2, the operation detector 13 detects movement of the user's fingertip F toward the icon 300B, i.e., the downward movement, as a change in the electrostatic capacitance. It is to be noted that FIG. 13(*a*) presents a front view of the finger.

The user moves his finger further downward and upon feeling that the fingertip F has reached the display position of the icon 300B in the midair image 300, he moves the finger F sideways, as indicated by the arrow in FIG. 13(*b*). The operation detector 13 detects the downward movement and the lateral movement of the finger F. The detection reference control unit 204 decides that the operation detector 13, has detected the downward movement of the finger, then having detected the lateral movement of the finger, determines the position assumed by the finger along the heightwise direction when the shift from the downward movement to the lateral movement has occurred as a designated position 50A. Based upon the designated position 50A, the detection reference control unit 204 changes the position of the detection reference 40 and stores the position data for the changed detection reference 40 into the storage unit 205. It is to be noted that while the designated position 50A is located further upward relative to the midair image 300 in FIG. 13(b), the designated position 50A, i.e., the position at which the user has a perception that his fingertip F has reached the icon 300B in the midair image 300, may be in alignment with the midair image 300 or may be further down relative to the midair image 300.

It is to be noted that the detection reference control unit 204 designates the height-wise position taken by the finger when the shift from the downward movement to the lateral movement has occurred as the designated position 50A in the description provided above, the present invention is not limited to this example and it may instead designate the height of the finger at the end of the lateral movement following the downward movement as the designated position 50A. As a further alternative, the detection reference control unit 204 may designate the average or the median of the heights of the finger assumed during the period of time elapsing between the start of the lateral movement of the finger and the end of the lateral finger movement as the designated position 50A.

Figure 14:
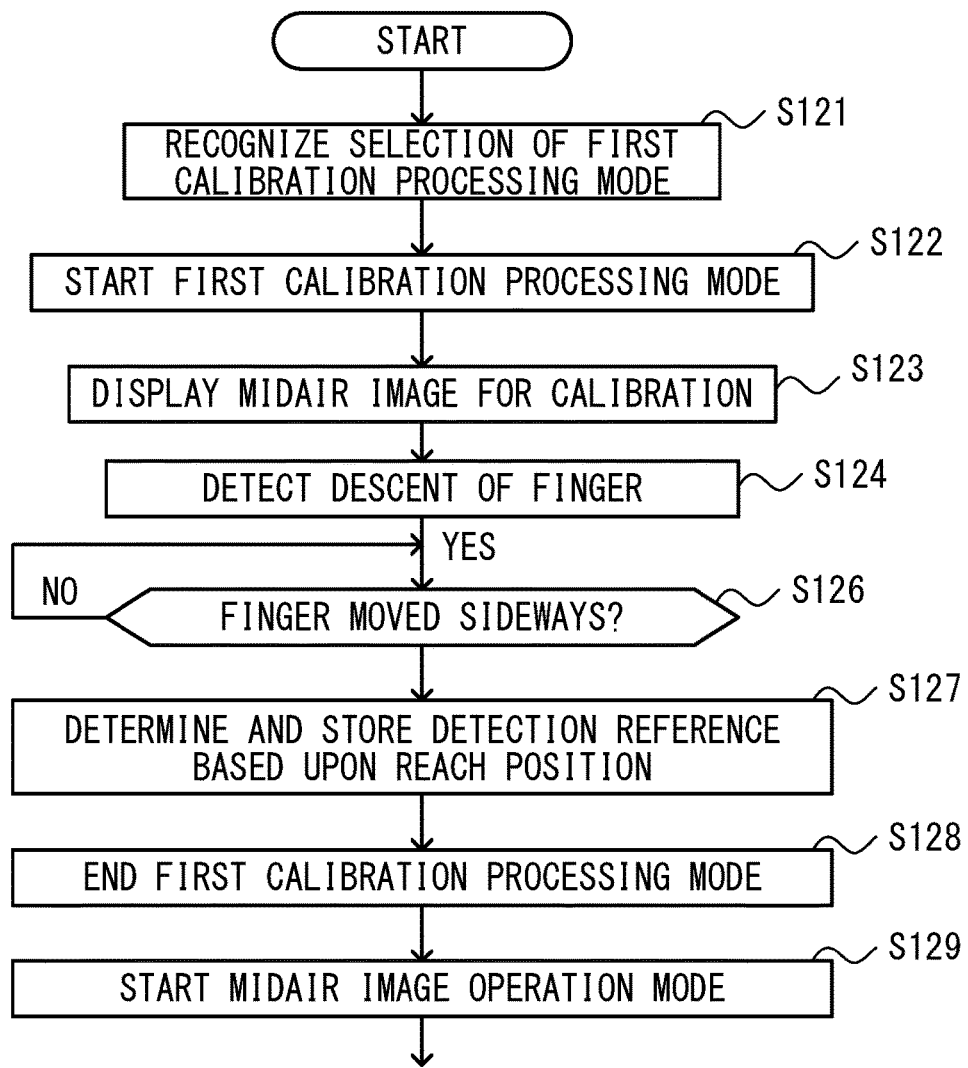

In reference to the flowchart presented in FIG. 14, the calibration processing executed in variation 3 will be described. It is to be noted that the flowchart in FIG. 14 shows the processing executed in steps S121 through S129 and does not show the processing executed in subsequent steps. The processing executed in step S129 and subsequent steps is similar to the processing executed in step S109 and subsequent steps in the flowchart presented in FIG. 11.

The processing executed in step S121 through step S124 is similar to that executed in step S1 through step S4 in the flowchart presented in FIG. 6. In step S126, the operation detector 13 detects the lateral movement of the user's finger. In step S127, the detection reference control unit 204 decides, based on the detection output from the operation detector 13, that a shift has occurred in the finger movement from the downward movement to the lateral movement, designates the position taken by the finger at the time of the shift as the designated position 50A, changes the position of the detection reference 40 based on the designated position 50A and stores the position data for the changed detection reference 40 into the storage unit 205, before the operation proceeds to step S128. In step S128, the first calibration processing mode ends and the operation proceeds to step S129. In step S129, the midair image operation mode starts. In the midair image operation mode, the detection reference is set based on the position data for the changed detection reference 40 read out from the storage unit 205.

While the calibration processing in variation 3 is in progress, the user designates a position at which he has the perception of having performed an operation at the display position of the midair image with his finger by switching the finger movement from the downward movement to a lateral movement. In other words, the calibration processing is executed by allowing the user to designate a position perceived operation position with respect to the icon 300B as the display position and thus, accurate calibration processing is enabled. Indicating the designated position by switching the finger movement from the downward movement to a lateral movement assures good operability and the calibration processing can be executed promptly.

Variation 4 of the First Embodiment

The user operating the display device 1 in variation 3 indicates the position at which he has a perception of performing an operation at the icon display position with his finger as a designated position by switching his finger movement from the downward movement to a lateral movement. The user of the display device 1 achieved in variation 4 indicates the position at which he has a perception of performing an operation at the icon display position with his finger by operating another icon. The calibration processing executed in this variation will be described next. It is to be noted that while an example in which variation 4 is adopted in the first calibration processing mode in the first embodiment is described below, it may also be adopted in the second calibration processing mode and in variations 1 through 3 described earlier.

Figure 15:
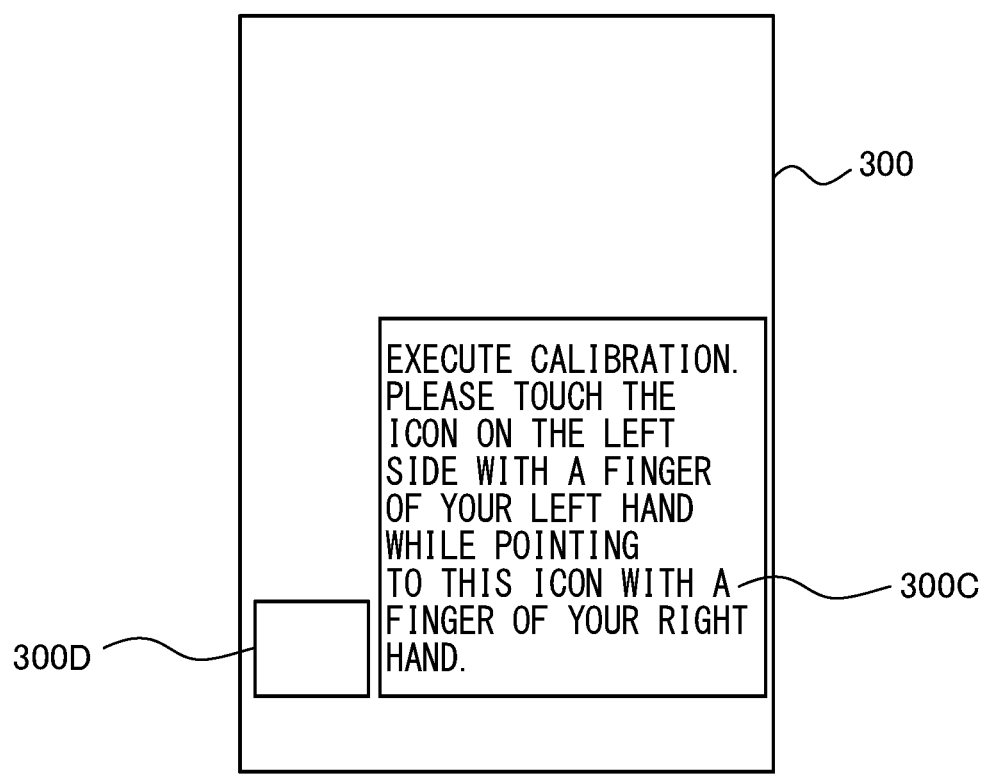

As the display device 1 is started up and the user operates the calibration processing mode selector operation button to select the first calibration processing mode, the calibration unit 203 in FIG. 2 starts the first calibration processing mode. The image generation unit 201 generates display image data, and the display unit 11 brings up a display image to be used in calibration processing based on the display image data. FIG. 15 shows a midair image 300 of the display image generated for the calibration processing. The midair image 300 includes icons 300C and 300D for calibration, and a message "execute calibration. Please touch the icon on the left side with a finger of your left hand while pointing to this icon with a finger of your right hand" is superimposed on the calibration icon 300C. It is to be noted that the icon 300C and the icon 300D are set side-by-side, the icon 300C on the right hand-side and the icon 300D on the left hand-side.

As the user, following the instructions in the message superimposed at the icon 300C, moves a fingertip of his right hand down toward the icon 300C in order to perform an operation at the display position of the icon 300C and the fingertip reaches the electrostatic capacitance detection range 13A of the operation detector 13, the operation detector 13 detects the movement of the user's finger moving closer to the display position of the icon 300C, i.e., the downward movement of the finger, as a change in the electrostatic capacitance. The user moves his finger further downward and as soon as he has the perception of the fingertip performing an operation at the display position of the icon 300C in the midair image 300, he moves a fingertip of his left hand toward the icon 300D in order to perform an operation at the display position of the icon 300D with the fingertip of his left hand as directed in the message. The operation detector 13 detects the movement of the fingertip toward the icon 300D. The detection reference control unit 204 recognizes the position taken by the fingertip in the user's right hand at the time point at which the operation detector 13 detects that the user's finger is positioned on the icon 300D as the designated position 50A. The detection reference control unit 204 changes the detection reference 40 based on the designated position 50A and stores the position data for the changed detection reference 40 into the storage unit 205.

It is to be noted that since the position taken by the right hand-side finger when the user has the perception of performing an operation at the display position of the right hand-side icon 300C is designated as the designated position, the right hand-side finger needs to move down toward the midair image. However, the left hand-side finger needs to be positioned above or below the icon 300D to perform an operation at the display position of the left hand-side icon 300D and thus, it is not always necessary to move the left hand-side finger downward. Namely, the left hand-side finger may move along, for instance, a direction parallel to the plane of the midair image 300, i.e., along a lateral direction, until it reaches a point above or below the icon 300D.

It is not necessary that a left hand-side finger and a right hand-side finger be used, as long as the operations described above can be also detected both on the icon 300C and on the icon 300D in the calibration midair image 300. For instance, these operations may be performed by using two fingers of one hand on either side. Instead of performing an operation at the display position of the icon 300D, the user may press an OK button (not shown) at the display device 1 in variation 4.

Instead of recognizing the position taken by the right hand-side fingertip when the user performs an operation at the display position of the icon 300D or when the user presses the OK button (not shown) as the designated position, the position of the right hand-side fingertip assumed when the user makes a predetermined gesture with his left hand may be also recognized as the designated position. In such a case, the display device 1 should include an image-capturing device 18 in variation 8 to be described later (see FIG. 22) so that a user gesture (e.g., the hand switching from the sign "stone" to the sign "paper") is detected by using images obtained via the image-capturing device 18.

Figure 16:
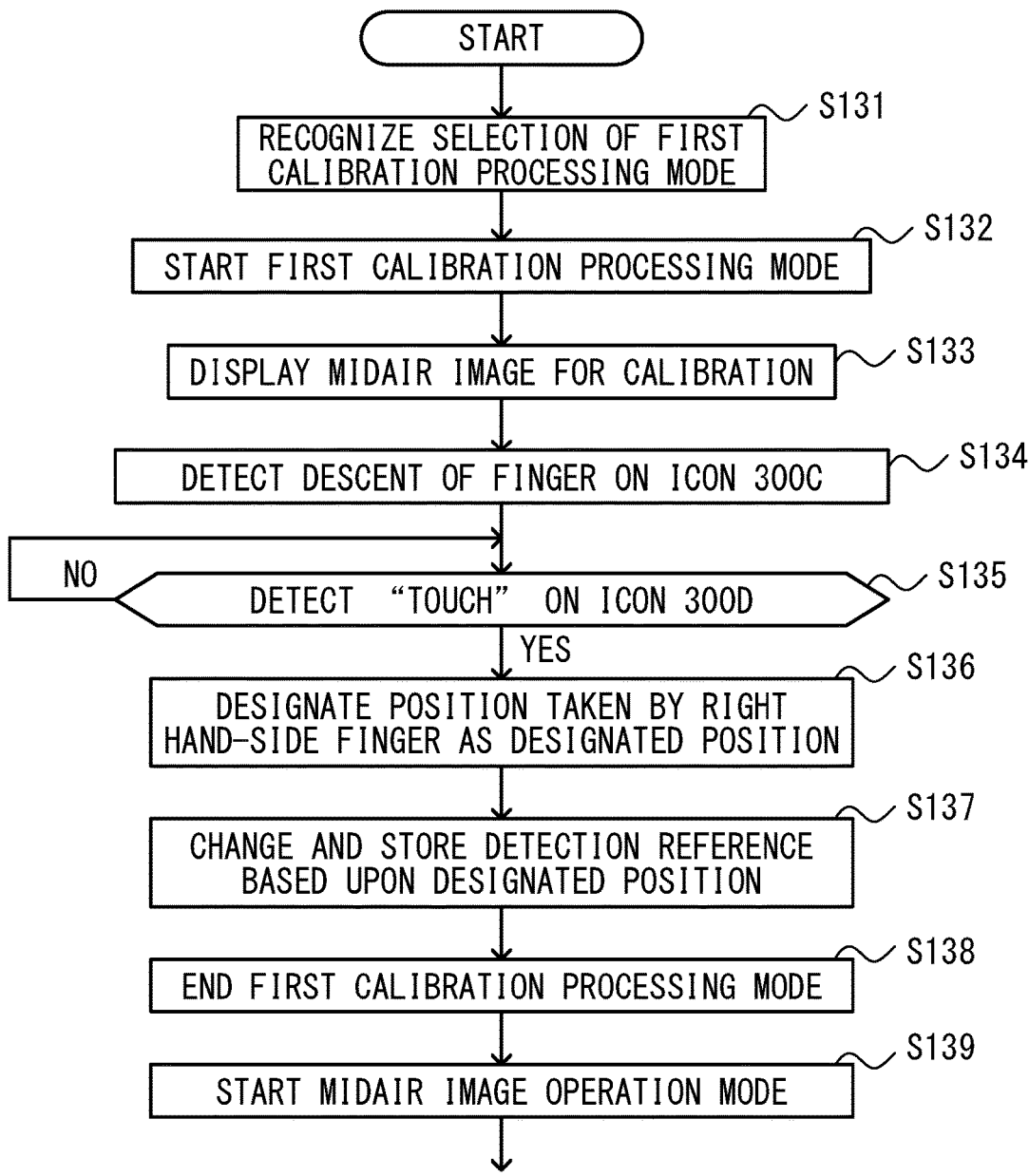

In reference to the flowchart presented in FIG. 16, the calibration processing executed in the variation will be described. It is to be noted that the flowchart in FIG. 16 shows the processing executed in steps S131 through S139 and does not show the processing executed in subsequent steps. The processing executed in step S139 and subsequent steps is similar to the processing executed in step S109 and subsequent steps in the flowchart presented in FIG. 11.

The processing executed in step S131 through step S133 is similar to that executed in step S1 through step S3 in the flowchart presented in FIG. 6. In step S134, the operation detector 13 starts detection of a downward movement of the fingertip in the user's right hand. The user moves his finger further downward and then performs an operation at the display position of the icon 300D with his left hand-side fingertip at the time point at which he has the perception of the right hand-side fingertip performing an operation at the display position of the icon 300C in the midair image 300. In step S136, the position taken by the right hand-side fingertip at the time point at which the user has performed an operation at the display position of the icon 300D with his left hand in step S135, is designated as the designated position 50A, and then the operation proceeds to step S137. In step S137, the detection reference control unit 204 changes the detection reference 40 based on the designated position 50A and stores the position data for the changed detection reference 40 into the storage unit 205 before the operation proceeds to step S138. In step S138, the first calibration processing mode ends and the operation proceeds to step S139. In step S139, the midair image operation mode starts.

The user of the display device 1 achieved in variation 4 described above indicates the designated position at which the finger operates the icon during the calibration processing by operating another icon or by operating the OK button at the display device 1. The calibration operation allowing the user to designate the position at which he perceives an icon 300, can be executed with high accuracy. By allowing the user to indicate the designated position through an operation at another icon or at a button at the display device, the calibration processing can be executed promptly.

Variation 5 of the First Embodiment

The user of the display device achieved in variation 5, perceiving that he has performed an operation at the display position of an icon with his fingertip, indicates the designated position by holding the finger still for a predetermined length of time. It is to be noted that while an example in which variation 5 is adopted in the first calibration processing mode in the first embodiment is described below, it may also be adopted in the second calibration processing mode and in variations 1 through 4 described earlier.

In this variation, a message "execute calibration. Please point at this icon and hold the finger still for a moment" is displayed with superimposed on an icon included in the calibration midair image. The user, perceiving that he has performed an operation at the icon display position, holds the finger still for a moment and in response, the operation detector 13 detects cessation of the downward movement of the finger over a predetermined length of time. The detection reference control unit 204 recognizes the position at which the finger is held still as the designated position based on the detection output provided by the operation detector 13 at this time.

The designated position is determined as described below. Namely, it is decided that an operation has been performed at the display position of the icon 300A when the fingertip F, having been moving downward, comes to a stop and holds still within a relatively small predetermined holding range taken along the up/down direction over a length of time equal to or greater than a predetermined time interval. It is decided that an operation has been performed at the display position of the icon 300A with the fingertip F when the fingertip F stays within the specific holding range over the predetermined time interval or longer, as described above, since the operation at the display position of the icon 300A in the midair image 300 is different from an operation performed at a touch panel and the fingertip F may not become completely still at the display position of the icon 300A. It is to be noted that the predetermined holding range in reference to which the designated position is determined should be set to a value sufficiently small relative to the electrostatic capacitance detection range 13A of the operation detector 13, e.g., 5 mm, and the predetermined time interval should be set to, for instance, 2 sec.

Variation 6 of the First Embodiment

The user of the display device achieved in variation 6 indicates the designated position at which he has a perception of performing an operation at an icon display position with his voice. It is to be noted that while an example in which variation 6 is adopted in the first calibration processing mode in the first embodiment is described below, it may also be adopted in the second calibration processing mode and in variations 1 through 5 described earlier.

Figure 17:
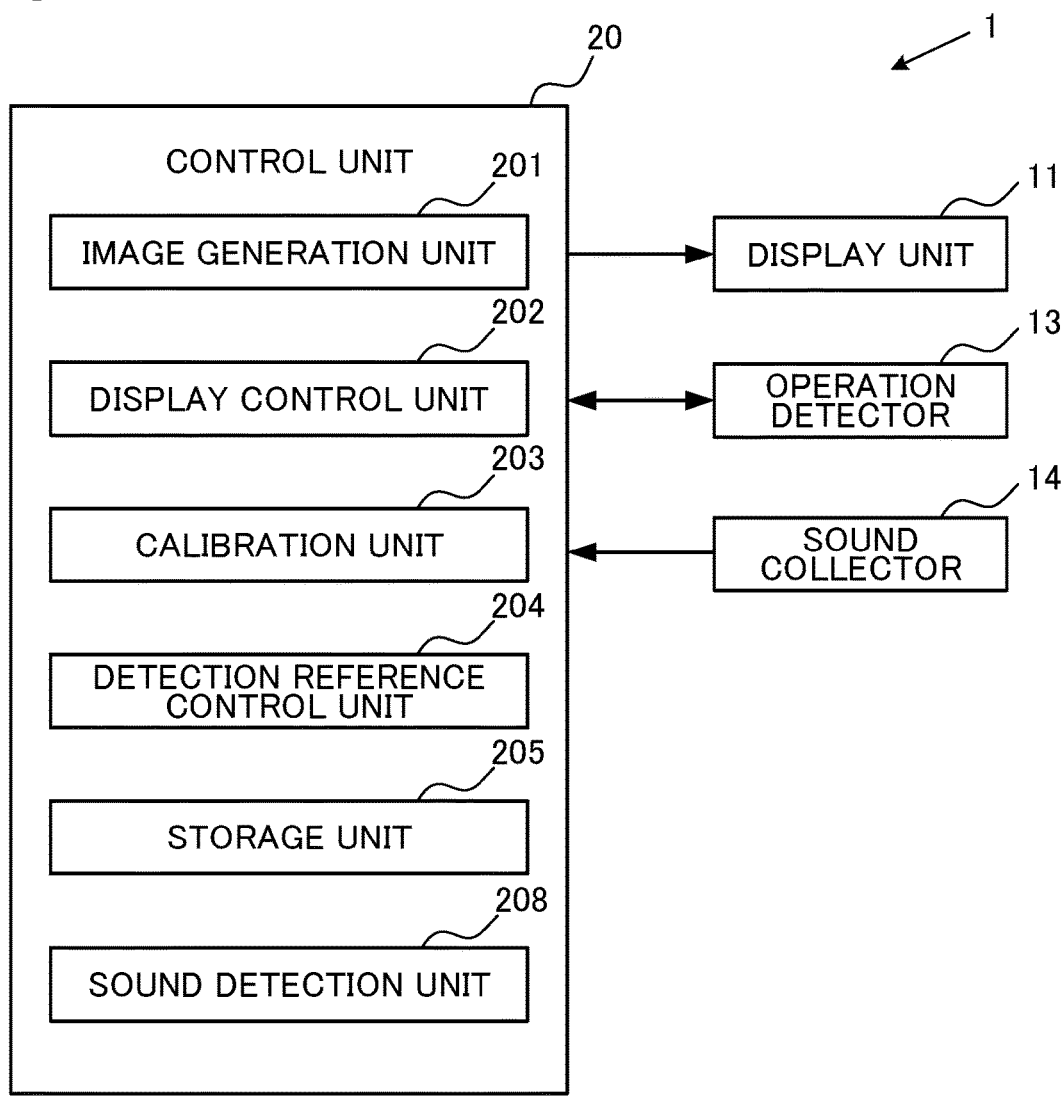

FIG. 17 is a block diagram showing a control unit 20, and a display unit 11 and an operation detector 13 controlled by the control unit 20, among the structural components in the display device 1 achieved in variation 6. The display device 1 includes a sound collector 14, with a sound detection unit 208 installed in the control unit 20. The sound collector 14 collects sound around the display device 1 and outputs the collected sound as audio data to the sound detection unit 208. The sound collector 14 may be a commonly available microphone. The sound detection unit 208 recognizes the audio data provided from the sound collector 14 and determines whether or not the audio data express the word "yes".

Figure 18:
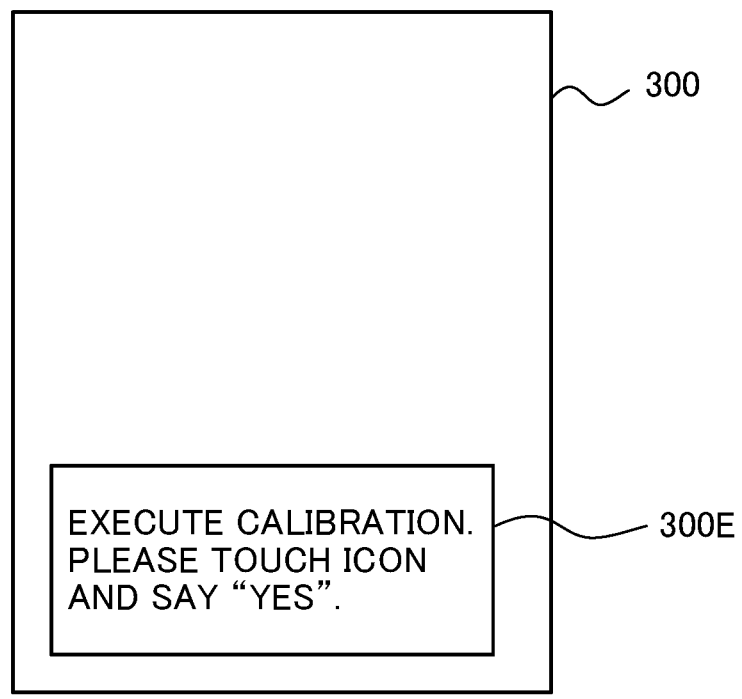

After the calibration unit 203 in FIG. 17 starts up the first calibration processing mode, the image generation unit 201 generates display image data, and the display unit 11 brings up a display image to be used in the calibration processing based on the display image data. FIG. 18 shows a midair image 300 as the display image generated for the calibration processing. The midair image 300 includes an icon 300E for calibration, and a message "execute calibration. Please touch icon and say "yes"" is superimposed on the calibration icon 300E.

The user, following the instructions in the message displayed with superimposed on the icon 300E, movies his fingertip down toward the icon 300E in order to perform an operation at the display position of the icon 300E and says "yes" as directed in the message when he perceives that his fingertip has touched the icon 300E. The operation detector 13 detects the downward movement of the fingertip, and the sound collector 14 picks up the user's voice and outputs it as audio data to the sound detection unit 208. As the sound detection unit 208 decides that the audio data correspond to "yes", the detection reference control unit 204 recognizes the position taken by the fingertip, detected by the operation detector 13 at the exact time point, as the designated position 50A, changes the detection reference 40 based on the designated position 50A and stores the position data for changed detection reference 40 into the storage unit 205.

Figure 19:
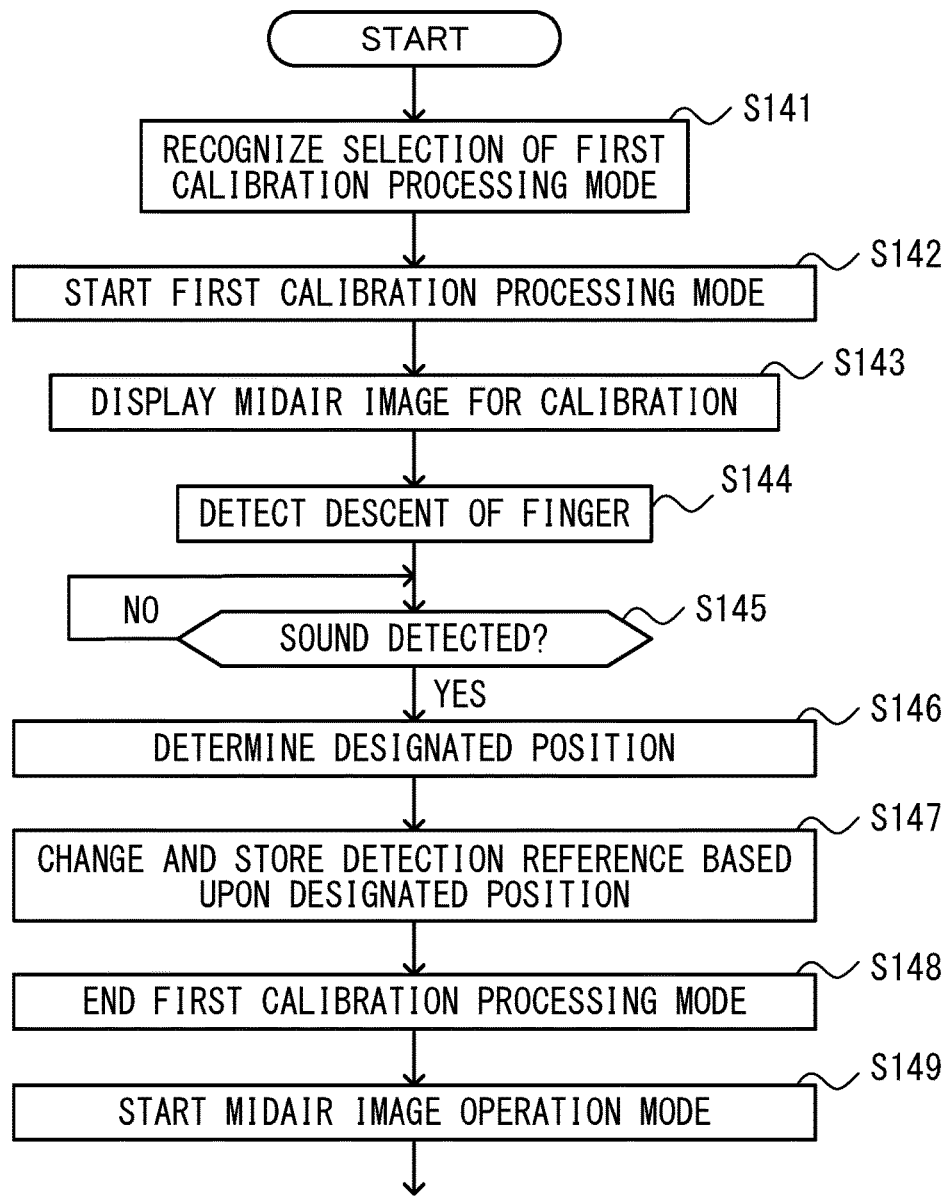

In reference to the flowchart presented in FIG. 19, the calibration processing executed in the variation will be described. It is to be noted that the flowchart in FIG. 19 shows the processing executed in steps S141 through S149 and does not show the processing executed in subsequent steps. The processing executed in step S149 and subsequent steps is similar to the processing executed in step S109 and subsequent steps in the flowchart presented in FIG. 11.

The processing executed in step S141 through step S144 is similar to that executed in step S1 through step S4 in the flowchart presented in FIG. 6. In step S145, the sound detection unit 208 determines whether or not the user has said "yes" based on the output from the sound collector 14. When an affirmative decision is made in step S145, i.e., when it is decided that the user, perceiving that he has touched the icon 30F, has said "yes", the operation proceeds to step S146. When, on the other hand, a negative decision is made in step S145, the operation waits in standby until an affirmative decision is made. In step S146, the detection reference control unit 204 determines, i.e., designates, the position taken by the fingertip at the time point at which the sound detection unit 208 has recognized the word "yes" as the designated position 50A. In step S147, the detection reference control unit 204 changes the detection reference 40 based on the designated position 50A and stores the position data for the changed detection reference 40 into the storage unit 205 before the operation proceeds to step S148. In step S148, the first calibration processing mode ends and the operation proceeds to step S149. In step S149, the midair image operation mode starts.

The user of the display device 1 achieved in variation 6 described above vocally indicates the designated position taken by his finger when he perceives that an operation has been performed at the icon display position. By allowing the reach position to be designated with the voice, the calibration processing can be executed promptly.

It is to be noted that the display device 1 does not need to include the sound collector 14 and the sound detection unit 208 in such a configuration may execute sound detection by using audio data input from an external sound collecting device via either a wireless means or a wired means.

Variation 7 of the First Embodiment

The detection reference is a single plane or planes defined in stages in the description provided above. However, the detection reference may be formed as an area with a depth instead of as a plane. Calibration processing that may be executed for a detection reference forming such an area will be explained next. It is to be noted that while an example in which variation 7 is adopted in the first calibration processing mode in the first embodiment is described below, it may also be adopted in the second calibration processing mode and in variations 1 through 6 described earlier.

Figure 20:
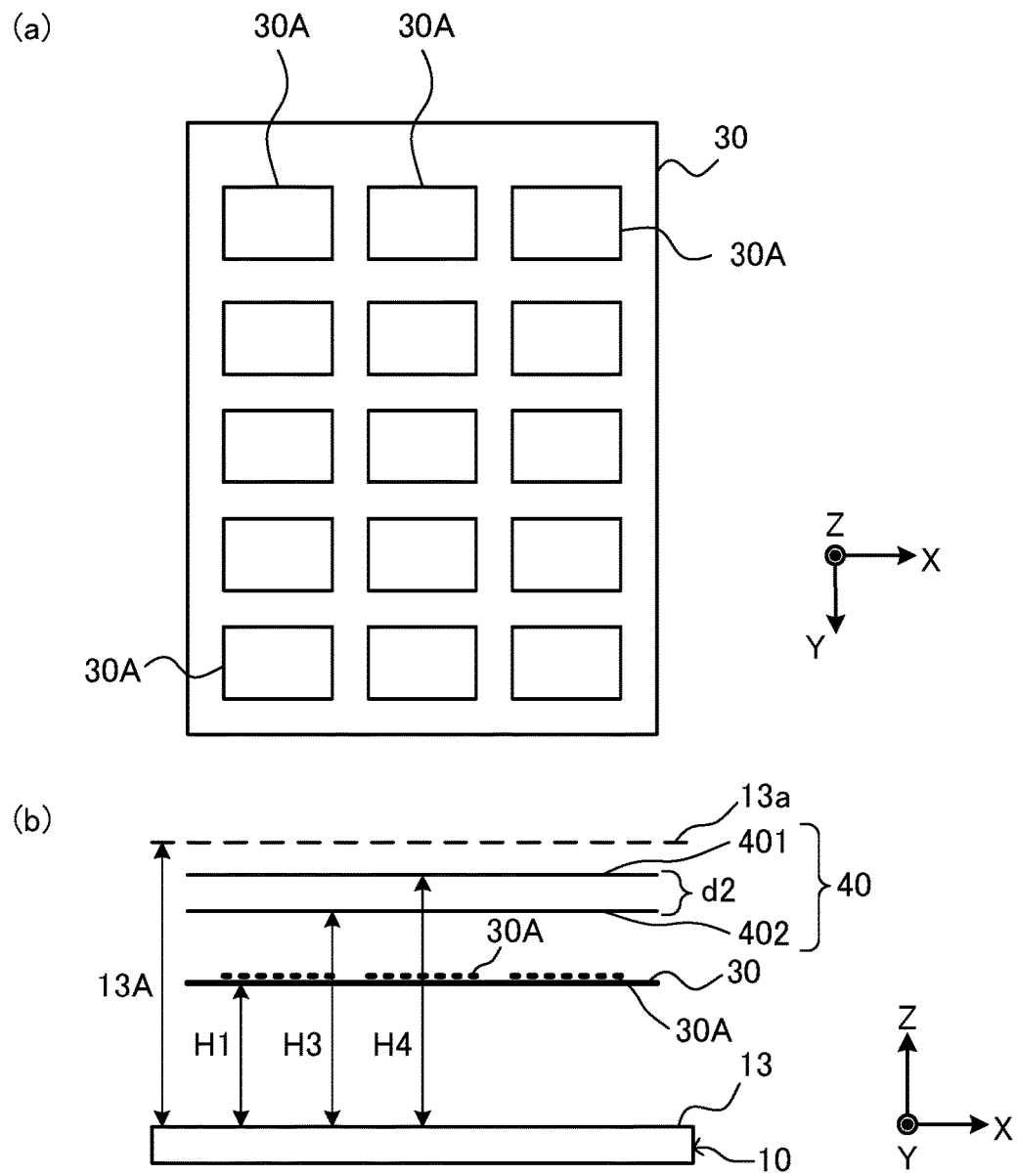

The display device 1 in this variation is similar to the display device 1 described in reference to the first embodiment, assuming a structure shown in the block diagram in FIG. 2. FIG. 20(a) presents an example of a midair image 30 that may be displayed in the midair image operation mode by the display device 1 in the variation, whereas FIG. 20(b) provides a schematic presentation of the positional relationship among the body 10 or the operation detector 13, the midair image 30 and the detection reference 40. The midair image 30 in FIG. 20(a) is similar to the midair image 30 shown in FIG. 3(a). The detection reference 40 in FIG. 20(b) is set as an area located between an upper plane 401 and a lower plane 402, achieving a depth d2 along the up/down direction.

In FIG. 20(b), the midair image 30 is formed at a position further upward relative to the operation detector 13 of the display device 1 and set apart from the operation detector 13 by a distance H1, with the upper plane 401 and the lower plane 402 of the detection reference 40 set above the operation detector 13, apart from the operation detector 13 by a distance H3 and a distance H4 respectively (H1<H3<H4). Namely, d2=H4−H3. The midair image 30 and the detection reference 40 are set within the electrostatic capacitance detection range 13A. It is to be noted that while the detection reference 40 is set further upward relative to the midair image 30 in the example presented in FIG. 3(b), it may instead be set downward relative to the midair image 30 or may be set so that the position of the midair image 30 is within the area d2 as long as the detection reference 40 remains within the electrostatic capacitance detection range 13A of the operation detector 13.

As the user's fingertip enters the detection reference 40, the operation detector 13 outputs a detection output corresponding to a point within the range between the distance H3 and the distance H4 that matches the position of the fingertip, and when the detection output provided by the operation detector 13 corresponds to a point in the range between the distance H3 and the distance H4, the detection reference control unit 204 decides that an operation has been performed at the display position of an icon 30A with the fingertip. The display device 1 thus detects the operation by the user at the display position of an icon 30A in the midair image 30 and executes the function corresponding to the particular icon 30A having been operated. The display device 1 may, for instance, execute display image switchover at the display unit 11. The detection reference control unit 204 in the display device in variation 7 described above decides that an operation has been performed at the display position of an icon 30A with the user's finger in the midair image operation mode regardless of exactly which position is assumed by the finger within the depth-wise range d2 of the detection reference 40, making it possible to detect an operation performed at the display position with better reliability. For instance, the finger may not always start its descent from a point directly above the icon 30A and instead may start moving downward diagonally from a point not directly above the icon 30A. In the case of a flat plane detection reference 40 such as that shown in FIG. 3, the finger moving diagonally downward may pass through a point beside the icon 30A instead of passing through the part of the detection reference 40 directly above the icon 30A, and it may not be possible to determine with regard to an operation performed at the display position of the icon 30A with the finger. However, entry of the finger into the detection reference 40 having the depth d2 can be detected with a reliability even when the finger moves down from a point diagonally above the detection reference 40 and thus, the occurrence of detection failure can be reduced. Even when the finger moves parallel to the midair image 30 to perform an operation at the display position of the icon 30A, entry of the finger into the detection reference 40 with the depth d2 can be detected with reliability at the display device in variation 7.

The processing executed in the first calibration processing mode at the display device 1 in variation 7 with the detection reference 40 assuming the depth d2 as described above will be explained next. It is to be noted that the processing in the second calibration processing mode may be executed through a similar procedure in relation to the detection reference 40 having the depth d2. In addition, features identical to those in the first embodiment will not be explained below.

In the first calibration processing mode, a midair image 300 that includes the icon 300A shown in FIG. 4 is displayed and the detection reference 40 is set at the initial position, as shown in FIG. 21(a). The user, following the instructions in the message displayed with superimposed on the icon 300A, moves his fingertip F down toward the icon 300A in order to perform an operation at the display position of the icon 300A and as the fingertip F reaches the electrostatic capacitance detection range 13A of the operation detector 13 shown in FIG. 2, the operation detector 13 detects the movement of the user's finger F toward the icon 300A, i.e., the downward movement of the user's finger F, as a change in the electrostatic capacitance.

The user, perceiving that an operation has been performed at the display position of the icon 300 with his finger, as shown in FIG. 21(b), moves his fingertip F upward by a specific distance. The operation detector 13 detects the downward movement of the fingertip F, i.e., the fingertip F pressing down the icon 300 and the subsequent upward movement by a specific distance as a change in the electrostatic capacitance. Based upon the change in the electrostatic capacitance, the detection reference control unit 204 determines the reach position 50 or the designated position 50A, as described earlier.

Based upon the reach position 50 or the designated position 50A, the detection reference control unit 204 alters the detection reference 40 to a detection reference 40 occupying a three-dimensional area with the depth d2, as shown in FIG. 21(c). While the detection reference 40 having the depth d2 is set so as to contain the reach position 50 or the designated position 50A in the example presented in FIG. 21(c), the detection reference 40 with the depth d2 may instead be set at a position above or below the reach position 50 or the designated position 50A. A three-dimensional area, present between the position set apart from the reach position 50 or the designated position 50A by a predetermined distance along the direction opposite from the direction in which the user moves his finger to press down the icon and the reach position 50 or the designated position 50A, may be designated as the detection reference 40 with the depth d2. The detection reference control unit 204 stores the position data for the detection reference 40 with the depth d2 into the storage unit 205. As the midair image operation mode is subsequently executed, the detection reference 40 with the depth d2 is set based on the position data stored in the storage unit 205.

The processing in the midair operation mode is executed in relation to the first calibration processing mode described above through a procedure similar to that in the flowchart presented in FIG. 6 except for the following point. Namely, the detection reference control unit 204 sets the detection reference 40 as a single plane based on the reach position 50 in step S6 in the first embodiment. Variation 7 differs from this in that the detection reference 40 with the depth d2 is set based on the reach position 50 or the designated position 50A.

It is to be noted that calibration processing may be executed in the midair image operation mode each time an icon is operated so as to set the detection reference 40 by positioning a plane, which includes the reach position 50 taken by the user fingertip or the designated position 50A, at a midway point between the upper plane 401 and the lower plane 402 of the detection reference 40.

As long as the fingertip is positioned above the icon used for calibration processing, the reach position or the designated position can be determined even when the user's finger moves downward diagonally, i.e., with an angle relative to the Z direction.

Variation 8 of the First Embodiment

Figure 22:
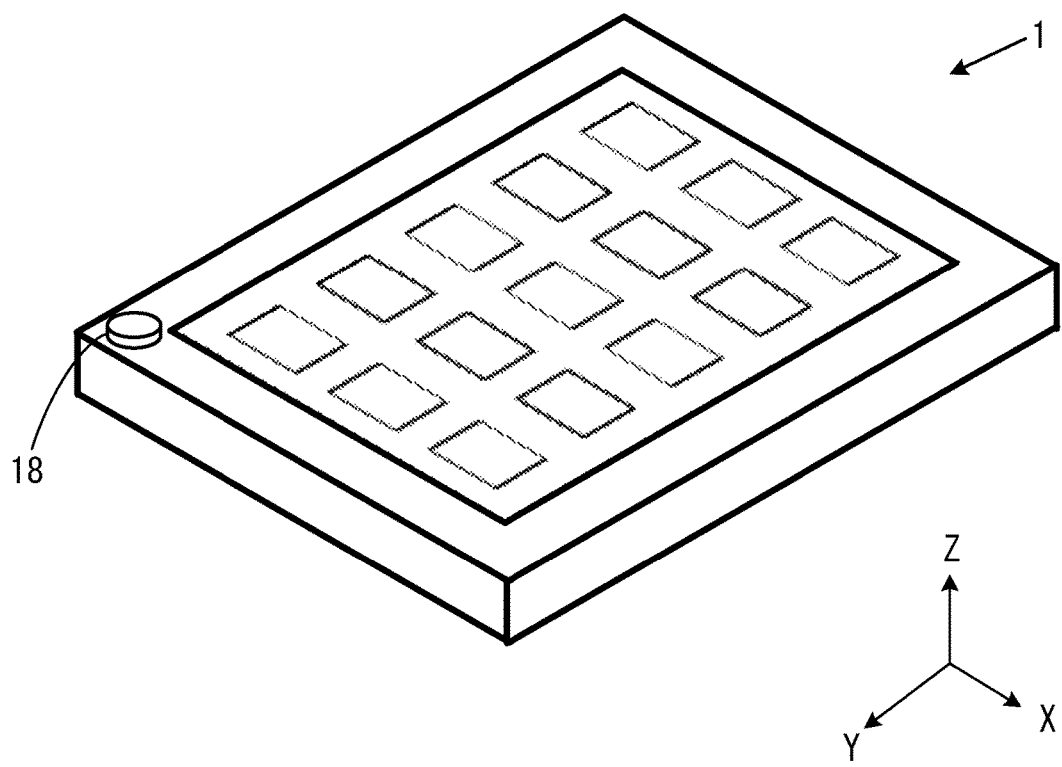

While the downward movement of the user's fingertip is detected by the operation detector 13 configured with a capacitive panel in the description provided above, the position of the user's fingertip may be detected by an image-capturing device instead. The display device 1 in variation 8 includes an image-capturing device (e.g., a digital camera) 18 to function as an operation detector, disposed at the upper surface of the display device 1, as shown in FIG. 22. A block diagram pertaining to such a display device 1 is provided in FIG. 23.

Figure 23:
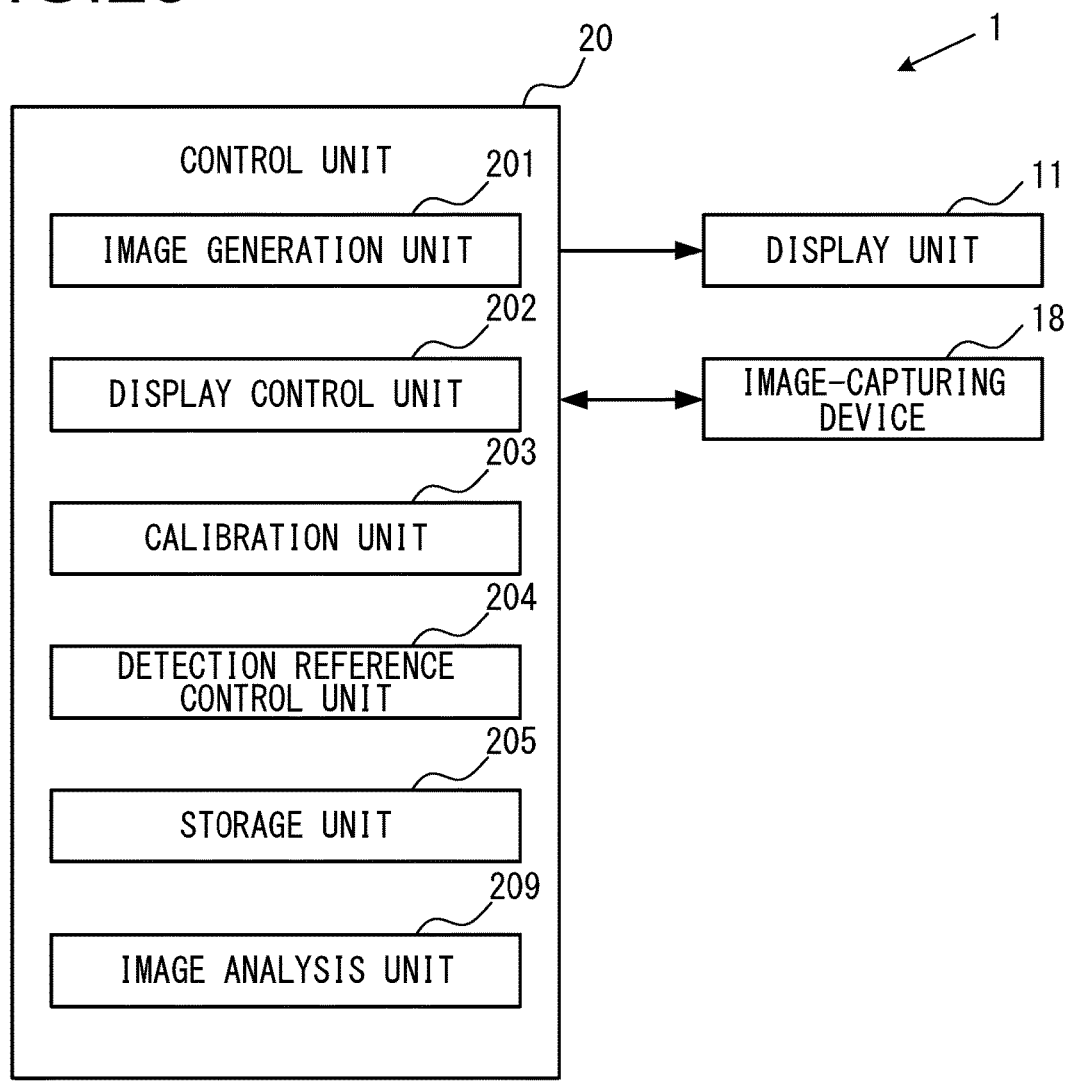

The control unit 20 of the display device 1 in the block diagram presented in FIG. 23 includes an image analysis unit 209. The image-capturing device 18 captures an image of an object located above the display unit 11, e.g., the user's finger, and the captured image is input to the image analysis unit 209. The image analysis unit 209 determines the position of the user's fingertip by analyzing the captured image input from the image-capturing device 18. Namely, the image analysis unit 209 decides, based on the position of the image of the finger within the captured image, a specific icon, among the plurality of icons, being operated with the user's fingertip. The image analysis unit 209 may compare the size of the finger image within the captured image with a standard finger size, and specifically, with the size of a finger at a predetermined height-wise position, an image of which has been captured in advance, so as to determine the height wise position of the finger, i.e., the position taken by the descending finger. Through this process, the position of the user's fingertip within the three-dimensional space can be determined. The display device 1 in variation 8 structured as described above is capable of obtaining, through analysis of the captured image provided via the image-capturing device 18, information similar to the information relating to the fingertip position obtained via the operation detector 13 configured with the capacitive panel. Thus, the display device in variation 8 is able to execute processing similar to that executed in the embodiment and the variations described earlier, by using the image-capturing device 18 instead of the capacitive panel having been described in reference to the embodiment and the numerous variations thereof.

While the image analysis unit 209 in the display device 1 in variation 8 calculates the height wise position of the finger based on the size of the finger in the captured image, the image-capturing device 18 may instead detect the height wise position of the finger via a phase different focus detection device and an image recognition device mounted in the digital camera. In more specific terms, the image recognition device may recognize a finger, the phase different focus detection device may detect a defocus quantity with respect to the finger recognized by the image recognition device and the height wise position of the finger may be calculated based on the defocus quantity. The height wise position of the finger may be likewise detected via a contrast focus detection device mounted in the digital camera instead of the phase different focus detection device.

It may be ideal to configure the image-capturing device 18 with a camera having installed therein a TOF (time of flight) device instead of a phase different focus detection device or a contrast focus detection device. A TOF camera emits infrared radiation from the camera body, receives infrared light that is reflected off a target object and then enters the TOF camera and calculates the distance from the TOF camera to the target object based on a phase change having occurred in the received light relative to the emitted light. Accordingly, by designating the user's fingertip as the measurement target object, emitting infrared light from the TOF camera toward the user's fingertip and receiving light reflected from the fingertip, the distance from the TOF camera to the user's fingertip can be determined. It is desirable that the image-capturing device 18 include an image-capturing lens constituted with a wide-angle lens so as to cover the entire midair image 30 and such an image-capturing lens may be a fisheye lens. The display device may include a plurality of image-capturing devices (e.g., two image-capturing devices) and the position of the user's fingertip may be detected based on captured images provided from the plurality of image-capturing devices.

Figure 24:
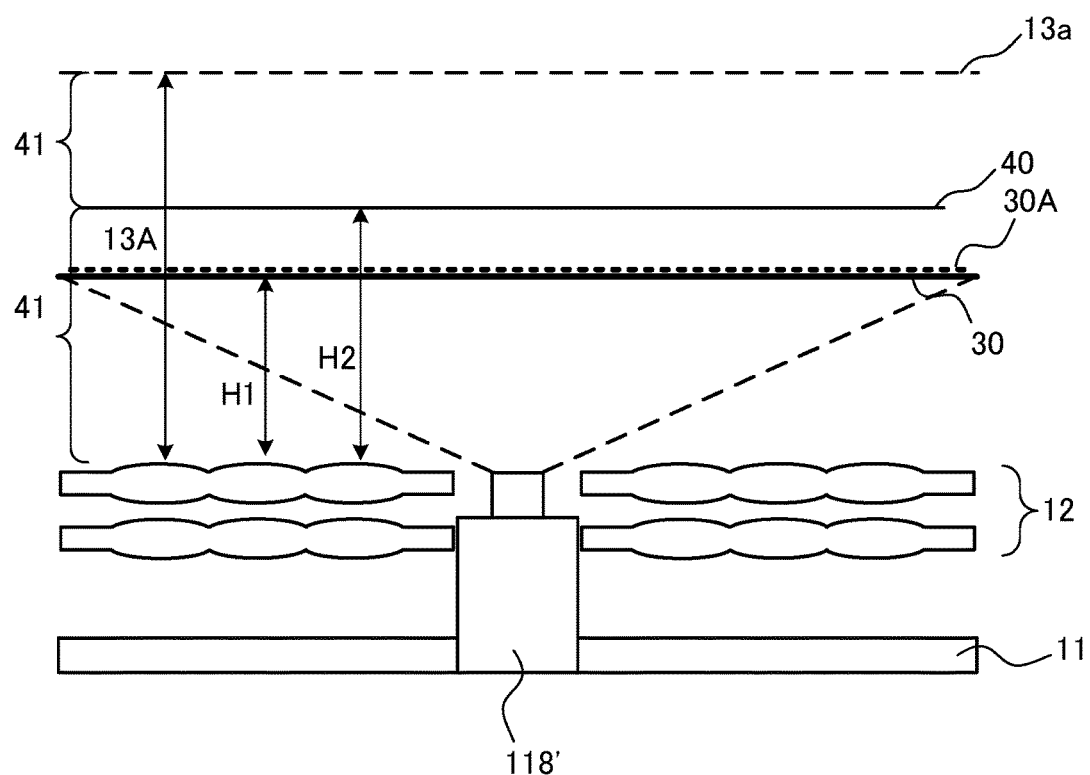

FIG. 24 presents an example of a display device 1 equipped with a TOF camera. FIG. 24 simply shows the internal structure of the display device 1 and does not provide an illustration of the display device body. As FIG. 24 shows, an installation space for a TOF camera 118' is formed so as to take up a position corresponding to the centers of the display unit 11 and an image forming optical element 12 and the TOF camera 118' is disposed in this installation space. The TOF camera 118' radiates infrared light onto the user's fingertip by scanning infrared light over a predetermined range and measures the distance from the TOF camera 118' to the user's fingertip based on a change in the phase of reflected light. Based upon the distance and the infrared emission direction, the position of the user's fingertip in three-dimensional space relative to the TOF camera 118' can be determined. In other words, the specific position within the midair image plane corresponding to the fingertip position and the distance that sets the fingertip position apart from the surface of the display device 1 can be determined. Information similar to detection information indicating the fingertip position obtained in conjunction with a capacitive panel can thus be obtained based on the range-finding results provided by the TOF camera 118'. It is to be noted that while an installation space for the TOF camera 118' is formed so as to take up an area corresponding to the centers of the display unit 11 and the image forming optical system 12 and the TOF camera 118' is disposed in this space in the description provided above, the present invention is not limited to this example and it may be adopted in a configuration that includes a TOF camera 118' installed outside the display unit 11.

At the display device 1 in variation 8, too, the midair image 30 is formed at a position above the image forming optical system 12 of the display device 1, set apart from the image forming optical system 12 by a distance H1, and the detection reference 40 is set at a position above the image forming optical system 12, apart from the image forming optical system 12 by a distance H2 (H1<H2), as shown in FIG. 24. The image-capturing device 18 assumes a detection range 13A for detection of user's fingertip position, set further upward relative to the surface of the image forming optical system 12. In FIG. 24, the limit to the range over which images can be captured is indicated by a dotted line 13*a* above the image-capturing device 18 and the detection range 13A is defined by the detection limit 13*a* and the surface of the image-capturing optical system 12. In variations 8, too, the midair image 30 and the detection reference 40 are set inside the detection range 13A, as in the first embodiment and variations 1 through 7 described earlier. It is to be noted that while the detection reference 40 in FIG. 24 is set further upward relative to the midair image 30, it may instead be set further downward relative to the midair image 30 or in alignment with the position of the midair image 30, as long as it is set within the detection range 13A. A range other than the area set as the detection reference 40 within the detection range 13A is referred to as outside a detection reference 41 in the description of variation 8. It is to be noted that instead of setting the detection range 13A by defining the limit to the range over which an image can be captured with the image-capturing device 18, the detection range 13A may be set as a range made up with part of the range over which an image can be captured by taking off, for instance, predetermined ranges at the left and the right ends in FIG. 24.

The display device 1 in variation 8 described above includes an operation detector configured with the image-capturing device 18 instead of the capacitive panel 13. However, the display device 1 may include both the operation detector 13 and the image-capturing device 18. In such a case, the detection range 13A of the operation detector 13 shown in FIG. 3 may be divided into, for instance, two parts, i.e., a top part and a bottom part, so as to form a lower detection range (a detection range closer to the display unit 11) and an upper detection range (a detection range further away from the display unit 11), and the lower detection range and the upper detection range may be respectively designated as the detection range for the capacitive panel 13 and the detection range for the image-capturing device 18. In this configuration, as the user moves his finger downward in order to perform an operation at the display position, the image-capturing device 18 detects the first half of the descending movement of the finger and the capacitive panel 13 detects the second half of the descending movement of the finger. Generally speaking, highly accurate detection is enabled via the capacitive panel 13 over a range set above and in close proximity to the display unit 13, whereas it may not always be possible to capture an image with the image-capturing device 18 over a range set above and in very close proximity to the display unit 13. For this reason, it is desirable to assign different detection ranges to the capacitive panel 13 and the image-capturing device 18, as described above. It is to be noted that the detection range 13A does not need to be divided into two equal parts along the up/down direction and instead, it may be divided into parts that are not equal. An operation detector 13 configured with another device, such as a proximity sensor, instead of the capacitive panel 13 or the image-capturing device 18, may be used. This means that detection ranges formed by dividing the detection range 13A may be assigned to various operation detectors 13.

The velocity/acceleration detection unit 206 shown in FIG. 9 is also capable of calculating the velocity and the acceleration with which the finger moves based on a captured image provided by the image-capturing device 18 in FIG. 23. Accordingly, in correspondence to each of the upper and lower detection ranges formed by dividing the detection range 13A, the finger movement velocity or the finger movement acceleration may be calculated and the stop position predicting unit 207 may predict the reach position of the finger.

It is to be noted that while the display device 1 in the first embodiment and its variations 1 through 7 described above includes at least the control unit 20, the display unit 11 and the operation detector 13, the present invention may instead be adopted in a detection device configured with the control unit 20 alone or a detection device configured with the control unit 20 and the operation detector 13. The control unit 20 may include, at least, the calibration unit 203 and the detection reference control unit 204. A structural element may be added as needed in order to realize the various advantages described in reference to the first embodiment or any of variations 1 through 7.

Second Embodiment

In reference to drawings, a display device 1 achieved in the second embodiment will be described. The second embodiment will be described in reference to an example in which the display device 1 is built into a portable telephone. It is to be noted that the display device achieved in this embodiment may be built into any of various electronic apparatuses including a portable information terminal device such as a tablet terminal or a wristwatch terminal, a personal computer, a music player, a landline telephone and a wearable apparatus, instead of a portable telephone.

Figure 25:
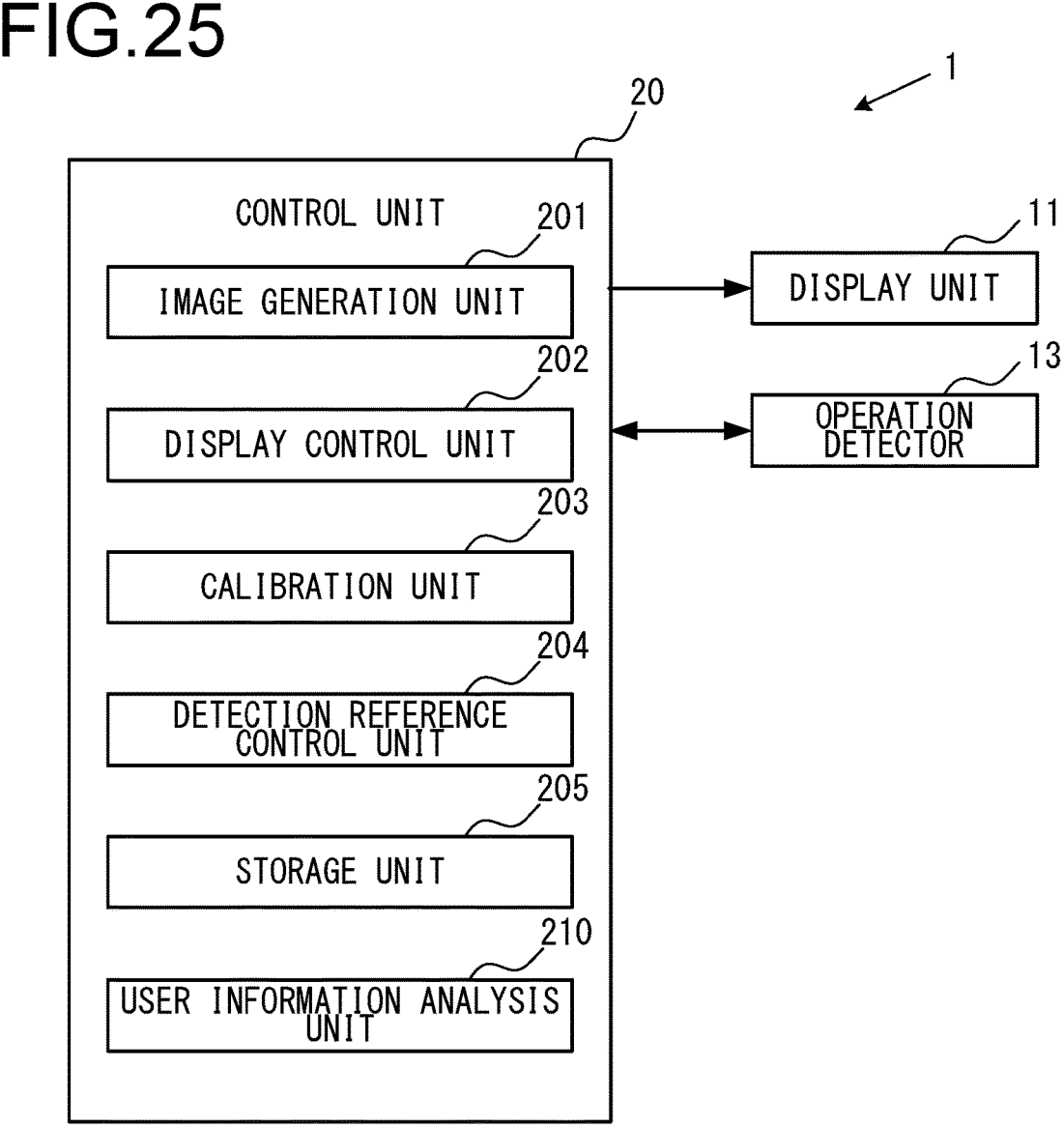

The display device 1 achieved in the embodiment, similar to the display device 1 shown in FIG. 1, includes main structural elements shown in the block diagram presented in FIG. 25. Namely, it includes a control unit 20, and a display unit 11 and an operation detector 13 controlled by the control unit 20. The control unit 20 includes an image generation unit 201, a display control unit 202, a calibration unit 203, a detection reference control unit 204, a storage unit 205 and a user information analysis unit 210.

Since the main structure of the control unit 20 is similar to that in the display device 1 in the first embodiment except that the control unit 20 in this embodiment includes the user information analysis unit 210, the following explanation will focus on the structural feature that differentiates the control unit 20 in this embodiment from that in the first embodiment. The detection reference control unit 204 first sets the detection reference at the initial position and then changes the detection reference based on the results of calibration processing to be described later. The user information analysis unit 210 analyzes information relating to the user input thereto. Based upon information input thereto from the user information analysis unit 210 during the calibration processing, the detection reference control unit 204 changes the detection reference.

Figure 26:
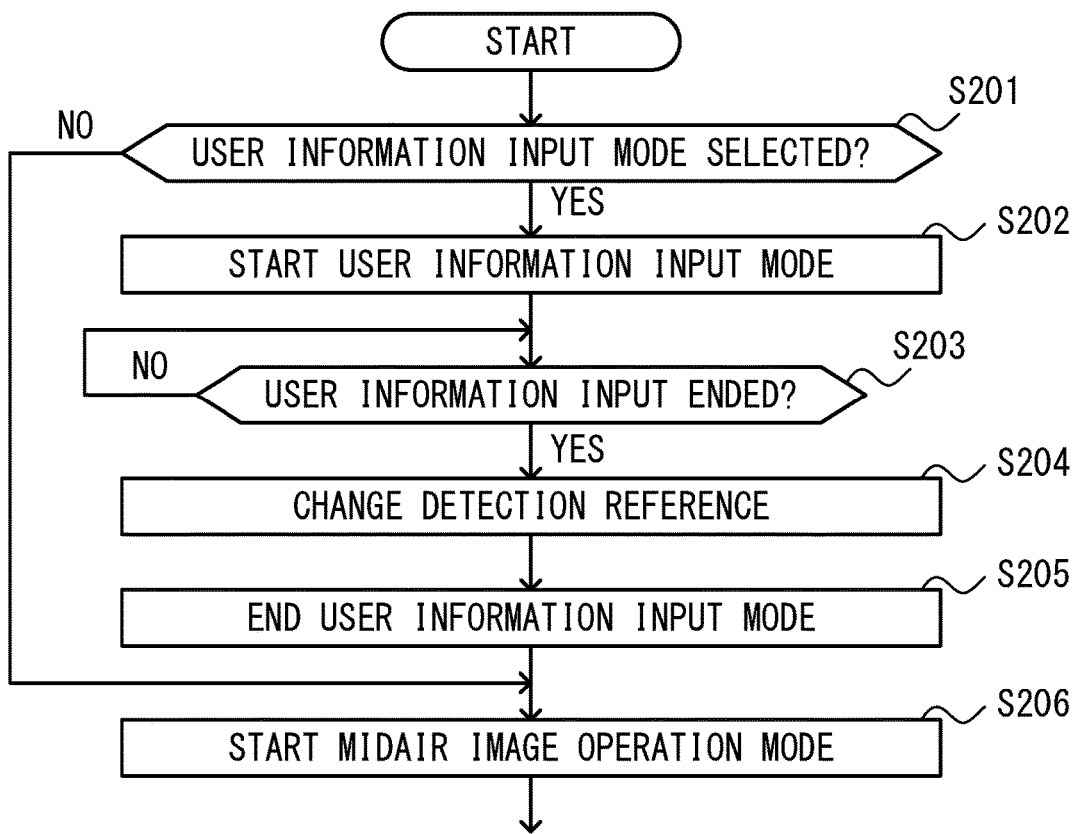

Next, in reference to the flowchart presented in FIG. 26, the calibration processing executed in the display device 1 in the embodiment will be described. It is to be noted that the flowchart in FIG. 26 shows the processing executed in steps S201 through S207 and does not show the processing executed in subsequent steps. The processing executed in step S207 and subsequent steps is similar to the processing executed in step S109 and subsequent steps in the flowchart presented in FIG. 11. After the display device 1 is started up, the processing in the flowchart presented in FIG. 26 is executed by the control unit 20 based on a program. The program is stored in the storage unit 205.

In step S201, a decision is made as to whether or not the user has operated a user information input mode operation button. When an affirmative decision is made in step S201, i.e., when it is decided that the user has selected a user information input mode, the operation proceeds to step S202. When a negative decision is made in step S201, i.e., when it is decided that the user has not the selected the user information input mode, the operation proceeds to step S206. In step S202, the user information input mode starts and then the operation proceeds to step S203. In step S203, a decision is made as to whether or not an input of user information has ended. This decision may be made by verifying whether or not the user has operated a button via which a user information input end instruction is issued. When an affirmative decision is made in step S203, i.e., when the user has issued a user information input end instruction, the operation proceeds to step S204. When a negative decision is made in step S203, the operation waits in standby until an affirmative decision is made.

In step S204, the user information analysis unit 210 changes the initial setting to be taken for the detection reference 40 in the midair image operation mode based on the user information having been input thereto and stores the position data for the changed detection reference 40 into the storage unit 205, before the operation proceeds to step S205. The detection reference 40 may be changed to, for instance, a position further upward relative to the reach position 50 by a predetermined distance d1. In step S205, the user information input mode ends, and the operation proceeds to step S206. In step S206, the midair image operation mode starts.

The user information may indicate at least one of; the user's gender, age, body type (height and reach) and vision, or the user information may be a combination of a plurality of user characteristics such as the user's gender, age, body type (height and arm-length) and vision. A plurality of tables relating to the reach position 50, each compiled by using a single factor or a combination of a plurality of factors among gender, age, body type (height) and vision as a parameter, are stored in advance in the storage unit 205. Based upon the type and the contents of the user information input thereto, the user information analysis unit 210 selects an applicable table and selects the reach position corresponding to the user information in the table. Based upon the selected reach position 50, the detection reference control unit 204 sets the detection reference 40.

Reach positions 50 stored in the tables are set so that a reach position 50 closer to the operation detector 13 is selected when, for instance, the user is female rather than male, when the user is younger rather than older or when the user is shorter rather than taller.

It is to be noted that while a decision is made in step S201 in the flowchart presented in FIG. 26 as to whether or not the user has operated the user information input mode operation button, it is not always necessary to execute this processing and instead, the operation may shift to step S204 when the device obtains user information.

It is to be noted that the user information indicating the user's gender, age, body type (height, reach), vision or the like may be stored in the storage unit 205 in correlation to an ID (identification code) used to identify the particular user and a password. In this case, the user operating the display device 1 is able to set the detection reference 40 based on the information indicating his/her gender, age, body type (height), vision or the like simply by entering the ID and the password. As described above, the positional relationship between the detection reference 40 and the midair image 300 is changed by changing the detection reference 40 for the particular user based on the user information that is a type of user-related information.

The user may be identified through image analysis of a captured image obtained by capturing an image of the user with an image-capturing device 18 such as that described in reference to variation 8 of the first embodiment. In such a case, the age, the gender and the like of the user in the captured image may be determined through, for instance, face recognition technology of the known art. The detection reference control unit 204 is then able to set the detection reference 50 based on information relating to the gender, age and the like of the user. In this case, the user does not need to enter the ID or the password. Through this process, too, the positional relationship between the detection reference 40 and the midair image 300 can be modified by changing the detection reference 40 for that particular user based on the user information that is a type of user-related information.

Variation 1 of the Second Embodiment

The second embodiment allows for the following variation. Namely, the user may enter user information at an information input device other than the display device 1 and the information, having been input, may be transferred to the display device 1 via an interface. User information may be pre-recorded in an IC card and in such a case, it is desirable that the display device 1 or the information input device have a read function for card information.

It is to be noted that while the display device 1 in the second embodiment described above includes, at least, the control unit 20, the display unit 11 and the operation detector 13, the present invention may instead be adopted in a detection device configured with the control unit 20 alone or a detection device configured with the control unit 20 and the operation detector 13. The control unit 20 may include at least the calibration unit 203 and the detection reference control unit 204. A structural element may be added as needed in order to realize the various advantages described in reference to the second embodiment.

Third Embodiment

In reference to drawings, a display device 1 achieved in the third embodiment will be described. The third embodiment will be described in reference to an example in which the display device 1 is built into a portable telephone. It is to be noted that the display device achieved in this embodiment may be built into any of various electronic apparatuses including a portable information terminal device such as a tablet terminal or a wristwatch terminal, a personal computer, a music player, a landline telephone and a wearable apparatus, instead of a portable telephone.

Figure 27:
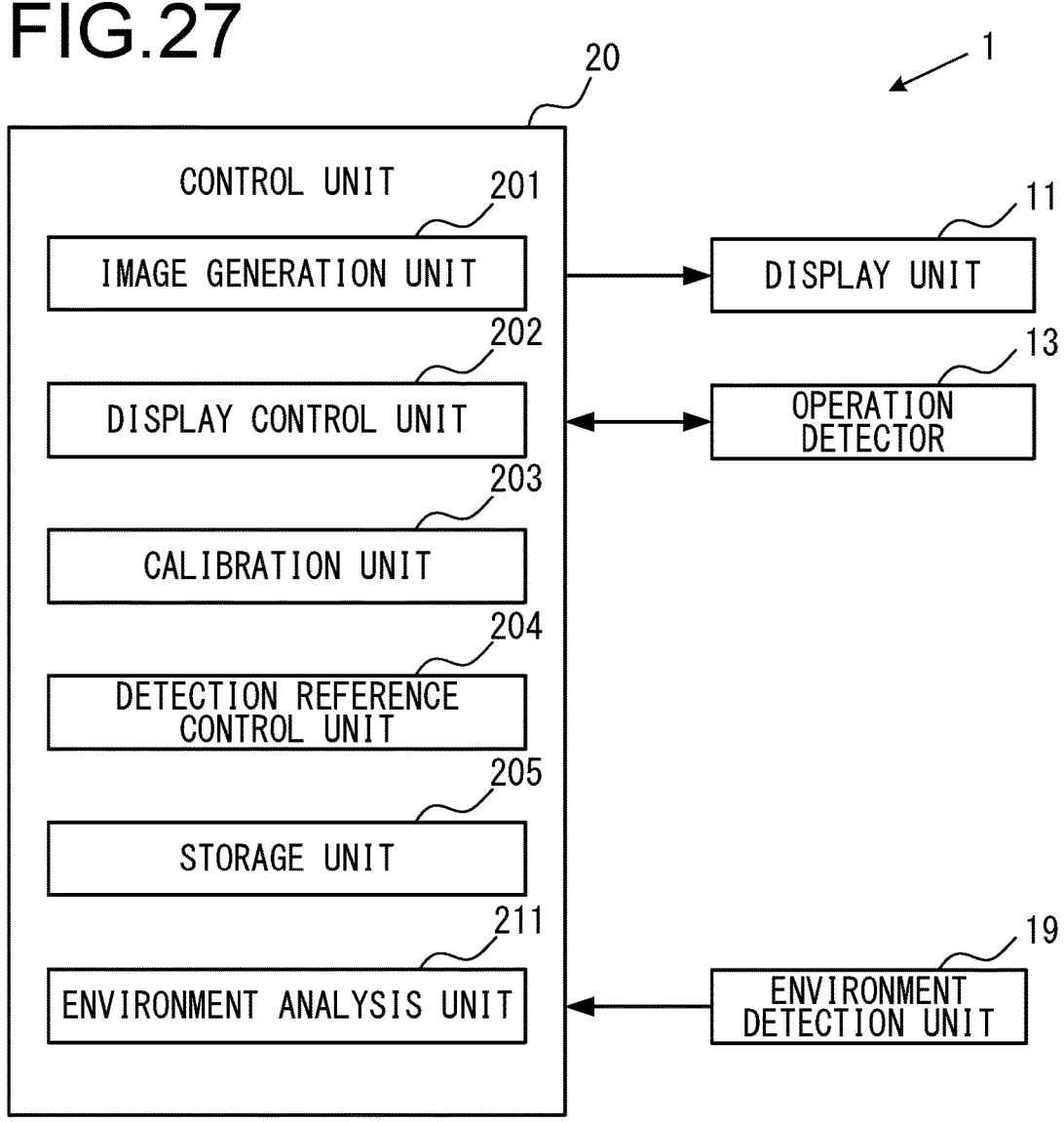

The display device 1 achieved in the embodiment, similar to the display device 1 shown in FIG. 1, includes main structural elements shown in the block diagram presented in FIG. 27. The display device 1 in the embodiment includes a control unit 20, and a display unit 11, an operation detector 13 and an environment detection unit 19 controlled by the control unit 20. The environment detection unit 19 detects an operating environment of the display device 1. The control unit 20 includes an image generation unit 201, a display control unit 202, a calibration unit 203, a detection reference control unit 204, a storage unit 205 and an environment analysis unit 211.

The environment analysis unit 211 determines whether or not a change in the environment has occurred by analyzing environment information input thereto from the environment detection unit 19, and outputs environment change information to the detection reference control unit 204 there has been a change in the environment. The detection reference control unit 204 executes detection reference calibration processing based on the environment change information input thereto from the environment analysis unit 211.

Figure 28:
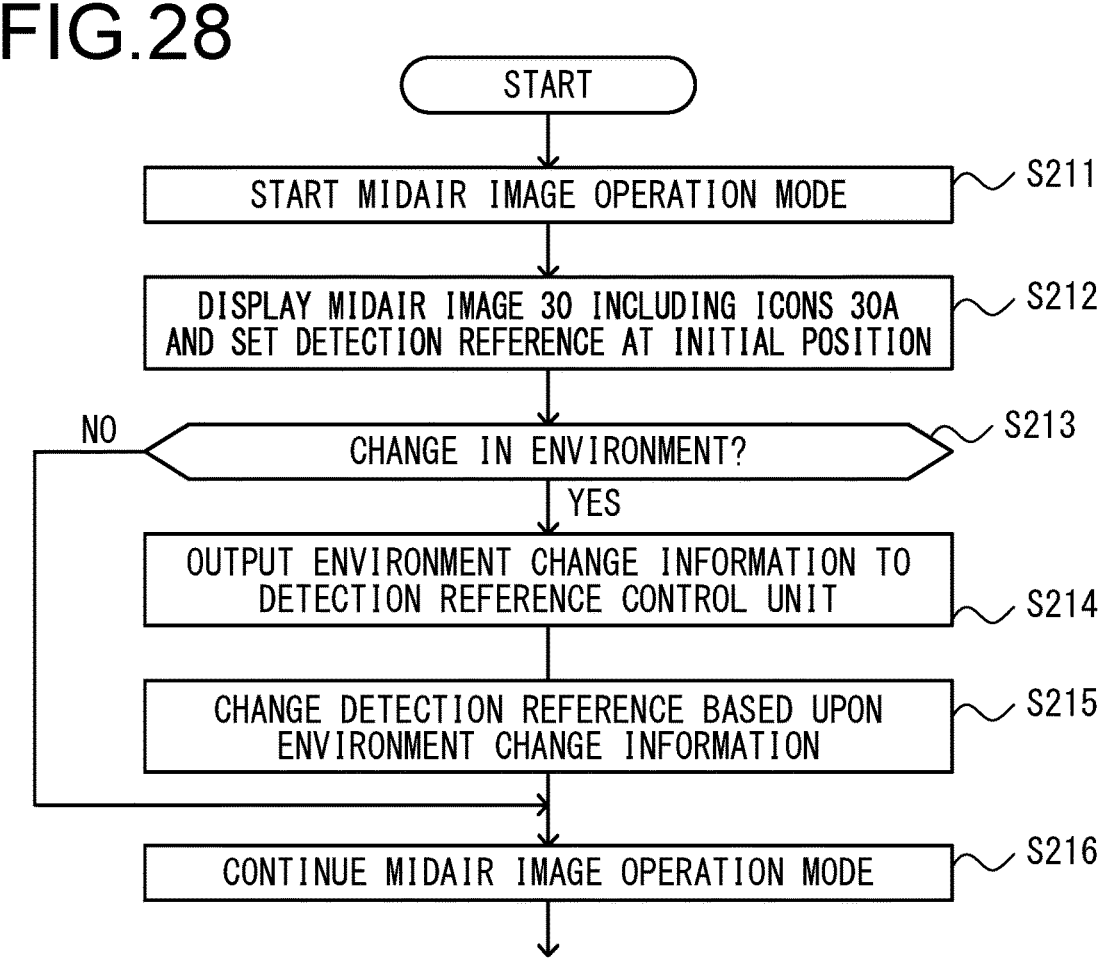

The calibration processing in this embodiment is executed concurrently while midair image operation mode execution is underway. In reference to the flowchart presented in FIG. 28, the calibration processing executed in the embodiment will be described. After the display device 1 is started up, the processing in the flowchart presented in FIG. 28 is executed by the control unit 20 based on a program. The program is stored in the storage unit 205.

In step S211, the midair image operation mode starts and then the operation proceeds to step S212. In step S212, a midair image 30 that includes icons 30A for the midair image operation mode, as shown in FIG. 3, is displayed and the detection reference control unit 204 sets the detection reference 40 at the predetermined initial position before the operation proceeds to step S213. In step S213, the environment analysis unit 211 determines whether or not there has been a change in the environment based on environment information relating to the operating environment, detected by the environment detection unit 19. When an affirmative decision is made in step S213, i.e., when it is decided that there has been a change in the environment, the operation proceeds to step S214. When, on the other hand, a negative decision is made in step S213, i.e., when it is decided that there has been no change in the environment, the operation proceeds to step S216. In step S214, environment change information is output to the detection reference control unit 204, and then the operation proceeds to step S215. In step S215, the detection reference control unit 204 changes the detection reference for the midair image operation mode based on the environment change information, and then the operation proceeds to step S216. Namely, the midair image operation mode is sustained in step S216.

The environment information may indicate the temperature, the humidity, the brightness and the like. The detection reference calibration processing is executed based on a change in a factor among such environment factors for the following reason. When the temperature of the display device 1 or the temperature in the vicinity of the display device 1 increases while the user operates the display device 1, a fastening member (not shown) that fastens the display unit 11 and the image forming optical system 12 together is bound to expand inside the display device 1, resulting in an increase in the distance between the display unit 11 and the image forming optical system 12. A temperature change attributable to the user may occur near the midair image 30 due to, for instance, an increase in the temperature at the display device caused by the heat of the user's hand holding a hand-held display device, e.g., a portable telephone. Under these circumstances, the midair image 30 is formed at a position closer to the user compared to the image forming position assumed before the temperature increase. The brightness in the vicinity of the midair image 30 may change while the user is operating the display device, and under such circumstances, the midair image 30 would appear different to the user. As a result, the user may have a perception that the midair image 30 is further away compared to the midair image 30 before the brightness change occurred. The shadow of the user may darken the midair image to result in a change in the brightness in the vicinity of the midair image 30. The display performance of the display device 1 configured with a hand-held device such as a portable telephone may be affected by a change in the ambient humidity caused by sweat in the user's hand holding the display device.

The environment detection unit 19 may be, for instance, a temperature sensor, a humidity sensor, a brightness sensor or the like installed in the body 10 of the display device 1. It is to be noted that the brightness may be measured by engaging the photometering function of the camera.

Calibration-related information generated based on the surrounding environment change information indicating a change in the environment attributable to the user will be described next. A plurality of tables of correction values for the detection reference, each compiled by using a single factor or a combination of factors, among changes in the temperature and the humidity occurring inside or in the vicinity of the display device 1 and a change in the brightness occurring in the vicinity of the midair image 30 as a parameter, are stored in advance in the storage unit 205. Upon deciding that there has been a change in the environment, the environment analysis unit 211 selects an applicable table corresponding to the factor manifesting the change and selects a specific correction value for the detection reference in the selected table. Based upon the selected correction value, the detection reference control unit 204 changes the detection reference 40. Through this process, the positional relationship between the detection reference 40 and the midair image 300 can be changed by changing the detection reference 40 for the particular user based on the environment change information indicating a change in the environment attributable to the user that is a type of user-related information.

The detection output provided by the environment detection unit 19 as described above may also be used when changing the detection reference in the first or second calibration processing mode in the first embodiment or in variations 1 through 8 of the first embodiment. Namely, instead of changing the detection reference based on the reach position taken by the user's finger, the detection reference may be changed based on both the reach position taken by the user's finger or the designated position and the detection output provided by the environment detection unit 19 in the first or second calibration processing mode described earlier.

It is to be noted that changes occurring in the environment are not limited to the changes in the environment attributable to the user described above, and various changes in the environment, including a change caused by sunlight filtered through a window, a change in the humidity caused by the weather, and an increase in the temperature of the display device as it is sustained in the ON state, may be detected, and the positional relationship between the detection reference and the midair image may be changed by changing the detection reference based on the detection results.

It is to be noted that while the display device 1 in the third embodiment described above includes at least the control unit 20, the display unit 11 and the operation detector 13, the present invention may instead be adopted in a detection device configured with the control unit 20 alone or a detection device configured with the control unit 20 and the operation detector 13. The control unit 20 may include at least the calibration unit 203, the detection reference control unit 204 and the environment analysis unit 211. A structural element may be added as needed in order to realize the various advantages described in reference to the third embodiment.

Fourth Embodiment

In reference to drawings, a display device 100 achieved in the fourth embodiment will be described. The display device 100 in the embodiment includes an operation detector assuming a structure different from that of the operation detector 13 in the first embodiment. FIG. 29 shows the display device achieved in the embodiment with FIG. 29(a) schematically illustrating the structure of an operation detector 100 in the display device 100 achieved in the fourth embodiment in a sectional view. FIG. 19(b) provides a perspective of an automatic cash dispenser (ATM system) 200 representing an example of an electronic apparatus with the display device 100 mounted therein. The display device 100 is mounted on the front panel, via which the user enters his pin number, a cash amount and the like at the automatic cash dispenser 200. It is to be noted that instead of an automatic cash dispenser, the display device 100 may be mounted in any of a wide range of electronic apparatuses including various types of ticket vending machines, at which train and bus tickets, passes and the like are purchased and various types of information search terminal devices installed in libraries, museums, art galleries and the like. In order to facilitate an explanation, a coordinate system that assumes an X axis, a Y axis and a Z axis set as indicated in the figure in relation to the display device 100, is set.

As FIG. 29(a) shows, the display device 100 includes a display unit 111, an image forming optical system 112 and an operation detector 113 disposed inside the body (not shown). The display unit 111 disposed inside the body, constituted with a liquid crystal element, an organic EL element or the like, includes a plurality of display pixels arrayed in a two-dimensional pattern. The display unit 111 displays an image corresponding to display image data under control executed by a control unit (not shown) similar to the control unit 20 in the display device 1 achieved in the first embodiment. The image forming optical system 112 is disposed so as to achieve a predetermined positional relation to the display unit 111. The image forming optical system 112 may be configured by two elements, each having two types of reflective strips disposed over a uniform distance from each other so as to run parallel to each other inside a transparent substrate, one element on top of the other.

Figure 30:
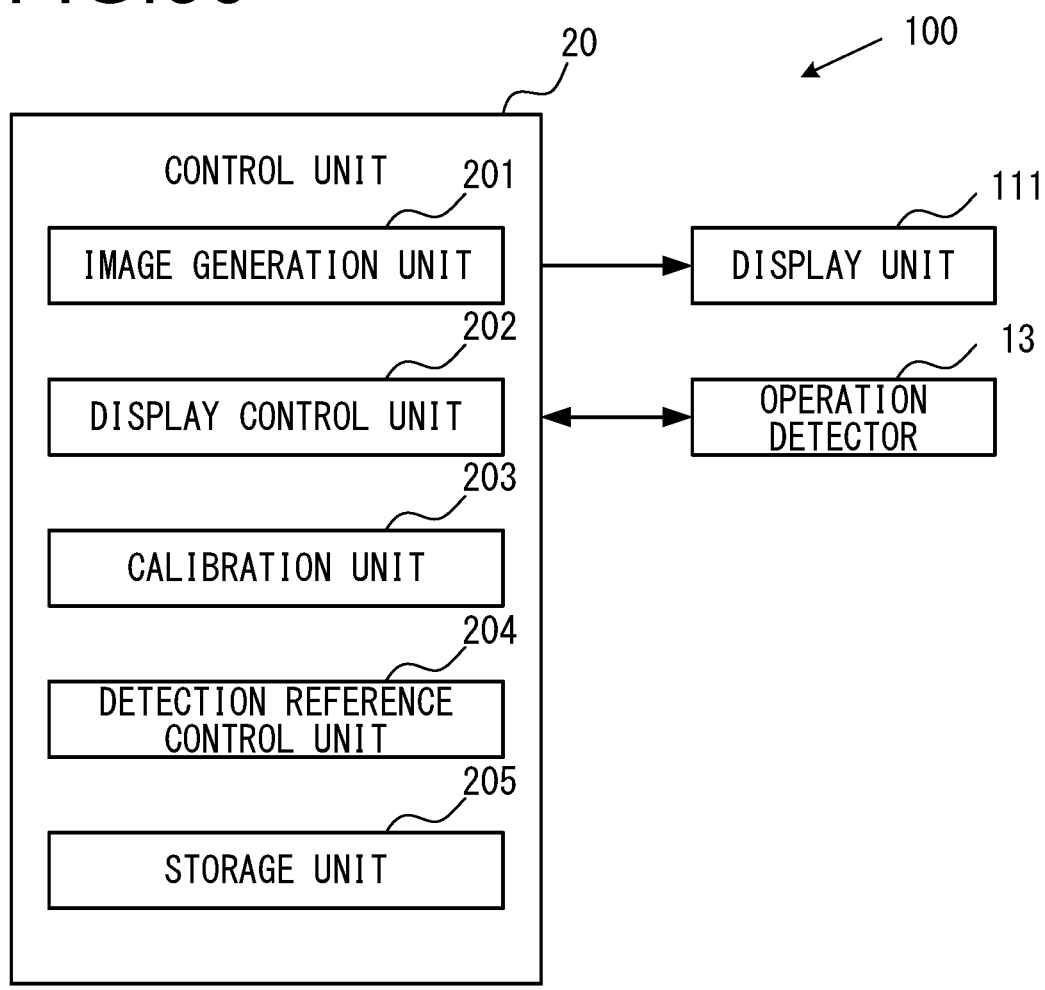
FIG. 30 A block diagram showing the main configuration of the display device achieved in the fourth embodiment FIG. 31 A plan view of the operation detector included in the display device achieved in the fourth embodiment FIG. 32 An illustration of the structure and the functions of the operation detector achieved in the fourth embodiment FIG. 33 A schematic illustration showing the structure adopted in the display device achieved in variation 1 of the fourth embodiment FIG. 34 A schematic illustration showing another structure that may be adopted in the display device in variation 1 of the fourth embodiment FIG. 35 The structure of the display device achieved in a fifth embodiment, illustrated in a disassembled oblique view in (a) and in a sectional view in (b)

FIG. 30 is a block diagram showing a control unit 20 and the display unit 111 and the operation detector 113 controlled by the control unit 20 in the display device 100. The display device 100 in the block diagram in FIG. 30 is substantially identical to the display device 1 in the block diagram in FIG. 2, except that the structures of the display unit 111 and the operation detector 113 are different from those of the display unit 11 and the operation detector 13 in the display device 1. Namely, the control unit 20, comprising a CPU, a ROM, a RAM and the like, includes an arithmetic operation circuit that controls various structural elements including the display unit 111 and the operation detector 113 in the display device 110 based on a control program and executes various types of data processing. The control unit 20 includes an image generation unit 201, a display control unit 202, a calibration unit 203, a detection reference control unit 204 and a storage unit 205. The storage unit 205 includes a nonvolatile memory where the control program is stored, a storage medium where image data to be displayed at the display unit 11 and the like are stored, and the like.

The image forming optical system 112 generates a midair image 30 that includes icons such as that shown in FIG. 29, by deflecting a light flux emitted from an image displayed at the display unit 111 in correspondence to display image data.

Figure 31:
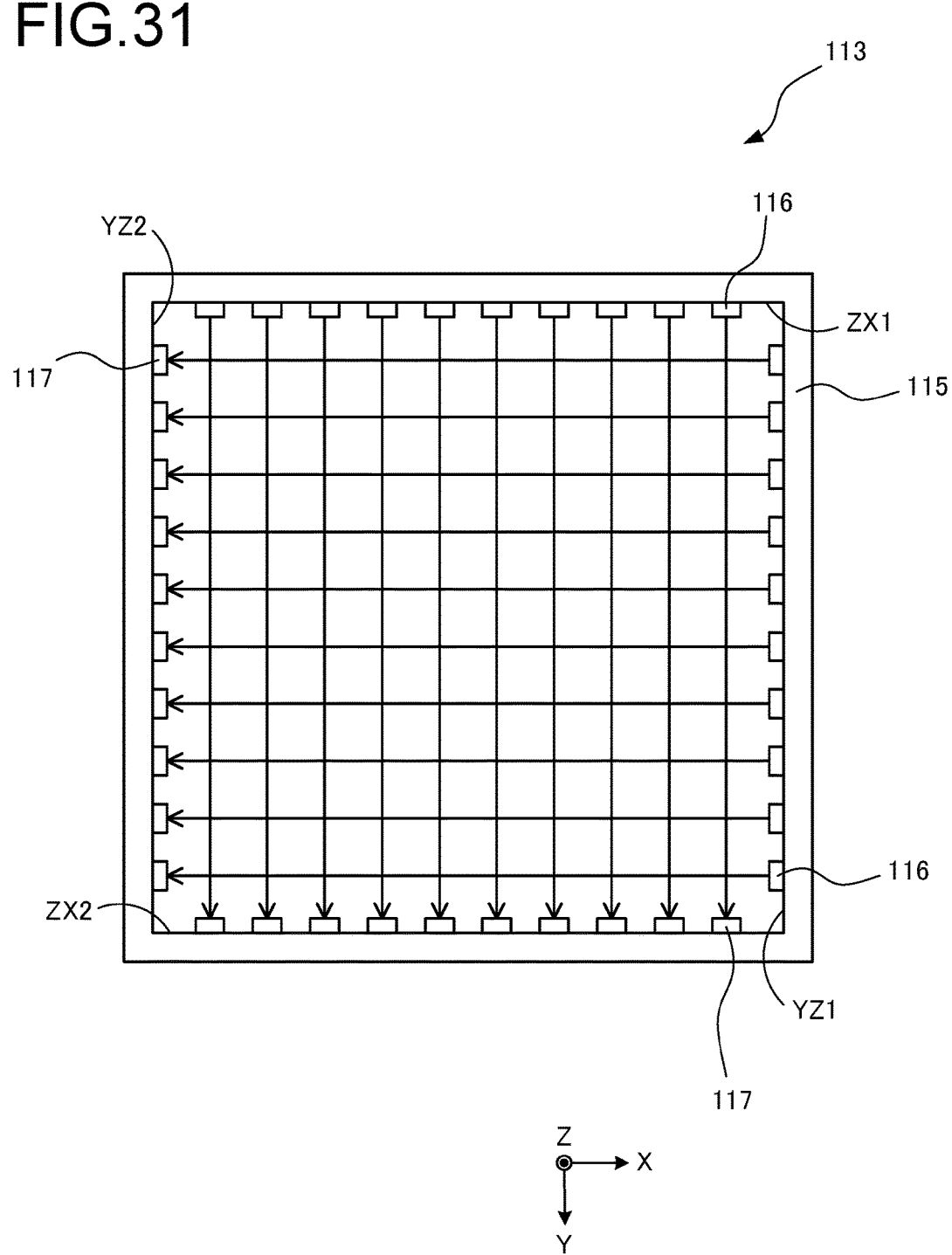

The operation detector 113 is disposed in the vicinity of the midair image 30 so as to surround the midair image 30. FIG. 31 shows the operation detector 113 in a plan view. The operation detector 113 includes a housing 115 with a section thereof parallel to the XY plane forming a rectangular frame shape. A plurality of light emitting elements 116 are disposed at two surfaces ranging next to each other, among the four surfaces defining the inner surfaces of the housing 115, and a plurality of light receiving elements 117 are disposed at the remaining two surfaces ranging next to each other. The frame-shaped housing 115 in FIG. 31 includes a pair of inner surfaces ranging parallel to the ZX plane with light emitting elements 116 alone disposed at an inner surface ZX 1 and light receiving elements 117 alone disposed at an inner surface ZX 2. Likewise, at a pair of inner surfaces ranging parallel to the YZ plane, light emitting elements 116 alone are disposed at an inner surface YZ 1 and light receiving elements 117 alone are disposed at an inner surface YZ 2. Namely, the light emitting elements 116 and the light receiving elements 117 are disposed so as to face opposite each other. The light emitting elements 116 may be constituted with commonly available laser elements or LED elements. The light receiving elements 117 may be constituted with commonly available photodiodes or photo transistors. It is to be noted that the operation detector may be configured with light emitting/receiving elements each constituted with a light emitting element and a light receiving element combined so as to form an integrated unit, and in such a case, the light emitting/receiving elements would be disposed in place of the light emitting elements and mirrors would be disposed in place of the light receiving elements.

The light emitting elements 116 and the light receiving elements 117 are disposed in a neat array so as to achieve a 1 to 1 correspondence in a structure in which light emitted from a given light emitting element 116 only enters a single light receiving element 117 that corresponds to the light emitting element 116. A light beam emitted from a light emitting element 116 advances within a plane parallel to the midair image I (i.e., within a plane parallel to the XY plane) and enters the corresponding light receiving element 117. Information indicating the light detection condition at the light receiving element 117 is transmitted to the control unit, which ascertains the detection condition at the light receiving element 117 in correspondence to the position of the light receiving element 117. Thus, a group of light paths assuming a multi-stage two-dimensional lattice pattern paralleled to the XY plane is formed inside the housing 117. It is desirable that the wavelength of light emitted from the light emitting elements 116 be within the infrared band.

Figure 32:
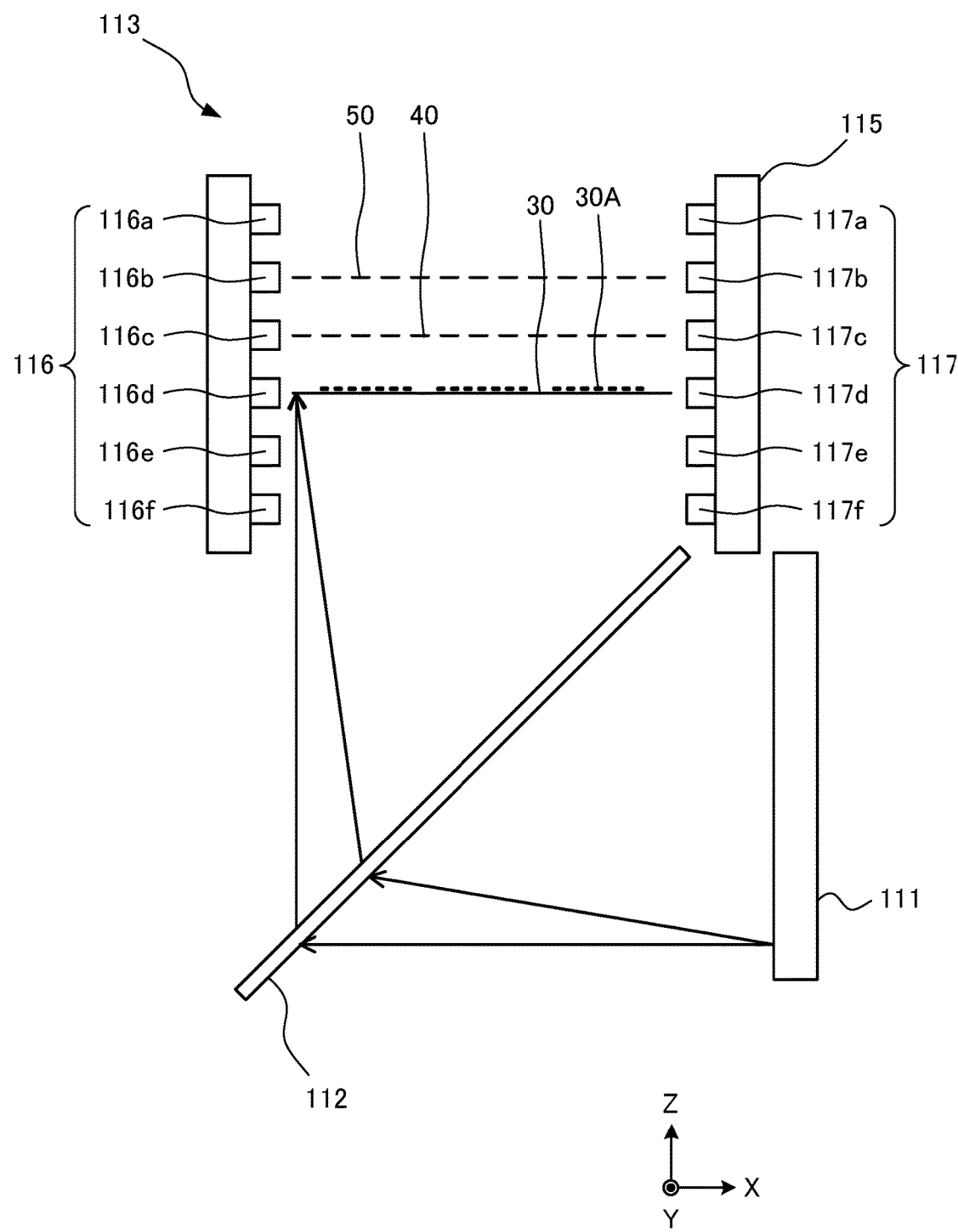

A position detector 113 is shown in a sectional view in FIG. 32. In order to simplify an explanation, the structure shown in FIG. 32 includes light emitting elements 116 and light receiving elements 117, disposed over six stages along the Z direction. The light emitting elements 116 disposed over six stages are assigned with reference numerals 116a, 116b, 116c, 116d, 116e and 116f starting on the + side along the Z direction. The light receiving elements 117 disposed over six stages are assigned with reference numerals 117a, 117b, 117c, 117d, 117e and 117f starting on the + side along the Z direction. In this case, the position detector 113 assumes a detection range between the light emitting element 116a and the light emitting element 116f, and this detection range is equivalent to the detection range 13A in FIG. 3, in reference to which the first embodiment has been described.

The functions of the operation detector 113 are explained in reference to FIG. 32. The display control unit 204 in the display device 100 forms a midair image 30 at a position set apart from the display device 100. The midair image 30 includes icons 30A and the position at which the midair image 30 is generated along the up/down direction is on a plane aligned with the light emitting element 116d and the corresponding light receiving element 117d. The detection reference control unit 204 sets the detection reference 40 at a predetermined initial position. In this example, the detection reference 40 is set on a plane aligned with the light emitting element 116c and the light receiving element 117c. It is desirable that light emitting elements 116 and light receiving elements 117 be disposed over numerous stages along the up/down direction so as to enable fine adjustment of the positions taken for the midair image 30 and the detection reference 40.

The user moves his fingertip down toward a first icon 30A in order to perform an operation at the first icon 30A in the midair image 30, and as the fingertip reaches the detection limit of the operation detector 113 (the plane aligned with the light emitting element 116a and the light receiving element 117a in this example), the operation detector 113 detects the approaching fingertip based on an output from the light receiving element 117.

As the fingertip F reaches a position indicated by a dotted line 50 further upward relative to the icons 30A in the midair image 30, the user experiences a perception of his finger, having reached an icon 30B, performing an operation and thus stops the downward movement of the fingertip F. The detection reference control unit 204 decides that the fingertip F has stopped moving downward, i.e., an operation has been performed at the display position of the icon 30B, when light is continuously detected at the light receiving element 117c over a length of time equal to or greater than a predetermined time interval with no light being detected at the light receiving elements 117a and 117b. At this time, the plane aligned with the light emitting element 116b and the light receiving element 117b is designated as the reach position at which the fingertip F has stopped its movement and performed an operation at the display position of the icon 30A.

Upon determining the reach decision 50, the detection reference control unit 204 changes the position of the detection reference 40, currently set at the initial position, to, for instance, the reach position 50, and stores the position data for the changed detection reference 40 into the storage unit 205 in FIG. 2. Through this process, the detection reference 40, suitable for the particular user, is set based on the reach position 50, as in the display device 1 achieved in the first embodiment. Namely, the plane aligned with the light emitting element 116c and the light receiving element 117c, among the light emitting elements 116 and the light receiving elements 117 disposed over multiple stages, is selected as the initial setting for the detection reference 40 and the detection reference 40 is then changed to the position in alignment with the plane aligned with, for instance, the light emitting element 116b and the light receiving element 117b based on the reach position through calibration processing, so as to change the positional relationship between the detection reference 40 and the display position of the midair image 30. It is to be noted that the position of the detection reference 40 may be changed to the reach position 50 through the calibration processing, i.e., the position of the detection reference 40 may be changed to the plane that is aligned with the light emitting element 116*b* and the light receiving element 117*c* among the plurality of light emitting elements 116 and the light receiving elements 117. The detection reference set at the initial position may be changed based on the reach position so as to take a position further upward relative to the reach position or a position further downward relative to the reach position.

The detection reference may be also altered to a detection reference assuming a depth d2 as illustrated in FIG. 21(*c*). Such a detection reference may be set by selecting the light emitting element 116*a* and the light receiving element 117*a* located further upward relative to the reach position 50, designating the plane aligned with the light emitting element 116*a* and the light receiving element 117*a* as an upper plane 401, selecting the light emitting element 116*c* and the light receiving element 117*c* located further downward relative to the reach position 50, and designating the plane aligned with the light emitting element 116*c* and the light receiving element 117*c* as a lower plane 402, i.e., by setting the upper plane 401 in alignment with the plane aligned with a pair of a light emitting element 116 and a light receiving element 117, among a plurality of pairs each made up with a light emitting element 116 and a light receiving element 117, and setting the lower plane 402 in alignment with the plane aligned with another pair of a light emitting element 116 and a light receiving element 117.

In the embodiment described above, the position of the detection reference can be changed by selecting a pair of a light emitting element 116 and a light receiving element 117 or a plurality of pairs, each made up with a light emitting element 116 and a light receiving element 117 based on the reach position and thus selecting a specific detection reference among a plurality of detection references that can be set in correspondence to the plurality of light emitting elements 116 and the plurality of light receiving elements 117.

As described above, while the display unit 111 and the operation detector 113 in the display device 100 assume structures different from those in the display unit 11 and the operation detector 13 in the display device 1, the detection reference 40 can be set through a similar procedure. This means that the first calibration processing and the second calibration processing can be executed at the display device 100 achieved in the fourth embodiment through procedures similar to those described in reference to the flowcharts presented in FIG. 6 and FIG. 8. The display device 100 in the fourth embodiment may be adopted in any of the numerous variations described earlier.

It is to be noted that the display device 100 may include an actuator and an encoder so as to allow a light emitting element 116 and a light receiving element 117 to move by a miniscule distance along the Z direction. For instance, in order to change the detection reference 42 to a position set apart from the reach position 50 by a distance d1, the light emitting element 116 and the light receiving element 117 disposed at a position closest to the point set apart from the reach position 50 by the distance d1 are selected. Based upon the difference between the position at which the selected light emitting element 116 and light receiving element 117 are disposed and the point set apart from the reach position 50 by the distance d1, the light emitting element 116 and the light receiving element 117 are displaced via the actuator for fine adjustment of the position of the light emitting element 116 and the light receiving element 117. Namely, through the fine adjustment of the position taken by the light emitting element 116 and the light receiving element 117, the detection reference 42 can also be changed to a position closer to the point set apart from the reach position 50 by the distance d1.

Variation 1 of the Fourth Embodiment

Figure 33:
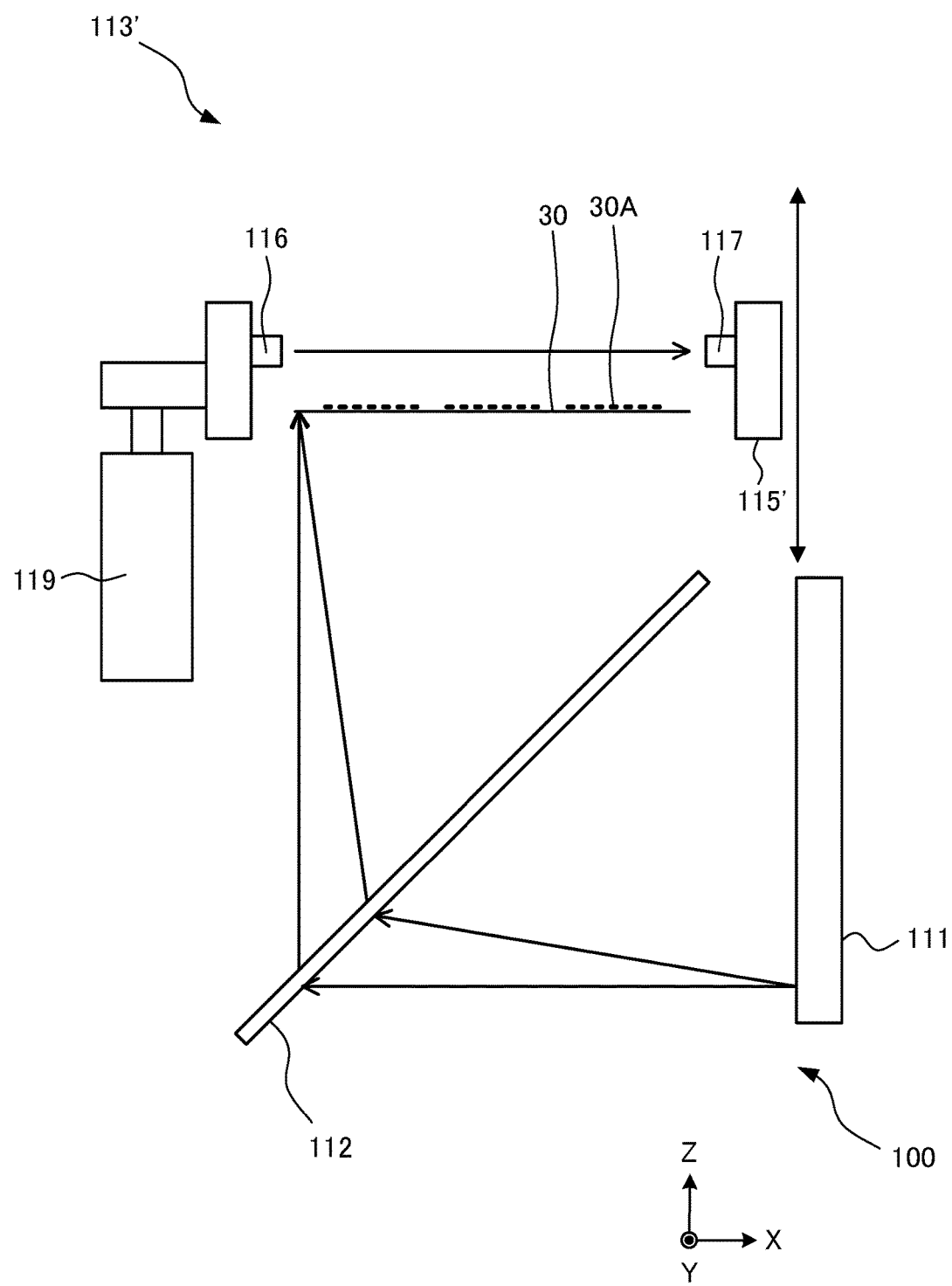

The fourth embodiment allows for the following variation. The operation detector 113 in the display device 100 achieved in the fourth embodiment includes the light emitting elements 116 and the light receiving elements 117 disposed in a two-dimensional array over multiple stages set one after another along the Z direction. However, the light emitting elements 116 and the light receiving elements 117 arrayed in a two-dimensional pattern in the embodiment may instead be disposed at a single stage. FIG. 33 shows a display device 100 equipped with such an operation detector 113'. At a frame-shaped housing 115' of the operation detector 113', a plurality of light emitting elements 116 are disposed in a single row, running parallel to the XY plane, at two the surfaces ranging next to each other, among the four surfaces forming the inner surfaces of the frame-shaped housing 115' and a plurality of light receiving elements 117 are disposed in a single row running parallel to the XY plane, at the two remaining surfaces set next to each other. In other words, the operation detector 113' assumes a single-stage structure, instead of the six-stage structure adopted in the operation detector 113 described in reference to FIG. 32. The housing 115' is able to move reciprocally along the Z direction over predetermined cycles (e.g., 10 cycles/sec) via an actuator 119 connected thereto. The current position of the housing 115' is detected by a position detection sensor such as an encoder (not shown) built into the actuator 119. In this case, a specific position falling within the range over which the housing 115' can move reciprocally is set for the detection reference 40.

In reference to FIG. 32, the detection reference calibration processing executed in the display device 100 equipped with the operation detector 113' will be described. The user, wishing to perform an operation at the display position of an icon 30A in the midair image 30, moves his fingertip down toward the midair image 30. When the position of the fingertip is within the range of movement of the housing 115', light emitted from a light emitting element 116 is blocked by the user's finger and thus does not reach the corresponding light receiving element 117. The position at which the light is blocked by the user's finger and thus stops traveling toward the light receiving element 117 is detected via the encoder as the user's fingertip position. The user moves his fingertip further down toward the midair image 30 in order to perform an operation at the display position of the icon 30A included in the midair image 30. When the user perceives that the fingertip has reached the icon 30A and is performing an operation at the display position of the icon 30A, he stops moving the fingertip. The control unit 20 decides that the user's fingertip has become still if, for instance, the position at which the light from the light emitting element 116 stops traveling toward the light receiving element 117 remains substantially constant during a single reciprocal movement of the housing 115'. At this time, the position at which the user's fingertip has become still is designated as the reach position and the position of the detection reference 40 is set based on the reach position thus designated. A flowchart of the processing executed in this variation will be substantially identical to that presented in FIG. 6.

It is to be noted that while the display device 1 in the fourth embodiment and in variation 1 described above includes at least the control unit 20, the display unit 111 and the operation detector 113, the present invention may instead be adopted in a detection device configured with the control unit 20 alone or a detection device configured with the control unit 20 and the operation detector 113. The control unit 20 may include at least the calibration unit 203 and the detection reference control unit 204. A structural element may be added as needed in order to realize the various advantages described in reference to the fourth embodiment or variation 1.

Figure 34:
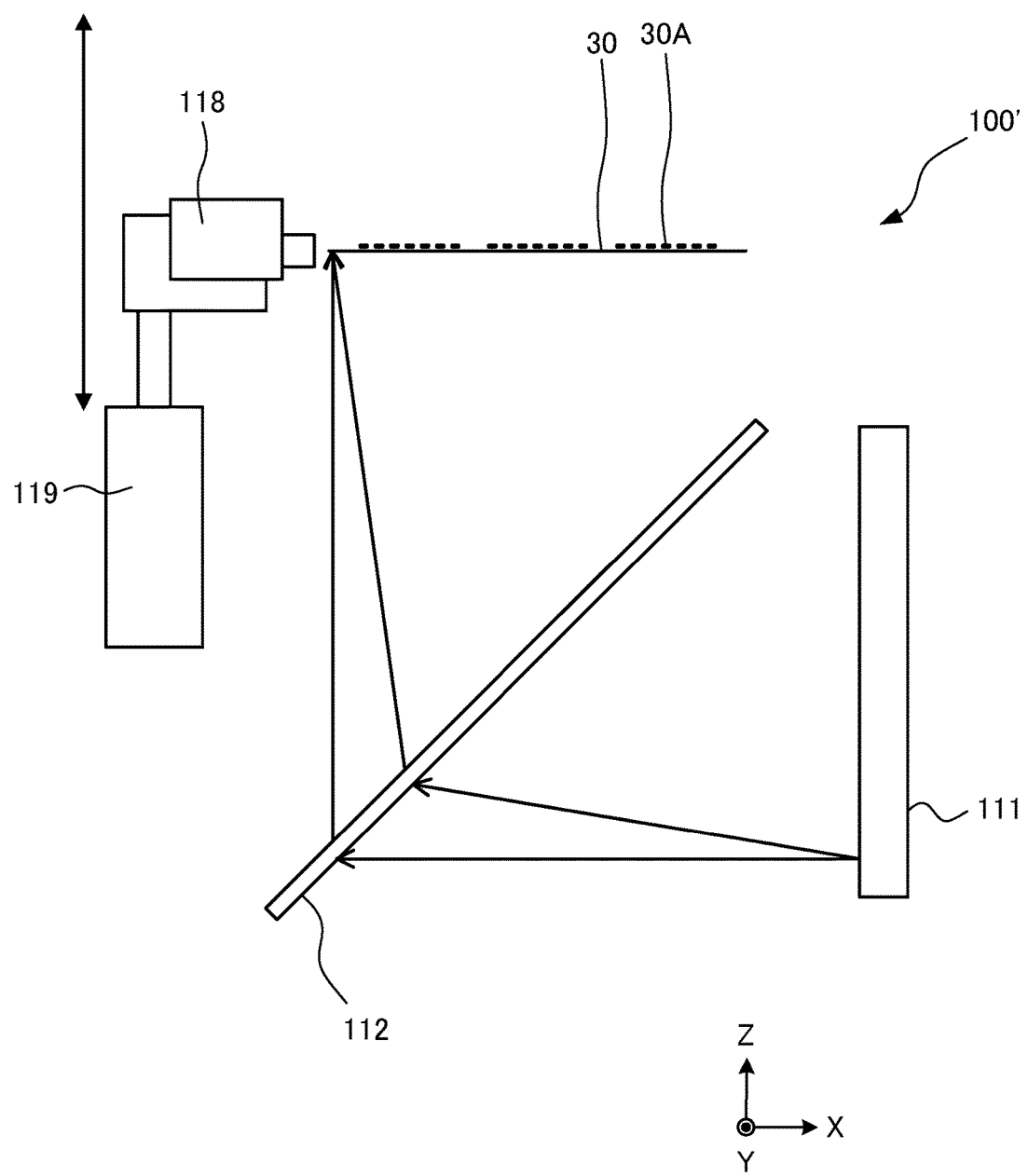

In the fourth embodiment, the position of the user's fingertip is detected via an operation detector configured with light emitting elements and light receiving elements. However, the present invention is not limited to this example and may be adopted in conjunction with an operation detection unit configured with an image-capturing unit. For instance, an image-capturing unit configured with a camera may be mounted at the display device so as to execute calibration processing to calibrate the detection reference 40 based on information obtained by detecting movement of the user's fingertip via the camera. FIG. 34 shows a display device 100' that includes a display unit 111 and an image forming optical system 112 similar to those in the display device 100 described in reference to the fourth embodiment. The display device 100' is distinguishable from the display device 100 in that it includes an image-capturing device (e.g., a digital camera) 118 in place of the operation detector 113. The position of the user's finger is ascertained via the image-capturing device 118 in the display device 100'. It is desirable that the image-capturing device 118 include a wide-angle lens so as to cover the entire midair image 30, and such a lens may be a fisheye lens. The display device may include a plurality of image-capturing devices (e.g., two image-capturing devices) and the position of the user's fingertip may be detected based on captured images provided from the plurality of image-capturing devices.

In the first through fourth embodiments and their variations, control is executed so as to change the positional relationship between the detection reference 40 and the midair image 30 (or an icon 300A or the like) by moving the position of the detection reference 40. As an alternative, the positional relationship between the detection reference 40 and the midair image 30 may be changed by moving the midair image 30. The positional relationship between the detection reference 40 and the midair image 30 may be also changed by moving both the detection reference 40 and the midair image 30.

Fifth Embodiment

While the positional relationship between the detection reference and the display position of the midair image is changed by controlling or changing the detection reference through calibration processing in the embodiments and the variations thereof described earlier, the positional relationship between the detection reference and the display position of the midair image may be changed by changing the midair image display position through calibration processing, as in the fifth embodiment to be described next.

Figure 36:
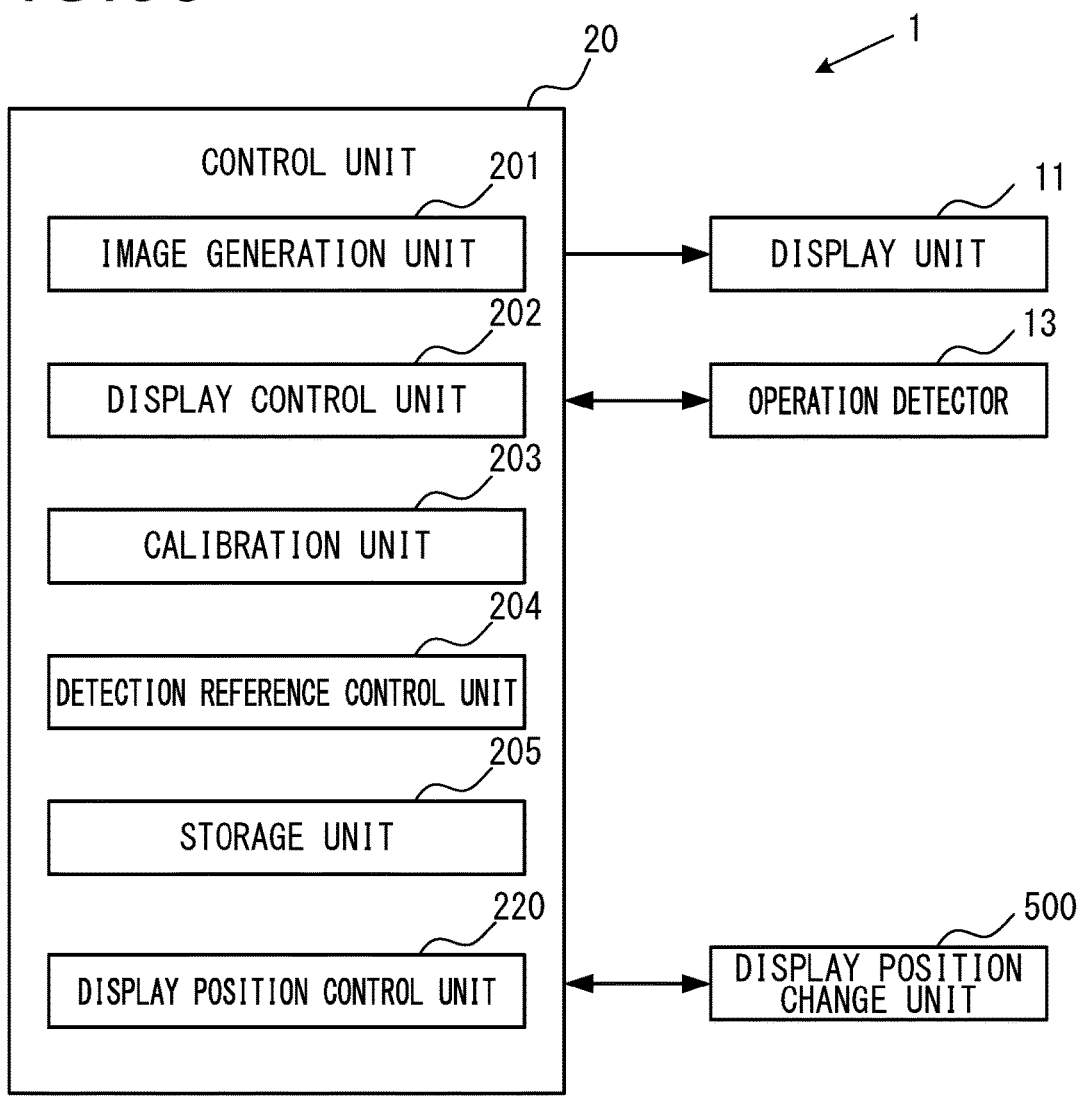
FIG. 36 A block diagram showing the main configuration of the display device achieved in the fifth embodiment FIG. 37 The calibration processing executed in the fifth embodiment, illustrated in (a) and (b) each providing a sectional view indicating the relationship among the midair image, the detection reference and the finger position.

FIG. 35 and FIG. 36 show the display device achieved in the fifth embodiment. As does the display device in the first embodiment, the display device 1 achieved in the fifth embodiment comprises a body 10 having a built-in control unit 20 disposed thereat, a display unit 11, an image forming optical system 12 and an operation detector 13, as shown in FIG. 35. It also includes an image generation unit 201, a display control unit 202, a calibration unit 203, a detection reference control unit 204 and a storage unit 205, as shown in FIG. 36. In addition to the structural elements listed above, the display device 1 in the fifth embodiment includes a display position change unit 500 and a display position control unit 220.

The display position change unit 500, which includes a drive unit such as a motor or an actuator, moves the image forming optical system 12 along the optical axis of the image forming optical system 12, as indicated by the arrow, so as to change the display position of a midair image 30 formed via the image forming optical system 12 by moving it along the Z axis, i.e., along the optical axis. The midair image 30 is moved upward, further away from the display unit 11, by moving the image forming optical system 12 downward, closer to the display unit 11, whereas the midair image 30 is moved downward, closer to the display unit 11 by moving the image forming optical system 12 upward, further away from the display unit 11. It is to be noted that the display position change unit 500 may move the display position of the midair image 30 for change by moving the display unit 11 along the optical axis of the image forming optical system 12 instead of moving the image forming optical system 12.

While the display unit 11, the image forming optical system 12 and the operation detector 13 may be structurally identical to the display unit 11, the image forming optical system 12 and the operation detector 13 in the first embodiment shown in FIG. 1, the image forming optical system 12 or the display unit 11 is structured so as to be able to move along the optical axis of the image forming optical system 12.

It is to be noted that while the following explanation is provided by assuming that the display position of the midair image 30 formed by the image forming optical system 12 is moved along the Z axis, i.e., along the optical axis, for change, by moving the image forming optical system 12 along the optical axis of the image forming optical system 12 via a drive unit such as a motor or an actuator, the present invention is not limited to this example, and the display position control unit 220 may instead control the display unit 11 so as to change the display position of the midair image 30 along the depth-wise direction by displaying a display image to be viewed with the right eye and a display image to be viewed with the left eye, which assumes parallax relative to the image to be viewed with the right eye.

The image generation unit 201, the display control unit 202, the calibration unit 203, the detection reference control unit 204 and the storage unit 205 fulfill functions identical to those of the image generation unit 201, the display control unit 202, the calibration unit 203, the detection reference control unit 204 and the storage unit 205 in the first embodiment shown in FIG. 1.

As described above, the control unit 20 includes the display position control unit 206 and the display position control unit 220 causes the display position change unit 500 to change the display position of the midair image 30 by calculating or determining the extent to which the midair image 30 is to move based on the finger reach position or a designated position, detected or determined in the calibration processing mode.

Operations executed in the display device achieved in the fifth embodiment of the present invention will be explained next. The midair image operation mode is executed as in the display device in the first embodiment. Namely, as the midair image operation mode is started up, the midair image 30 for the midair image operation mode shown in FIG. 3(a) is displayed via the image forming optical system 12 and the detection reference 40 is set at a predetermined initial position by the detection reference control unit 204. As the user's finger moves downward in order to perform an operation at the display position of an icon 30A in the midair image 30, the operation detector 13 detects the descending movement of the finger. Based upon the detection output provided by the operation detector 13, the detection reference control unit 204 decides that the finger has reached the position of the detection reference 40, and once this decision is made, a function corresponding to the icon 30A having been operated is executed. For instance, the display content in the midair image 30 may be switched.

As the first calibration processing mode is executed, the midair image 300 for the calibration processing shown in FIG. 4 is formed via the display control unit 202, the display unit 11 and the image forming optical system 12 and the detection reference 40 is set at an initial position near the midair image 300 by the detection reference control unit 204. As the user's finger moves downward in order to operate an icon 300A in the midair image 300, the operation detector 13 detects the descending movement of the finger. Based upon the detection output provided by the operation detector 13, the detection reference control unit 204 determines the reach position for the finger. This decision-making may be executed through any of the methods described in reference to the first embodiment and variations 1 and 2 of the first embodiment. Based upon the finger reach position 50, the display position control unit 206 causes the display position change unit 500 to move the position of the midair image 300 along the optical axis of the image forming optical system 12.

It is to be noted that the display control unit 202, the display unit 11 and the image forming optical system 12 may form any of the midair images 300 displayed for purposes of calibration processing as shown in FIG. 12, FIG. 15 and FIG. 18, and in such a case, the detection reference control unit 204 determines a designated position 50A indicated with the finger based on the detection output provided by the operation detector 13. The display position control unit 220 then causes the display position change unit 500 to move the position of the midair image 300 along the optical axis of the image forming optical system 12 based on the designated position 50A. Once the display position of the midair image 300 is changed as described above, the first calibration processing ends and in the subsequent midair image operation mode, the midair image 30 for the midair image operation mode is displayed at the changed display position.

The display position of the midair image 300 is moved by the display position control unit 220 and the display position change unit 500 as described below. Namely, when the finger reach position 50 or the designated position 50A is further upward relative to the detection reference 40, as shown in FIG. 37(a), the display position control unit 220 and the display position change unit 500 calculate a distance $\Delta H$ between the reach position 50 or the designated position 50A and the detection reference 40 and moves the midair image 300 to display position 300 indicated by the dotted line, located further downward by the distance $\Delta H$. The midair image 300 displayed in space may not always assure good visibility, and the display position of the midair image 300 may be perceived differently from one user to another. In the example presented in FIG. 37(a), the user perceives that the display position of the midair image 300 is higher than its actual position. For this reason, the reach position 50 or the designated position 50A for this particular user is further upward relative to the display position of the midair image 300. Accordingly, the display position of the midair image 300 is moved downward by the distance $\Delta H$ in order to enable detection of an operation by the user at the display position of the midair image 300. As a result, the user performs an operation at the display position of the midair image 300 having been moved downward, and the reach position 50 or the designated position 50A is thus likely moved downward. With the reach position 50 or the designated position 50A changed to a point further downward so as to reach the detection reference, it becomes possible to detect an operation by the user at the display position of the midair image 300. By changing the display position of the midair image 300 as described above, an operation by the user at the display position of the midair image 30 can be detected at the detection reference 40.

When the finger reach position 50 or the designated position 50A is further downward relative to the detection reference 40, as shown in FIG. 37(b), the display position control unit 220 and the display position change unit 500 calculate a distance $\Delta H$ between the reach position 50 or the designated position 50A and the detection reference 40 and moves the display position of the midair image 300 to a display position 300 indicated by the dotted line, located further upward by the distance $\Delta H$.

When the finger reach position 50 or the designated position 50A is in alignment with the detection reference 40 or is in the vicinity of the detection reference 40, the display position control unit 220 and the display position change unit 500 does not move the display position of the midair image 300.

It is to be noted that while the display position control unit 220 and the display position change unit 500 move the display position of the midair image 300 downward when the reach position 50 or the designated position 50A is further upward relative to the detection reference 40 and move the display position of the midair image 300 upward when the reach position 50 or the designated position 50A is further downward relative to the detection reference 40, it is not necessary to precisely match the extent of the movement with the distance $\Delta H$ between the reach position 50 or designated position 50A and the detection reference 40 and instead, the display position may be moved by an extent greater or smaller than the distance $\Delta H$, as has been explained in reference to the first embodiment.

As an example of a method that may be adopted when calculating the extent of midair image movement, numerous user's may be asked to participate in advance calibration processing in order to ascertain the suitable extent of movement of the midair image 300 that affords each user smooth midair image operation by moving the display position of the midair image 300 by different extents relative to the distance $\Delta H$ between the reach position or the designated position and the detection reference, and statistical processing may be executed on these extents of movement of the midair image 300 to determine the extent of movement for the midair image relative to the distance $\Delta H$.

The extent of midair image movement through the statistical processing may be, for example, a common value for all users, or different values, each corresponding to a specific user age group or a specific gender. It is to be noted that the method of determining the extent of midair image movement through the statistical processing described above may also be adopted when determining the extent to which the detection reference is to move for change based on the reach position or the designated position in the first embodiment described earlier.

Figure 38:
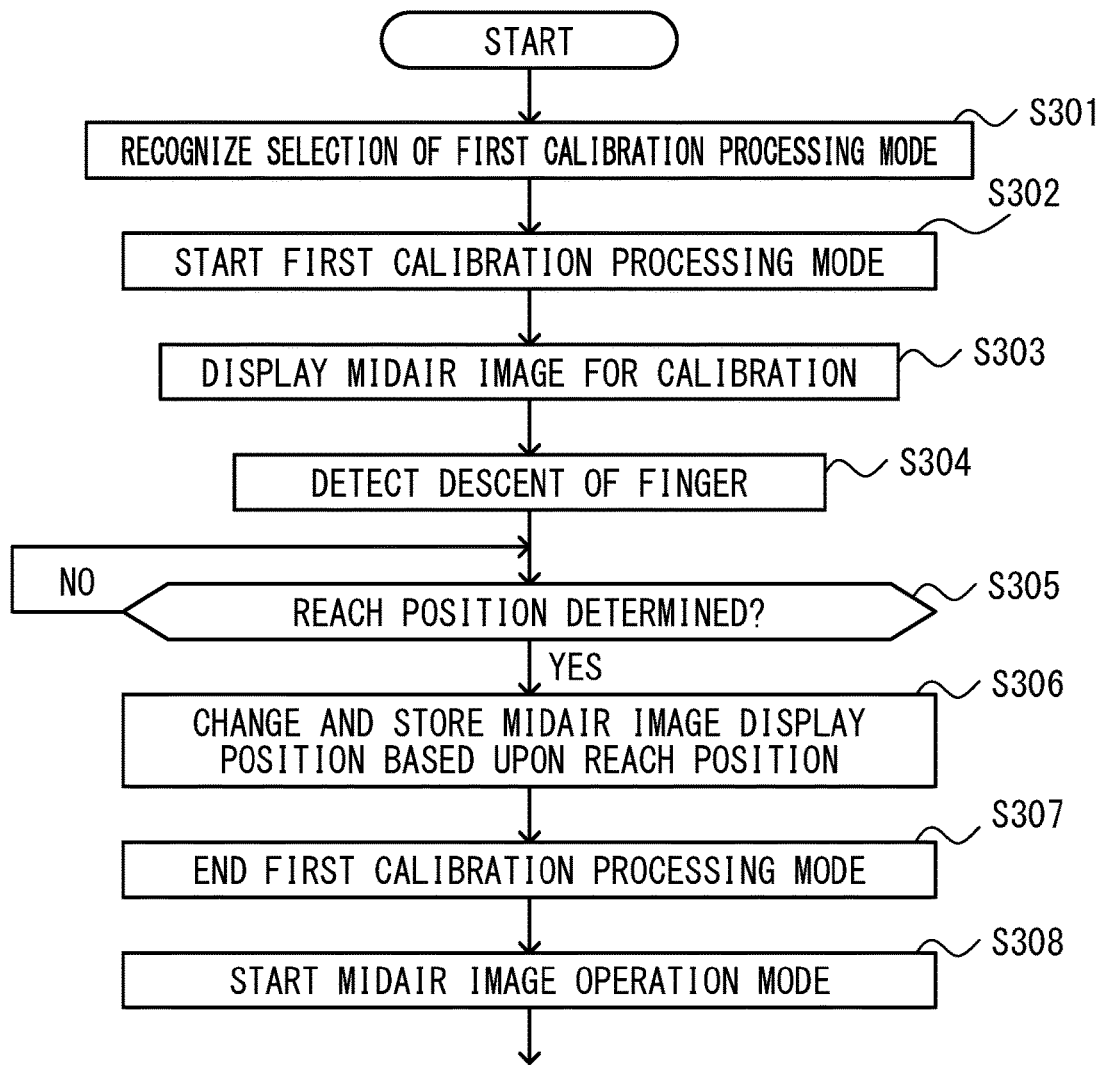
FIG. 38 A flowchart of the calibration processing executed in the fifth embodiment FIG. 39 A flowchart of the calibration processing executed in the display device achieved in variation 3 of the fifth embodiment FIG. 40 A block diagram showing the main configuration of the display device achieved in variation 4 of the fifth embodiment FIG. 41 An illustration of a midair image displayed for purposes of calibration of the display device achieved in variation 4 of the fifth embodiment FIG. 42 A schematic presentation of a midair image displayed in a sixth embodiment in a sectional view indicating the relationship among the operation detector, the midair image and the detection reference FIG. 43 The calibration processing executed in the display device in the sixth embodiment, illustrated in (a) and (b)

An example in which the calibration processing described above is executed in the first calibration processing mode will be explained in reference to the flowchart presented in FIG. 38. It is to be noted that the flowchart in FIG. 38 shows the processing executed in steps S301 through S308 and does not show the processing executed in subsequent steps. The processing executed in step S308 and subsequent steps is similar to the processing executed in step S9 and subsequent steps in the flowchart presented in FIG. 6.

The processing executed in steps S301 through S305 is similar to the processing executed in steps S1 through S5 in the flowchart presented in FIG. 6. In step S306, the display position control unit 206 changes the display position of the midair image 300. Namely, the display position control unit 206 causes the display position change unit 500 to move the display position of the midair image 300 along the optical axis of the image forming optical system 12 based on the finger reach position 50, and then the operation proceeds to step S307. In step S307, the first calibration processing mode ends and then the operation proceeds to step S308. In step S308, the midair image operation mode starts. It is to be noted that when the midair image displayed in step S303 is any of the midair images 300 shown in FIG. 12, FIG. 15 and FIG. 18, the designated position 50A should be determined in step S305 and the display position of the midair image 300 should be changed based on the designated position 50A in step S306.

It is to be noted that while the calibration processing described above is executed in the first calibration processing mode, it may be also adopted in the second calibration processing mode.

The display device achieved in the fifth embodiment as described above, which changes the positional relationship between the midair image display position and the detection reference by changing the display position of the midair image based on the reach position or the designated position through the calibration processing, is capable of achieving a suitable positional relationship for the midair image display position and the detection reference suited for the operation characteristics of a specific user.

If the detection reference changed through calibration processing is likely to be set outside the detection range 13A of the operation detector 13 shown in FIG. 3 or near the upper limit or the lower limit of the detection range 13A, the midair image, instead of the detection reference, may be moved through calibration processing so as to avert such an eventuality.

Variation 1 of the Fifth Embodiment

Next, variation 1 of the display device achieved in the fifth embodiment will be described.

While the display device in the fifth embodiment changes the midair image display position based on the reach position or the designated position through the calibration processing, the display position control unit 220 and the display position change unit 500 change the midair image display position, and the detection reference control unit 204 changes the position of the detection reference based on the reach position or the designated position in the calibration processing executed in variation 1 of the display device achieved in the fifth embodiment. Through change of both the display position of the midair image and the position of the detection reference, a suitable positional relationship suited for the operation characteristics of a specific user, can be achieved. When it is difficult to accurately move the midair image to the suitable display position determined based on the reach position or the designated position via the display position change unit 500, the midair image display position may first be roughly adjusted by the display position change unit 500 and then the detection reference may be fine-adjusted by the detection reference control unit 204, so as to achieve a suitable positional relationship for the midair image display position and the detection reference.

Variation 2 of the Fifth Embodiment

Variation 2 of the display device achieved in the fifth embodiment will be described below. When the display position control unit 220 and the display position change unit 500 in the display device in variation 2 moves the midair image display position, the midair image display is controlled so that it fades out and then fades in during the period of time elapsing between the movement start and the movement end. Namely, at the start of midair image movement, the display luminance is gradually lowered and then, toward the end of the midair image movement, the display luminance is gradually raised. The movement of the midair image during the calibration processing may look jarring to the user. Accordingly, the display luminance is gradually reduced as the midair image begins to move so as to make the midair image movement less visible to the user and reduce the discomfort that may otherwise be experienced by the user.

The display control unit 202 may lower the display luminance or the contrast of the moving midair image, flash the midair image display at lowered luminance or contrast, or may even hide the midair image. By rendering the movement of the midair image, achieved via the display position change unit 500 less noticeable, i.e., less visible, through these measures the user experience will be improved. As an alternative, a display mode that renders the midair image more noticeable as it moves may be adopted. In the display mode for rendering the midair image more noticeable, the display luminance or the contrast of the moving midair image may be raised or the midair image display may be flashed. In the display mode for rendering the midair image itself more noticeable, the movement of the midair image can be rendered less noticeable. In other words, the user's attention will be focused on the midair image itself rather than on the movement of the midair image. Under such circumstances, the user will not be bothered or distracted by the movement of the midair image.

The midair image display mode is switched for midair image movement as described above during the processing executed in step S306 in the flowchart presented in FIG. 38.

Instead of rendering the entire midair image display less noticeable or more noticeable during the movement of the midair image, part of the midair image, e.g., the icon for the calibration processing, may be rendered less noticeable or more noticeable. The user may choose as an option whether or not to render the midair image movement more noticeable as described above.

While the calibration processing is underway, the movement of the midair image, achieved via the display position change unit 500, may be rendered more noticeable so as to enable the user to be aware of the midair image movement. The display control unit 202 may raise the display luminance or the contrast of the moving midair image or may flash the midair image display. While the midair image movement is rendered less noticeable in the explanation provided earlier, the position to which the midair image moves can be indicated clearly by rendering the movement of the midair image more noticeable to the user.

The midair image display luminance is switched for midair image movement as described above during the processing executed in step S306 in the flowchart presented in FIG. 38.

Variation 3 of the Fifth Embodiment

Variation 3 of the display device 1 achieved in the fifth embodiment will be described next. The display device 1 achieved in variation 3 starts midair image display position change in response to an operation by the user during the calibration processing. As the operation by the user ends, the display position control unit 220 controls the display position change unit 500 so as to start change of the midair image display position.

Figure 39:
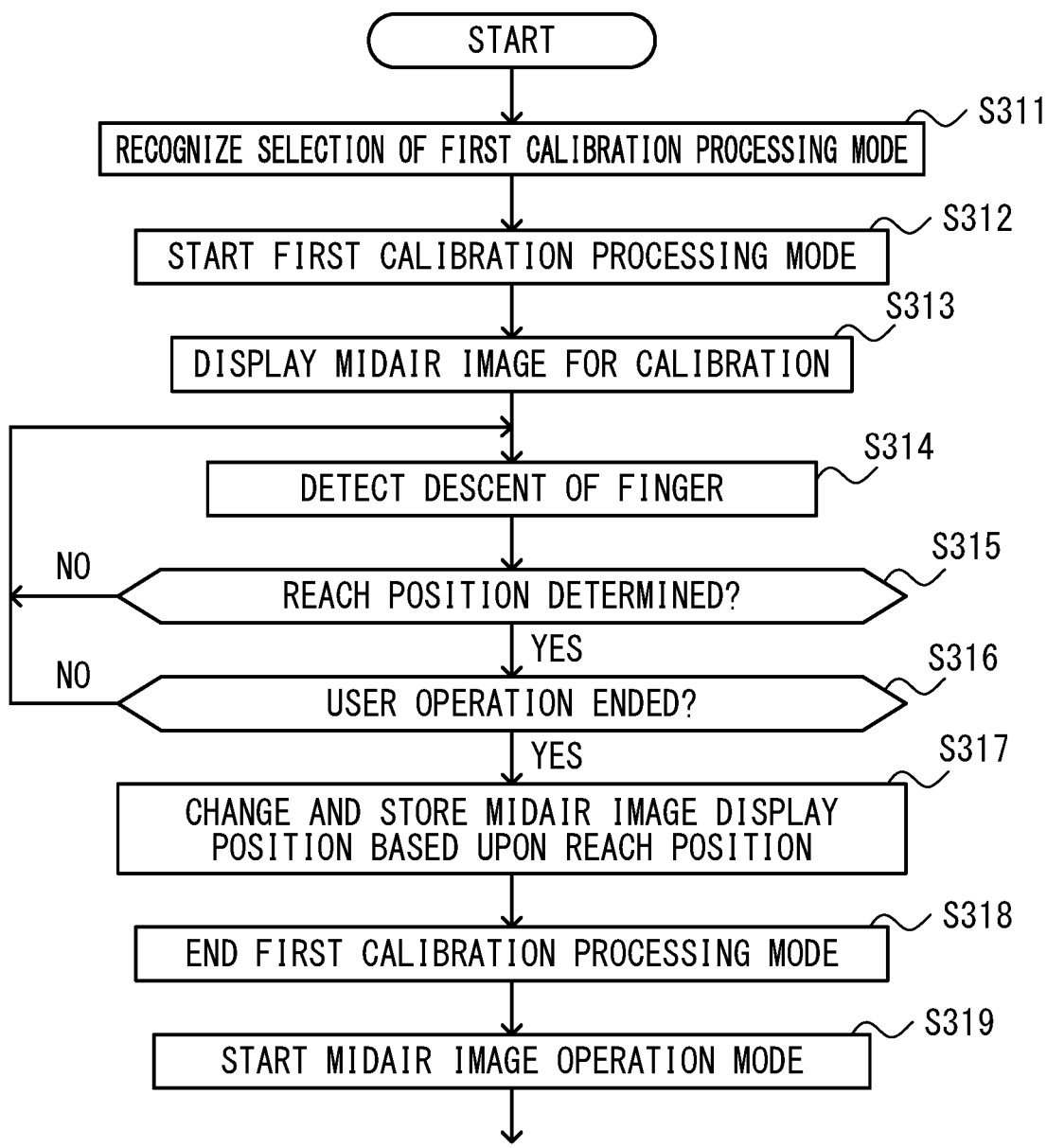

An example in which the calibration processing described above is executed in the first calibration processing mode will be explained in reference to the flowchart presented in FIG. 39. It is to be noted that the flowchart in FIG. 39 shows the processing executed in steps S311 through S319 and does not show the processing executed in subsequent steps. The processing executed in step S319 and subsequent steps is similar to the processing executed in step S9 and subsequent steps in the flowchart presented in FIG. 6.

The processing executed in steps S311 through S315 is similar to the processing executed in steps S301 through S305 in the flowchart presented in FIG. 38. In step S316, a decision is made as to whether or not the operation by the user has ended. When an affirmative decision is made in step S316, i.e., when it is decided that the operation by the user has ended, the operation proceeds to step S317. When a negative decision is made in step S316, the operation returns to step S314. The processing executed in steps S317 through S319 is similar to the processing executed in steps S306 through S308 in the flowchart presented in FIG. 38.

It is to be noted that the processing in step S316, through which a decision is made as to whether or not the operation by the user has ended, is executed in order to determine whether or not to change the midair image display position. Accordingly, the operation by the user may be judged to have ended when the reach position or the designated position is determined or when a specific gesture signaling display position change (a gesture such as the user's hand forming the "paper" sign switching to the "stone" sign) is detected after the reach position or the designated position is determined. As an alternative, the operation by the user may be judged to have ended when the user's finger is detected to press down a display position change button displayed in the midair image after the reach position or the designated position is determined.

It is to be noted that while the calibration processing described above is executed in the first calibration processing mode, it may be also adopted in the second calibration processing mode.

Variation 4 of Fifth Embodiment

Figure 40:
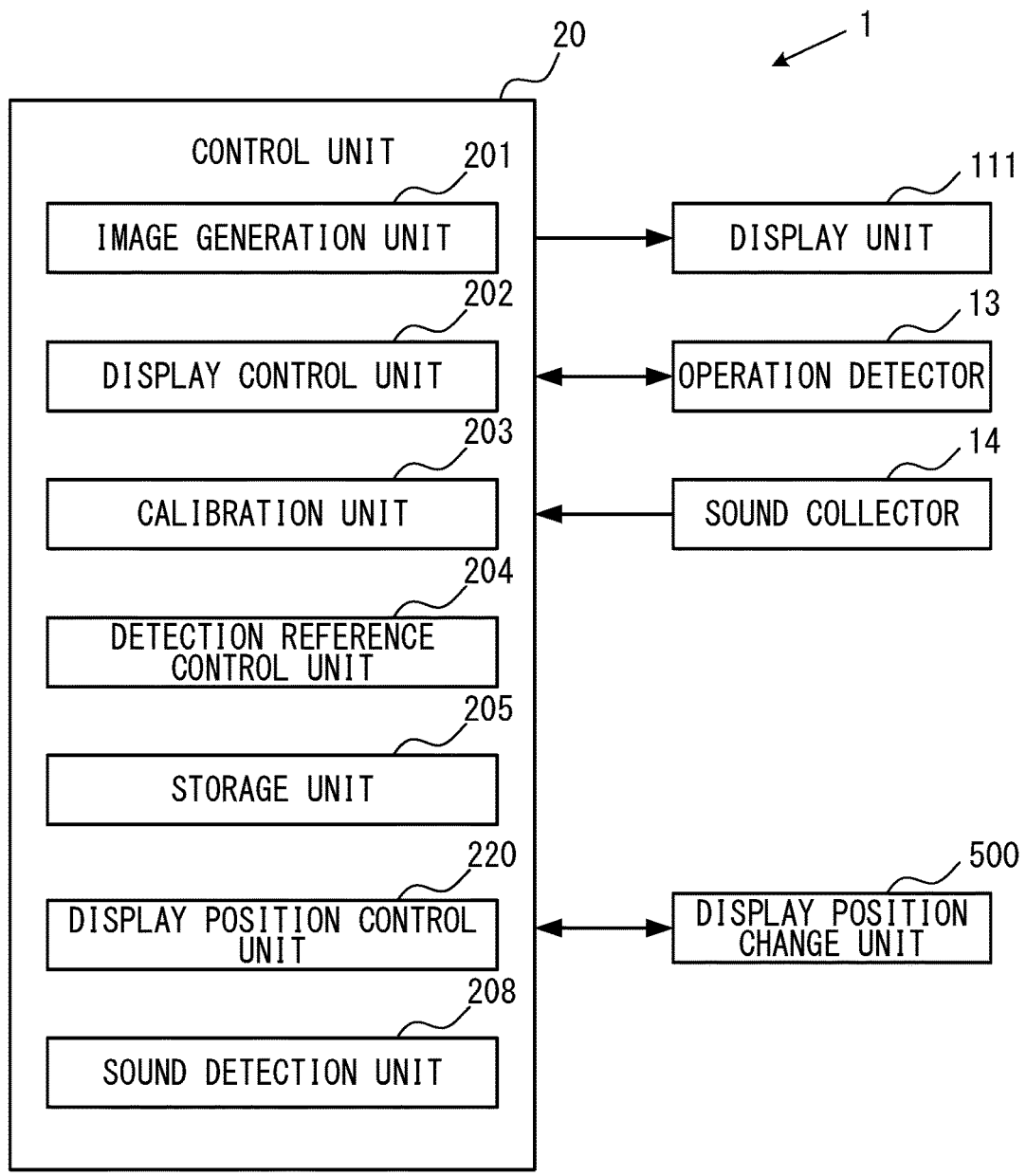

Variation 4 of the display device 1 achieved in the fifth embodiment will be described next. The user of the display device 1 in variation 4 signals the timing with which change of the midair image display position starts with his voice during calibration processing. FIG. 40 is a block diagram showing a display unit 11 and an operation detector 13 controlled by a control unit 20 in the display device 1 achieved in variation 4. The display device 1 includes the sound collector 14 in variation 6 of the first embodiment shown in FIG. 17 with a sound detection unit 208 installed in the control unit 20.

Figure 41:
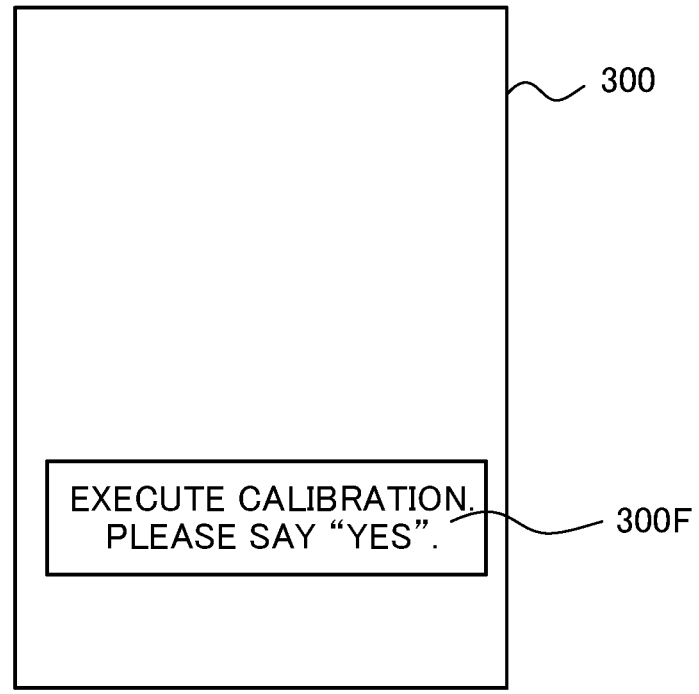

The display device 1 determines the reach position 50 as in the first embodiment. The display control unit 202 brings up a superimposed display of a message "execute calibration. Please say "yes"" at a calibration icon 300F in the midair image 300, as shown in FIG. 41. As the user, prompted by the message displayed at the calibration icon 300F, says "yes", the sound collector 14 collects the sound and outputs the sound as audio data to the sound detector 208. When the sound detector 208 decides that the audio data corresponds to "yes", the display position control unit 220 controls the display position change unit 500 so as to change the display position of the midair image 300. The change of the midair image display position described above is executed by making a decision in step S316 in the flowchart presented in FIG. 39, in reference to which variation 3 of the fifth embodiment has been described, as to whether or not the user has said "yes" instead of making a decision as to whether or not the operation by the user has ended and proceeding to step S317 upon making an affirmative decision in step S316, i.e., upon deciding that the user has said "yes".

It is to be noted that while the calibration processing described above is executed in the first calibration processing mode, it may be also adopted in the second calibration processing mode.

The display device 1 does not need to include the sound collector 14 and the sound detection unit 208 in such a configuration may execute sound detection by using audio data input from an external sound collecting device via either a wireless means or a wired means.

It is to be also noted that after the detection reference control unit 204 determines the finger reach position or the designated position, the midair image movement does not start until the user says "yes" and the midair image starts moving when the user's voice saying "yes" is detected. This means that the user may repeatedly perform an operation at the midair image display position many times before he says "yes". In such a case, the midair image should be moved when the user says "yes" based on an average value representing the plurality of reach positions or designated positions, e.g., the arithmetic mean or the geometric mean of the plurality of reach positions or designated positions, a median of the plurality of reach positions 50, or the most recent reach position or designated position among the plurality of reach positions or designated positions.

Variation 5 of the Fifth Embodiment

Variation 5 of the display device achieved in the fifth embodiment will be described next. The display device 1 in variation 5 suspends midair image movement while the user is viewing the midair image and moves the midair image as the user takes his eyes away from the midair image. Accordingly, the display device 1 includes an image-capturing device configured with a camera or the like, as in variation 8 of the first embodiment, images of the user are captured via the image-capturing device while the calibration processing is underway, the control unit 20 analyzes the image data expressing the captured images and judges the direction along which the user's face or body is turned based on the analysis results in order to determine whether or not the user is viewing the midair image. The display position control unit 220 and the display position change unit 500 move the midair image when the user is not looking at the midair image. The movement of the midair image during the calibration processing may look jarring to the user. Accordingly, the midair image is made to move when the user takes his eyes off the midair image, and as a result, the user does not need to see the movement of the midair image, which reduces the discomfort of the user.

Instead of an image-capturing device, the display device 1 may include a line-of-sight detector that detects the user's line of sight, and based on a detection output provided by the line-of-sight detector, the display position control unit 220 and the display position change unit 500 may move the midair image when the user is not looking at the midair image, i.e., when the user's line of sight does not extend toward the midair image. The change of the midair image display position described above is executed by making a decision in step S316 in the flowchart presented in FIG. 39, in reference to which variation 3 of the fifth embodiment has been described, as to whether or not the user is looking at the midair image instead of making a decision as to whether or not the operation by the user has ended and proceeding to step S317 upon making an affirmative decision in step S316 when it is decided that the user is looking at the midair image.

It is to be noted that while the calibration processing described above is executed in the first calibration processing mode, it may be also adopted in the second calibration processing mode.

It is to be also noted that the line-of-sight detector or the image-capturing device described above does not need to be installed in the display device 1. The line-of-sight detector may be installed outside the display device 1 and may transmit line-of-sight detection results to the display device 1 through wireless communication or via a cable. The image-capturing device may be installed outside the display device 1 and may transmit image-capturing data to the display device 1 through wireless communication or via a cable It is to be further noted that while the midair image display position is changed when it is decided that the user is looking at the midair image, the display position control unit 220 and the display position change unit 500 may instead execute control so as to change the midair image display position when it is decided that the user is looking at the midair image. In the latter case, the user, looking at the moving midair image is able to sense the extent to which the midair image has moved and thus, the user can be prompted to alter the operating position.

It is to be noted that while control is executed so as to change the midair image display position when the user is not looking at the midair image in the explanation provided above, control may instead be executed so as to change the midair image display position based on a value indicated in user biometric information. The user's pulse rate may be obtained as such user biometric information. The user's pulse rate may be gauged via, for instance, a pulse rate counting device worn by the user. Then, the display position control unit 220 and the display position change unit 500 may execute control so as to change the midair image display position when the user's pulse rate increases. The user's pulse rate may rise when the user, being unable to perform an operation smoothly, becomes frustrated. In this situation, change of the midair image display position will assure better ease of device operation for the user.

It is to be also noted that after the detection reference control unit determines the finger reach position or the designated position, the midair image movement does not start while the user is looking at the midair image and the midair image starts moving when the user is not looking at the midair image is detected in the explanation provided above. This means that the user may repeatedly perform an operation at the midair image display position many times before he stops looking at the midair image. In such a case, the midair image should be moved when the user looks away from the midair image based on an average value representing the plurality of reach positions or designated positions, e.g., the arithmetic mean or the geometric mean of the plurality of reach positions or designated positions, a median of the plurality of reach positions 50, or the most recent reach position or designated position among the plurality of reach positions or designated positions.

Variation 6 of the Fifth Embodiment

Variation 6 of the display device achieved in the fifth embodiment will be described next. The display device 1 achieved in variation 6 is capable of altering the velocity of the midair image movement during the calibration processing. The display device 1 is capable of moving the midair image at very high speed for at low speed. The display position control unit 220 and the display position change unit 500 move the midair image at very high speed equal to or higher than the first predetermined value or at low speed equal to or lower than the second predetermined value smaller than the first predetermined value. The user is not able to easily see the movement of the midair image when the midair image moves at very high speed or at low speed as described above. The user may be allowed to choose whether to move the midair image at very high speed or at low speed via, for instance, a selector switch. Under the control executed by the display position control unit 220 and the display position change unit 500, as described above, the user is not able to easily see the movement of the midair image display position. In other words, since the user cannot see the movement of the midair image, he will not find it jarring. When the midair image display position needs to move by a large distance for change, the user may find the change of the midair image display position too noticeable and accordingly, the first predetermined value and the second predetermined value may be changed based on the distance by which the display position needs to be moved. For instance, when the midair image display position needs to move by an extent equal to or greater than a predetermined distance, the first predetermined value may be raised and the second predetermined value may be lowered, in comparison to the values taken for the first predetermined value and the second predetermined value when the midair image display position needs to move by an extent equal to or less than the predetermined distance.

It is to be noted that while the display device 1 in the fifth embodiment and variations 1 through 6 thereof includes at least the control unit 20, the display unit 11 and the operation detector 13, the present invention may instead be adopted in a control device configured with the control unit 20 alone or a control device configured with the control unit 20 and the operation detector 13. The control unit 20 may include at least the calibration unit 203 and the display position control unit 220. A structural element may be added as needed in order to realize the various advantages described in reference to the fifth embodiment or variations 1 through 6 thereof.

Sixth Embodiment

Figure 42:
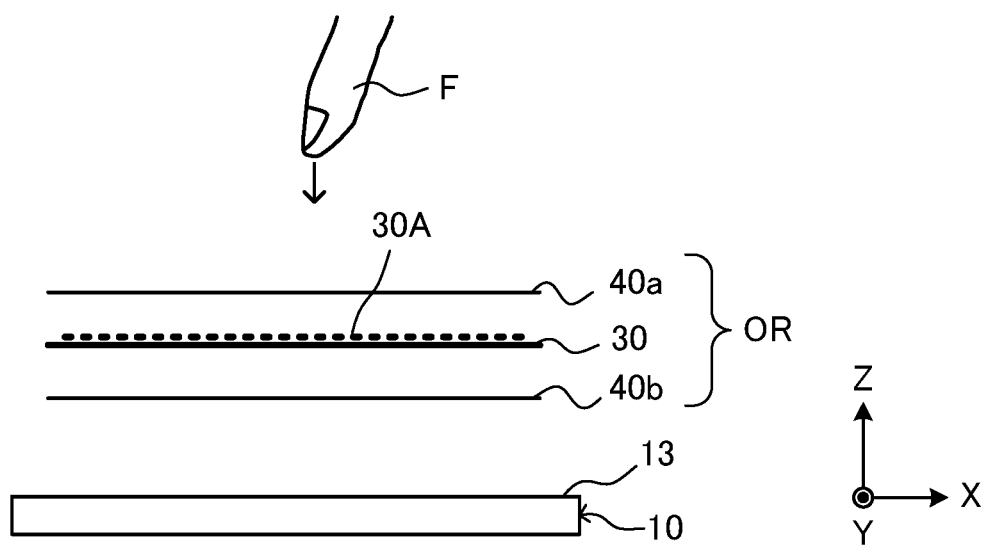

The display device achieved in the sixth embodiment will be described in reference to FIG. 42. The display device to be described below assumes a structure identical to that of the display device achieved in the fifth embodiment described in reference to FIG. 35 and FIG. 36. It differs from the display device in the fifth embodiment in that a first detection reference 40*a* and a second detection reference 40*b*, assuming initial positions on the two sides of the midair image 30, are set as shown in FIG. 42. It is to be noted that in the example presented in FIG. 42, the midair image 30 is set so as to take a position halfway between the first and second detection references 40*a* and 40*b*, i.e., so that the distance between the midair image 30 and the first detection reference 40*a* is equal to the distance between the midair image 30 and the second detection reference 40*b*. However, it is not always necessary to set the distance between the midair image 30 and the first detection reference 40*a* and the distance between the midair image 30 and the second detection reference 40*b* equal to each other. An icon 30A is displayed in the midair image 30.

As the finger F moves down toward the icon 30A in the midair image operation mode, the operation detector 13 detects the descending movement of the finger F. As the finger F reaches the first detection reference 40*a*, the detection reference control unit 204 decides that the finger F has reached the first detection reference 40*a* based on the detection output provided from the operation detector 13 and once this decision is made, the display control unit 202 changes the display mode for the icon 30A. The display mode may be switched by raising the display luminance, by flashing the display for a highlighted display effect, or by altering the display color. As the display mode for the icon 30A changes in this manner, the user is able to verify that the icon 30A has been selected with his finger.

As the user's finger F moves further downward and reaches the second detection reference 40*b*, the detection reference control unit 204 decides that the finger F has reached the second detection reference 40*b* based on the detection output provided by the operation detector 13, and the display control unit 202 switches the display content in the midair image 30 based on this decision. Namely, the second detection reference 40*b* has a function similar to that of the detection reference 40 described in reference to the fifth embodiment. It is to be noted that while the display control unit 202 switches the display content of the midair image 30 based on the decision that the finger F has reached the second detection reference 40*b* in the example described above, the present invention is not limited to this example. For instance, once it is decided that the finger F has reached the second detection reference 40*b*, the display control unit 202 may execute control for displaying movie as the midair image 30 and playing the movie based on the decision. Once it is decided that the finger F has reached the second detection reference 40*b*, the display control unit 202 may execute scroll control for the midair image 30 based on the decision.

Next, the calibration processing executed in the sixth embodiment will be explained by assuming that it is executed in the second calibration processing mode. While the second calibration processing is underway, a descending movement of the user's finger F toward the icon 30A in the midair image 30 is likely to stop once the user feels that he has selected the icon 30A, i.e., once he decides that the finger F has reached the first detection reference 40*a*, as shown in FIG. 43(*a*). The detection reference control unit 204 shown in FIG. 36 determines the finger reach position 50 or the designated position 50A based on the point at which the descending movement of the user's finger F has stopped, indicated in the detection output provided by the operation detector 13. The reach position 50 or the designated position 50A is located at a point further upward relative to the first detection reference 40*a* by a distance ΔH.

Since the reach position 50 or the designated position 50A is further upward relative to the first detection reference 40*a* by the distance ΔH, the display position control unit 220 moves the display position of the midair image 30 downward by the distance ΔH, i.e., to a position 30 indicated by the dotted line.

Through the downward movement of the midair image 30, the positional relationship between the midair image 30 and the first detection reference 40*a* is calibrated. Since the distance between the midair image 30 and the second detection reference 40*b* becomes smaller than the distance between the midair image 30 and the first detection reference 40*a* through this calibration processing, the detection reference control unit 204 moves the second detection reference 40*b* downward to a position 40*b* indicated by the dotted line in FIG. 43(*b*), so as to equalize the distance between the midair image 30 and the second detection reference 40*b* with the distance between the midair image 30 and the first detection reference 40*a*. The downward movement of the midair image 30 reduces the distance between the position of the midair image 30 and the position of the second detection referenced 40*b*. For this reason, the ease of operation by the user may be compromised since the user will feel that his finger reaches the second detection reference 40*b* immediately after it touches the midair image 30. However, better ease of operation by the user is assured by changing the distance between the midair image 30 and the second detection reference 40*b* to the suitable distance. When the distance between the midair image 30 and the second detection reference 40*b* is equalized with the distance between the midair image 30 and the first detection reference 40*a*, the user is able to easily discern the distance between the midair image 30 and the second detection reference 40*b* based on the distance between the midair image 30 and the first detection reference 40*a*.

When the reach position 50 or the designated position 50A is located further downward relative to the first detection reference 40*a* by a distance −ΔH, as shown in FIG. 44(*a*), the display position control unit 220 and the display position change unit 500 move the display position of the midair image 30 upward by the distance ΔH, as indicated in FIG. 44(*b*). As the midair image 30 is moved as described above, the detection reference control unit 204 moves the second detection reference 40*b* up to a position 40*b* indicated by the dotted line in FIG. 44(*c*). As a result, the distance between the midair image 30 and the second detection referenced 40*b* is equalized with the distance between the midair image 30 and the first detection reference 40*a*. When the midair image 30 is moved upward, the distance between the position of the midair image 30 and the position of the second detection reference 40*b* lengthens. For this reason, the ease of operation by the user may be compromised, as the user is likely to feel that his finger, having touched the midair image 30, needs to move over quite a distance to reach the second detection reference 40*b*. However, better ease of operation by the user is assured by changing the distance between the midair image 30 and the second detection reference 40*b* to the suitable distance. Since the distance between the midair image 30 and the second detection reference 40*b* is equalized with the distance between the midair image 30 and the first detection reference 40*a*, the user is able to easily discern the distance between the midair image 30 and the second detection reference 40b based on the distance between the midair image 30 and the first detection reference 40a.

While the calibration processing is executed in the second calibration processing mode, as described above, it can be executed in a similar manner in the first calibration processing mode as well.

Variation 1 of the Sixth Embodiment

The display device achieved in the sixth embodiment described above changes the positional relationship between the first detection reference 40a and the midair image 30 by moving the midair image 30 and then moves the second detection reference 40b so as to set the distance between the midair image 30 taking a new position through the move and the second detection reference 40b substantially equal to the distance between the midair image 30 and the first detection reference 40a. Variation 1 of this embodiment will be described next. In variation 1, the positional relationship between the first detection reference 40a and the midair image 30 is changed by moving the midair image 30, as in the display device achieved in the sixth embodiment, but the positional relationship between the midair image 30 and the second detection reference 40b is changed by moving the second detection reference 40b based on the finger reach position or the designated position determined relative to the second detection reference.

The display device in variation 1 brings up on display the midair image 30 as shown in FIG. 42, and sets the first and second detection references 40a and 40b at the initial positions, as does the display device in the sixth embodiment. The calibration processing executed in this variation will be explained in reference to FIGS. 45(a), 45(b) and 45(c). It is to be noted that FIG. 45(a) is identical to FIG. 39(a).

A descending movement of the user's finger F toward a first icon 30A in the midair image 30 is likely to stop once the user feels that he has selected the first icon 30A, i.e., once he decides that the finger F has reached the first detection reference 40a, as shown in FIG. 45(a). The detection reference control unit 204 determines the finger reach position 50 or the designated position 50A based on the detection output provided by the operation detector 13. Since the reach position 50 or the designated position 50A is located at a point further upward relative to the first detection reference 40a by a distance ΔH, the display position control unit 220 moves the display position of the midair image 30 to a position further downward by an extent substantially equal to the distance ΔH, i.e., to a position 30 indicated by the dotted line. Through the downward movement of the midair image 30, the positional relationship between the midair image 30 and the first detection reference 40a is changed, i.e., the positional relationship is calibrated.

Following the calibration, the user moves his finger F further downward, and when he feels that an operation at the icon 30A has been performed, i.e., when he feels that his finger F has reached the second detection reference 40b, he is likely to stop the descending movement of the finger F. As indicated in FIG. 45(b), the detection reference control unit 204 determines the reach position 50 taken by the finger or the designated position 50A relative to the second detection reference 40b based on the detection output provided by the operation detector 13. Since the finger reach position 50 or the designated position 50A is located further upward relative to the second detection reference 40b by the distance ΔH, the detection reference control unit 204 in FIG. 36 moves the second detection reference 40b upward by, for instance, an extent substantially equal to the distance ΔH based on the finger reach position 50 or the designated position 50A. Through this processing, the second detection referenced 40b is moved upward to a position 40a indicated by the dotted line in FIG. 45(c). As the second detection reference 40b moves upward as described above, the positional relationship between the midair image 30 and the second detection reference 40b is changed, i.e., the positional relationship is calibrated.

It is to be noted that when the finger reach position 50 or the designated position 50A relative to the first detection reference 40a is further downward relative to the first detection reference 40a, the display position control unit 220 moves the midair image 30 upward based on the finger reach position 50 or the designated position 50A, as in the display device achieved in the sixth embodiment described in reference to FIG. 44(a) and FIG. 44(b). As the midair image 30 moves upward, the positional relationship between the midair image 30 and the first detection reference 40a is changed, i.e., the positional relationship is calibrated.

When the finger reach position 50 or the designated position 50A, determined in relation to the second detection reference 40b, is further downward relative to the second detection reference 40b, the detection reference control unit 204 moves the second detection reference 40b downward, based on the reach position 50 or the designated position 50A. As the second detection reference 40b moves downward, the positional relationship between the midair image 30 and the second detection reference 40b is changed, i.e., the positional relationship is calibrated. As described above, the positional relationship between the midair image 30 and the first detection reference 40a is first changed by moving the midair image 30 and then the positional relationship between the midair image 30 and the second detection reference 40b is changed by moving the second detection reference 40b, so as to change both the positional relationship between the midair image 30 and the first detection reference 40a and the positional relationship between the midair image 30 and the second detection reference 40b to suitable positional relationships.

It is to be noted that as an alternative to the control executed in variation 1 as described above, the positional relationship between the midair image 30 and the first detection reference 40a may be changed by moving the midair image 30 based on the finger reach position 50 or the designated position 50A determined relative to the first detection reference 40a and the positional relationship between the midair image 30 and the second detection reference 40b may then be changed by further moving the midair image 30 based on the finger reach position 50 or the designated position 50A determined relative to the second detection reference 40b. In this case, the positional relationship between the midair image 30 and the first detection reference 40a and the positional relationship between the midair image 30 and the second detection reference 40b can be changed by moving the midair image 30 alone, through simple control.

Variation 2 of the Sixth Embodiment

Variation 2 of the display device achieved in the sixth embodiment will be described next. It is distinguishable from the sixth embodiment and variation 1 thereof described above in the method with which the midair image 30 is made to move. Namely, the display position of the midair image 30 is moved in correspondence to a descending movement of the user's finger.

After the user's finger, moving down toward an icon 30A, reaches the first detection reference 40a and the display mode for the icon 30A is switched in response in the midair image operation mode in the display device in variation 2, the finger keeps moving downward. As it reaches the display position of the midair image 30, the display position control unit 220 decides that the finger has reached the display position of the midair image 30 based on the detection output provided by the operation detector 13 and moves the display position of the midair image 30 in accordance with the descending movement of the finger. The display position control unit 220 controls the display position of the midair image 30 so that the midair image display position and the position of the descending finger are both held within a predetermined range. Under such control, the display position of the midair image 30 can be made to move downward to trail the descending finger. By setting the display position of the midair image 30 so as to always take a position further downward relative to the descending finger and controlling the display position of the midair image 30 via the display position control unit 220 so that the display position of the midair image 30 moves downward in accordance with the descending finger, it is possible that the user's finger does not move through the midair image 30.

As the descending finger and the descending midair image 30, moving to trail the descending movement of the finger, both reach the second detection reference 40b, the detection reference control unit 204 decides that the finger has reached the second detection reference 40b and the display control unit 202 brings up on display a reproduced image.

As described above, once the finger reaches the midair image 30, the midair image 30 moves to trail the descending movement of the finger, which creates a user perception of the descending finger being guided by the midair image 30 to the second detection reference 40b to enable the finger to reach the second detection reference 40b with a high degree of reliability.

It is to be noted that while the display device 1 in the sixth embodiment and variations 1 and 2 thereof includes at least the control unit 20, the display unit 11 and the operation detector 13, the present invention may instead be adopted in a control device configured with the control unit 20 alone or a control device configured with the control unit 20 and the operation detector 13. The control unit 20 may include at least the calibration unit 203, the display position control unit 220 and the detection reference control unit 204. A structural element may be added as needed in order to realize the various advantages described in reference to the sixth embodiment or variations 1 or 2 thereof.

Seventh Embodiment

The display device achieved in the seventh embodiment will be described below. The display device in this embodiment is structurally similar to the display device 100 achieved in the fourth embodiment described in reference to FIG. 29, FIG. 31 and FIG. 32, and the display device 100 achieved in variation 1 of the fourth embodiment, described in reference to FIG. 33 and FIG. 34. As with the display devices 1 achieved in the fifth embodiment and variations 1 through 4 thereof, the sixth embodiment and variation 1 thereof, the display device 100 in the seventh embodiment is configured so as to enable change of the midair image display position.

As shown in FIG. 46, the display device 100 in the embodiment includes a display position change unit 500 and a display position control unit 220 in addition to the structural elements of the display device 100 achieved in the fourth embodiment, as shown in FIG. 29. As with the fifth embodiment, variations 1 through 4 thereof, the sixth embodiment and variation 1 thereof, the detection reference control unit 204 determines the finger reach position 50 based on the detection output provided by the operation detector 13. Based upon the finger reach position 50, the display position control unit 206 causes the display position change unit 500 to move the position of the midair image 300 along the optical axis of the image forming optical system 12 based on the finger reach position 50. At this time, the display position change unit 500 moves the midair image 30 along the Z direction by moving the display unit 111 along the X direction. Namely, it is able to move the midair image 30 toward the + side along the Z direction by moving the display unit 111 toward the + side along the X direction and move the midair image 30 toward the − side along the Z direction by moving the display unit 111 toward the − side along the X direction. It will be obvious, however, that the display position change unit 500 may move the image forming optical system 112 in parallel without moving the display unit 111 or it may move both the image forming optical system 112 and the display unit 111.

In the various embodiments and variations thereof described above, calibration processing is executed so as to change the positional relationship between the detection reference 40 and the midair image 30 (or an icon 30A or the like) by moving the position of the detection reference 40 or by moving the display position of the midair image 30. However, the positional relationship between the detection reference 40 and the midair image 30 may be change by moving both the detection reference 40 and the midair image 30.

It is to be noted that while the display device 100 in the seventh embodiment includes at least the control unit 20, the display unit 11 and the operation detector 113, the present invention may instead be adopted in a control device configured with the control unit 20 alone or a control device configured with the control unit 20 and the display unit 111. The control unit 20 may include at least the calibration unit 203 and the display position control unit 220. A structural element may be added as needed in order to realize the various advantages described in reference to the seventh embodiment.

Eighth Embodiment

In the embodiments and variations thereof described above, the positional relationship between the detection reference and the midair image is changed by controlling or changing the detection reference and/or the midair image based on the fingertip reach position or the designated position through the calibration processing. The eighth embodiment, in which the detection reference is changed when a predetermined non-contact operation, performed while the calibration processing is underway, is not detected by the detection reference, will be described next.

The display device 1 achieved in this embodiment adopts a structure similar to the display device 1 achieved in the first embodiment, described in reference to FIG. 1 and FIG. 2. In the midair image operation mode, the display control unit 202, the display unit 11 and the image forming optical system 12 at the display device 1 achieved in the eighth embodiment display a midair image 30 for the midair image operation mode, as shown in FIG. 47(a) and FIG. 47(b). The midair image 30 in FIG. 47(a) includes two rectangular icons 30D and 30E.

The detection reference control unit 204 sets rectangular parallelepiped detection references 42 at initial positions, each in correspondence to one of the two icons 30D and 30E included in the midair image 30, as shown in FIG. 47(b) and FIG. 47(c). The areal size of a lateral section of the detection reference 42 corresponding to the icon 30D corresponds to the size of the icon 30D, as clearly indicated in FIG. 47. D1 indicates the depth measured along the up/down direction, i.e., along the Z direction. Namely, the length W1 of a side of the lateral section of the rectangular parallelepiped detection reference 42 is equal to the length W1 of a side of the icon 30D and the length W2 of another side of the lateral section is equal to the length W2 of another side of the icon 30D.

An upper plane, a lower plane, a side plane defined with the length W2 and the depth D1, and another side plane defined with the length W1 and the depth D1 of the rectangular parallelepiped detection reference 42 will be respectively referred to as an upper reference plane 42a, a lower reference plane 42b, a side reference plane 42c and a side reference plane 42d.

While the embodiment will be described by assuming that the detection references 42 are rectangular parallelepiped references, the present invention is not limited to this example and may be adopted in conjunction with spherical detection references, cylinder-shaped detection references, prismatic detection references or detection references assuming a shape other than these.

The midair image 30 is set so that it takes a position at the halfway point between the upper reference plane 42a and the lower reference plane 42b, i.e., so that the distance between the midair image 30 and the upper reference plane 42a is equal to the distance between the midair image 30 and the lower reference plane 42b. It is to be noted that the midair image 30 does not need to take a position at precisely the halfway point between the upper reference plane 42a and the lower reference plane 42b, and the midair image 30 may instead be set at a position at which the distance between the midair image 30 and the upper reference plane 42a and the distance between the midair image 30 and the lower reference plane 42b are not equal to each other, at a position further upward relative to the upper reference plane 42a or at a position further downward relative to the lower reference plane 42b, as long as the midair image 30 (the icons 30D and 30E) and the reference planes 42a and 42b of the detection reference 42 are vertically aligned when viewed along the Z direction.

It is to be noted that the detection reference 42 corresponding to the icon 30E also assumes a rectangular parallelepiped shape having a predetermined depth with a lateral section thereof having a shape corresponding to the shape of the icon 30E, as does the detection reference 42 corresponding to the icon 30D.

In the midair image operation mode, by a predetermined non-contact operation toward the detection reference 42 by the user, the display device 1 executes a function allocated to the icon 30D or the icon 30E. FIGS. 48(a) through 48(c) present examples of predetermined non-contact operations 600A through 600C (may be collectively referred to as a predetermined non-contact operation 600) that may be performed in the embodiment. FIG. 48 schematically illustrates the predetermined non-contact operations 600A through 600C by using arrows, each indicating a path of the movement of the finger F. The user performing the predetermined non-contact operation 600A shown in FIG. 48(a) moves his finger F downward by a distance L1, makes a U-turn with the finger F and then moves the finger F upward by the distance L1. Namely, the predetermined non-contact operation 600A leaves a U-turn path with the downward movement and the upward movement made over distances equal to each other. Instead of making a U-turn, i.e., instead of leaving a U-shaped path, a V-shaped path may be left through the predetermined non-contact operation 600A. As a further alternative, the finger F performing the predetermined non-contact operation 600A may move downward by the distance L1 and then move upward by the distance L1 along the same path. The distance L1, over which the downward movement is made and the distance L1, over which the upward movement is made in the predetermined non-contact operation 600A, may be different from each other. The predetermined non-contact operation 600A performed in the embodiment simply needs to include a downward movement of the finger, immediately followed by an upward movement of the finger.

The user performing the predetermined non-contact operation 600B shown in FIG. 48(b) first moves his finger F downward by the distance L1 and then holds the finger F still for a predetermined length of time. The user performing the non-contact operation 600C shown in FIG. 48(c) first moves his finger F downward by the distance L1 and then moves the finger F sideways at least by a predetermined distance L2.

Instead of performing the predetermined non-contact operation 600 indicated by the path of one of the various paths of movement of the finger F described above, the user may perform a non-contact operation that will leave another path of movement, as long as the path of the movement (the path of movement of the finger F or a hand) can be detected by the operation detector 13.

In the midair image operation mode, once a predetermined non-contact operation 600 is detected by a detection reference by the operation detector 13, the detection reference control unit 204 decides that the finger F has performed an operation at the icon display position based on the detection output provided by the operation detector 13 upon detecting the movement of the user's finger F.

In the example presented in FIG. 49, the detection reference control unit 204 decides that the non-contact operation 600A, among the predetermined non-contact operations 600 described earlier, has been performed at the detection reference 42. Through a predetermined non-contact operation 600A1, the finger F moves downward by the distance L1 from the upper reference plane 42a, makes a U-turn and moves upward by the distance L1 until the finger F reaches the upper reference plane 42a. Through a predetermined non-contact operation 600A2, the finger F moves downward by the distance L1, then makes a U-turn and moves upward by the distance L1 in the space between the upper reference plane 42a and the lower reference plane 42b. Through a predetermined non-contact operation 600A3, the finger F moves downward by the distance L1, makes a U-turn at the lower reference plane 42b and moves upward by the distance L1.

As described earlier, the detection reference control unit 204 decides that the predetermined non-contact operation 600A has been performed at the detection reference 42 if the downward movement of the finger over the distance L1, the U-turn, the upward movement over the distance L1 are all made at the detection reference 42 through the predetermined non-contact operation 600A, as shown in FIG. 49. Namely, the detection reference control unit 204 detects the predetermined non-contact operation 600A by the detection reference 42.

While the method adopted when the detection reference control unit 204 determines whether or not a predetermined non-contact operation 600 has been performed at the detection reference 42 in reference to the predetermined non-contact operation 600A used as an example, such a decision may be made in a similar manner with regard to other predetermined non-contact operations such as the predetermined non-contact operations 600B and 600C. The detection reference control unit 204 decides that a predetermined non-contact operation 600 has been performed at the detection reference 42 if the predetermined non-contact operation 600 has been performed in its entirety at the detection reference 42. Even if part of the predetermined non-contact operation 600 has been performed outside a detection reference 41, it does not decide that the predetermined non-contact operation 600 has been performed at the detection reference 42. When the predetermined non-contact operation 600 is performed with the finger moving by the distance L1 along the up/down direction, the detection reference 42 needs to achieve a depth D1, i.e., the distance between the upper reference plane 42a and the lower reference plane 42b (the length along the Z direction) at least equal to or greater than, the distance L1, and accordingly, the depth D1 may be set to, for instance, 1.5 to 3 times the distance L1.

It is to be noted that outside the detection reference 41 in FIG. 49 is space outside the detection reference 42. In more specific terms, it is the space outside the space defined by the upper reference plane 42a, the lower reference plane 42b, the side reference plane 42c and the side reference plane 42d of the detection reference 42 shown in FIG. 47(c).

A predetermined non-contact operation 600 may be detected outside the detection reference 41, as will be described next. A predetermined non-contact operation is detected outside the detection reference 41 if the predetermined non-contact operation 600 in its entirety is detected outside the detection reference 41.

While the embodiment and variations thereof will be explained in reference to the predetermined non-contact operation 600A chosen as an example, a technology equivalent to that described below may be adopted in conjunction with other non-contact operations such as the non-contact operations 600B and 600C.

FIG. 50 presents examples of the predetermined non-contact operation 600A in its entirety detected outside the detection reference 41. In FIG. 50(a), the entire predetermined non-contact operation 600A is performed with the finger F at a position above the upper reference plane 42a of the detection reference 42. In this situation, the predetermined non-contact operation 600A in its entirety is detected outside the detection reference 41 via the operation detector 13 and the detection reference control unit 204.

FIG. 50(b) shows a predetermined non-contact operation 600Aa in its entirety performed with the finger F at a position below the lower reference plane 42b of the detection reference 42 and a predetermined non-contact operation 600Ab in its entirety performed with the finger F at a position outside the side reference plane 42c of the detection reference 42. Under these circumstances, the entire predetermined non-contact operation 600Aa and the entire predetermined non-contact operation 600Ab are both detected outside the detection reference 41 by the operation detector 13 and the detection reference control unit 204. The method through which the operation detector 13 and the detection reference control unit 204 detect a predetermined non-contact operation 600 outside the detection reference 41 will be explained next. The operation detector 13 sequentially detects the movement of the finger F. Next, based on the detection output provided by the operation detector 13, the detection reference control unit 204 determines whether or not the path of the movement of the finger F corresponds to a predetermined non-contact operation 600 and a decision with regard to the positions taken by the finger F along the path of its movement (in the detection reference 42, outside the detection reference 41 or both at the detection reference 42 and outside the detection reference 41). Based on the results obtained through the decision-making, the predetermined non-contact operation 600 can be detected outside the detection reference 41.

Next, in reference to FIG. 51, FIG. 52 and FIG. 53, the calibration processing executed when the predetermined non-contact operation 600 is detected outside the detection reference 41 will be described. FIG. 51 illustrates the predetermined non-contact operation 600A detected outside the detection reference 41 at a position further upward relative to the upper reference plane 42a of the detection reference 42. It is to be noted that while the calibration processing described below is executed by using the midair image 30 for midair image operation, it may instead be executed by using a midair image 300 for calibration processing, such as that shown in FIG. 4.

Once the user's finger, moving downward in order to perform an operation at the display position of the icon 30D in the midair image 30, reaches the upper limit 13a of the detection range 13A of the operation detector 13, as shown in FIG. 51(a), the operation detector 13 sequentially detects the descending movement of the finger and detection outputs, provided as the finger moves, are sequentially stored into the storage unit 205. Based on the detection outputs provided by the operation detector 13 and stored in the storage unit 205, the detection reference control unit 204 determines whether or not the path of the movement of the finger F corresponds to the predetermined non-contact operation 600A and also determines whether or not the path of the movement of the finger F in its entirety is at the detection reference 42.

Upon deciding that the predetermined non-contact operation 600A has been performed and that the predetermined non-contact operation has been performed in its entirety outside the detection reference 41, the detection reference control unit 204 calculates, based on the detection outputs provided by the operation detector 13 and stored in the storage unit 205, a distance ΔH10 between the start position at which the predetermined non-contact operation 600A has started and the upper reference plane 42a. While the distance ΔH10 may be calculated based on the operation start position for the predetermined non-contact operation 600A and the position of the upper reference plane 42a as described above, it may instead be calculated through the following alternative method. Namely, the distance ΔH10 can also be calculated by determining the lowest position assumed during the predetermined non-contact operation 600A, i.e., the reach position of the predetermined non-contact operation 600A, based on the detection outputs provided by the operation detector 13 and stored in the storage unit 205, calculating the distance between the reach position of the predetermined non-contact operation 600A and the position assumed at the upper reference plane 42a and adding the distance L1, over which the predetermined non-contact operation 600A spans to the distance thus calculated.

Once the distance ΔH10 is calculated, the detection reference control unit 204 moves the entire detection reference 42 upward based on the distance ΔH10, as shown in FIG. 51(b). The detection reference 42 having been moved is indicated by the one-point chain lines. The extent to which the detection reference 42 is moved upward may be substantially equal to the distance ΔH10, as indicated in FIG. 51(*b*), or it may be greater or smaller than the distance ΔH10. As described above, when the predetermined non-contact operation performed by the user is detected outside the detection reference 41 at a position further upward relative to the detection reference 42, the detection reference 42 is changed by moving the entire detection reference 42 up toward the position at which the predetermined non-contact operation has been performed. As a result, when the operation by the user fails to reach the detection reference 42 and is thus not effective, the detection reference 42 is changed in correspondence to position of the operation by the user, making it possible to lessen the sense of operational discomfort that may be otherwise experienced by the user.

FIG. 52 illustrates the predetermined non-contact operation 600A detected outside the detection reference 41 at a position further downward relative to the lower reference plane 42*b* of the detection reference 42. Upon deciding, based on the detection outputs provided by the operation detector 13 and stored in the storage unit 205, that the predetermined non-contact operation 600A has been performed and that the predetermined non-contact operation has been performed outside the detection reference, as shown in FIG. 52(*a*), the detection reference control unit 204 calculates a distance ΔH10 between the lowest position taken in the movement path corresponding to the predetermined non-contact operation 600A, i.e., the reach position taken during the predetermined non-contact operation 600A, and the lower reference plane 42*b* of the detection reference 42. Once the distance ΔH10 is calculated, the detection reference control unit 204 moves the entire detection reference 42 downward based on the distance ΔH10, as shown in FIG. 52(*b*). The detection reference 42 having been moved is indicated by the one-point chain lines. The extent to which the detection reference 42 is moved downward may be substantially equal to the distance ΔH10, as indicated in FIG. 52(*b*), or it may be greater or smaller than the distance ΔH10. As described above, when the predetermined non-contact operation performed by the user is detected outside the detection reference 41 at a position further downward relative to the detection reference 42, the detection reference 42 is changed by moving the entire detection reference 42 down toward the position at which the predetermined non-contact operation has been performed. As a result, when the operation by the user passes through the detection reference 42 and is thus not effective, the detection reference 42 is changed in correspondence to the position of the operation by the user, making it possible to lessen the sense of operational discomfort that may be otherwise experienced by the user.

FIG. 53 illustrates the predetermined non-contact operation 600A detected outside the detection reference 41 at a position outside the side reference plane 42*c* of the detection reference 42. Upon deciding, based on the detection outputs provided by the operation detector 13 and stored in the storage unit 205, that the predetermined non-contact operation 600A has been performed and that the predetermined non-contact operation has been performed outside the side reference plane 42*c*, as shown in FIG. 53(*a*), the detection reference control unit 204 calculates a distance ΔH10 between the side reference plane 42*c* of the detection reference 42 and the part of the movement path of the predetermined non-contact operation 600A that is furthest away from the side reference plane 42*c*. Once the distance ΔH10 is calculated, the detection reference control unit 204 moves the entire detection reference 42 sideways toward the position at which the predetermined non-contact operation 600A has been performed based on the distance ΔH10, as shown in FIG. 53(*b*). The detection reference 42 having been moved is indicated by the one-point chain lines. The extent to which the detection reference 42 is moved sideways may be substantially equal to the distance ΔH10, as indicated in FIG. 53(*b*), or it may be greater or smaller than the distance ΔH10. As described above, when the predetermined non-contact operation performed by the user is detected outside the detection reference 41 at a position outside the side reference plane 42*c* or 42*d* of the detection reference 42, the detection reference 42 is changed by moving the entire detection reference 42 toward the position at which the predetermined non-contact operation has been performed. As a result, when the operation by the user is performed outside the detection reference 42 and is thus not effective, the detection reference 42 is changed in correspondence to the position of operation by the user, making it possible to lessen the sense of operational discomfort that may be otherwise experienced by the user.

It is to be noted that while the detection reference 42 is changed by the change quantity ΔH10 calculated as described above in the examples presented in FIGS. 51 through 53, the detection reference 42 may instead be changed by change quantity calculated by adding a predetermined quantity h to the distance ΔH10. The predetermined quantity h may be, for instance, a value obtained by averaging differences manifesting with regard to the reach position of the predetermined non-contact operation 600 (each representing the difference between the reach position of the non-contact operation and the closest reference plane of the detection reference 42 in a specific instance) or a value obtained by averaging differences with regard to the start positions of a plurality of non-contact operations 600 (each representing the difference between the non-contact operation start position and the closest reference plane of the detection reference 42 in a specific instance). The predetermined quantity h may take a preselected fixed value. In such a case, the detection reference 42 moves by an extent representing the sum of the distance ΔH10 and the predetermined quantity h used as a margin. This means that, even when the non-contact operation cannot be performed exactly at the same position at which the non-contact operation has been performed during the calibration processing, the non-contact operation by the user can still be detected at the detection reference 42, as long as the operation position error stays within the range defined by the predetermined quantity h. In other words, even when the start position or the reach position of the non-contact operation performed by the user changes from session to session, the user non-contact operation can always be detected by the detection reference 42. As a result, by changing the detection reference by an extent indicated by the sum of the distance ΔH10 and the predetermined quantity h, the rate of non-contact operation detection by the detection reference 42 can be raised compared to the detection rate achieved by changing the detection reference 42 by an extent matching the distance ΔH10.

An operation different from the predetermined non-contact operation 600 may be detected outside the detection reference 41, as will be explained next. An operation different from than the predetermined non-contact operation 600 detected outside the detection reference 41 is part of the predetermined non-contact operation 600, instead of the entire predetermined non-contact operation 600, detected outside the detection reference 41.

FIG. 54 presents examples of part of the predetermined non-contact operation 600A detected outside the detection reference 41. FIG. 54(a) shows that part of the predetermined non-contact operation 600A performed with the finger F, i.e., the part corresponding to the distance ΔH10, is performed at a position further upward relative to the upper reference plane 42a of the detection reference 42 with the remainder of the non-contact operation performed at the detection reference 42. In other words, the predetermined non-contact operation 600A is made up with the part of the predetermined non-contact operation 600A, which is detected by the detection reference 42, and the part of the predetermined non-contact operation 600A, which is detected outside the detection reference 41.

Under such circumstances, part of the predetermined non-contact operation 600A is detected outside the detection reference 41 by the operation detector 13 and the detection reference control unit 204.

FIG. 54(b) shows that part of a predetermined non-contact operation 600Aa performed with the finger F, i.e., the part corresponding to the distance ΔH10 is performed at a position further downward relative to the lower reference plane 42b of the detection reference 42 with the remainder of the non-contact operation performed at the detection reference 42. In other words, the predetermined non-contact operation 600Aa is made up with the part of the predetermined non-contact operation 600Aa, which is detected by the detection reference 42, and the part of the predetermined non-contact operation 600Aa, which is detected outside the detection reference 41.

Part of a predetermined non-contact operation 600Ab performed with the finger F, i.e., the part corresponding to the distance ΔH10 is performed at a position further outside the side reference plane 42c and the remainder of the operation is performed at the detection reference 42. In other words, the predetermined non-contact operation 600Ab is made up with the part of the predetermined non-contact operation 600Ab, which is detected by the detection reference 42, and the part of the predetermined non-contact operation 600Ab, which is detected outside the detection reference 41.

In these situations, too, part of the predetermined non-contact operation 600Aa or 600Ab is detected outside the detection reference 41 by the operation detector 13 and the detection reference control unit 204.

Next, in reference to FIG. 54, the calibration processing executed when an operation different from the predetermined non-contact operation 600 is detected outside the detection reference 41 will be explained.

The calibration processing executed when part of the predetermined non-contact operation 600A is performed at the detection reference 42 and the remaining operation is performed at a position further upward relative to the upper reference plane 42a, as shown in FIG. 54(a), is similar to that described in reference to FIG. 51. Namely, the entire detection reference 42 is moved upward in the figure based on the distance ΔH10.

The calibration processing executed when part of the predetermined non-contact operation 600Aa is performed at the detection reference 42 and the remaining operation is performed at a position further downward relative to the lower reference plane 42b, as shown in FIG. 54(b), is similar to that described in reference to FIG. 52. Namely, the entire detection reference 42 is moved downward in the figure based on the distance ΔH10.

The calibration processing executed when part of the predetermined non-contact operation 600Ab is performed at the detection reference 42 and the remaining operation is performed at a position further outside relative to the side reference plane 42c, as shown in FIG. 54(b), is similar to that described in reference to FIG. 53. Namely, the entire detection reference 42 is moved sideways in the figure based on the distance ΔH10.

An example in which the calibration processing described above is executed in the first calibration processing mode will be explained in reference to the flowchart presented in FIG. 55. It is to be noted that the flowchart in FIG. 55 shows the processing executed in steps S701 through S709 and does not show the processing executed in subsequent steps following step S709. The processing executed in step S709 and subsequent steps is similar to the processing executed in step S9 and subsequent steps in the flowchart presented in FIG. 6 and a repeated explanation is not provided. The processing executed in steps S701 through S703 is similar to the processing executed in steps S1 through S3 in the flowchart presented in FIG. 6. In step S704, a decision is made based on detection outputs provided by the operation detector 13, as to whether or not the operation by the user (specifically, the operation by the user toward the display position of the icon 300A, in the midair image 300) is a predetermined non-contact operation. When it is a predetermined non-contact operation, an affirmative decision is made in step S704 and the operation proceeds to step S705, whereas when it is not a predetermined non-contact operation, a negative decision is made in step S704 and the operation waits in standby until an affirmative decision is made.

In step S705, a decision is made as to whether or not the predetermined non-contact operation has been performed at the detection referenced 42. When the predetermined non-contact operation has been performed at the detection reference 42, as shown in FIG. 49, an affirmative decision is made in step S705, and the operation proceeds to step S708, which will be explained later. When the predetermined non-contact operation has not been detected by the detection reference 42, i.e., (1) if the entire predetermined non-contact operation has been detected outside the detection reference 41 or (2) if part of the predetermined non-contact operation has been detected by the detection reference 42 and the remaining part has been detected outside the detection reference 41, a negative decision is made in step S705 and the operation proceeds to step S706. In step S706, the change quantity for the detection reference 42 is calculated based on the positional relationship between the predetermined non-contact operation and the detection reference 42, and then the operation proceeds to step S707.

In step S707, the position of the detection reference 42 is changed based on the change quantity calculated in step S706 before the operation proceeds to step S708. In step S708, the first calibration processing mode ends and the operation proceeds to step S709. In step S709, the midair image operation mode starts. As described above, if the predetermined non-contact operation performed by the user is not detected by the detection reference, the position of the detection reference is changed. In other words, the central position assumed in the detection reference 42 along the up/down direction and/or the central position assumed in the detection reference 42 along the left/right direction is changed. With the detection reference position changed as described above, the user is able to perform an operation at the position suited to the particular user. The positional relationship between the detection reference and the midair image can be changed to that suited to the operation by the user.

It is to be noted that while the calibration processing described above is executed in the first calibration processing mode, the calibration processing may be executed as shown in the flowchart presented in FIG. 55 in the second calibration processing mode as well.

It is to be noted that while a detection reference 42 is set in correspondence to each of the icons 30D and 30E in the eighth embodiment described above, the present invention is not limited to this example and a common detection reference 42 may be set for a plurality of icons or a single detection reference 42 may be set over the entire range of the midair image 30.

Variation 1 of the Eighth Embodiment

In the eighth embodiment described above, the detection reference 42 is changed along the up/down direction and/or the left/right direction based on the positional relationship between the position in space at which the predetermined non-contact operation 600 is detected and the detection reference 42. In other words, the central position of the detection reference 42 assumed along the up/down direction and/or the central position assumed along the left/right direction is changed. The positional relationship achieved in space by the detection reference 42 and the predetermined non-contact operation 600 may be changed by changing the depth D1 of the detection reference 42, as in the display device 1 achieved in variation 1. For instance, when the predetermined non-contact operation 600A is detected outside the detection reference 41 further upward relative to the detection reference 42, as shown in FIG. 50(a), the upper reference plane 42a alone may be changed upward by the change quantity ΔH10 without altering the position of the lower reference plane 42b. Namely, the central position of the detection reference 42 assumed along the up/down direction may be changed by altering the depth D1 of the detection reference 42. As an alternative, the upper reference plane 42a may be changed upward by the change quantity ΔH10 and the lower reference plane 42b may be changed downward by the change quantity ΔH10. Namely, the detection reference 42 may be changed by altering the depth D1 of the detection reference 42 by equal change quantities ΔH10 on the upper side and the lower side thereof without having to alter the central position of the detection reference 42 assumed along the up/down direction. It is to be noted that when the predetermined non-contact operation 600Aa is detected further downward relative to the detection reference 42, as shown in FIG. 50(b), the position of the lower reference plane 42b may be changed downward by the change quantity ΔH10, or the position of the lower reference plane 42b and the position of the upper reference plane 42a may be respectively changed downward and upward by the change quantity ΔH10. It is to be noted that when the predetermined non-contact operation 600Ab is detected further to the right relative to the detection reference 42, the position of the side reference plane 42c can be changed along the left/right direction in a similar manner. Namely, the detection reference 42 may be changed by altering the central position of the detection reference 42 along the left/right direction or by altering the width of the detection reference 42 without changing the central position.

Variation 2 of the Eighth Embodiment

The display device 1 achieved in variation 2 will be described next. When the predetermined non-contact operation 600 performed during the calibration processing is detected outside the detection reference 41, the display device 1 in variation 2 changes the detection reference 42 provided that the distance between the predetermined non-contact operation 600 and the detection reference 42 is equal to or less than a predetermined value. The predetermined non-contact operation 600A may be detected outside the detection reference 41 at a position further upward relative to the detection reference 42, as shown in FIG. 50(a). Under such circumstances, the display device 1 changes the detection reference 42 by judging that the user has intended to perform an operation at the display position of the midair image if it is decided that the distance ΔH10 is equal to or less than the predetermined value, i.e., if it is decided that the predetermined non-contact operation 600A has been performed in the vicinity of the detection reference 42. When, on the other hand, it is decided that the distance ΔH10 is greater than the predetermined value, i.e., if it is decided that the predetermined non-contact operation 600A has been performed at a position away from the detection reference 42, the display device 1 judges that the user has had no intention of performing an operation at the display position of the midair image, that an erroneous operation has been performed or that the user aborted an operation partway through, and accordingly does not change the detection reference 42.

If part of the predetermined non-contact operation 600A is detected outside the detection reference 41, as shown in FIG. 54, the position of the detection reference 42 may be changed based on the distance between the position in space taken by the part of the predetermined non-contact operation 600 detected outside the detection reference 41 and the detection reference 42. For instance, a decision may be made as to whether or not the part of the non-contact operation 600 detected further upward relative to the upper reference plane 42a of the detection reference 42, i.e., the distance ΔH10, as shown in FIG. 54(a), is equal to or less than a predetermined threshold value. When the distance ΔH10 is equal to or less than the predetermined threshold value, most of, but not all of, the predetermined non-contact operation 600A, has been performed with the finger F at the detection reference 42, as illustrated in FIG. 56(a). Under such circumstances, the display device 1 judges that the user has had the intention of performing an operation at the display position of the midair image and changes the position of the detection reference 42. When the distance ΔH10 exceeds the predetermined threshold value, most of the predetermined non-contact operation 600A has been performed outside the detection reference 41, as illustrated in FIG. 56(b). In this case, the display device 1 judges that the user has had no intention of performing an operation at the display position of the midair image, that an erroneous operation has been performed or that the user has aborted an operation partway through, and thus does not altar the position of the detection reference 42.

Variation 3 of the Eighth Embodiment

In variation 3 of the eighth embodiment, the velocity or the acceleration of the user's fingertip is calculated based on the detection output provided by the operation detector 13 and the position of the detection reference 42 is modified based on the calculated velocity or acceleration, as in variation 1 of the first embodiment. Namely, the detection reference 42 is changed based on the velocity of at least part of the predetermined non-contact operation 600 and, specifically, if the velocity of part of the predetermined non-contact operation 600 is lower than a predetermined value. FIG. 57 is a block diagram showing a control unit 20, and a display unit 11 and an operation detector 13 controlled by the detection unit 20 in the display device 1 achieved in variation 3.

The expression "the velocity of at least part of the predetermined non-contact operation 600" means that the velocity of an operation constituting at least part of the predetermined non-contact operation 600. An "operation constituting at least part of the predetermined non-contact operation 600" may be, for instance, an operational segment through which the user's finger moves from outside the detection reference 41 toward the detection reference 42 during the predetermined non-contact operation 600, in which the user's finger first moves from a position outside the detection reference 41 toward the detection reference 42 and then the finger immediately turns back toward the initial position (the predetermined non-contact operation 600A). Or it may be an operational segment through which the user's finger moves toward one end of the detection reference 42 during the predetermined non-contact operation 600, in which the user's finger first moves from a position at the detection reference 42 toward the one end of the detection reference 42 and then immediately turns back (the predetermined non-contact operation 600A).

It is to be noted that the detection reference 42 may be changed for a subsequent operation detection by monitoring the velocity (acceleration) through the entire predetermined non-contact operation 600 (e.g., from the start of the descending movement through the end of the subsequent ascending movement in the predetermined non-contact operation 600A), calculating a velocity (acceleration) average value and deciding whether the operation is decisive or indecisive, based on the average value. For instance, when the operational velocity is high on average, there is the likelihood that the user's finger will move through the detection reference 42, and accordingly control may be executed so as to increase the depth of the detection reference 42 for subsequent sessions.

The velocity/acceleration detection unit 206 in FIG. 57 reads out the electrostatic capacitance value detected by the operation detector 13 after each predetermined time interval and calculates the velocity of the finger movement based on a change having occurred in the electrostatic capacitance value over the predetermined time interval, as in variation 1 of the first embodiment. Based on the velocity thus calculated, it calculates the acceleration of the finger movement and determines whether or not the acceleration exceeds a predetermined value. When the movement velocity and/or the movement acceleration calculated by the velocity/acceleration detection unit 206 is indicated by a value equal to or lower than a predetermined value, an operation predicting unit 211 calculates, i.e., predicts, a path of the movement of the finger F, based on the finger movement velocity or acceleration output from the velocity/acceleration detector 206. Based on the path of the movement of the finger F predicted by the operation predicting unit 211, the detection reference control unit 204 changes the detection reference 42. Namely, if the predicted path of movement of the finger F is not at the detection reference 42, it is decided that the predetermined non-contact operation 600 is not detected at the detection reference 42. In such a case, the detection reference 42 is changed based on the change quantity ΔH10 having been calculated, as in the eighth embodiment. When, on the other hand, the predicted path of movement of the finger F is at the detection reference 42, it is judged that the predetermined non-contact operation 600 is detected by the detection reference 42 and no change is made with regard to the detection reference 42.

The operation predicting unit 211 may instead predict a path of movement of the finger F when the movement velocity and/or the movement acceleration calculated by the velocity/acceleration detection unit 206 is indicated by a value equal to or greater than a predetermined value and the detection reference 42 may be changed based on the predicted path. Namely, if the path of movement of the finger F, predicted when the movement velocity and/or the movement acceleration of the finger F is indicated by a value equal to or greater than the predetermined value is not at the detection reference 42, it will be decided that the predetermined non-contact operation 600 is not detected by the detection reference 42. Then, the detection reference 42 will be changed based on the change quantity ΔH10 having been calculated, as in the eighth embodiment.

Next, if in reference to FIG. 58 and FIG. 59, the processing executed in the first calibration processing mode in the display device 1 achieved in variation 3 will be described. Since the processing executed in step S764 through step S766 in the flowchart presented in FIG. 59 is identical to that in the flowchart presented in FIG. 56, a repeated explanation is not provided. As the finger F moves into the predetermined detection range 13A of the operation detector 13, as shown in FIG. 58(a), the operation detector 13 detects the movement of the finger F as a change in the electrostatic capacitance value in step S764. In step S765, the velocity/acceleration unit 206 calculates, based on the detection output provided by the operation detector 13, the velocity and the acceleration of the movement of the fingertip F. In step S765, the operation predicting unit 211 determines whether or not the movement velocity and the acceleration having been calculated by the velocity/acceleration detection unit 206 are indicated by a value equal to or higher than a first predetermined value and equal to or lower than a second predetermined value. The first predetermined value is selected in correspondence to a velocity and an acceleration at which the finger F, moving downward from a point above the detection reference 42 is predicted to fall short of the upper reference plane 42a, whereas the second predetermined value, greater than the first predetermined value, is selected in correspondence to a velocity and an acceleration at which the finger F moving downward is predicted to move through the lower reference plane 42b. When the movement velocity and the acceleration of the fingertip F are indicated by a value equal to or greater than the first predetermined value and equal to or less than the second predetermined value, an affirmative decision is made in step S765 and the operation proceeds to step S770. When the movement velocity and the acceleration of the finger F are indicated by a value either less than the first predetermined value or greater than the second predetermined value, a negative decision is made in step S765 and the operation proceeds to step S767.

In step S767, the operation predicting unit 211 calculates a path of movement for the fingertip F based on the movement velocity and the acceleration calculated by the velocity/acceleration detection unit 206. In FIG. 58(b), the path of movement of the finger F calculated, i.e., predicted, by the operation predicting unit 211 when the movement velocity and the acceleration indicate a value less than the first predetermined value is indicated by a dotted line 600Ac. In step S768, the detection reference control unit 204 calculates an change quantity ΔH10 for the detection reference 42 as it does in the situation described in reference to FIG. 51 and changes the detection reference 42 accordingly. It is to be noted that the finger reach position may be predicted based on both the finger movement velocity and the acceleration, or based on either of them.

It is to be noted that while the calibration processing described above is executed in the first calibration processing mode, it may be also adopted in the second calibration processing mode It is to be noted that while the operation predicting unit 211 calculates a path of movement of the fingertip F in the explanation provided above, it is not always necessary to calculate a movement path. Namely, the control unit 20 in the display device 1 does not need to include the operation predicting unit 211 and in such a case, the detection reference 42 may be changed by a predetermined change quantity when the movement velocity and the movement acceleration calculated by the velocity/acceleration detection unit 206 are indicated by a value equal to or less than a predetermined value. For instance, the movement velocity or the movement acceleration may be detected at a position further up relative to the detection reference 42 by a predetermined distance, and if the detected movement velocity or movement acceleration is equal to or lower than a predetermined value, the finger F may be predicted to fall short of the detection reference 42 and the detection reference 42 may be changed accordingly.

While the velocity/acceleration detection unit 206 described above reads out the electrostatic capacitance value detected by the operation detector 13 after each time interval, calculates the velocity of the finger movement based on the change occurring in the electrostatic capacitance value over the predetermined time interval and calculates the acceleration of the finger movement based on the velocity thus calculated, the present invention is not limited to this example and it may be adopted in a configuration that includes an image-capturing device used as the velocity/acceleration detection unit 206. While the velocity or the acceleration of the movement of the user's finger is calculated in the explanation provided above, the velocity or the acceleration of the movement of the user's foot or elbow or a stylus held by the user may be calculated instead.

Variation 4 of the Eighth Embodiment

At the display device achieved in the eighth embodiment and variations 1 through 3 thereof described above, the position of the detection reference 42 is changed based on the positional relationship between the position at which the predetermined non-contact operation 600A is performed in space and the detection reference 42 through a single calibration processing session. In other words, a calibration processing session is executed in correspondence to a single user operation. At the display device 1 in variation 4, a single calibration processing session is executed in correspondence to a user operation performed a plurality of times. Namely, the detection reference 42 is changed based on the number of times the predetermined non-contact operation 600A is detected outside the detection reference 41 or the number of times the predetermined non-contact operation 600A is detected at the detection reference 42.

During a first user operation, the detection reference control unit 204 determines based on the detection output provided by the operation detector 13 as to whether or not the finger F has performed the predetermined non-contact operation 600A, and if the predetermined non-contact operation 600A has been detected, it further detects the position at which the predetermined non-contact operation 600A has been performed in space. When the predetermined non-contact operation 600A has been detected at the detection reference 42, the detection reference control unit 204 decides that the first calibration processing has been successful and stores the decision-making results into the storage unit 205. When, on the other hand, the predetermined non-contact operation 600A has been detected outside the detection reference 41, the detection reference control unit 204 decides that the first user operation has failed, calculates an change quantity $\Delta H10$ as in the eighth embodiment and stores the decision-making results and the change quantity $\Delta H10$ into the storage unit 205. Next, decision-making results indicating success or failure of a second user operation and/or the corresponding change quantity $\Delta H10$ are stored into the storage unit 205. The processing may be continuously executed for a third user operation as well.

The detection reference 42 is changed based on a plurality of sets of decision-making results and/or the corresponding change quantities $\Delta H10$ stored into the storage unit 205 in correspondence to the user operation performed successively over a plurality of times, as described above. A decision as to whether or not to change the detection reference 42 based on the decision-making results and/or the change quantities $\Delta H10$ corresponding to the plurality of user operations may be made as described above through any of various methods. For instance, the detection reference 42 may be changed if decision-making results indicating failure are stored successively in the storage unit 205 in correspondence to a plurality of user operations performed successively. Specifically, the detection reference 42 may be changed if the first user operation and the second user operation have both been judged to have failed. As an alternative, the detection reference 42 may be changed if, for instance, the first user operation has been judged successful but the second user operation and the third user operation have been judged to have failed. The detection reference 42 may be changed if the number of operations having been judged to have failed among the plurality of user operations is equal to or greater than a predetermined value. In more specific terms, the detection reference 42 may be changed if, for instance, at least five user operations out of ten user operations are judged to have failed. In this case, the detection reference 42 may be changed as soon as the user operation is judged to have failed for the fifth time (at a time point when the cumulative decision-making results indicate five failures) or the detection reference 42 may be changed after the user has performed the user operation 10 times. It is to be noted that if the predetermined non-contact operation 600A is detected outside the detection reference 41 with high frequency, the frequency with which the detection reference 42 is changed may be increased. Namely, assuming that a setting is selected so as to change the detection reference 42 when at least five user operations out of ten user operations are judged to have failed, eight user operations out of ten may be judged to have failed. Under such circumstances, the detection reference 42 may be changed through a subsequent calibration session if at least three user operations out of five are judged to have failed.

The change quantity $\Delta H10$ by which the detection reference 42 is changed based on the results of a plurality of user operations may be calculated through processing similar to that through which the detection reference is determined in variation 2 of the first embodiment. Namely, a single change quantity $\Delta H10$ may be calculated as the arithmetic mean or the geometric mean of the change quantities calculated in correspondence to the user operations judged to have failed. In this case, too, a new change quantity $\Delta H10$ may be calculated through suitable weighting, as has been described in reference to variation 2 of the first embodiment.

It is to be noted that the detection reference 42 may be changed based on the results of a plurality of user operations if the value calculated as the arithmetic mean or the geometric mean of the change quantities ΔH10 calculated in correspondence to the individual user operations exceeds a predetermined threshold value or if the change quantities ΔH10 calculated in correspondence to the individual user operations indicate a trend of increasing magnitude.

It is to be noted that while the position of the detection reference 42 is changed based on the number of times the predetermined non-contact operation 600A is detected outside the detection reference 41 in the example described above, an operation different from the predetermined non-contact operation 600A, i.e., part of the predetermined non-contact operation 600A, detected outside the detection reference 41 may also be regarded as a user operation failure. Namely, the detection reference 42 may be changed when part of the predetermined non-contact operation 600A is detected successively outside the detection reference 41 as a plurality of user operations or if part of the predetermined non-contact operation 600A is detected outside the detection reference 41 a predetermined number of times or more as a plurality of user operations are performed.

Variation 5 of the Eighth Embodiment

The predetermined non-contact operation 600 is performed by the user moving his finger F toward the display position 1 in the example described in reference to the eighth embodiment. This operation may be performed by making a U-turn with the finger F, as shown in FIG. 48(*a*). However, the present invention is not limited to this example. The predetermined non-contact operation 600 may be performed by pointing three fingers at the display position or by moving the finger F toward the display position 1 in front of the user's body. As an alternative, the predetermined non-contact operation 600 may be performed by holding the finger F still for a predetermined length of time, e.g., 20 seconds.

In the embodiment described above, the detection reference control unit 204 determines whether or not the predetermined non-contact operation 600 has been performed based on the detection output provided by the operation detector 13. However, the user may not always be able to perform the predetermined non-contact operation 600 accurately or correctly. For instance, the predetermined non-contact operation 600 may include a descending movement of the finger over 10 cm immediately followed by an ascending movement of the finger over 10 cm, but the user may actually move his finger downward over 5 cm and then move it upward by 5 cm. The user performing the predetermined non-contact operation 600 may need to point three fingers at the display position 1 but may not be able to unclench his fist to point the three fingers and may end up pointing two fingers. The user performing the predetermined non-contact operation 600 may need to move his finger F in front of his body towards the display position, but may move the finger F toward the display position at a side of his body. The user performing the predetermined non-contact operation 600 may also need to hold his finger F still for a predetermined length of time, e.g., 20 seconds, that may move his finger before the 20 second-holding time is up, e.g., after 15 seconds.

Under such circumstances, even when the central position or the detection depth of the detection reference 42 has been changed so as to enable detection of the entire user operation at the detection reference 42, the user operation will not be recognized unless the operation itself performed by the user (a detection value detected as the operation by the user) matches the "predetermined non-contact operation 600" (a reference value indicating the predetermined non-contact operation 600). In such a case, it becomes possible to recognize the operation by the user as the predetermined non-contact operation 600 by changing the reference value indicating the predetermined non-contact operation 600 as a way of changing the detection reference 42.

Namely, when a given non-contact operation performed by the user is similar to, but not identical to, the predetermined non-contact operation 600 or is very roughly similar, the display device 1 assumes that the user has performed the predetermined non-contact operation 600. The display device 1 then changes (updates) the reference value indicating the predetermined non-contact operation 600 (i.e., the definition of the predetermined non-contact operation 600) stored therein by using a value indicating the operation itself performed by the user (the detection value indicating the operation by the user). For instance, the detection reference control unit 204 may compare the detection value indicating the user non-contact operation having been detected with the reference value indicating the predetermined non-contact operation 600 that is stored in advance. The reference value indicating the predetermined non-contact operation 600 may be the definition of the predetermined non-contact operation 600 or a template of the predetermined non-contact operation 600, stored in advance in the display device 1. When the comparison results indicate that the degree of similarity between them exceeds a predetermined threshold value, the reference value indicating the predetermined non-contact operation 600 (the value stored in advance) is changed based on the detection value indicating the user non-contact operation having been detected. Through these measures, the non-contact operation performed by the user is rendered effective. For instance, the reference value indicating the predetermined non-contact operation 600 stored in advance may be a value indicating "descent of finger F by 10 cm". Upon detecting that the finger F has descended by 5 cm, the reference value indicating the predetermined non-contact operation 600 is switched to a value indicating "descent of the finger F by 5 cm". By changing the reference value indicating the predetermined non-contact operation 600 as described above, a non-contact operation similar to the predetermined non-contact operation 600 is rendered effective as well. By changing the reference value indicating the predetermined non-contact operation 600 to a value that allows the user to perform the non-contact operation with less movement, the operational onus placed on the user is reduced.

The reference value indicating the predetermined non-contact operation may be a value indicating, "descent of the finger over 10 cm immediately followed by ascent of the finger over 10 cm "in front of" the body". When the user has moved his finger downward by 10 cm and then moved the finger upward by 10 cm at "a side of" his body, the reference value indicating the predetermined non-contact operation 600 may be changed to a value indicating an operation defined as "descent of the finger over 10 cm immediately followed by ascent of the finger over 10 cm at a side of the body". As a result, it becomes possible to operate the display device 1 by moving the finger downward by 10 cm and then moving it upward by 10 cm at a side of the body.

It is to be noted that the detection reference 42 (the reference value indicating the predetermined non-contact operation 600) may be changed based on the operation by the user performed a plurality of times. Namely, the reference value indicating the predetermined non-contact operation 600 may be changed when a non-contact operation similar to the predetermined non-contact operation 600, though not exactly the same, has been performed a plurality of times.

As described above, the detection reference 42 may be changed by changing the reference value indicating the predetermined non-contact operation 600.

Variation 6 of the Eighth Embodiment

At the display device 1 achieved in the eighth embodiment and variations 1 through 5 thereof the detection reference 42 is changed when, for instance, a predetermined non-contact operation 600 or part of a predetermined non-contact operation 600 is detected outside the detection reference 41.

As an alternative, the detection reference 42 may be changed when an operation instructing change of the detection reference 42 is detected by the detection reference 42. The change that may be made to the detection reference 42 under such circumstances includes change of the position or the expanse of the detection reference 42, and change of the reference value indicating the predetermined non-contact operation 600. In variation 6, a gesture instructing calibration, for instance, is stored in the display device 1, and the detection reference 42 is changed when the user makes the gesture instructing the calibration at the detection reference 42. The detection reference 42 may also be changed in a manner similar to that described above when the gesture instructing calibration is detected outside the detection reference 41.

Variation 7 of the Eighth Embodiment

The detection reference control unit 204 may change the detection reference 42 in response to sound. The change that may be made to the detection reference 42 under such circumstances, includes change of the position or the expanse of the detection reference 42, change of the reference value indicating the predetermined non-contact operation 600 and like. The display device 1 includes, for instance, a sound collector 14 similar to that in variation 6 of the first embodiment and the control unit 20 includes a sound detection unit 208 that detects audio data input thereto from the sound collector 14. It is to be noted that the sound detection unit 208 in this variation has a speech recognition function of the known art that enables it to recognize sounds other than the word "yes". Upon detecting, through the speech recognition function, a speech indicating that the user "cannot perform an operation", a speech requesting calibration or the like, the display device 1 in variation 7 changes the detection reference 42. In more specific terms, it may move the detection reference 42 or change the expanse of the detection reference 42 so that the position assumed by the user's finger when the sound (speech) was detected is set within the section reference 42. As an alternative, upon detecting the sound (speech), the detection reference 42 may be moved toward the user by a predetermined extent, e.g., by 1 cm or the depth of the detection reference 42 may be changed toward the user. As a yet further alternative, the reference value indicating the predetermined non-contact operation 600 may be changed to the detection value detected as the operation by the user at the time when the sound (speech) was detected. As a further alternative, the reference value indicating the predetermined non-contact operation 600 may be changed by a predetermined extent upon detecting the sound (speech). For instance, assuming that the reference value indicating the predetermined non-contact operation 600 stored in advance is a value indicating "descent by 10 cm", the reference value indicating the predetermined non-contact operation 600 may be changed (updated) with a value indicating "descent by 9 cm" upon detecting the sound (speech).

It is to be noted that it is not always necessary that the display device 1 include the sound collector 14, and in such a case, the sound detection unit 208 may detect sound by using audio data input thereto from an external sound collector device through a wireless connection or a wired connection.

Variation 8 of the Eighth Embodiment

The detection reference control unit 204 may change the detection reference 42 based on time. The change that may be made to the detection reference 42 under such circumstances includes change of the position or the expanse of the detection reference 42, and change of the reference value indicating the predetermined non-contact operation 600 and like. The display device 1 in variation 8 changes the detection reference 42 by a predetermined extent if, for instance, the predetermined non-contact operation 600 is not detected by the detection reference 42 within a predetermined time interval. Accordingly, the control unit 20 includes a time count unit and the detection reference control unit 204 changes the detection reference 42 by the predetermined extent based on an output provided by the time count unit when no icon operation or the like has been performed over the predetermined length of time after the power switch at the display device 1 was turned on. If a subsequent icon operation or the like is not performed after a predetermined length of time elapses following an operation performed for a given icon or the like, the detection reference control unit 204 changes the detection reference 42 by the predetermined extent based on an output provided by the time count unit having counted the predetermined length of time.

It is desirable that the detection reference 42 be moved for change by the predetermined extent toward the user based on the time count of the predetermined time interval in variation 8. For instance, if no operation by the user is detected over the predetermined length of time, the central position (the overall position) of the detection reference 42 may be moved toward the user or the expanse of the detection reference 42 may be changed on the side toward the user by the predetermined extent of, for instance, 1 cm. As an alternative, the central position of the detection reference 42 may be moved or the expanse of the detection reference 42 may be changed so that the position taken by the user's finger when the predetermined length of time has elapsed is set in the detection reference 42. As a further alternative, the reference value indicating the predetermined non-contact operation 600 may be changed to the detection value detected as the operation by the user when the predetermined length of time has elapsed. The reference value indicating the predetermined non-contact operation 600 may be changed by a predetermined extent once the predetermined length of time elapses. For instance, assuming that the reference value indicating the predetermined non-contact operation 600 stored in advance is a value indicating "descent by 10 cm", the reference value indicating the predetermined non-contact operation 600 may be changed (updated) with a value indicating "descent by 9 cm" once the predetermined length of time elapses.

Variation 9 of the Eighth Embodiment

The detection reference control unit 204 may change the detection reference 42 based on the user's face. The change that may be made to the detection reference 42 under such circumstances includes change of the position or the expanse of the detection reference 42, and change of the reference value indicating the predetermined non-contact operation 600. The control unit 20 analyzes an image of the user's face, captured via, for instance, a camera installed at the display device 1 in variation 9, and upon detecting a predetermined expression on the user's face (upon recognizing a predetermined facial expression through a function commonly referred to as a face recognition function), the detection reference 42 is changed. It is to be noted that the predetermined facial expression may be that of frustration indicating that the user cannot perform an operation smoothly, and in such a case, the detection reference 42 is changed upon detecting a frustrated expression on the user's face.

Upon detecting frustration in the user through the face recognition function of the display device 1, the detection reference 42 may be moved toward the user or the expanse of the detection reference 42 may be changed so as to move toward the user by a predetermined extent (e.g., 1 cm). The detection value indicating the operation performed by the user immediately before frustration is recognized on the user's face may be stored and the reference value indicating the predetermined non-contact operation 600 may be changed based on the detection value thus stored.

Variation 10 of the Eighth Embodiment

The detection reference control unit 204 may change the detection reference 42 (the position or the expanse of the detection reference 42 or the reference value indicating a predetermined non-contact operation) when a gesture made by the user is not detected by the detection reference 42. The user may perform a predetermined non-contact operation 600 by gesturing with his hand to simulate the "stone", the "scissors", the "paper" or the like or by moving his finger F sideways immediately after a descending movement. At the display device 1 in variation 10, characteristics information (reference values indicating characteristics) for the various non-contact operations is stored in advance in the storage unit 205. The display device 1 detects a gesture made by the user, and determines whether or not the gesture matches any of the predetermined non-contact operations described above by comparing the detected gesture with a set of characteristics information selected from the plurality of sets of characteristics information stored in the storage unit 205. When the user's gesture has not been detected by the detection reference 42, the display device 1 changes the detection reference 42. In this situation, the detection reference 42 is changed by switching to the reference value indicating another predetermined non-contact operation 600. Namely, the reference value initially selected at the display device 1 for purposes of operation detection by the detection reference 42 may correspond to the characteristics information indicating the hand gesture "stone". In this case, if a user's gesture is not detected by the detection reference 42, the display device 1 switches to the reference value corresponding to the characteristics information indicating an operation other than the hand gesture "stone" (e.g., a specific hand gesture among the plurality of gestures listed above, such as the hand gesture simulating the "scissors") from the reference value for the characteristics information indicating the hand gesture "stone".

Variation 11 of the Eighth Embodiment

When the position of the finger F performing a predetermined non-contact operation 600 matches a predetermined position, the predetermined position may be located inside the detection reference 42, outside the detection reference 41, exactly at an icon display position, or exactly at the border of the detection reference 42. When the predetermined position is located inside the detection reference 42, it is decided that the predetermined non-contact operation 600 has been performed while the finger is inside the detection reference 42. When the predetermined position is located outside the detection reference 41, it is decided that the predetermined non-contact operation 600 has been performed while the finger is outside the detection reference 41. When the predetermined position exactly matches an icon display position, it is decided that the predetermined non-contact operation 600 has been performed when the finger F is set exactly at the icon display position in the midair image or when the finger F has performed an operation at the icon display position. When the predetermined position is located at the border of the detection reference 42, it is decided that the predetermined non-contact operation 600 has been performed as the finger F passes through a boundary of the detection reference 42 and outside the detection reference 41 or as the finger, having passed through the boundary, passes through the boundary again.

Variation 12 of the Eighth Embodiment

While an explanation has been given in reference to the eighth embodiment and variations 1 through 11 thereof by assuming that the detection reference 42 achieves a depth D1 along the up/down direction, the detection reference 42 may instead be defined with a plane as is the detection reference 40 in the first embodiment. As shown in FIGS. 60(*a*) and 60(*b*), the predetermined non-contact operation 600A performed by making a U-turn at a position further downward relative to the detection reference 40 and set apart from the detection reference 40 by a distance L1 or a distance equal to or greater than the distance L1 is detected by the detection reference 40. The predetermined non-contact operation 600A performed at a position further upward relative to the detection reference 40 (within the electrostatic capacitance detection range 13A), as shown in FIG. 61(*a*), is detected outside the detection reference 41 by the operation detector 13, whereas part of the predetermined non-contact operation 600A performed by the finger passing through the detection reference 40, as shown in FIG. 61(*b*) is detected outside the detection reference 41 by the operation detector 13. In the situations illustrated in FIGS. 61(*a*) and 61(*b*), the position of the detection reference 40 (the position taken along the Z direction in FIG. 61) may be changed by change quantity $\Delta H10$ calculated based on the distance from the detection reference 40.

The processing described in reference to the eighth embodiment and variations 1 through 12 thereof may be also executed at the display device 100 achieved in any of the fourth embodiment, variation 1 thereof and the seventh embodiment.

While the predetermined non-contact operation 600 is performed with regard to the display position of the midair image in the eighth embodiment and variations 1 through 12 thereof described above, the present invention is not limited to this example. The position of the detection reference 42 may be changed based on the positional relationship between the position at which the predetermined non-contact operation 600 is performed in space and the detection reference 42 when, for instance, the predetermined non-contact operation 600 is performed in space with regard to an image displayed at the display unit 11 of the display device achieved in any of the eighth embodiment and variations 1 through 12 thereof.

It is to be noted that while the display device 1 in the eighth embodiment and variations 1 through 12 thereof includes at least the control unit 20, the display unit 11 and the operation detector 13, the present invention may instead be adopted in a control device configured with the control unit 20 alone or a control device configured with the control unit 20 and the operation detector 13. The control unit 20 may include at least the calibration unit 203 and the detection reference control unit 204.

In the various embodiments and variations thereof described above, a midair image is generated via the image forming optical system 12 in correspondence to an image displayed at the display unit 11 in the display device 1. A midair image is generated via the image forming optical system 112 in correspondence to an image displayed at the display unit 111 at the display device 100. However, a midair image may be generated by adopting a structure other than those described above through the following methods. The structures explained below simply represent examples and a midair image may be generated by assuming a structure other than those described below.

A midair image may be generated at a display device by displaying an image to be viewed with the right eye and an image to be viewed with the left eye, which manifests parallax relative to the image to be viewed with the right eye, on display at the display unit so as to create an image perceived by the user to have depth, unlike the images displayed at the display unit. This method creates a user perception that an image, corresponding to the images displayed at the display unit, is on display in midair.

The user may wear a display device configured with a transmissive head-mounted display (HMD). An image displayed at the HMD is superimposed over the actual visual field and thus the user feels as if the image displayed at the HMD is floating in midair.

It is to be noted that a midair image may be generated by projecting a virtual image or by directly forming an image in the user's retina. In yet another midair image generation method, light may be emitted in mid air by condensing laser light in midair and forming plasma with air molecules. Through this method, a three-dimensional image is generated as a real image in midair by controlling the laser light condensing position at any desired position in the three-dimensional space. In yet another midair image generation method, an image may be generated in midair via a display device having a function of creating fog in the air and a projector function by creating a screen with the fog in the air and projecting an image onto the screen formed with the fog (fog display).

A program enabling calibration at the display device 1 or 100 may be recorded into a computer-readable recording medium, and the calibration may be executed based on the program read into a computer system. It is to be noted that the "computer system" in this context may include an OS (operating system) and hardware such as peripheral devices.

It is to be also noted that the "computer system" may include a homepage provider environment (or a display environment) achieved in conjunction with the WWW system. The "computer-readable recording medium" may be a non-volatile writable memory such as a flexible disk, a magneto-optical disk, a ROM and a flash memory, a portable medium such as a CD-ROM or a storage device such as a hard disk built into a computer system. The "computer-readable recording medium" may be a storage medium capable of holding a program over a specific length of time, such as a volatile memory, e.g., DRAM (dynamic random access memory) in a computer system functioning as a server or a client when the program is transmitted via a communication network such as the Internet or via a communication line such as a telephone line.

The program stored in a storage device or the like in a computer system may be transmitted to another computer system via a transmission medium or on a transmission wave in the transmission medium. The "transmission medium" through which the program is transmitted in this context refers to a medium having a function of information transmission, examples of which include a network (communication network) such as the Internet and a communication line such as a telephone line. The program described above may enable some of the functions described earlier. The program may be a differential file (differential program) that works in conjunction with a program already recorded in the computer system so as to enable the functions described earlier.

It is to be noted that a detection device that detects an operation by a user on a midair display, comprising a detection unit that detects a predetermined non-contact operation by a detection reference and a control unit that changes a positional relationship between the detection reference used for operation detection and the display, and changes the detection reference when the predetermined non-contact operation is not detected by the detection reference, with the control unit being capable of changing the positional relationship for each user, may be configured by combining any of the various embodiments and numerous variations thereof described above. The control unit in the detection device may change the detection reference based on sound. The control unit in the detection device may also change the detection reference based on time. The control unit in the detection device may change the detection reference based on the user's face. The control unit in the detection device may change the detection reference when a specific movement is not detected as the predetermined non-contact operation by the detection reference. The control unit in the detection device may change the detection reference when a "press down" operation is not detected as a predetermined non-contact operation by the detection reference. The control unit in the detection device may change the detection reference when a gesture is not detected as a predetermined non-contact operation by the detection reference. The control unit in the detection device may change the detection reference when the shape of an operating object performing the predetermined non-contact operation does not match a predetermined shape. A detection device that detects an operation by a user on a midair display, comprising a detection unit that includes a detection reference used for detection of a non-contact operation and a control unit that changes a positional relationship between the detection reference used for detecting the non-contact operation and the display, and changes the detection reference based on the non-contact operation detected outside a detection reference, with the control unit being capable of changing the positional relationship for each user, may be configured by combining any of the various embodiments and numerous variations described above.

It is to be noted that a detection device comprising a detection unit that detects a predetermined non-contact operation by a detection reference and a control unit that changes the detection reference when the predetermined non-contact operation is not detected by the detection reference, with the control unit being capable of changing a positional relationship based on an operation by a user, may be configured by combining any of the various embodiments and numerous variations thereof described above. A detection device comprising a detection unit that detects a predetermined non-contact operation by a detection reference and a control unit that changes the detection reference when the predetermined non-contact operation is not detected by the detection reference with the control unit being capable of changing a positional relationship based on user information, may be configured by combining any of the various embodiments and numerous variations described above. A detection device comprising a detection unit that detects a predetermined non-contact operation by a detection reference and a control unit that changes the detection reference when the predetermined non-contact operation is not detected by the detection reference, with the control unit being capable of changing a positional relationship based on a change in an environment surrounding the detection device attributable to a user, may be configured by combining any of the various embodiments and numerous variations described above.

It is to be noted that a detection device that detects an operation by a user on a midair display comprising a detection unit that detects a predetermined non-contact operation by a detection reference and a control unit that changes the detection reference when the predetermined non-contact operation is not detected by the detection reference, with the control unit being capable of changing a positional relationship by controlling the display, may be configured by combining any of the various embodiments and numerous variations described above.

It is to be noted that a control device comprising a control unit that changes a positional relationship between a detection device capable of detecting an operation by a user on a midair display and the display by controlling the display based on the operation by the user, with the control unit being capable of changing the positional relationship for each user, may be configured by combining any of the various embodiments and variations thereof described above. A control device comprising a control unit that changes a positional relationship between a detection device capable of detecting an operation by the user on a midair display and the display by controlling the display based on the operation by the user, with the control unit being capable of changing the positional relationship for each user, may be configured by combining any of the various embodiments and variations thereof described above. A control device comprising a control unit that changes a positional relationship between a detection device capable of detecting an operation by a user performed on a midair display and the display by controlling the display based on a change in an environment surrounding the detection device attributable to a user, with the control unit being capable of changing the positional relationship for each user, may be configured by combining any of the various embodiments and variations thereof described above.

It is to be noted that a control device comprising a detection unit that detects a predetermined non-contact operation by a detection reference and a control unit that changes a positional relationship between the detection reference used for detecting an operation by a user on a midair display and the display by controlling the display and changes the detection reference when the predetermined non-contact operation is not detected by the detection reference, with the control unit being capable of changing a positional relationship for each user, may be configured by combining any of the various embodiments and numerous variations thereof described above. The control unit in the control device may change the detection reference based on sound. The control unit in the control device may change the detection reference based on time. The control unit in the control device may change the detection reference based on the user's face. The control unit in the control device may change the detection reference when a specific movement is not detected as the predetermined non-contact operation by the detection reference. The control unit in the control device may change the detection reference when a press down operation is not detected as the predetermined non-contact operation by the detection reference. The control unit in the control device may change the detection reference when a gesture is not detected as the predetermined non-contact operation by the detection reference. The control unit in the control device may change the detection reference when the shape of an operating object performing the non-contact operation does not match a predetermined shape. A control device comprising a detection unit that includes a detection reference used for detecting a non-contact operation and a control unit that changes a positional relationship between the detection reference used for detecting a user performed on a midair display and the display by controlling the display and changes the detection reference based on the non-contact operation detected outside a detection reference, with the control unit being capable of changing the positional relationship for each user, may be configured by combining any of the various embodiments and numerous variations described above.

As long as the features characterizing the present invention are not compromised, the present invention is in no way limited to the particulars of the embodiments and variations thereof described above and other modes or combinations that are conceivable within the technical teaching of the present invention are also within the scope of the invention.

REFERENCE SIGNS LIST 1, 100 display device
11, 111 display unit
112 image forming optical system
13, 113 operation detector
14 sound collector
18, 118 image-capturing device
19 environment detection unit
20 control unit
116 light emitting element
117 light receiving element
119 actuator
201 image generation unit
202 display control unit
203 calibration unit
204 detection reference control unit
205 storage unit
206 velocity/acceleration detection unit
207 stop position predicting unit
208 sound detection unit
209 image analysis unit 210 user information analysis unit
220 display position control unit
500 display position change unit

The invention claimed is:

1. A detection device that detects an operation by a user for a midair display, the device comprising:
an operation detector that detects a position of the operation based on a value that changes based on a distance between the midair display and the user, the midair display occupying a position within a predetermined detection range of the operation detector; and
a processor that changes a positional relationship between a detection reference at which the operation is determined to be performed and the midair display, wherein
the processor is capable of changing the positional relationship based on the user.

2. The detection device according to claim 1, wherein the processor changes the positional relationship between the detection reference and the midair display by controlling the detection reference based on the operation.

3. The detection device according to claim 2, wherein the processor changes the positional relationship by changing a position of the detection reference.

4. The detection device according to claim 3, wherein the processor controls the position of the detection reference based on a direction of the operation for the midair display.

5. The detection device according to claim 2, wherein the processor controls a direction to move the detection reference based on whether or not the position of the operation detected by the operation detector reaches the detection reference.

6. The detection device according to claim 5, wherein:
the operation is a press down operation for the midair display; and
the processor moves the detection reference in a direction of the press down operation or in a direction opposite to the direction of the press down operation.

7. The detection device according to claim 6, wherein the position of the operation detected by the operation detector is a position based on a reach position of the press down operation or a designated position by the user.

8. The detection device according to claim 6, wherein the processor moves the detection reference in the direction opposite to the direction of the press down operation when the position of the operation detected by the operation detector reaches the detection reference.

9. The detection device according to claim 6, wherein the position of the operation detected by the operation detector is a position based on a reach position of the press down operation or a designated position.

10. The detection device according to claim 2, wherein the processor controls a part of the detection reference.

11. The detection device according to claim 10, wherein:
the midair display includes a first midair display and a second midair display; and
the detection reference includes a first detection reference at which the operation for the first midair display is determined to be performed and a second detection reference at which the operation for the second midair display is determined to be performed.

12. The detection device according to claim 11, wherein the processor sets the first detection reference and the second detection reference at different positions.

13. The detection device according to claim 2, wherein the processor changes the positional relationship by setting a size of the detection reference along a direction of the operation.

14. The detection device according to claim 13, wherein the processor controls the size of the detection reference along the direction of the operation based on a quantity of the operation.

15. The detection device according to claim 1, wherein:
the processor sets the detection reference, and
the processor changes the positional relationship between the set detection reference and the midair display.

16. The detection device according to claim 1, further comprising:
a memory that stores the detection reference.

17. The detection device according to claim 1, wherein the processor changes the positional relationship based on the operation by the user.

18. The detection device according to claim 17, wherein the processor changes the positional relationship so as to set the detection reference over a predetermined range that includes a reach position of a press down operation for the midair display by the user.

19. The detection device according to claim 18, wherein the processor sets the detection reference over a three dimensional area between (i) a position set apart from the reach position by a predetermined distance along a direction opposite from a direction in which the press down operation is performed and (ii) the reach position.

20. The detection device according to claim 18, wherein the processor determines the reach position for the press down operation based on a velocity or an acceleration of the press down operation by the user.

21. The detection device according to claim 1, wherein the processor changes the positional relationship based on a designated position designated by the user.

22. The detection device according to claim 21, wherein:
the operation by the user is performed with a finger of the user; and
the processor designates a detected position of the finger as the designated position when a sound from the user is detected.

23. The detection device according to claim 17, wherein the processor changes the positional relationship based on a plurality of operations performed by the user.

24. The detection device according to claim 1, further comprising:
a camera that captures an image of the operation by the user, wherein
the operation by the user is detected based on the image captured by the camera.

25. The detection device according to claim 1, further comprising:
a display that displays the midair display.

26. An electronic apparatus equipped with the detection device according to claim 1.

27. A detection method for detecting an operation by a user for a midair display, the method comprising:
detecting, by an operation detector, a position of the operation based on a value that changes based on a distance between the midair display and the user, the midair display occupying a position within a predetermined detection range of the operation detector; and
changing, by the user, a positional relationship between a detection reference at which the operation is determined to be performed and the midair display.

28. The detection method according to claim 27, wherein changing the positional relationship between the detection reference and the midair display is performed by controlling the detection reference based on the operation.

29. The detection device according to claim 1, wherein the detection reference is a detection area.

30. The detection method according to claim 27, wherein the detection reference is a detection area.

31. The detection device according to claim 29, wherein:
the detection area is a three-dimensional area; and
at least one depth of the three-dimensional area or a central position of the three-dimensional area is changeable by the processor.

32. The detection device according to claim 1, wherein the processor is capable of changing the positional relationship between the detection reference and the midair display based on a detected sound from the user.

33. The detection device according to claim 1, wherein the operation detector detects the position of the operation by way of an electrostatic capacitance value.

34. A detection device that detects an operation by a user for a midair display, the device comprising:
an operation detector that detects a position of the operation by way of an electrostatic capacitance value, the midair display occupying a position within a predetermined detection range of the operation detector;
a processor that changes a positional relationship between a detection reference at which the operation is determined to be performed and the midair display; and
a memory that stores a said detection reference for each of a plurality of users of the midair display, wherein
the processor is capable of changing the positional relationship based on the user.

35. A detection method for detecting an operation by a user for a midair display, the method comprising:
detecting, by an operation detector, a position of the operation by way of an electrostatic capacitance value, the midair display occupying a position within a predetermined detection range of the operation detector;
changing, by the user, a positional relationship between a detection reference at which the operation is determined to be performed and the midair display; and
storing in a memory a said detection reference for each of a plurality of users of the midair display.

36. The detection device according to claim 1, wherein the detection reference is spaced apart from the midair display.

* * * * *